(12) United States Patent
Siems et al.

(10) Patent No.: US 6,591,025 B1
(45) Date of Patent: Jul. 8, 2003

(54) OPTICAL SENSING SYSTEM

(75) Inventors: Lee E. Siems, Simonton, TX (US); Han-Sun Choi, Houston, TX (US); Greyson Knapp, Houston, TX (US); Reinis Kanders, Houston, TX (US); John L. Maida, Houston, TX (US); Tom O'Brien, Sugarland, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/524,918

(22) Filed: Mar. 13, 2000

Related U.S. Application Data

(63) Continuation-in-part of application No. 09/144,953, filed on Sep. 1, 1998.

(51) Int. Cl.[7] .................................................. G02B 6/00
(52) U.S. Cl. ...................... 385/12; 385/13; 250/227.14; 250/227.18; 250/227.16; 356/32; 356/35.5
(58) Field of Search .............................. 385/12, 13, 37; 250/227.14, 227.16, 227.19, 227.18, 227.27; 356/32, 35.5; 372/18

(56) References Cited

U.S. PATENT DOCUMENTS

| | | | | |
|---|---|---|---|---|
| 4,649,529 A | * | 3/1987 | Avicola | 356/478 |
| 5,313,266 A | * | 5/1994 | Keolian et al. | 250/227.19 |
| 5,361,130 A | * | 11/1994 | Kersey et al. | 250/227.27 |
| 5,675,674 A | * | 10/1997 | Weis | 250/227.18 |
| 5,680,489 A | * | 10/1997 | Kersey | 356/35.5 |
| 5,878,065 A | * | 3/1999 | Delavaux | 372/18 |
| 5,987,197 A | * | 11/1999 | Kersey | 250/227.23 |
| 6,072,567 A | * | 6/2000 | Sapack | 356/32 |
| 6,137,565 A | * | 10/2000 | Ecke et al. | 356/35.5 |

* cited by examiner

Primary Examiner—Hemang Sanghavi
Assistant Examiner—Scott Knauss
(74) Attorney, Agent, or Firm—Madan, Mossman & Sriram, P.C.

(57) ABSTRACT

A fiber optic acoustic sensor system including an optical conductor having low reflectivity mirrors is provided. Optical sensors are provided by sections of the optical conductor bounded by pairs of the low reflectivity mirrors. Pulses of light are injected into the optical conductor and reflected by the low reflectivity mirrors. The reflected pulses of light are processed using a compensating interferometer to generate interference patterns representative of the environmental conditions acting upon the optical conductor.

4 Claims, 44 Drawing Sheets

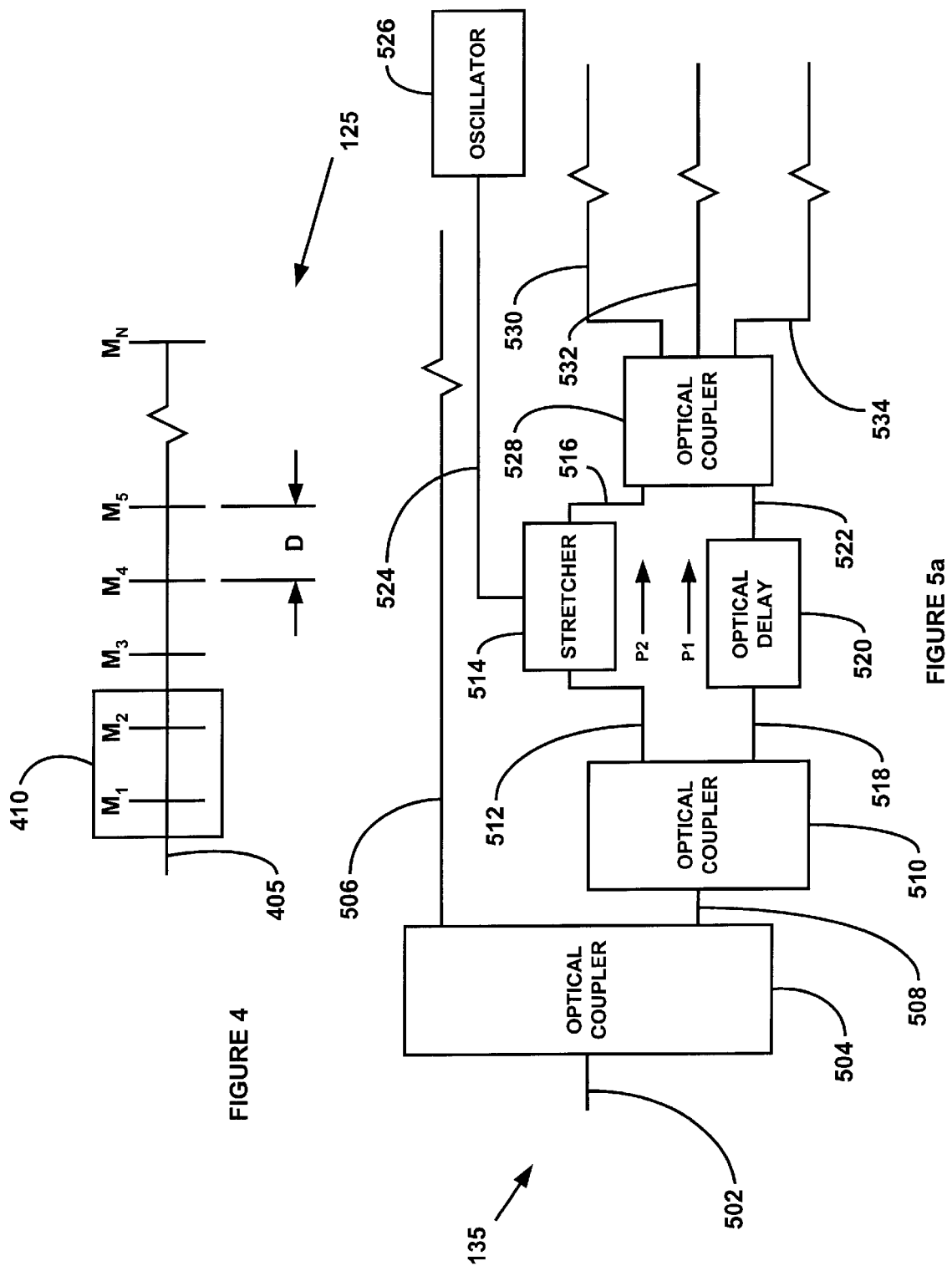

OPTICAL SENSING SYSTEM

CROSS-REFERENCE TO RELATED APPLICATIONS

This application is a continuation-in-part of U.S. patent application Ser. No. 09/144,953, filed on Sep. 1, 1998, the disclosure of which is incorporated herein by reference.

BACKGROUND OF THE INVENTION

This invention relates to fiber optic sensors and, more particularly, to marine seismic streamers using optical fibers for sensing changes in acoustic fields.

Marine seismic sensing devices are known that utilize discrete optical hydrophones which are assembled into marine seismic streamers. The discrete hydrophones use a pulsed laser to provide light to hydrophones made of optical fiber wound around mandrels. Pressure changes about a hydrophone cause deformations, which in turn cause phase modulation of light traveling through the fibers within each discrete hydrophone. Those changes are recorded as interference patterns produced at each discrete sensor. The individual interference patterns are coupled to a return cable to return to the shipboard for processing. Discrete optical hydrophones require a significant amount of fabrication, because each hydrophone must be spliced to optical coupler and return fibers, and the whole assembly encased and inserted into a hydrophone streamer skeleton. Marine seismic streamers of such individual sensors are bulky and expensive to fabricate.

Alternate types of optical hydrophone streamer systems are also known that utilize a streamer with discrete optical hydrophone sensors that operate by phase and intensity modulation of laser light input. Each sensor includes a mandrel-wound section of fiber coupled to two tails of optical fiber, each tail ending in an internal mirror. In this approach, light is reflected back and forth between the tails to produce phase and intensity modulation of the optical signal in response to sensed local acoustic pressure change. These two-tail systems have not been considered practical or economical for use in marine seismic streamers.

Such conventional optical sensing systems are also limited in their application by cross talk effects. For example, if the width of the pulse is less than the round-trip optical propagation delay in each sensor element, the output obtained through the optical coupler consists of a series of N+1 pulses that are separated in the time domain. Apart from cross-talk effects, these pulses contain no direct interferometric information. Application of this pulse train to a compensating interferometer of optical imbalance 2L coherently mixes pulses obtained from consecutive reflectors, thus generating the interferometric outputs from each sensor element. Cross talk then occurs between optical sensors due to multiple reflection paths. The cross talk manifests itself as side-bands in a heterodyne modulation and demodulation. In seismic acquisition, cross-talk of acoustic signals between sensors is highly deleterious to processing data. It is generally accepted that these crossfeed products must be kept below −90 dB in order to provide quality seismic data. To achieve this level of crossfeed the reflectivity of the mirrors would have to be so low that there would be inadequate returned optical power to process.

The present invention is directed to providing seismic optical sensor systems that overcome the limitations of existing systems.

SUMMARY

According to one embodiment of the present invention, an optical sensor system is provided that includes an optical source for controllably generating pulses of light having a predetermined wavelength distribution, an optical coupler coupled to the optical source, an array of optical sensors coupled to the optical coupler, and a compensating interferometer coupled to the optical coupler for generating interference patterns representative of environmental conditions within the array of optical sensors.

According to another embodiment of the present invention, an optical source for use in an optical sensor system is provided that includes a laser, a modulator coupled to the laser, and a polarization controller coupled to the modulator.

According to another embodiment of the present invention, a polarization controller for use in an optical source is provided that includes a first optical conductor, a bias voltage source, a polarization scrambler coupled to the bias voltage source, a ramp voltage source coupled to the polarization scrambler, and a second optical conductor coupled to the polarization controller. The polarization of the first and second optical conductors are substantially equal.

According to another embodiment of the present invention, an array of optical sensors for use in an optical sensor system is provided that includes a sensing optical conductor and a plurality of partially reflective assemblies coupled to the sensing optical conductor. Wherein the partially reflective assemblies are equally distributed along the length of the sensing optical conductor.

According to another embodiment of the present invention, a compensating interferometer assembly for processing reflected pulses of light is provided that includes a first optical coupler, a first optical path coupled to the first optical coupler, a second optical path coupled to the first optical coupler and a second optical coupler coupled to the first and second optical paths. The optical travel time of the first optical path is greater than the optical travel time of the second optical path.

According to another embodiment of the present invention, a method of optically sensing environmental conditions is provided that includes generating pulses of light, reflecting the pulses of light at partially reflective locations, delaying the reflected pulses of light, and interfering the reflected pulses of light with the delayed reflected pulses of light to generate an interference pattern.

According to another embodiment of the present invention, a method of generating pulses of light is provided that includes generating light waves and blocking the light waves.

According to another embodiment of the present invention, a pulsed laser is provided that includes a laser having an output port and an optical switch operably coupled to the output port of the laser.

According to another embodiment of the present invention, an optical switch is provided that includes a first single polarization fiber, a polarization scrambler having an input port and an output port, wherein the input port of the polarization scrambler is operably coupled to the first single polarization fiber, and a second single polarization fiber operably coupled to the output port of the polarization scrambler.

The present embodiments of the invention provide optical sensing systems having enhanced operational performance through the use of features such as, for example, time division multiplexing and wave division multiplexing, optical amplifiers, and optical switches.

BRIEF DESCRIPTION OF THE DRAWINGS

FIG. 4 is a schematic illustration of an embodiment of the sensors of the optical sensing system of FIG. 1.

FIG. 5a is a schematic illustration of a portion of an embodiment of the compensating interferometer of the optical sensing system of FIG. 1.

FIG. 5b is a schematic illustration of another portion of the compensating interferometer of FIG. 5a.

FIG. 6b is a flow chart illustration of a preferred embodiment of the removal of DC bias and normalization of the signals A, B and C of the method of FIG. 6a.

FIG. 6c is a flow chart illustration of the unwrapping of the phase angle of the method of FIG. 6a.

FIG. 27a is a schematic diagram of the bidirectional optical amplifier of the optical source of FIG. 26a.

FIG. 28 is a schematic diagram of the optical TDM reflector of the optical source of FIG. 26a.

FIG. 43b is an illustration of a preferred embodiment of the optical conductor of the optical sensor assembly of FIG. 43a.

DETAILED DESCRIPTION OF THE ILLUSTRATIVE EMBODIMENTS

Those elements of the present illustrative embodiments having the same numerical label are preferably substantially identical in design and operation.

Figure 1:
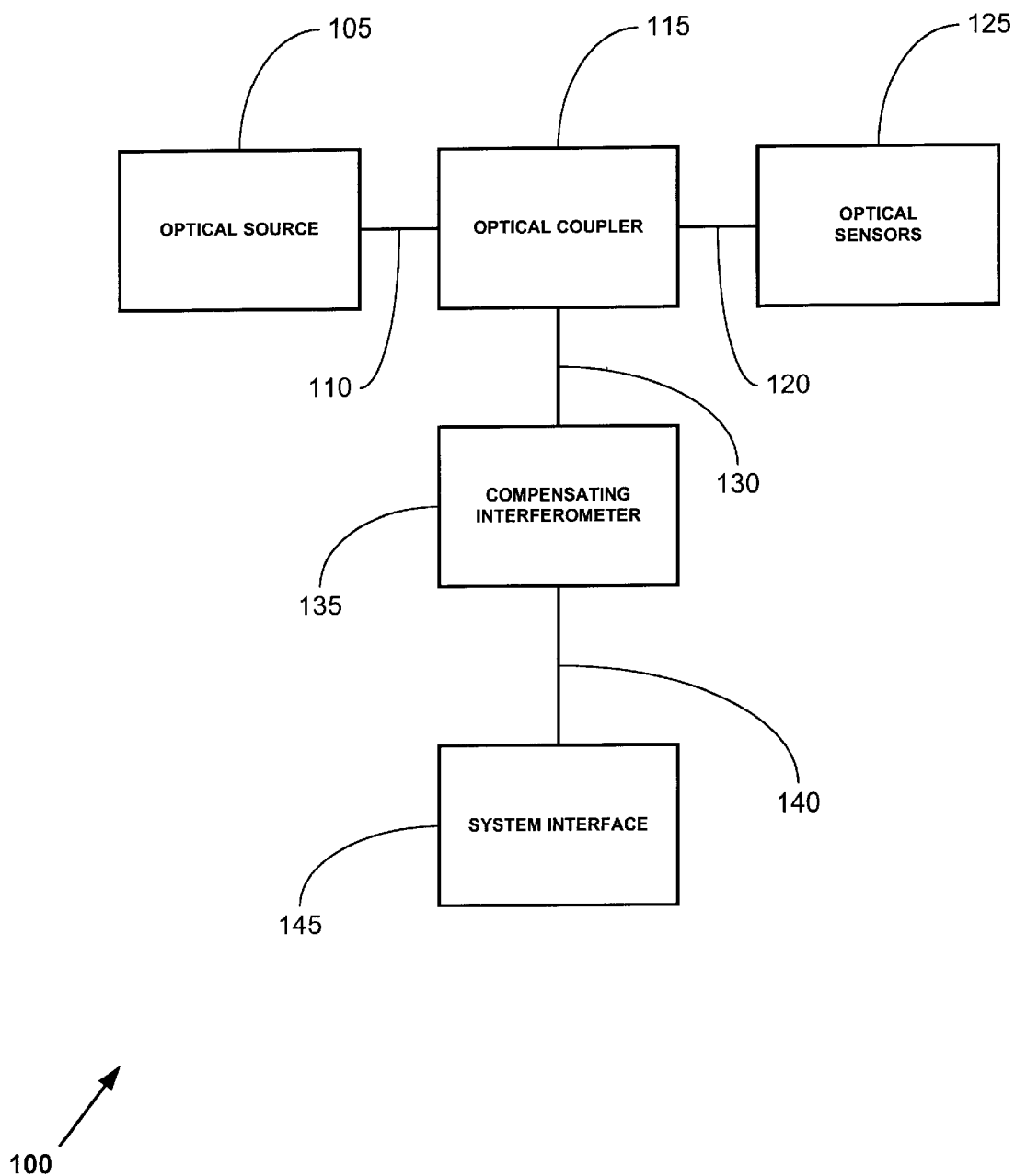
FIG. 1 is a schematic illustration of an embodiment of an optical sensing system.

Referring initially to FIG. 1, an embodiment of an optical sensing system 100 preferably includes an optical source 105, an optical conductor 110, an optical coupler 115, an optical conductor 120, optical sensors 125, an optical conductor 130, a compensating interferometer 135, a communication interface 140, and a system interface 145.

Figure 2:
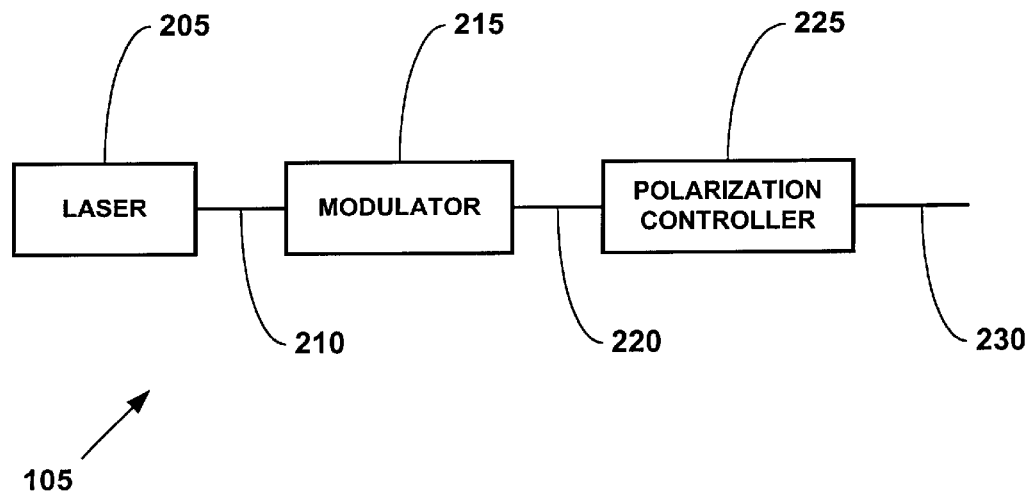
FIG. 2 is a schematic illustration of an embodiment of the optical source of the optical sensing system of FIG. 1.

The optical source 105 preferably controllably generates light waves having a predetermined wavelength distribution. The optical source 105 is preferably coupled to the optical conductor 110. Referring to FIG. 2, in a preferred embodiment, the optical source 105 includes a laser 205, an optical conductor 210, an optical modulator 215, an optical conductor 220, a polarization controller 225, and an optical conductor 230.

The laser 205 preferably controllably generates coherent light waves having a predetermined wavelength distribution. The laser 205 is coupled to the optical conductor 210. In a preferred embodiment, the laser 205 includes a pulsed laser including commercially available components such as, for example, a PLD Series 500 laser driver available from Wavelength Electronics, a pulse generator such as, for example, a Tektronics PG 501, and a laser diode such as, for example, a Rockwell 1.3 micron laser diode. In a particularly preferred embodiment, the laser 205 includes a Nd:Yag ring laser, model number M125-1319-200, available from Lightwave Electronics. In an alternative embodiment, the laser 205 is a 1.5 $\mu$m type laser.

In a preferred embodiment, the laser 205 is selected to provide a pulse length equal to or less than twice the travel time for a light pulse to travel the preselected distance D between the reflective portions of the optical sensors 125. In a preferred embodiment, the laser 205 is selected to provide a coherence length equal to about the typical fabrication error in the distance D.

The optical conductor 210 conveys light waves from the laser 205 to the optical modulator 215. The optical conductor 210 is coupled to the laser 205 and the optical modulator 215. The optical conductor 210 may be any number of commercially available optical fibers. In a preferred embodiment, the optical conductor 210 is a single mode optical fiber.

The optical modulator 215 controllably modulates light waves. The optical modulator 215 is coupled to the optical conductors, 210 and 215. The optical modulator 215 may be any number of conventional commercially available optical modulators modified in accordance with the teachings of the present disclosure. In a preferred embodiment, the optical modulator 215 is an APE Lithium Niobate modulator available from UTP.

The optical conductor 220 conveys light waves from the optical modulator 215 to the polarization controller 225. The optical conductor 220 is coupled to the optical modulator 215 and the polarization controller 225. The optical conductor 220 may be any number of commercially available optical fibers. In a preferred embodiment, the optical conductor 220 is a single mode optical fiber.

The polarization controller 225 controllably adjusts the polarization of the light waves. The polarization controller 225 is coupled to the optical conductors, 220 and 230. In a preferred embodiment, the polarization controller 225 controllably provides light waves having a single polarization mode. The polarization controller 225 may be any number of conventional commercially available manual or automatic polarization controllers such as, for example, a Polarization Scrambler available from the Ramar Corporation modified in accordance with the teachings of the present disclosure.

Figure 3:
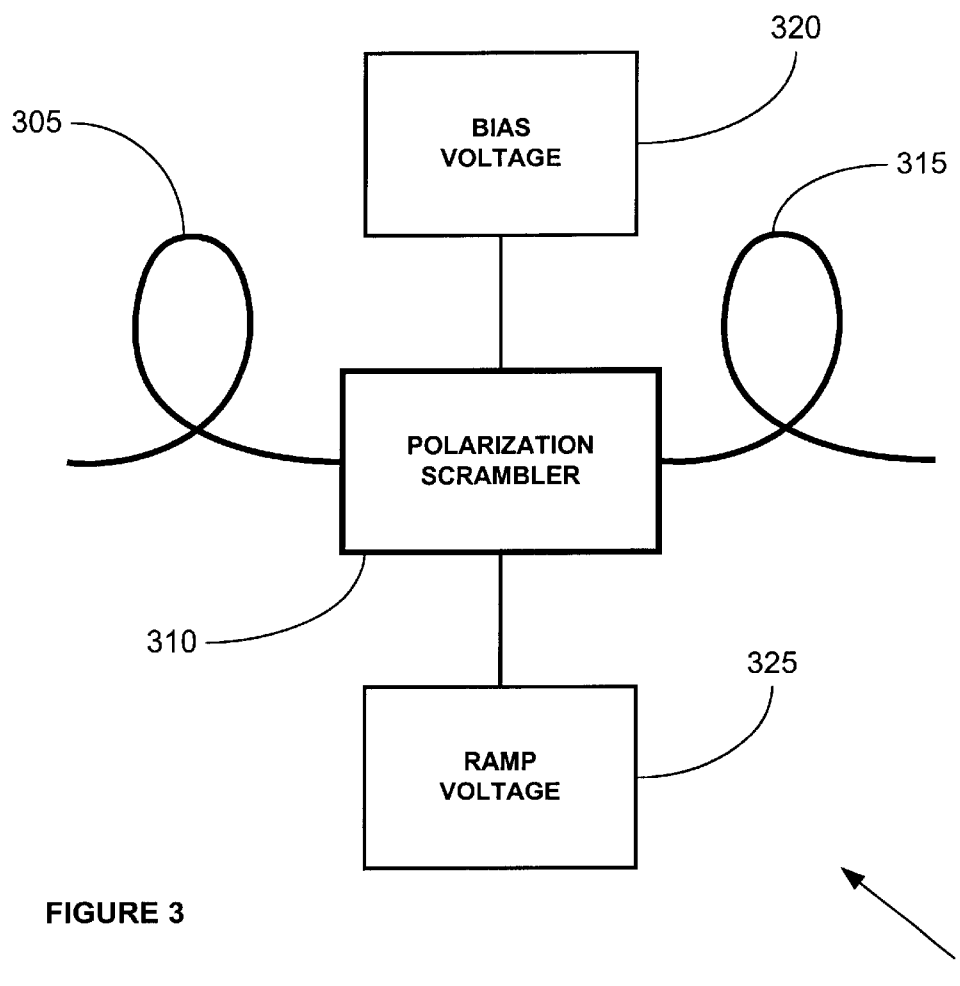
FIG. 3 is a schematic illustration of an embodiment of the polarization controller of the optical source of FIG. 2.

In a preferred embodiment, as illustrated in FIG. 3, the polarization controller 225 includes approximately 3 meters of a looped single mode optical fiber 305, a polarization scrambler 310, approximately 3 meters of a looped single mode optical fiber 315, a bias voltage 320, and a ramp voltage 325.

The optical fiber 305 is coupled to the optical conductor 220 and the input of the polarization scrambler 310. In a preferred embodiment, one end of the optical fiber 305 is coupled to the input port of the $LiNbO_3$ substrate of the polarization scrambler 310. The optical fiber 305 may be any number of conventional commercially available optical fibers modified in accordance with the teachings of the present disclosure. In a preferred embodiment, the optical fiber 305 is a PZ series optical fiber available from the 3M Corporation having a length of approximately 3 meters.

The polarization scrambler 310 is coupled to the optical fiber 305, the optical fiber 315, the bias voltage 320, and the ramp voltage 325. The polarization scrambler 310 may be any number of conventional commercially available polarization scramblers modified in accordance with the teachings of the present disclosure. In a preferred embodiment, the polarization scrambler 310 is a series 900–100 MHZ Low Speed Polarization Scrambler available from the Ramar Corporation.

The optical fiber 315 is coupled to the output of the polarization scrambler 310 and the optical conductor 230. In a preferred embodiment, the optical fiber 315 is coupled to the output port of the $LiNbO_3$ substrate of the polarization scrambler 310. The optical fiber 315 may be any number of conventional commercially available optical fibers modified in accordance with the teachings of the present disclosure. In a preferred embodiment, the optical fiber 315 is a PZ series optical fiber available from the 3M Corporation having a length of approximately 3 meters.

The bias voltage 320 is coupled to the polarization scrambler 320. The bias voltage 320 controls the operation of the polarization scrambler 310.

The ramp voltage 325 is coupled to the polarization scrambler 310. The ramp voltage 325 controls the operation of the polarization scrambler 310.

In a preferred embodiment, during operation of the polarization controller 225, a ramp voltage 325 is controllably applied to the $V_\pi$ electrode of the polarization scrambler 310. Application of the ramp voltage 325 to the $V_\pi$ electrode of the polarization scrambler 310 preferably causes the polarization vector of the polarization scrambler 310 to swing through a predetermined angular range. In this manner, the light output from the polarization scrambler 310 is completely extinguished until the polarization of the light within the polarization scrambler 310 is aligned with the polarization of the single mode optical fibers, 305 and 315, coupled to the input and output of the polarization scrambler 310. In this manner, the polarization controller 225 provides pulsed light having a high extinction ratio, low loss, and the ability to operate over a wide range of wavelengths. Furthermore, the combination of the single mode optical fibers, 305 and 315, with the polarization scrambler 310 provides an optical switch. In a preferred embodiment, the bias voltage 320 is controllably provided to maintain the maximum contrast between the $V_\pi$ and $V_0$ voltage levels of the polarization scrambler 310.

The optical conductor 230 is coupled to the polarization controller 225 and the optical conductor 110. The optical conductor 230 may be any number of conventional commercially available optical conductors. In a preferred embodiment, the optical conductor 230 is a single mode optical fiber, model number SMF-28, available from Corning, Inc. in order to optimally provide lightwave transmission.

The optical conductor 110 conveys light waves. The optical conductor 110 is coupled to the optical source 105 and the optical coupler 115. In a preferred embodiment, the optical conductor 110 is a single mode optical fiber.

The optical coupler 115 optically couples a plurality of optical conductors. The optical coupler 115 is coupled to the optical conductors 110, 120 and 130. The optical coupler 115 preferably is a conventional commercially available two-by-two optical couplers. In this manner, when light transmitted from the optical source 105 enters the optical coupler 115, the transmitted light is conveyed to the optical conductor 120 and into the optical sensors 125. Furthermore, when light reflected by the reflective portions of the optical sensors 125 enters the optical coupler 115, the optical coupler 115 directs 50% of the reflected light back to the optical source 105, and directs the other 50% to the optical conductor 130 and into the compensating interferometer 135. In a preferred embodiment, the optical coupler 115 is a two-by-two balanced optical coupler available from M.P. Fiber Optics as part number SA 15500202ABONE.

The optical conductor 120 conveys light waves. The optical conductor 120 is coupled to the optical coupler 120 and the optical sensors 125. In a preferred embodiment, the optical conductor 120 is a single mode optical fiber.

The optical sensors 125 are coupled to the optical conductor 120. The optical sensors 125 preferably receive incident light and reflect at least a portion of the incident light at predetermined positions. Exposure of the optical sensors 125 to environmental conditions preferably alters the location of at least some of the predetermined reflective positions. The optical sensing system 100 is preferably adapted to sense alterations in the reflective positions and generates signals representative of the sensed environmental conditions.

In a preferred embodiment, as illustrated in FIG. 4, the sensors 125 include an optical conductor 405, mirrors M, and optical hydrophones 410. In a preferred embodiment, the optical conductor 405 includes a plurality of partially reflective mirrors M formed in the optical conductor 405.

The optical conductor 405 is coupled to the optical conductor 120, the mirrors M, and the optical hydrophones 410. The optical conductor 405 may be any number of conventional commercially available single mode optical fibers such as, for example, SMF28. The partially reflective mirrors M may be formed in the optical conductor 405 using conventional processes such as, for example, vapor deposition or photographic. In a preferred embodiment, the mirrors M are formed in the optical conductor 405 using the processes disclosed in U.S. Pat. No. 4,923,273, the disclosure of which is incorporated herein by reference. In a preferred embodiment, the mirrors M are formed in the optical conductor 405 at equally spaced intervals D.

The mirrors M are preferably partially reflective so that, at each of the mirrors M, a portion of the incident light is reflected back through the optical conductor 405, and the remaining portion moves forward to the next mirror M. The optical conductor 405 is preferably wavelength dependent, and the mirrors M are preferably selected to be reflective at a wavelength at which the optical energy loss due to refraction is minimal, such as, for example, a wavelength of 1550 nanometers ("nm"). The reflectivity of each of the mirrors M is preferably low, less than, for example, 0.5%, in order to minimize the optical energy loss from multiple reflections between mirrors M, as the optical energy pulse travels down the optical conductor 405, serially through each mirror M, while at the same time maximizing the return energy from each mirror M.

In an exemplary embodiment, the spacing between the mirrors M is about 12.5 meters, and the transmission speed though the optical conductor 405 is about five nanoseconds ("ns") per meter. In an exemplary embodiment, the time for the light pulse to travel the distance D between adjacent mirrors M is typically less than sixty-two and one-half ns, that time being the acoustic aperture for each of the optical hydrophones 410.

Each of the optical hydrophones 410 include a pair of mirrors M and the corresponding intermediate section of the optical conductor 405 bounded by the pair of mirrors M. In a preferred embodiment, the optical sensing system 100 includes a plurality of optical hydrophones 410. For example, the first three optical hydrophones 410 include: (1) mirrors $M_1$ and $M_2$ and the corresponding intermediate section of the optical conductor 405 (2); mirrors $M_2$ and $M_3$ and the corresponding intermediate section of the optical conductor 405; and (3) mirrors $M_3$ and $M_4$, and the corresponding intermediate section of the optical conductor 405.

To enhance the acoustic sensitivity of the optical hydrophones 410, and provide robustness, the optical conductor 405 is preferably encased in a flexible, resilient material, such as, for example, Hytrel, available from DuPont. Alternatively, the encasing material can also be Sanaprene, available from Monsanto, or any other type of synthetic rubber suitable for extrusion onto an optical fiber. In a preferred embodiment, the optical conductor 405 is further acoustically enhanced by extruding a layer of silicone over the glass cladding, and then extruding a layer of Teflon™ over the silicone. In an exemplary embodiment, the optical conductor 405 is about 400 meters long.

The optical conductor 130 conveys light waves. The optical conductor 130 is coupled to the optical coupler 115 and the compensating interferometer 135. In a preferred embodiment, the optical conductor 130 is a single mode optical fiber.

The compensating interferometer 135 is coupled to the optical conductors 130 and 140. The compensating interferometer 135 preferably receives reflected pulses of light from the optical sensors 125, evenly divides the reflected pulses of light, distributes the reflected pulses of light to two optical paths, delays the reflected pulses of light in one optical path, modulates the length of the other optical path, generates an interference pattern using the delayed and undelayed reflected pulses of light, and processes the interference pattern to determine the sensed environmental conditions at each of the optical hydrophones 410.

Figure 5B:
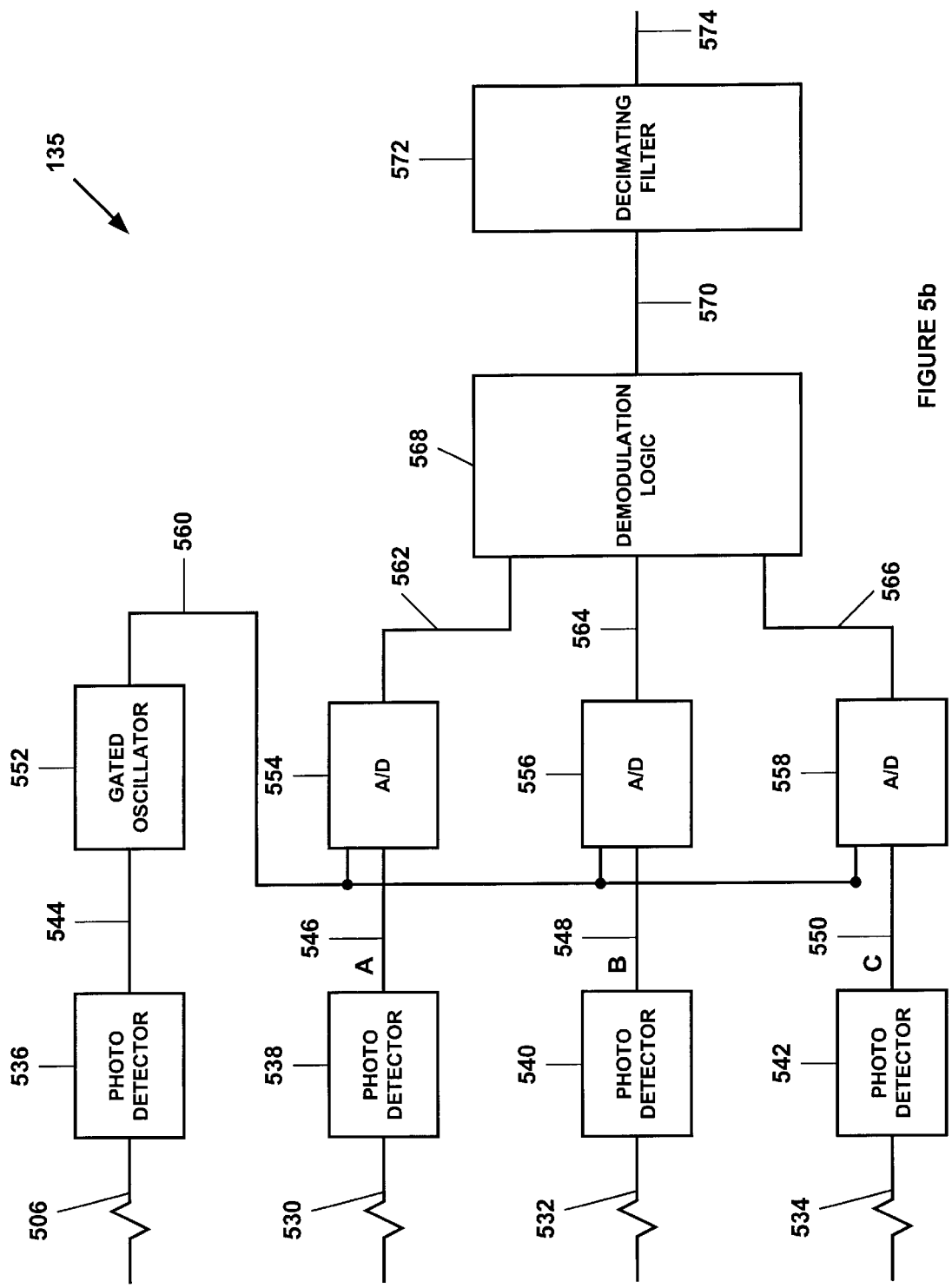

In a preferred embodiment, as illustrated in FIGS. 5a and 5b, the compensating interferometer 135 includes an optical conductor 502, an optical coupler 504, an optical conductor 506, an optical conductor 508, an optical coupler 510, and optical conductor 512, a stretcher 514, an optical conductor 516, an optical conductor 518, an optical delay 520, an optical conductor 522, a communication interface 524, an oscillator 526, an optical coupler 528, an optical conductor 530, an optical conductor 532, an optical conductor 534, photodetectors 536, 538, 540, and 542, communication interfaces 544, 546, 548, and 550, a gated oscillator 552, A/D converters 554, 556, and 558, communication interfaces 560, 562, 564, and 566, demodulation logic 568, a communication interface 570, a decimating filter 572, and a communication interfaces 574.

The optical conductor 502 conveys light waves from the optical conductor 130 to the optical coupler 504. The optical conductor 502 is coupled to the optical conductor 130 and the optical coupler 504. In a preferred embodiment, the optical conductor 502 is a single mode optical fiber.

The optical coupler 504 optically couples a plurality of optical conductors. The optical coupler 504 is coupled to the optical conductors 502, 506 and 508. In a preferred embodiment, the optical coupler 504 is a conventional two-by-two optical coupler. In this manner, light coming from the optical conductor 502 into the optical coupler 504 is split such that 50% passes through the optical conductor 506 and the remaining 50% passes though the optical conductor 508. In a preferred embodiment, the optical coupler 504 is a two-by-two balanced optical coupler available from M.P. Fiber Optics as part number SA 15500202ABONE. In an alternative embodiment, the optical coupler 504 is a ratio optical coupler.

The optical conductor 506 conveys light waves from the optical coupler 504 to the photodetector 536. The optical conductor 506 is coupled to the optical coupler 504 and the photodetector 536. In a preferred embodiment, the optical conductor 515 is a single mode optical fiber.

The optical conductor 508 conveys light waves from the optical coupler 504 to the optical coupler 510. The optical conductor 508 is coupled to the optical coupler 504 and the optical coupler 510. In a preferred embodiment, the optical conductor 508 is a single mode optical fiber.

The optical coupler 510 optically couples a plurality of optical conductors. The optical coupler 510 is coupled to the optical conductors 508, 512 and 518. In a preferred embodiment, the optical coupler 510 is a conventional two-by-two optical coupler. In this manner, light coming from the optical conductor 508 into the optical coupler 510 is split such that 50% passes through the optical conductor 512 and the remaining 50% passes though the optical conductor 518. In a preferred embodiment, the optical coupler 510 is a two-by-two balanced optical coupler available from M.P. Fiber Optics as part number SA 15500202ABONE.

The optical conductor 512 conveys light waves from the optical coupler 510 to the stretcher 514. The optical conductor 512 is coupled to the optical coupler 510 and the stretcher 514. In a preferred embodiment, the optical conductor 512 is a single mode optical fiber.

The stretcher 514 conveys light waves from the optical conductor 512 to the optical conductor 516. The stretcher 514 is coupled to the optical conductors 512 and 516 and the communication interface 524. In a preferred embodiment, the optical path length of the stretcher 514 is controllably varied by the oscillator 526. In a preferred embodiment, the optical path length of the stretcher 514 is varied by at least about a distance equal to twice the wavelength of the lightwaves generated by the optical source 105. In a preferred embodiment, the stretcher 514 includes a Model 915 Piezo Assembly available from Canadian Instrumentation & Research, Ltd.

The optical conductor 516 conveys light waves from the stretcher 514 to the optical coupler 528. The optical conductor 516 is coupled to the stretcher 514 and the optical coupler 528. In a preferred embodiment, the optical conductor 516 is a single mode optical fiber.

The optical conductor 518 conveys light waves from the optical coupler 510 to the optical delay 520. The optical conductor 518 is coupled to the optical coupler 510 and the optical delay 520. In a preferred embodiment, the optical conductor 518 is a single mode optical fiber.

The optical delay 520 conveys light waves from the optical conductor 518 to the optical conductor 522. The optical delay 520 is coupled to the optical conductor 518 and the optical conductor 522. In a preferred embodiment, the optical delay 520 includes a coiled section of SMF28 optical fiber available from the Corning Corporation.

In a preferred embodiment, the optical delay 520 delays the passage of light relative to the corresponding optical path through the optical conductors 512, 514, and 516 by a time period equal to the travel time for the distance 2D. In this manner, the reflected pulses of light from the optical sensors 125 interfere with delayed reflected pulses of light from the optical sensors 125.

The optical conductor 522 conveys light waves from the optical delay 520 to the optical coupler 528. The optical conductor 522 is coupled to the optical delay 520 and the optical coupler 528. In a preferred embodiment, the optical conductor 522 is a single mode optical fiber.

In a preferred embodiment, the optical conductor 518, the optical delay 520, and the optical conductor 522 provide an optical path P1, and the optical conductor 512, the stretcher 514, and the optical conductor 516 provide an optical path P2. In a preferred embodiment, the travel time though the optical path P1 is equal to the travel time through the optical path P2 plus the two-way travel time of the distance D between adjacent mirrors M. In a preferred embodiment, the optical paths P1 and P2 function as the two arms of a compensating interferometer in order to provide interference signals to the photodetectors, 538, 540 and 542. In a preferred embodiment, the compensating interferometer is a Mach Zehnder interferometer.

The communication interface 524 couples the stretcher 514 and the oscillator 526.

The oscillator 526 is coupled to the stretcher 514 using the communication interface 524. The oscillator 526 preferably generates a sinusoidal signal having a higher frequency than the environmental data to be detected by the sensors 125. In a preferred embodiment, the oscillator 526 generates a 2 KHz sine wave that is synchronized with the pulses of light generated by the optical source 105.

The optical coupler 528 conveys light waves from the optical conductors 516 and 522 to the optical conductors 530, 532 and 534. In a preferred embodiment, the optical coupler 528 divides the incident light waves into 3 parts of equal amplitude and also creates a phase shift of about 120 degrees between the divided parts of the incident light waves. In a preferred embodiment, the optical coupler 528 is a three-by-three balanced optical coupler available from M.P. Fiber Optics as part number SA 15000303BONE.

The optical conductor 530 conveys light waves from one output of the optical coupler 528 to the photodetector 538. The optical conductor 530 is coupled to the optical coupler 528 and the photodetector 538. In a preferred embodiment, the optical conductor 530 is a single mode optical fiber.

The optical conductor 532 conveys light waves from one output of the optical coupler 528 to the photodetector 540. The optical conductor 532 is coupled to the optical coupler 528 and the photodetector 540. In a preferred embodiment, the optical conductor 532 is a single mode optical fiber.

The optical conductor 534 conveys light waves from one output of the optical coupler 528 to the photodetector 542. The optical conductor 534 is coupled to the optical coupler 528 and the photodetector 542. In a preferred embodiment, the optical conductor 534 is a single mode optical fiber.

The photodetector 536 receives light waves from the optical conductor 506 and generates an electrical signal for transmission to the gated oscillator 552. The photodetector 536 is coupled to the optical conductor 506 and the communication interface 544. In a preferred embodiment, the photodetector 536 is a pin photodiode, available from PD LD Inc. as part number PLD-DIN-075-TL7-1FA.

The photodetector 538 receives light waves from the optical conductor 530 and generates an electrical signal A for transmission to the A/D converter 554. The photodetector 538 is coupled to the optical conductor 530 and the communication interface 546. In a preferred embodiment, the photodetector 538 is a pin photodiode, available from PD LD Inc. as part number PLD-DIN-075-TL7-1FA.

The photodetector 540 receives light waves from the optical conductor 532 and generates an electrical signal B for transmission to the A/D converter 556. The photodetector 540 is coupled to the optical conductor 532 and the communication interface 548. In a preferred embodiment, the photodetector 540 is a pin photodiode, available from PD LD Inc. as part number PLD-DIN-075-TL7-1FA.

The photodetector 542 receives light waves from the optical conductor 534 and generates an electrical signal C for transmission to the A/D converter 558. The photodetector 542 is coupled to the optical conductor 534 and the communication interface 550. In a preferred embodiment, the photodetector 542 is a pin photodiode, available from PD LD Inc. as part number PLD-DIN-075-TL7-1FA.

The communication interface 544 conveys electrical signals from the photodetector 536 to the gated oscillator 552. The communication interface 544 may be any number of conventional electrical conductors.

The communication interface 546 conveys the electrical signal A from the photodetector 538 to the A/D converter 554. The communication interface 546 may be any number of conventional electrical conductors.

The communication interface 548 conveys the electrical signal B from the photodetector 540 to the A/D converter 556. The communication interface 548 may be any number of conventional electrical conductors.

The communication interface 550 conveys the electrical signal C from the photodetector 542 to the A/D converter 558. The communication interface 550 may be any number of conventional electrical conductors.

The gated oscillator 552 creates a timing signal used to control the timing of the AID converters 554, 556, and 558. The operating frequency of the gated oscillator 552 preferably matches the spacing of the pulses of light reflected by the sensors 125. In a preferred embodiment, the electrical pulse generated by the photodetector 536 from the first reflected pulse of light from the sensors 125 is used to provide an enable signal for triggering the gated oscillator 552. Because the gated oscillator 552 is enabled by a signal generated by the optical sensors 125, the system 100 is insensitive to variations in the optical path length between the optical sensors 125 and the remainder of the system 100.

The A/D converter 554 converts the analog signals received from the photodetector 538 into corresponding digital signals. In a preferred embodiment, the A/D converter 554 generates a single digital value for each interference pulse conveyed to the optical conductor 530. As a result, in a preferred embodiment, the minimum conversion rate for the A/D converter 554 is the inverse of twice the time required for a lightwave to travel between mirrors in the optical sensors 125.

The A/D converter 556 converts the analog signals received from the photodetector 540 into corresponding digital signals. In a preferred embodiment, the A/D converter 556 generates a single digital value for each interference pulse conveyed to the optical conductor 532. As a result, in a preferred embodiment, the minimum conversion rate for the A/D converter 556 is the inverse of twice the time required for a lightwave to travel between mirrors in the optical sensors 125.

The A/D converter 558 converts the analog signals received from the photodetector 542 into corresponding digital signals. In a preferred embodiment, the A/D converter 558 generates a single digital value for each interference pulse conveyed to the optical conductor 534. As a result, in a preferred embodiment, the minimum conversion rate for the A/D converter 5548 is the inverse of twice the time required for a lightwave to travel between mirrors in the optical sensors 125.

The communication interface 560 conveys electrical timing signals from the gated oscillator 552 to the A/D converters 554, 556, and 558. The communication interface 560 may, for example, be any number of conventional commercially available electrical conductors.

The communication interface 562 conveys digital signals from the A/D converter 554 to the demodulation logic 568. The communication interface 562 may, for example, be any number of conventional commercially available electrical conductors.

The communication interface 564 conveys digital signals from the A/D converter 556 to the demodulation logic 568. The communication interface 564 may, for example, be any number of conventional commercially available electrical conductors.

The communication interface 566 conveys digital signals from the A/D converter 558 to the demodulation logic 568. The communication interface 566 may, for example, be any number of conventional commercially available electrical conductors.

The demodulation logic 568 receives the digital data samples provided by the A/D converters 554, 556, and 558, and generates a corresponding digital data sample. In a preferred embodiment, the demodulation logic 568 is a field programmable gate array (FPGA), programmable logic device (PLD), application specific integrated circuit (ASIC), or a combination of these devices.

The communication interface 570 conveys digital signals from the demodulation logic 568 to the decimating filter 572.

The decimating filter 572 receives the digital data samples provided by the demodulation logic 568 and preferably outputs digital data samples at a reduced sampling rate. In a preferred embodiment, the decimating filter 572 filters out the oscillating signal added to the data from the optical sensors within the stretcher 514. In a preferred embodiment, the output from the decimating filter 572 is compatible with typical seismic sensor data in bandwidth and sampling rate.

The communication interface 574 conveys electrical signals from the decimating filter 572 to the communication interface 140.

The communication interface 140 conveys communications signals between the compensating interferometer 135 and the system interface 145. The communication interface 140 may be any conventional communication interface.

The system interface 145 couples the system 100 to a conventional seismic recording system. The system interface 145 may be any number of conventional system interfaces suitable for coupling to a conventional seismic recording system.

Figure 6:
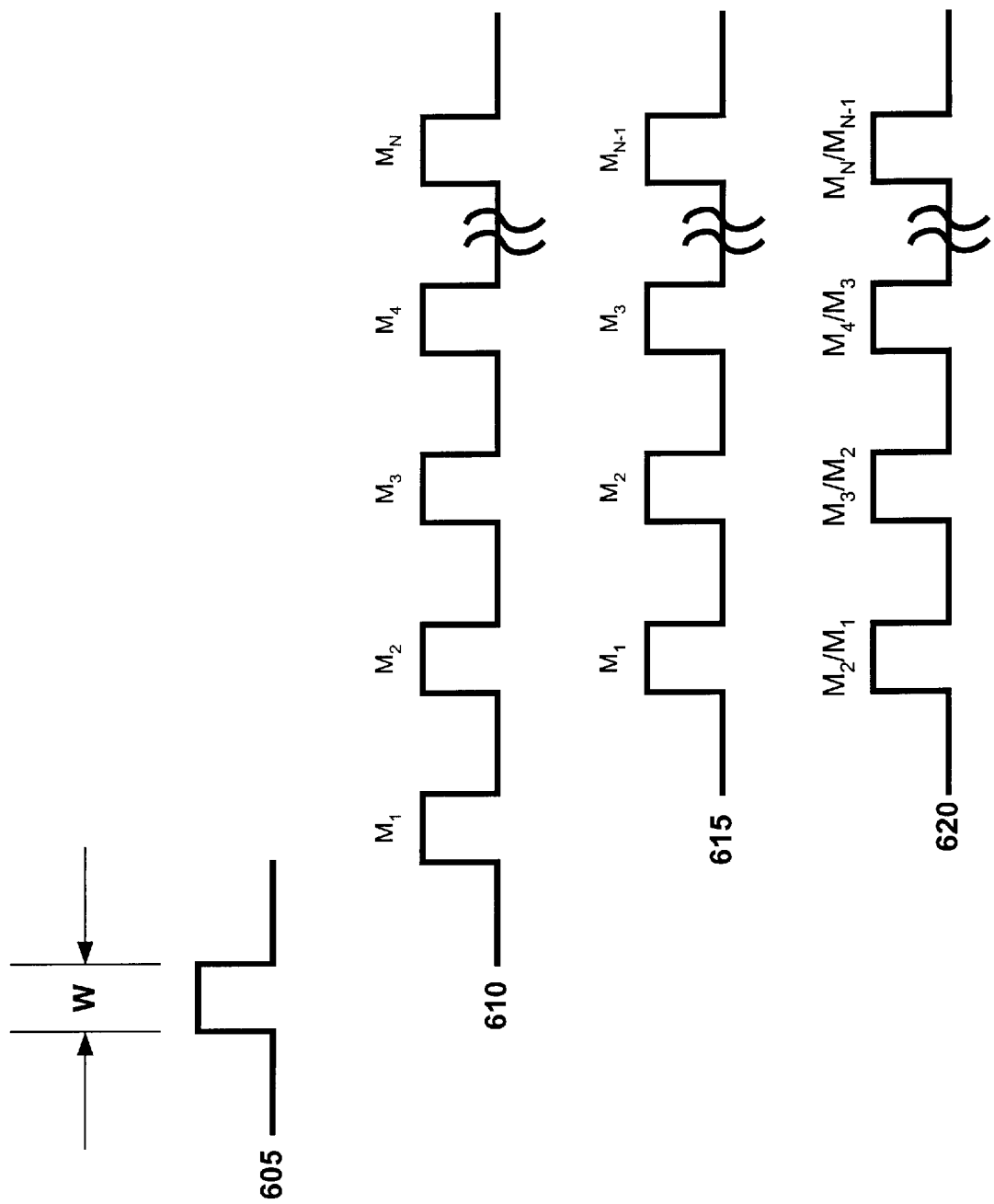
FIG. 6 is a timing diagram illustrating the operation of the optical sensing system of FIG. 1.

Referring to FIG. 6, in a preferred embodiment, during operation of the optical sensing system 100, the optical source 105 controllably transmits a pulse 605 of light having a predetermined wavelength distribution and a pulse width W into the optical coupler 115. In a preferred embodiment, the optical source 105 controllably sequentially generates a plurality of pulses 605 of light. The pulse 605 of light is then transmitted into the sensors 125. Within the sensors 125, the pulse of light is then transmitted into the optical conductor 405 to the first mirror $M_1$, where a small fraction of the incident light pulse 605, about 1%, is reflected back to the optical coupler 115. The remaining incident pulsed light energy then moves on through the first optical hydrophone 410 (the portion of the optical conductor 405 between the mirrors M1 and $M_2$). If the width W of the incident pulse 605 of light is less than twice the travel time between the mirrors $M_1$ and $M_2$, the incident pulse 605 of light will travel past the mirror $M_2$ and a portion of the incident pulse 605 of light will reflect back toward the mirror $M_1$, without any phase or frequency modulation of the reflected portion of the incident pulse 605 of light. When the remaining portion of the incident pulse 605 of light then arrives at the mirror $M_3$, the reflected portion of the incident pulse of light 605 from the mirror $M_2$ will have traveled a distance D back towards the optical coupler 115. Furthermore, when the mirror $M_3$ reflects 1% of the incident pulse 605 of light, the reflected portion of the incident pulse 605 of light from the mirror $M_1$ will have traveled a distance 2D back towards the optical coupler 115. The difference in length traveled by the pulse 605 of light through the first hydrophone, bounded by the mirrors $M_1$ and $M_2$, and second hydrophone, bounded by the mirrors $M_2$ and $M_3$, will be 2D.

The remaining portion of the pulse 605 of light will then continue on down the optical conductor 405, creating reflections at all of the remaining mirrors M. Because the distances between the mirrors M are all substantially equal, the time spacing between all of the reflected pulses will be substantially equal. In this manner, the optical sensing system 100 provides a time division multiplexed serial array of optical sensors.

When the reflected pulses 610 of light reach the optical coupler 115, fifty percent of the energy of the reflected pulses 610 of light will travel towards the optical source 105, where the reflected pulses 610 of light will be absorbed in a conventional optical isolator, which is also part of the optical source 105. The other fifty percent of the energy of the reflected pulses 610 of light will travel to the optical coupler 504, where the energy of the reflected pulses 610 of light are split, with about 25% being sent to the photodetector 536 and about 75% sent to the optical coupler 510. The optical coupler 510 then evenly splits the energy of the reflected pulses of light between the optical paths P1 and P2. The reflected pulses 610 of light that pass through the optical path P1 are preferably delayed relative those that pass through the optical path P2 in order to provide delayed reflected light pulses 615. In a preferred embodiment, the optical path P1 causes a relative delay equal in length to the two-way travel time of the distance between adjacent mirrors M.

Because of the relative delay caused by the optical path P1, the reflected pulses 610 of light and the delayed reflected pulses 615 of light interfere with each other when they arrive at the optical coupler 535 and generate interference patterns 620. For example, the reflected pulse from the mirror $M_1$ in path P1 will arrive at the optical coupler 535 at the same time as the reflected light pulse from $M_2$ in path P2. Because the input pulses 605 of light from the optical source 105 are coherent, the interference patterns 620 will indicate the acoustic pressure, temperature, and acceleration effects of the light traveling through an optical hydrophone N bounded by mirrors $M_N$ and $M_{N+1}$ as amplitude differences.

In a preferred embodiment, the degree of interference among the reflected pulses of light, 610 and 615, in the optical coupler 528 is the result of changes in the optical path length between adjacent mirrors M as a result of pressure, acceleration, and temperature. The resulting phase information detected by the photo detectors 538, 540 and 542 is then preferably processed by the demodulation logic 568 using a T-transform technique. The interference patterns generated within the optical coupler 528 are then split up into three optical signals, A, B and C, of equal amplitude with a phase difference of 120 degrees between each optical signal A, B and C.

The optical signals A, B and C are then converted to corresponding electrical signals A, B and C by the photo-detectors 538, 540 and 542. The analog electrical signals A, B and C are then converted to the corresponding digital signals A, B and C by the A/D converters 554, 556, and 558. The digital signals A, B and C are then processed by the demodulation logic 568 to generate phase information.

Figure 6A:
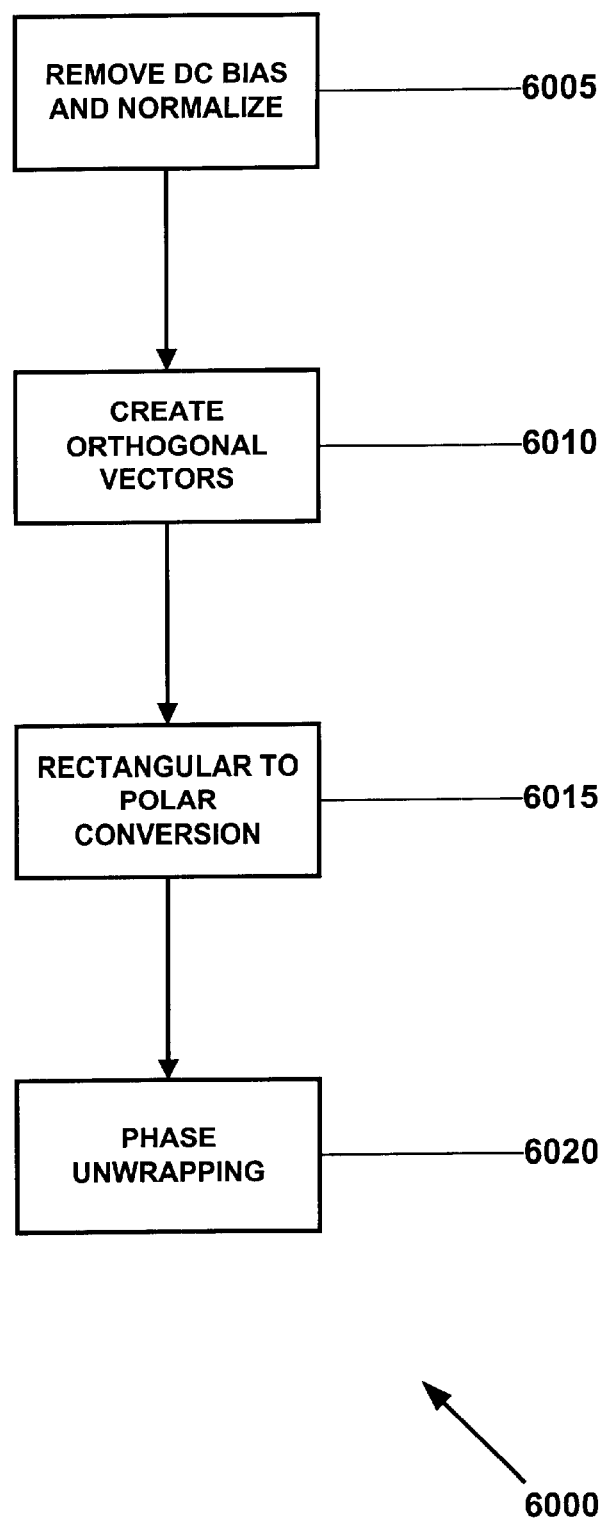
FIG. 6a is a flow chart illustration of a preferred embodiment of the conversion of the signals A, B and C to signals representative of the environmental conditions sensed by the optical sensors of FIG. 1.
Figure 6B:
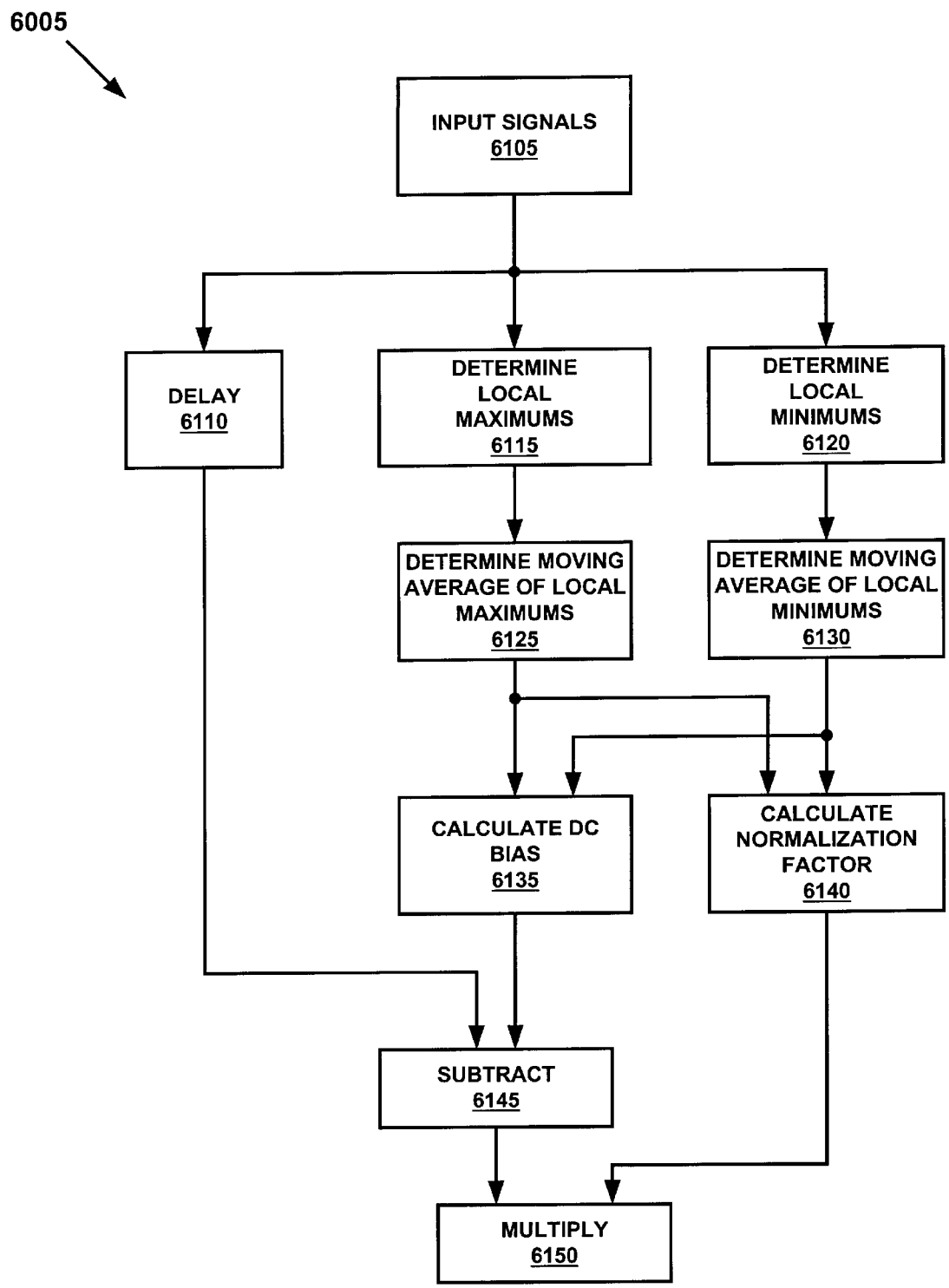
Figure 6C:
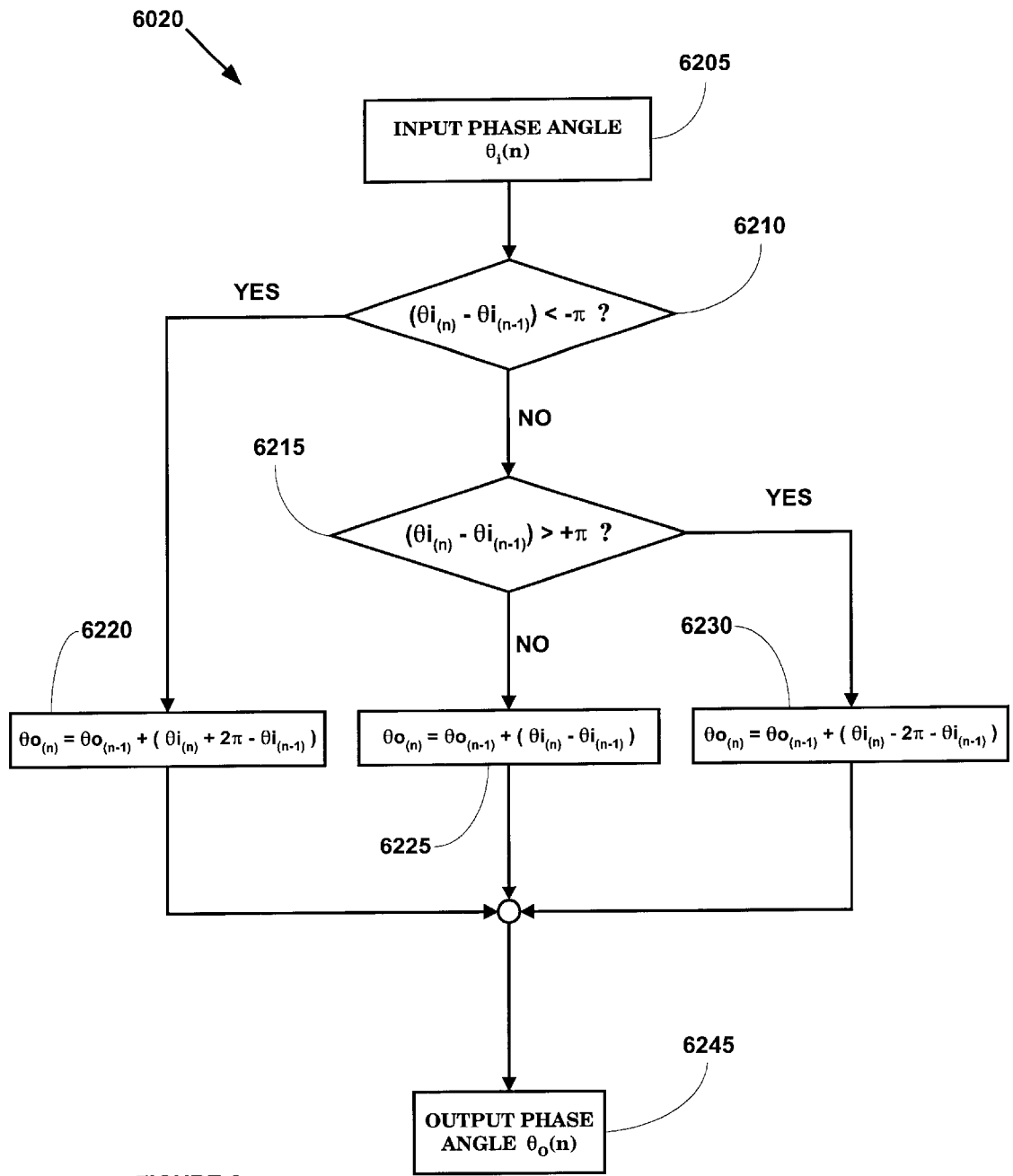

In a preferred embodiment, as illustrated in FIGS. 6a, 6b, and 6c, the demodulation logic 568 processes the digital signals A, B and C using a conversion program 6000 to generate signals representative of the environmental conditions sensed by the optical sensors 125 that includes the steps of: removing DC bias and normalizing in step 6005; creating orthogonal vectors in step 6010; converting to polar coordinates in step 6015; and unwrapping phase in step 6020.

In a preferred embodiment, in step 6005, the demodulation logic 568 removes the DC bias from and normalizes each of the digital signals A, B and C. In a preferred embodiment, the demodulation logic 568 continuously updates the DC bias and normalization scaling factor in order to process the digital signals A, B and C. In an exemplary embodiment, the stretcher 514 continuously modulates the length of the optical path P2 by more than one wavelength in order to facilitate the calculation of the DC bias and normalization scaling factor.

In a preferred embodiment, as illustrated in FIG. 6b, the removal of the DC bias and normalization of the digital signals A, B and C includes the steps of: inputting the signals in step 6105; delaying the signals in step 6110; determining the local maximums for the signals in step 6115; determining the local minimums for the signals in step. 6120; determining the moving average of the local maximums in step 6125; determining the moving average of the local minimums in step 6130; calculating the DC bias in step 6135; calculating the normalization scaling factor in step 6140; subtracting the DC bias from the signals in step 6145; and multiplying the signals by the normalization scaling factor in step 6150.

In a preferred embodiment, in step 6110, the digital signals are delayed in order to compensate for the processing delays of steps 6115, 6120, 6125, and 6130.

In a preferred embodiment, in steps 6115 and 6120, the local maximums and minimums for the signals A, B and C are determined. Because the length of the optical path P2 is preferably controllably varied by the stretcher 514 by more than one wavelength, the relative phase of the delayed and undelayed reflected pulses of light will vary from zero to two pi radians. As a result, in a preferred embodiment, the interference signals A, B and C are guaranteed to reach a local maximum and a local minimum.

In a preferred embodiment, in steps 6125 and 6130, the local maximums and local minimums for the signals A, B and C are then passed through moving average filters to remove noise. The filtered local maximums and minimums are then used to calculate the DC bias and normalization scaling factors in steps 6135 and 6140.

In a preferred embodiment, in step 6135, the DC bias for each signal A, B and C is calculated by the following expression:

$$DCBias = \frac{MALMax + MALMin}{2} \quad (1)$$

where

MALMax=moving average of local maximum; and

MAMMin=moving average of local minimum.

In a preferred embodiment, in step 6140, the normalization scaling factor for the each signal A, B and C is calculated by the following expression:

$$NSF = \frac{2}{MALMax - MALMin} \quad (2)$$

where

NSF=normalization scaling factor;

MALMax=moving average of local maximum; and

MALMin=moving average of local minimum.

In a preferred embodiment, in step 6145, the DC bias is then substracted from each of the signals A, B and C.

In a preferred embodiment, in step 6150, the signals A, B and C, corrected for DC bias, are then multiplied by the corresponding normalization scaling factors for each signal A, B, and C. In a preferred embodiment, the digital data output signals generated in step 6150 have an average value of zero and range in amplitude from −1.0 to +1.0.

In a preferred embodiment, in step 6010, the demodulation logic 568 then converts the digital data signals A, B, and C to digital data signals X and Y. The digital data signals A, B, C, X and Y are all representative of the relative phase shift of the delayed and undelayed reflected pulses of light. In an exemplary embodiment, a fixed phase shift of 120 degrees exists between each of the signals A, B and C. In step 6010, the signals A, B and C are processed to provide signals X and Y that represent values for measurements having fixed phase shift of 90 degrees. In a preferred embodiment, the conversion of the digital data signals A, B and C to the digital data signals X and Y is provided using one of the following algorithms:

$$X=2(3^{1/2})(A/2+B)/3 \ \& \ Y=-(B+C) \quad (3)$$

$$X=2(3^{1/2})(A/2+B)/3 \ \& \ Y=(2*A-B-C)/3 \quad (4)$$

$$X=-(3^{1/2})(A-B)/3 \ \& \ Y=A+B \quad (5)$$

$$X=-(3^{1/2})(B-C)/3 \ \& \ Y=B+C \quad (6)$$

$$X=-(3^{1/2})(A-C)/3 \ \& \ Y=-(A+C) \quad (7)$$

$$X=-(A+B) \ \& \ Y=-(3^{1/2})(A-B)/3 \quad (8)$$

$$X=-(B+C) \ \& \ Y=-(3^{1/2})(B-C)/3 \quad (9)$$

$$X=A+C \ \& \ Y=-(3^{1/2})(A-C)/3 \quad (10)$$

In a preferred embodiment, in step 6015, the demodulation logic 568 converts the rectangular digital data signals X and Y to polar data signals including radius ρ and phase angle θ. In a preferred embodiment, the phases angle θ is determined by the following:

$$\theta(n)=\text{Tan}^{-1}(Y(n)/X(n)) \quad (11)$$

In a preferred embodiment, the range of values for θ(n) ranges from −π to +π radians.

In a preferred embodiment, in step 6020, the demodulation logic 568 unwraps the phase from the polar data. In a preferred embodiment, the unwrapping step removes discontinuities greater than π radians. In a preferred embodiment, the range of values for the phase θ is not limited to −π to +π radians.

In a preferred embodiment, as illustrated in FIG. 6c, in step 6020, the demodulation logic 568 unwraps the phase from the polar data by implementing the following: inputting the phase angle in step 6205; determining if $\theta i_{(n)}-\theta i_{(n-1)}$ is less than −π in step 6210; determining if $\theta i_{(n)}-\theta i_{(n-1)}$ is greater than +π in step 6215; set $\theta o_{(n)}=\theta o_{(n-1)}+(\theta i_{(n)}+2\pi-\theta i_{(n-1)})$ in step 6220; set $\theta o_{(n)}=\theta o_{(n-1)}+(\theta i_{(n)}-\theta i_{(n-1)})$ in step 6225; setting $\theta o_{(n)}=\theta o_{(n-1)}+(\theta i_{(n)}-2\pi-\theta i_{(n-1)})$ in step 6230; and outputting the completed phase angle output $\theta_o$ in step 6145.

In a preferred embodiment, in step 6205, the demodulation logic 568 inputs the phase angle input θi in step 6205. In an exemplary embodiment, the phase angle input θi is a 16 bit integer number.

In a preferred embodiment, in step 6210, the demodulation logic 568 determines if $\theta i_{(n)}-\theta i_{(n-1)}$ is less than −π. If $\theta i_{(n)}-\theta i_{(n-1)}$ is less than −π, then the demodulation logic 568 executes step 6220. If $\theta i_{(n)}-\theta i_{(n-1)}$ is greater than or equal to −π, then the demodulation logic 568 executes step 6215.

In a preferred embodiment, in step 6215, the demodulation logic 568 determines if $\theta i_{(n)}-\theta i_{(n-1)}$ is greater than +π. If $\theta i_{(n)}-\theta i_{(n-1)}$ is greater than +π, then the demodulation logic 568 executes step 6230. If $\theta i_{(n)}-\theta i_{(n-1)}$ is less than or equal to +π, then the demodulation logic 568 executes step 6225.

In a preferred embodiment, in step 6220, the demodulation logic 568 sets $\theta o_{(n)}=\theta o_{(n-1)}+(\theta i_{(n)}+2\pi-\theta i_{(n-1)})$.

In a preferred embodiment, in step 6225, the demodulation logic 568 sets $\theta o_{(n)}=\theta o_{(n-1)}+(\theta i_{(n)}-\theta i_{(n-1)})$.

In a preferred embodiment, in step 6230, the demodulation logic 568 sets $\theta o_{(n)}=\theta o_{(n-1)}+(\theta i_{(n)}-2\pi-\theta i_{(n-1)})$.

In a preferred embodiment, in step 6245, the demodulation logic 568 outputs the completed phase angle output $\theta o_{(n)}$.

The decimating filter 572 digitally filters the output phase data θo(n). In a preferred embodiment, the decimating filter 572 digitally filters the output phase data θo(n) using a finite-impulse-response low pass filter in order to reduce the bandwidth and the sample rate, and to remove the phase changes caused by changes in the length of the optical path P2 due to the stretcher 514. In a preferred embodiment, the digitally filtered output phase data θo(n) is representative of the environmental conditions sensed by the optical sensors 125. In a preferred embodiment, the magnitude of the digitally filtered output phase data θo(n) is representative of the environmental conditions sensed by the optical sensors 125.

Figure 7:
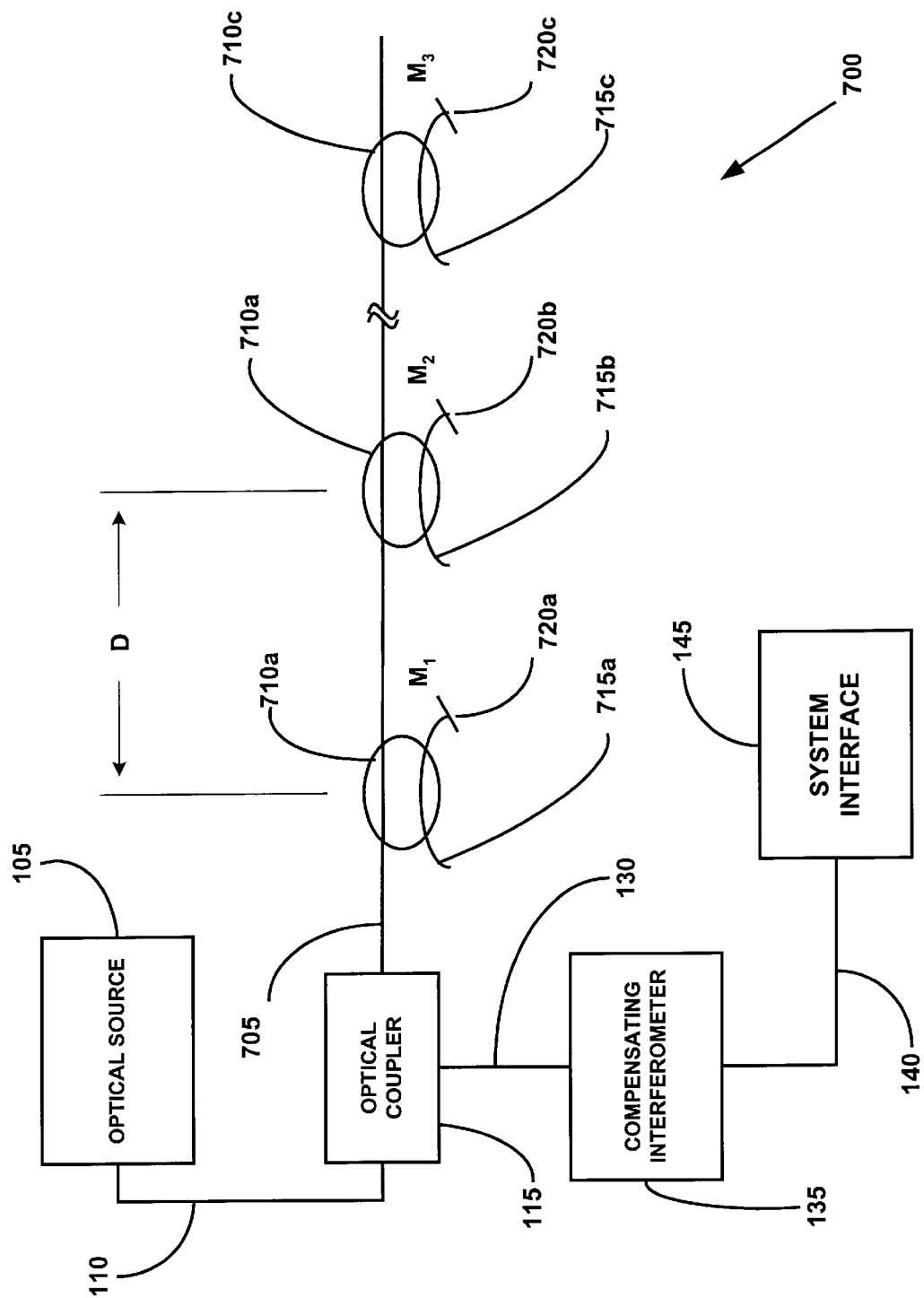
FIG. 7 is a schematic diagram of an alternate embodiment of an optical sensing system.

Referring to FIG. 7, an alternative embodiment of an optical sensing system 700 includes the optical source 105, the optical conductor 110, the optical coupler 115, the optical conductor 130, the compensating interferometer 135, the communication interface 140, the system interface 145, an optical conductor 705, optical couplers 710, optical conductors 715, and totally reflective mirrors 720. In a preferred embodiment, the design and operation of the optical source 105, the optical conductor 110, the optical coupler 115, the optical conductor 130, the compensating interferometer 135, the communication interface 140, and the system interface 145 are substantially identical to the optical source 105, the optical conductor 110, the optical coupler 115, the optical conductor 130, the compensating interferometer 135, the communication interface 140, and the system interface 145 as described above with reference to the optical sensing system 100.

The optical conductor 705 conveys light waves to and from the optical couplers 115 and 710. The optical conductor 705 is coupled to the optical coupler 115 and the optical couplers 710. The optical conductor 705 may be any number of conventional optical conductors. In a preferred embodiment, the optical conductor 705 is a single mode optical fiber.

The optical couplers 710 convey light waves between the optical conductor 705 and the optical conductors 715. In a preferred embodiment, the optical couplers 710 are 2×2 optical couplers. The optical couplers 710 are preferably evenly spaced along the length of the optical conductor 705 by a distance D.

The optical conductors 715 convey light waves between the optical couplers 710 and the totally reflective mirrors 720. In a preferred embodiment, the optical conductors 715 are single mode optical fibers.

The totally reflective mirrors 720 reflect incident light waves. The totally reflective mirrors 720 are coupled to the ends of the optical conductors 715. The totally reflective mirrors 720 may be formed in the ends of the optical conductors 715 using conventional methods.

In the system 700, optical hydrophones are provided by pairs of adjacent mirrors M and the corresponding intermediate section of the optical conductor 705. For example, the first optical hydrophone includes the mirrors $M_1$ and $M_2$ and the intermediate section of the optical conductor 705.

During operation of the system 700, the optical source 105 controllably generates pulses of light. The pulses of light are conveyed to the optical conductor 705 by the optical coupler 115. Each optical coupler 710 transmits a small portion of the incident light pulses, e.g. 0.5%, to the optical conductors 715. The totally reflective mirrors 720 embedded in the ends of each of the optical conductors 715 then reflect the incident light pulses back towards the optical coupler 115. In a preferred embodiment, the reflected pulses of light are then processed by the compensating interferometer 135 to generate signals representative of the sensed environmental conditions at each of the optical hydrophones substantially as described above with reference to the optical sensing system 100.

Figure 8:
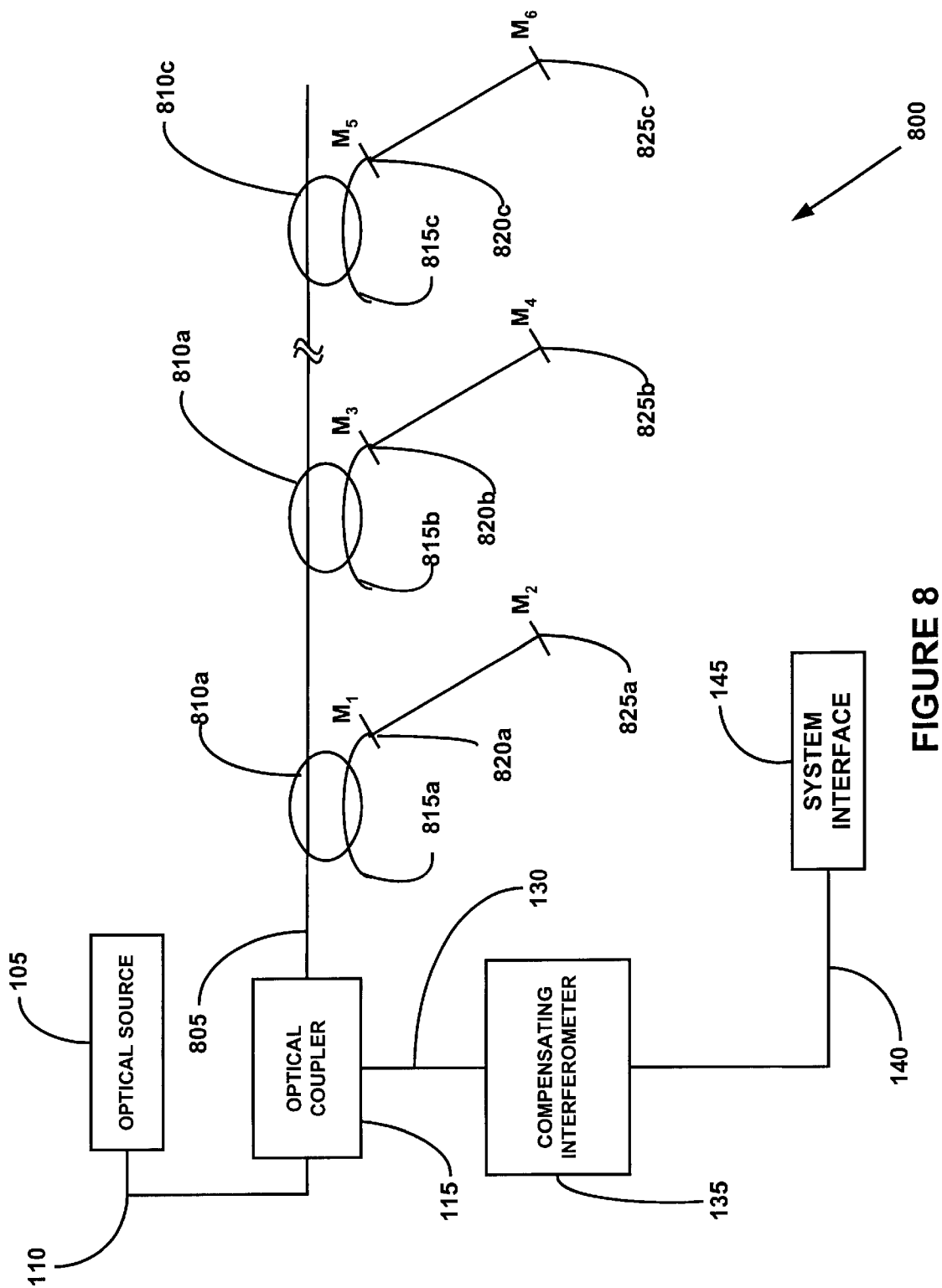
FIG. 8 is a schematic diagram of an alternate embodiment of an optical sensing system.

Referring to FIG. 8, an alternative embodiment of an optical sensing system 800 includes the optical source 105, the optical conductor 110, the optical coupler 115, the optical conductor 130, the compensating interferometer 135, the communication interface 140, the system interface 145, an optical conductor 805, optical couplers 810, optical conductors 815, partially reflective mirrors 820, and totally reflective mirrors 825. The design and operation of the optical source 105, the optical conductor 110, the optical coupler 115, the optical conductor 130, the compensating interferometer 135, the communication interface 140, and the system interface 145 are substantially identical to the optical source 105, the optical conductor 110, the optical coupler 115, the optical conductor 130, the compensating interferometer 135, the communication interface 140, and the system interface 145 as described above with reference to the optical sensing system 100.

The optical conductor 805 conveys light waves to and from the optical couplers 115 and 810. The optical conductor 805 is coupled to the optical coupler 115 and the optical couplers 810. The optical conductor 805 may be any number of conventional optical conductors. In a preferred embodiment, the optical conductor 805 is a single mode optical fiber.

The optical couplers 810 convey light waves between the optical conductor 805 and the optical conductors 815. In a preferred embodiment, the optical couplers 810 are 2×2 optical couplers.

The optical conductors 815 convey light waves between the optical couplers 810 and the reflective mirrors 820 and 825. In a preferred embodiment, the optical conductors 815 are single mode optical fibers.

The partially reflective mirrors 820 reflect a portion of the incident light waves. The partially reflective mirrors 820 may be formed in the optical conductors 815 using conventional methods.

The totally reflective mirrors 825 reflect incident light waves. The totally reflective mirrors 825 are coupled to the ends of the optical conductors 815. The totally reflective mirrors 825 may be formed in the optical conductor 815 using conventional methods. In a preferred embodiment, the spacing D between the partially reflective mirrors 820 and the totally reflective mirrors 825 is substantially constant.

In the system 800, optical hydrophones are provided by the pairs of the adjacent partially and totally reflective mirrors M and the corresponding intermediate sections of the optical conductors 815. For example, the first optical hydrophone includes the mirrors $M_1$ and $M_2$ and the intermediate section of the optical conductor 815.

During operation of the system 800, the optical source 105 controllably generates pulses of light. The pulses of light are conveyed to the optical conductor 805 by the optical coupler 115. Each optical coupler 810 transmits a small portion of the incident light pulses, e.g. 0.5%, to the optical conductors 815. The partially reflective. mirrors 820 embedded in each of the optical conductors 815 then reflect a portion of the incident light pulses back towards the optical coupler 115. The remaining portions of the incident light pulses are then reflected by the totally reflective mirrors 825 back toward the optical coupler 115. The reflected pulses of light are then processed by the compensating interferometer 135 to generate signals representative of the sensed environmental conditions at each of the optical hydrophones substantially as described above with reference to the optical sensing system 100.

By using the optical couplers 710 and 810, the systems 700 and 800 minimize cross talk and interference between the incident and reflected pulses of light.

Figure 9:
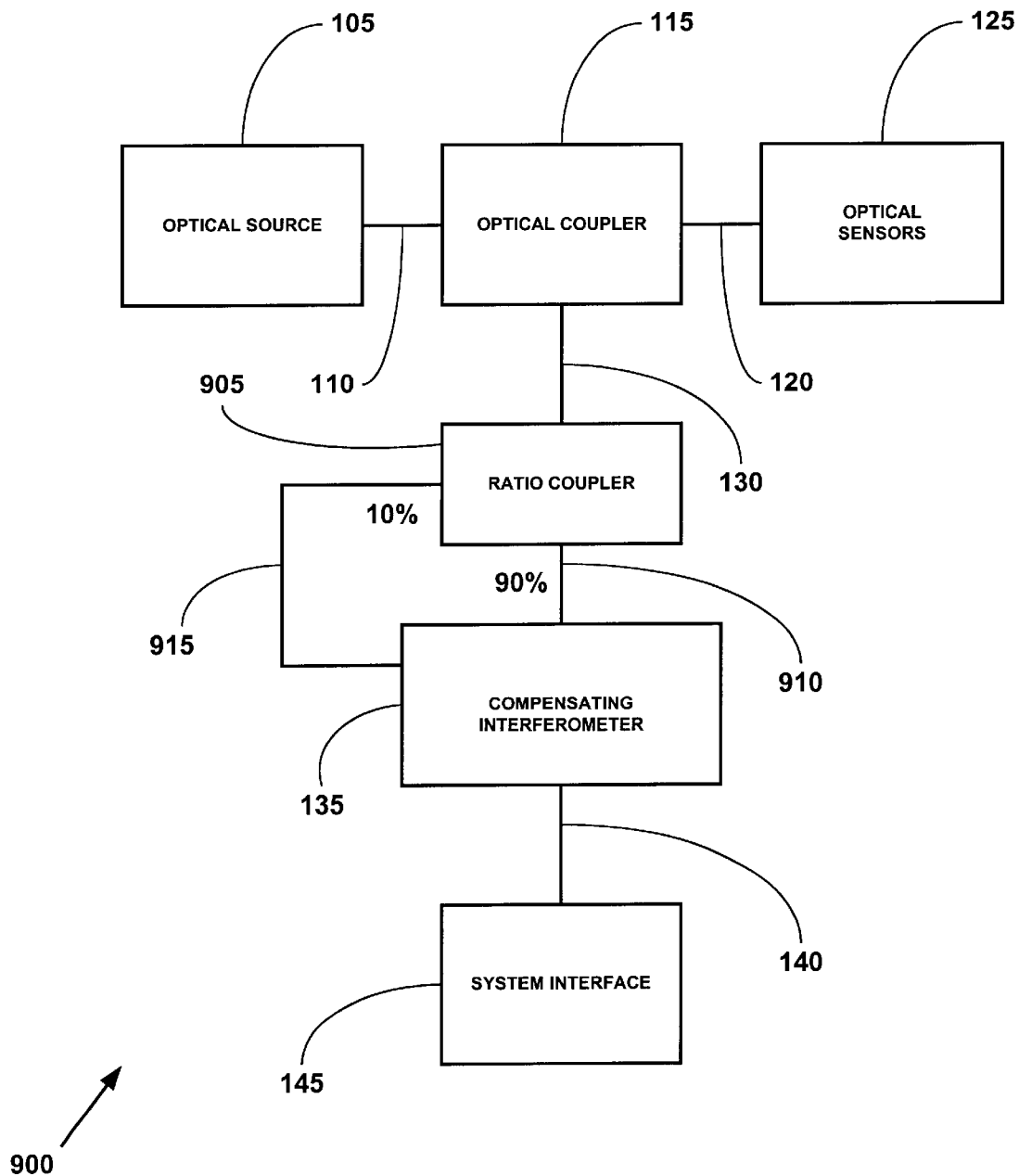
FIG. 9 is a schematic diagram of an alternate embodiment of an optical sensing system.

Referring to FIG. 9, an alternative embodiment of an optical sensing system 900 includes the optical source 105, the optical conductor 110, the optical coupler 115, the optical coupler 120, the optical sensors 125, the optical conductor 130, the compensating interferometer 135, the communication interface 140, the system interface 145, an optical conductor 910, and an optical conductor 915. The design and operation of the optical source 105, the optical conductor 110, the optical coupler 115, the optical conductor 120, the optical sensors 125, the optical conductor 130, the compensating interferometer 135, the communication interface 140, and the system interface 145 are substantially identical to the optical source 105, the optical conductor 110, the optical coupler 115, the optical conductor 120, the optical sensors 125, the optical conductor 130, the compensating interferometer 135, the communication interface 140, and the system interface 145 as described above with reference to the optical sensing system 100.

The ratio optical coupler 905 conveys a fraction of the incident light from the optical conductor 130 to the optical conductor 915, and conveys the remaining portion of the incident light to the compensating interferometer 135. The ratio optical coupler 905 is coupled to the optical conductors 130 and 915 and the compensating interferometer 135. The ratio optical coupler 905 may be any number of conventional ratio optical couplers. In a preferred embodiment, the ratio optical coupler 905 is a 10% ratio optical coupler.

The optical conductor 910 preferably conveys light waves between the 90% output of the ratio coupler 905 and the input to the compensating interferometer 135. In a preferred embodiment, the optical conductor 910 is a single mode optical fiber.

The optical conductor 915 preferably conveys light waves between the 10% output of the ratio optical coupler 905 and the processor 585 within the compensating interferometer 135. In a preferred embodiment, the optical conductor 915 is a single mode optical fibers.

The operation of the system 900 is preferably substantially identical to the operation of the system 100. In a preferred embodiment, the system 900 further uses the 10% output of the ratio optical coupler 905 as a timing signal to synchronize the analog-to-digital conversion of the signals A, B and C.

In a preferred embodiment, during operation of the optical sensing systems 100, 700, 800 and 900, a method for optimizing the level of the electrical signals A, B and C transmitted to the processor 585 is used that varies the percentage of the incident optical signal reflected by each mirror M In a preferred embodiment the mirrors M closest to the optical source 105 reflect the lowest percentage of the incident optical signals, and those mirrors M furthest away from the optical source 105 reflect the highest percentage of the incident optical signals. In this manner, the magnitude of the electrical signals A, B and C provided to the processor 585 are preferably equalized. In a preferred embodiment, the magnitude of the electrical signals A, B and C are equalized by tapering the reflectances of the mirrors M and the coupling ratios of the optical couplers 115, 510, 535, 710, 810, and 905 from low values near the optical source 105 to high values away from the optical source 105. In this manner, the reflected optical signal level is substantially the same from all of the mirrors M.

In order to optimize the mirror reflectance $R_j$ for the jth mirror (where j=1 for the mirror closest to the optical source 105, and j=N for the mirror furthest from the optical source 105), in a preferred embodiment, we define three loss factors associated with the optical fiber: (1) F is the fiber length attenuation loss factor, (2) X is the mirror excess loss factor, and (3) $M_j$ is the loss factor for the jth mirror due to mirror reflectance. These loss factors are given by $$F=10^{-\alpha D/10} \tag{12}$$

where $\alpha$ represents the fiber loss in db/km and D represents the center-to center spacing of the optical hydrophones, in km;

$$X=10^{-\beta/10}, \tag{13}$$

where $\beta$ represents excess loss per mirror in dB, and $$M_j=1-R_j \tag{14}$$

Furthermore, since at least a portion of the incident light at the jth mirror passes though all of the downstream mirrors and the connecting optical conductor twice, the reflectance of the jth mirror that will provide the same reflected signal level as that provided by the j-1th mirror is given by the following expression:

$$R_j=R_{j-1}/(L^2 X^2 M_{j-1}^2) \tag{15}$$

A summary of exemplary calculated results is given in the Table below. The calculations assume that the maximum mirror reflectance $R_N=2\%=0.02$, and that the excess mirror loss X=0.03 dB. The loss factors of 0.4 db/km and 0.25 db/km correspond to minimum fiber losses at 1.3 $\mu$m and 1.55 $\mu$m, respectively. In the Table, $R_1$ is the reflectance of the mirror closest to the laser 105. The excess system loss XSL, given (in db) by $$XSL=-10 \log_{10}(2R_1N), \tag{16}$$

is an important parameter in the analysis. XSL indicates what portion of the light from the optical source 105 is actually utilized at the optical-coupler 535. It takes into account all the loss factors introduced above: fiber length attenuation, mirror excess loss, and excess loss due to mirror reflectance.

Exemplary results of mirror reflectance optimization are illustrated below:

| Input Parameters | | Output Parameters | |
| --- | --- | --- | --- |
| N | α (db/km) | $R_1$ | XSL (dB) |
| 48 | 0.4 | .0041 | 8.61 |
| 48 | .25 | .0042 | 6.79 |
| 96 | .04 | .00157 | 14.56 |
| 96 | .025 | .00163 | 10.89 |

Figure 10:
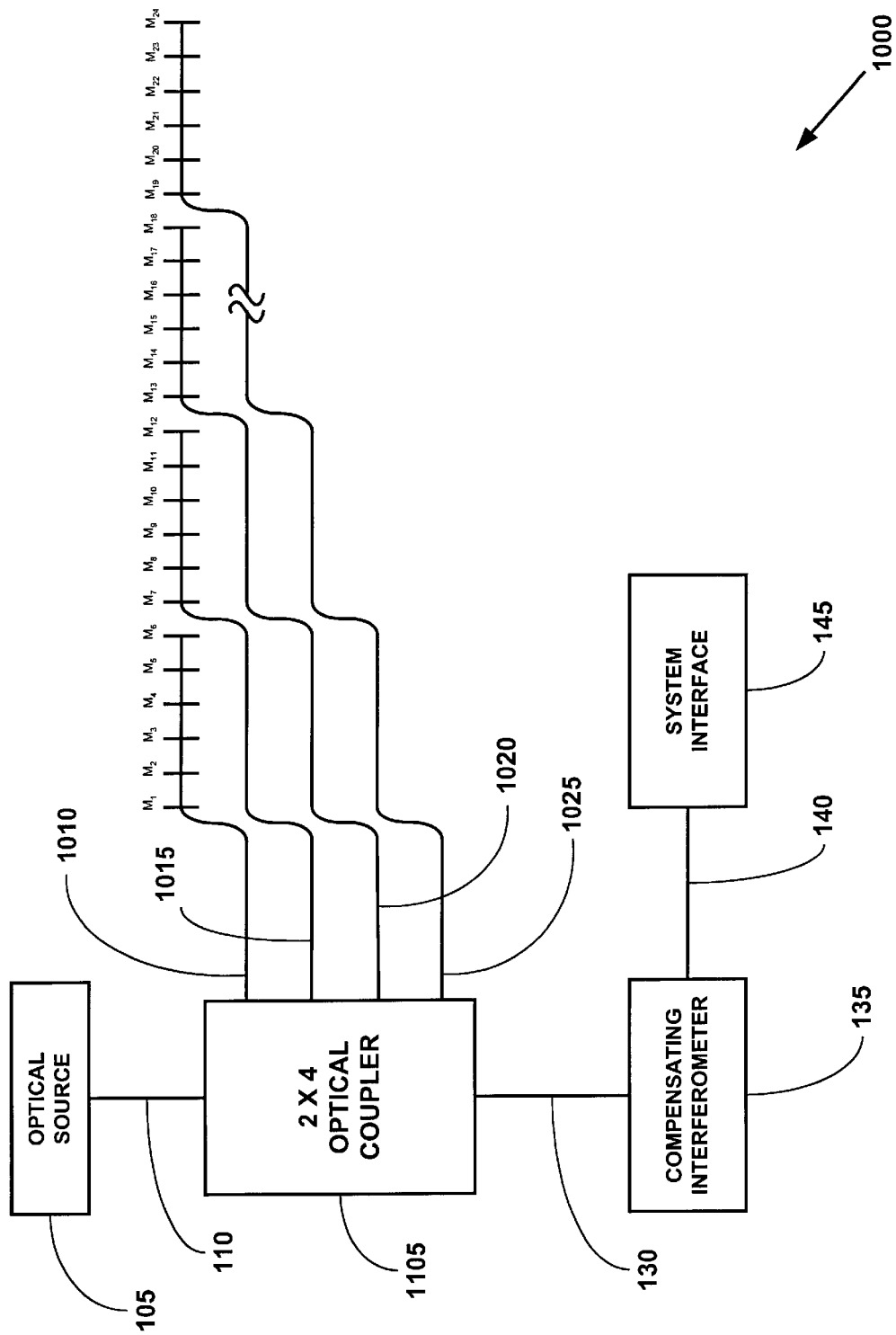
FIG. 10 is a schematic diagram of an alternate embodiment of an optical sensing system.

Referring to FIG. 10, an alternative embodiment of an optical sensing system 1000 includes the optical source 105, the optical conductor 110, the optical conductor 130, the compensating interferometer 135, the communications interface 140, the system interface 145, a 2×N optical coupler 1105, a first optical conductor 1010 including partially reflective mirrors M, a second optical conductor 1015 including partially reflective mirrors M, a third optical conductor 1020 including partially reflective mirrors M, and a fourth optical conductor 1025 including partially reflective mirrors M.

The design and operation of the optical source 105, the optical conductor 110, the optical conductor 130, the compensating interferometer 135, the communications interface 140, and the system interface 145 are preferably substantially identical to the optical source 105, the optical conductor 110, the optical conductor 130, the compensating interferometer 135, the communications interface 140, and the system interface 145 as described above with reference to the system 100.

The 2×4 optical coupler 1105 conveys light waves between the optical conductors 110, 130 and 1010, 1015, 1020 and 1025. In this manner, light waves transmitted from the optical source 105 are split into 4 equal parts and transmitted to the optical conductors 1010, 1015, 1020 and 1025. Light waves reflected by the mirrors M are split into 2 equal parts and transmitted to the optical source 105 and the compensating interferometer. The 2×$ optical coupler 1105 may be any number of commercially available 2×4 optical couplers. In a preferred embodiment, the 2×4 optical coupler 1105 is a balanced 2×4 optical coupler. More generally, the optical coupler 1105 is an 2×N optical coupler, where-N corresponds to the number of optical conductors that include partially reflective mirrors M. In a preferred embodiment, the two-by-N optical coupler 1105 is a balanced two-by-N optical coupler available from M.P. Fiber Optic as part number SA1500NONABONE.

The optical conductor 1010 conveys light waves to and from the optical coupler 1105. The optical conductor 1010 preferably includes partially reflective mirrors $M_1$ to $M_6$. The optical conductor 1010 may be any number of conventional optical fibers. In a preferred embodiment, the optical conductor 1010 is a single mode optical fiber. The partially reflective mirrors $M_1$ to $M_6$ may be formed in the optical conductor 1010 using conventional methods.

The optical conductor 1015 conveys light waves to and from the optical coupler 1105. The optical conductor 1015 preferably includes partially reflective mirrors $M_7$ to $M_{12}$. The optical conductor 1015 may be any number of conventional optical fibers. In a preferred embodiment, the optical conductor 1015 is a single mode optical fiber. The partially reflective mirrors $M_7$ to $M_{12}$ may be formed in the optical conductor 1015 using conventional methods.

The optical conductor 1020 conveys light waves to and from the optical coupler 1105. The optical conductor 1020 preferably includes partially reflective mirrors $M_{13}$ to $M_{18}$. The optical conductor 1020 may be any number of conventional optical fibers. In a preferred embodiment, the optical conductor 1020 is a single mode optical fiber. The partially reflective mirrors $M_{13}$ to $M_{18}$ may be formed in the optical conductor 1020 using conventional methods.

In a preferred embodiment, the optical conductors, 1010, 1015, 1020, and 1025, are SMF 28 fibers available from the Corning Corporation.

In a preferred embodiment, the partially reflective mirrors $M_1$ to $M_{24}$ are positioned along a common axis and the spacing D between the partially reflective mirrors $M_1$ to $M_{24}$ is substantially equal. In an alternative embodiment, the mirrors M are provided by coupling totally reflective mirrors to the optical conductors, 1010, 1015, 1020, and 1025, using ratio couplers. In the system 1000, the optical hydrophones are preferably defined by adjacent pairs of spaced apart partially reflective mirrors M.

During operation of the system 1000, the optical source 105 controllably generates pulses of light having a predetermined wavelength distribution. The pulses of light are then transmitted to the optical coupler 1105 for distribution to the optical conductors 1010, 1015, 1020, and 1025. The incident pulses of light are then partially reflected by mirrors M and reflected back to optical coupler 1105.

Figure 11:
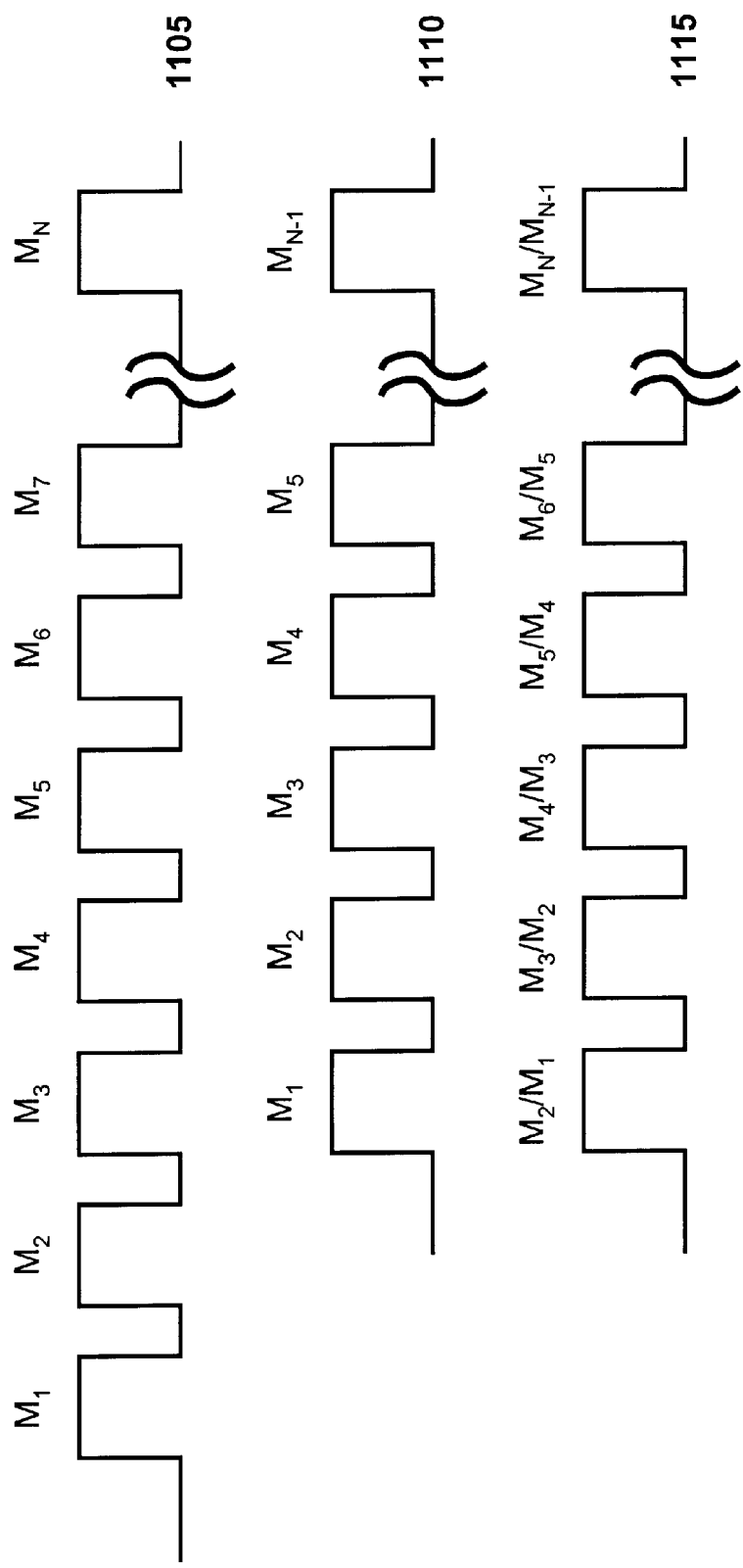
FIG. 11 is a timing diagram illustrating the operation of the optical sensing system of FIG. 10.

As illustrated in FIG. 11, the reflected pulses 1105 of light are then transmitted to the compensating interferometer 135. The reflected pulses 1105 of light and the delayed reflected pulses 1110 of light are then used within the compensating interferometer to generate the interference patterns 1115 substantially as described above with reference to the system 100. In a preferred embodiment, the interference patterns 1115 are representative of the variations in the spacing D between the adjacent mirrors M.

Figure 12:
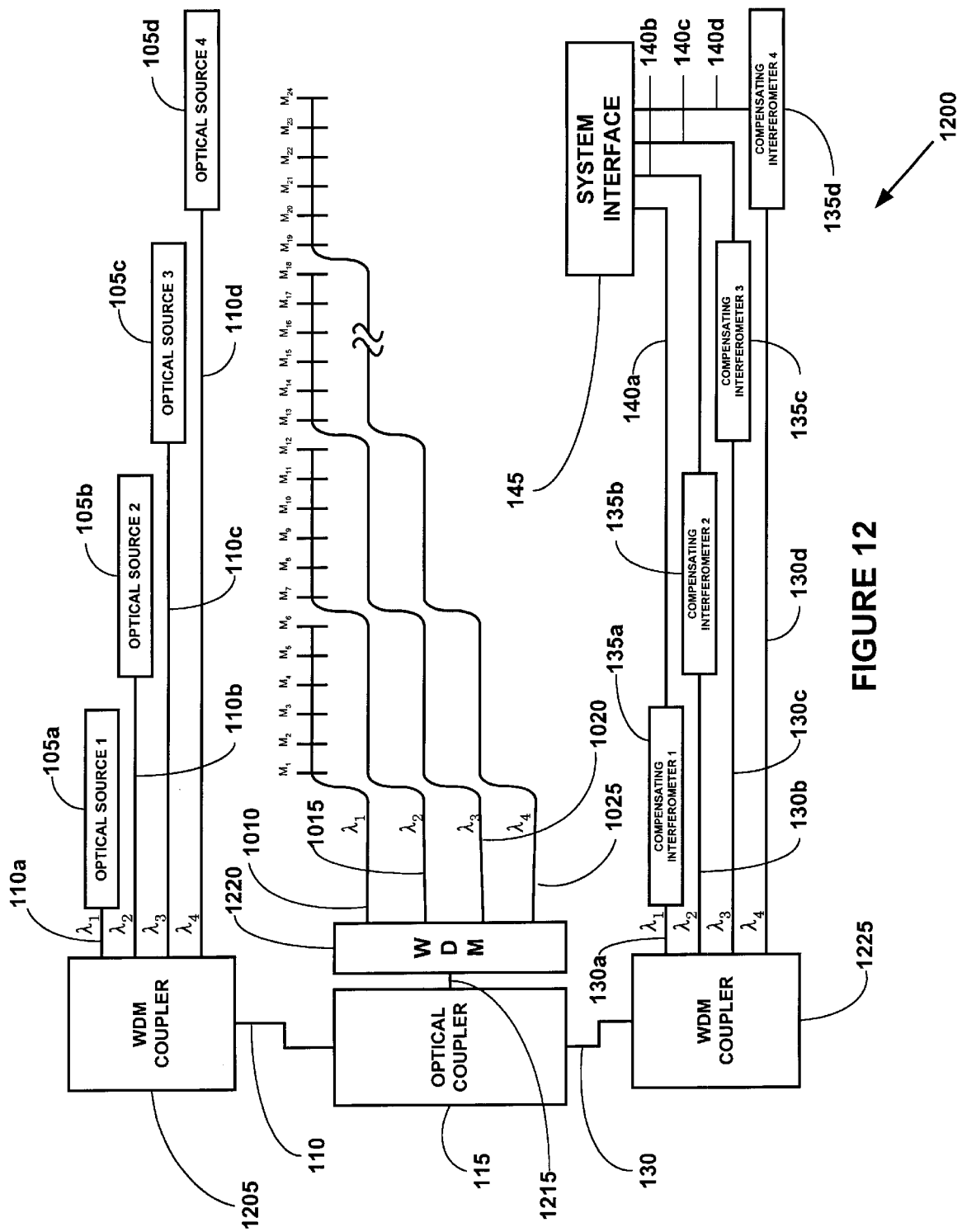
FIG. 12 is a schematic diagram of an alternate embodiment of an optical sensing system.

Referring to FIG. 12, an alternate embodiment of an optical sensing system 1200 includes optical sources 105*a*, 105*b*, 105*c* and 105*d*, optical conductors 110*a*, 110*b*, 110*c* and 110*d*, a wave division multiplexing (WDM) optical coupler 1205, the optical conductor 110, the optical coupler 115, an optical conductor 1215, a WDM optical coupler 1220, the optical conductors 1010, 1015, 1020 and 1025, the optical conductor 130, a WDM optical coupler 1225, optical conductors 130*a*, 130*b*, 130*c*, and 130*d*, compensating interferometers 135*a*, 135*b*, 135*c* and 135*d*, communication interfaces 140*a*, 140*b*, 140*c*, and 140*d*, and the system interface 145. In a preferred embodiment, the system 1200 provides a time-division-multiplexed and a wave division multiplexed optical sensing system.

The optical sources 105*a*, 105*b*, 105*c* and 105*d* preferably controllably generate light sources having center wavelengths of $\lambda_1, \lambda_2, \lambda_3,$ and $\lambda_4$. In a preferred embodiment, the design and operation of the optical sources 105*a*, 105*b*, 105*c* and 105*d* are substantially identical to the optical source 105 described above with reference to the system 100, further adapted to provide the selected wavelength distribution.

The optical conductors 110*a*, 110*b*, 110*c*, and 110*d* convey light waves between the optical sources 105*a*, 105*b*, 105*c* and 105*d* and the WDM optical coupler 1205. In a preferred embodiment, the design and operation of the optical conductors 110*a*, 110*b*, 110*c* and 110*d* are substantially identical to the optical conductor 110 described above with reference to the system 100.

The WDM optical coupler 1205 conveys light waves between the optical conductors 110*a*, 110*b*, 110*c*, and 110*d* and the optical conductor 110. During operation, the WDM optical coupler 1205 preferably combines the incident optical signals received from the optical sources 105*a*, 105*b*, 105*c* and 105*d*, having center wavelengths $\lambda_1, \lambda_2, \lambda_3,$ and $\lambda_4$, respectively, into an output signal for transmission to the optical coupler 115. The WDM optical coupler 1205 may be any number of conventional WDM optical couplers. In a preferred embodiment, the WDM optical coupler 1205 is a model LDW Series available from Kaifa Technology.

The optical conductor 110 conveys light waves between the WDM optical coupler 1205 and the optical coupler 115. The design and operation of the optical conductor 110 is preferably provided as described above with reference to the system 100.

The optical coupler 115 conveys light waves between the optical conductors 110, 1215 and 130. The design and operation of the optical coupler 115 is preferably provided as described above with reference to the system 100.

The optical conductor 1215 conveys light waves between the optical coupler 115 and the WDM optical coupler 1220. The optical conductor 1215 may be any number of conventional commercially available optical conductors. In a preferred embodiment, the optical conductor 1215 is a single mode optical fiber.

The WDM optical coupler 1220 conveys light waves between the optical conductor 1215 and the optical conductors 1010, 1015, 1020 and 1025. In a preferred embodiment, the WDM optical coupler 1220 conveys light waves having center wavelengths of $\lambda_1, \lambda_2, \lambda_3,$ and $\lambda_4$ to and from the optical conductors 1010, 1015, 1020 and 1025, respectively. In a preferred embodiment, the WDM optical coupler 1220 conveys light waves having center wavelengths of $\lambda_1, \lambda_2, \lambda_3,$ and $\lambda_4$ to and from the optical conductor 1215. In this manner, the WDM optical coupler 1220 provides each optical conductor, 1010, 1015, 1020, and 1025 with light waves having a different wavelength distribution.

The optical conductors 1010, 1015, 1020 and 1025 and the corresponding mirrors M are coupled to corresponding outputs of the WDM optical coupler 1220. In this manner, each optical conductor 1010, 1015, 1020 and 1025 uses a different wavelength distribution of light waves. The design and operation of the optical conductors 1010, 1015, 1020, and 1025 and mirrors M are otherwise preferably substantially identical to the optical conductors 1010, 1015, 1020 and 1025 as described above with reference to the system 1000. In the system 1200, the optical hydrophones are defined by pairs of partially reflective mirrors M and the corresponding intermediate sections of the optical conductors 1010, 1015, 1020 and 1025.

The optical conductor 130 conveys light waves between the optical coupler 115 and the WDM optical coupler 1225. The design and operation of the optical conductor 130 is preferably provided as described above with reference to the system 100.

The WDM optical coupler 1225 conveys light waves between the optical conductor 130 and the optical conductors 130a, 130b, 130c and 130d. In a preferred embodiment, the WDM optical coupler 1225 receives light waves having center wavelengths including $\lambda_1$, $\lambda_2$, $\lambda_3$, and $\lambda_4$ from the optical conductor 130 and conveys light waves having center wavelengths $\lambda_1$, $\lambda_2$, $\lambda_3$, and $\lambda_4$ to the optical conductors 130a, 130b, 130c and 130d, respectively. In this manner, the WDM optical coupler 1225 provides each optical conductor, 130a, 130b, 130c, and 130d with light waves having a different wavelength distribution. The WDM optical coupler 1225 may be any conventional commercially available WDM optical coupler. In a preferred embodiment, the WDM optical coupler 1225 is a model LDW Series available from Kaifa Technology.

The optical conductors 130a, 130b, 130c, and 130d are coupled to the WDM optical coupler 1225 and corresponding compensating interferometers 135a, 135b, 135c, and 135d. In a preferred embodiment, the optical conductors 130a, 130b, 103c, and 130d receive light waves having center wavelengths $\lambda_1$, $\lambda_2$, $\lambda_3$, and $\lambda_4$, respectively, from the WDM optical coupler 1225. The design and operation of the optical conductors 130a, 130b, 130c, and 130d are preferably identical to the optical conductor 130 as described above with reference to the system 100.

The compensating interferometers 135a, 135b, 135c, and 135d receive light waves having center wavelengths of $\lambda_1$, $\lambda_2$, $\lambda_3$, and $\lambda_4$ from the corresponding optical conductors 130a, 130b, 130c, and 130d. The design and operation of the compensating interferometers 135a, 135b, 135c, and 135d are preferably substantially identical to the compensating interferometer 135 as described above with reference to the system 100. In a preferred embodiment, the compensating interferometers 135a, 135b, 135c, and 135d generate signals representative of the sensed environmental conditions for the corresponding optical conductors 1010, 1015, 1020, and 1025. In this manner, the system 1200 provides wavelength division multiplexing.

The communication interfaces 140a, 140b, 140c, and 140d convey electrical signals from the compensating interferometers 135a, 135b, 135c, and 135d, to the system interface 145. The design and operation of the communication interfaces 140a, 140b, 140c and 140d are preferably substantially identical to the communication interface 140 as described above with reference to the system 100.

The system interface 145 is coupled to the communication interfaces 140a, 140b, 140c, and 140d. The design and operation of the system interface 145 is preferably substantially identical to the system interface 145 as described above with reference to the system 100.

In a preferred embodiment, during operation of the system 1200, the optical sources 105 controllably generate pulses of light having different wavelength distributions. In a preferred embodiment, the optical sources, 105a, 105b, 10c and 105d, controllably generate pulses of light having center wavelengths $\lambda_1$, $\lambda_2$, $\lambda_3$, and $\lambda_4$, respectively. The pulses of light controllably generated by the optical sources 105 are then combined by the WDM optical coupler 1205 and transmitted to the WDM optical coupler 1220. The WDM optical coupler 1220 then distributes the pulses of light to the optical conductors 1010, 1015, 1020, and 1025. In a preferred embodiment, the WDM optical coupler 1220 provides the optical conductors 1010, 1015, 1020, and 1025 with pulses of light having center wavelengths $\lambda_1$, $\lambda_2$, $\lambda_3$, and $\lambda_4$, respectively. Within each optical conductor, 1010, 1015, 1020 and 1025, a portion of the transmitted pulses of light are reflected back toward to the WDM optical coupler 1220 at each mirror M. Because the mirrors M are preferably separated by a constant distance D, the reflected pulses of light are time division multiplexed (TDM). Furthermore, because each optical conductor, 1010, 1015, 1020, and 1025, is provided with pulses of light having different center wavelengths, the reflected pulses of light are also wavelength division multiplexed (WDM). In this manner, the system 1200 provides a TDM and a WDM optical sensing system. The reflected pulses of light are then transmitted to the WDM optical coupler 1225. The WDM optical coupler 1225 preferably distributes the reflected pulses of light to the corresponding compensating interferometer 135 as a function of the center wavelength of the reflected light. pulses. In this manner, each compensating interferometer 135 is dedicated to a corresponding one of the optical conductors 1010, 1015, 1020 and 1025. The reflected light pulses are then processed by the corresponding compensating interferometer 135 substantially as described above with reference to compensating interferometer 135 of the system 100 to generate signals representative of the sensed environmental conditions in each of the optical conductors 1010, 1015, 1020, and 1025.

Figure 13:
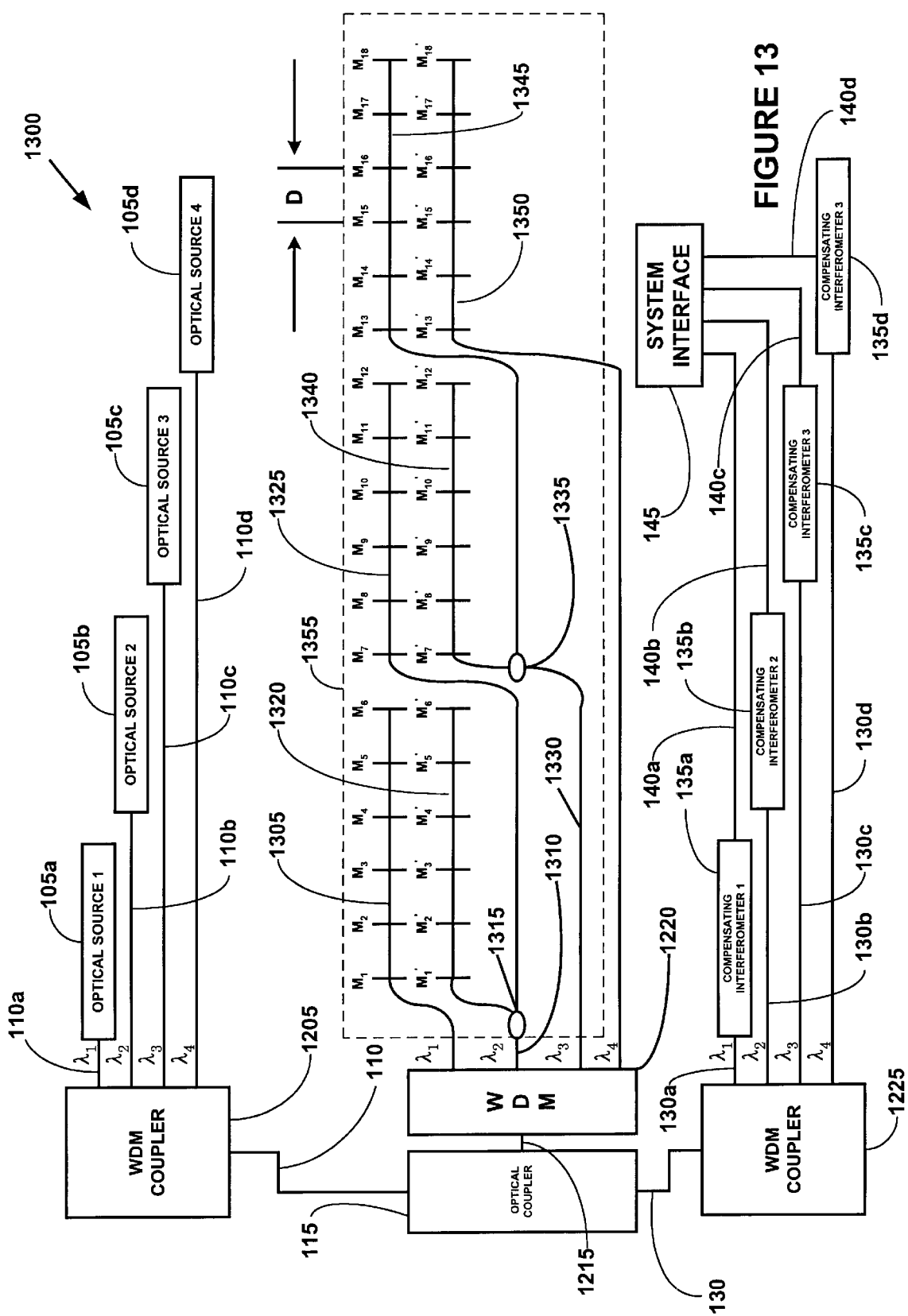
FIG. 13 is a schematic diagram of an alternate embodiment of an optical sensing system.

Referring to FIG. 13, an alternate embodiment of an optical sensing system 1300 includes the optical sources 105a, 105b, 105c and 105d, the optical conductors 110a, 110b, 110c and 110d, the WDM optical coupler 1205, the optical conductor 110, the optical coupler 115, the optical conductor 1215, the WDM optical coupler 1220, an optical conductor 1305 having partially reflective mirrors M, an optical conductor 1310, an optical coupler 1315, an optical conductor 1320 having partially reflective mirrors M, an optical conductor 1325 having partially reflective mirrors M, an optical conductor 1330, an optical coupler 1335, an optical conductor 1340 having partially reflective mirrors 1340, an optical conductor 1345 having partially reflective mirrors, an optical conductor 1350 having partially reflective mirrors M, the optical conductor 130, the optical conductors 130a, 130b, 130c, and 130d, the compensating interferometers 135a, 135b, 135c, and 135d, the communication interfaces 140a, 140b, 140c, and 140d, and the system interface 145. In a preferred embodiment, the system 1300 provides a TDM and a WDM optical sensing system.

The optical sources 105a, 105b, 105c, and 105d preferably controllably generate light sources having center wavelengths of $\lambda_1$, $\lambda_2$, $\lambda_3$, and $\lambda_4$, respectively. In a preferred embodiment, the design and operation of the optical sources 105a, 105b, 105c, and 105d is substantially identical to the optical sources 105a, 105b, 105c and 105d as described above with reference to the system 1200.

The optical conductors 110a, 110b, 110c, and 110d convey light waves between the optical sources 105a, 105b, 105c and 105d and the WDM optical coupler 1205. In a preferred embodiment, the design and operation of the optical conductors 110a, 110b, 110c, and 110d are substantially identical to the optical conductors 110a, 110b, 110c and 110d as described above with reference to the system 1200.

The WDM optical coupler 1205 conveys light waves between the optical conductors 110a, 110b, 110c, and 110d and the optical conductor 110. The design and operation of the WDM optical coupler 1205 is preferably substantially identical to the WDM optical coupler 1205 as described above with reference to the system 1200.

The optical conductor 110 conveys light waves between the WDM optical coupler 1205 and the optical coupler 115. The design and operation of the optical conductor 110 is preferably substantially identical to the optical conductor 110 described above with reference to the system 1200.

The optical coupler 115 conveys light waves between the optical conductors 110, 1215 and 130. The design and operation of the optical coupler 115 is preferably substantially identical to the optical coupler 115 as described above with reference to the system 1200.

The optical conductor 1215 conveys light waves between the optical coupler 115 and the WDM optical coupler 1220. The design and operation of the optical conductor 1215 is preferably substantially identical to the optical conductor 1215 as described above with reference to the system 1200.

The WDM optical coupler 1220 conveys light waves between the optical conductor 1215 and the optical conductors 1305, 1310, 1330, and 1350. In a preferred embodiment, the WDM optical coupler 1220 conveys light waves having center wavelengths of $\lambda_1$, $\lambda_2$, $\lambda_3$, and $\lambda_4$ to and from the optical conductors 1305, 1310, 1330, and 1350, respectively. In a preferred embodiment, the WDM optical coupler 1220 conveys light waves having center wavelengths of $\lambda_1$, $\lambda_2$, $\lambda_3$, and $\lambda_4$ to and from the optical conductor 1215. In this manner, the WDM optical coupler 1220 provides each optical conductor, 1305, 1310, 1330 and 1350 with light waves having a different wavelength distribution.

The optical conductor 1305 conveys light waves to and from the WDM optical coupler 1220. The optical conductor 1305 further preferably includes partially reflective mirrors $M_1$ to $M_6$. The optical conductor 1305 may be any number of conventional commercially available optical conductors. In a preferred embodiment, the optical conductor 1305 is a single mode optical fiber. The partially reflective mirrors $M_1$ to $M_6$ may be formed in the optical conductor 1305 using conventional methods. In a preferred embodiment, the partially reflective mirrors $M_1$ to $M_6$ are equally spaced by a distance D.

The optical conductor 1310 conveys light waves between the WDM optical coupler 1220 and the optical coupler 1315. The optical conductor 1310 may be any number of conventional commercially available optical conductors. In a preferred embodiment, the optical conductor 1310 is a single mode optical fiber.

The optical coupler 1315 conveys light waves between the optical conductors 1310, 1320, and 1325. The optical coupler 1315 may be any number of conventional commercially available 1×2 optical couplers. In a preferred embodiment, the optical coupler 1315 is a model SMUC2150PS210 optical coupler available from E-TEK Dynamics, Inc.

The optical conductor 1320 conveys light waves to and from the optical coupler 1315. The optical conductor 1320 further preferably includes partially reflective mirrors $M_1'$ to $M_6'$. The optical conductor 1320 may be any number of conventional commercially available optical conductors. In a preferred embodiment, the optical conductor 1320 is a single mode optical fiber. The partially reflective mirrors $M_1'$ to $M_6'$ may be formed in the optical conductor 1320 using conventional methods. In a preferred embodiment, the partially reflective mirrors $M_1'$ to $M_6'$ are equally spaced by a distance D. In a preferred embodiment, the partially reflective mirrors $M_1'$ to $M_6'$ are positioned parallel to and in opposing relation to the partially reflective mirrors $M_1$ to $M_6$. In this manner, the partially reflective mirrors $M_1'$ to $M_6'$ provide a reference signal for the partially reflective mirrors $M_1$ to $M_6$. In a preferred embodiment, the partially reflective mirrors $M_1'$ to $M_6'$ are further contained within an acoustically insensitive housing in order to optimally provide a reference signal for the partially reflective mirrors $M_1$ to $M_6$.

The optical conductor 1325 conveys light waves to and from the optical coupler 1315. The optical conductor 1325 further preferably includes partially reflective mirrors $M_7$ to $M_{12}$. The optical conductor 1325 may be any number of conventional commercially available optical conductors. In a preferred embodiment, the optical conductor 1325 is a single mode optical fiber. The partially reflective mirrors $M_7$ to $M_{12}$ may be formed in the optical conductor 1325 using conventional methods. In a preferred embodiment, the partially reflective mirrors $M_7$ to $M_{12}$ are equally spaced by a distance D. In a preferred embodiment, the partially reflective mirrors $M_7$ to $M_{12}$ are positioned along an axis common to the partially reflective mirrors $M_1$ to $M_6$.

The optical conductor 1330 conveys light waves between the WDM optical coupler 1220 and the optical coupler 1335. The optical conductor 1330 may be any number of conventional commercially available optical conductors. In a preferred embodiment, the optical conductor 1330 is a single mode optical fiber.

The optical coupler 1335 conveys light waves between the optical conductors 1330, 1340 and 1345. The optical coupler 1335 may be any number of conventional commercially available 1×2 optical couplers. In a preferred embodiment, the optical coupler 1335 is a model SMUC2150PS210 optical coupler available from E-TEK Dynamics, Inc.

The optical conductor 1340 conveys light waves to and from the optical coupler 1335. The optical conductor 1340 further preferably includes partially reflective mirrors $M_7'$ to $M_{12}'$. The optical conductor 1340 may be any number of conventional commercially available optical conductors. In a preferred embodiment, the optical conductor 1340 is a single mode optical fiber. The partially reflective mirrors $M_7'$ to $M_{12}'$ may be formed in the optical conductor 1340 using conventional methods. In a preferred embodiment, the partially reflective mirrors $M_7'$ to $M_{12}'$ are equally spaced by a distance D. In a preferred embodiment, the partially reflective mirrors $M_1'$ to $M_6'$ and the partially reflective mirrors $M_7'$ to $M_{12}'$ are positioned along a common axis. In a preferred embodiment, the partially reflective mirrors $M_1'$ to $M_{12}'$ are positioned parallel to and in opposing relation to the partially reflective mirrors $M_1$ to $M_{12}$. In this manner, the partially reflective mirrors $M_1'$ to $M_{12}'$ preferably provide a reference signal for the partially reflective mirrors $M_1$ to $M_{12}$. In a preferred embodiment, the partially reflective mirrors $M_1'$ to $M_{12}'$ are further contained within an acoustically insensitive housing in order to optimally provide a reference signal for the partially reflective mirrors $M_1$ to $M_{12}$.

The optical conductor 1345 conveys light waves to and from the optical coupler 1335. The optical conductor 1355 further preferably includes partially reflective mirrors $M_{13}$ to $M_{18}$. The optical conductor 1345 may be any number of conventional commercially available optical conductors. In a preferred embodiment, the optical conductor 1345 is a single mode optical fiber. The partially reflective mirrors $M_{13}$ to $M_{18}$ may be formed in the optical conductor 1345 using conventional methods. In a preferred embodiment, the partially reflective mirrors $M_{13}$ to $M_{18}$ are equally spaced by a distance D. In a preferred embodiment, the partially reflective mirrors $M_{13}$ to $M_{18}$ are equally spaced by a distance D. In a preferred embodiment, the partially reflective mirrors $M_{13}$ to $M_{18}$ are positioned along an axis common to the partially reflective mirrors $M_1$ to $M_{12}$.

The optical conductor 1350 conveys light waves to and from the WDM optical coupler 1220. The optical conductor 1350 further preferably includes partially reflective mirrors $M_{13}'$ to $M_{18}'$. The optical conductor 1350 may be any number of conventional commercially available optical conductors. In a preferred embodiment, the optical conductor 1350 is a single mode optical fiber. The partially reflective mirrors $M_{13}'$ to $M_{18}'$ may be formed in the optical conductor 1350 using conventional methods. In a preferred embodiment, the partially reflective mirrors $M_{13}'$ to $M_{18}'$ are equally spaced by a distance D. In a preferred embodiment, the partially reflective mirrors $M_1'$ to $M_{18}'$ are positioned along a common axis. In a preferred embodiment, the partially reflective mirrors $M_1'$ to $M_{18}'$ are positioned parallel to and in opposing relation to the partially reflective mirrors $M_1$ to $M_{18}$. In this manner, the partially reflective mirrors $M_1'$ to $M_{18}'$ preferably provide a reference signal for the partially reflective mirrors $M_1$ to $M_{18}$. In a preferred embodiment, the partially reflective mirrors $M_1'$ to $M_{18}'$ are further contained within an acoustically insensitive housing in order to optimally provide a reference signal for the partially reflective mirrors $M_1$ to $M_{18}$.

In a preferred embodiment, the partially reflective mirrors $M_1$ to $M_{18}$ are positioned along a common axis and adjacent partially reflective mirrors M are separated by a constant distance D. In a preferred embodiment, the partially reflective mirrors $M_1'$ to $M_{18}'$ are positioned along a common axis and adjacent partially reflective mirrors M are separated by a constant distance D. In a preferred embodiment, the partially reflective mirrors $M_1'$ to $M_{18}'$ are positioned parallel to and in opposing relation to the partially reflective mirrors $M_1$ to $M_{18}$. In a preferred embodiment, the optical conductors 1305, 1320, 1340, 1345, 1350, the partially reflective mirrors $M_1$ to $M_{18}$ and $M_1'$ to $M_{18}'$, and the optical couplers 1315 and 1335 provide an optical sensor assembly 1355.

The optical conductors 1305, 1320, 1325, 1340, 1345 and 1350 and the corresponding partially reflective mirrors M are coupled to corresponding outputs of the WDM optical coupler 1220. In this manner, each optical conductor 1305, 1320, 1325, 1340, 1345 and 1350 uses a different wavelength distribution of light waves. In this manner, the system 1300 provides a WDM optical sensing system. Furthermore, because of axial spacing D of the partially reflective mirrors M, the system 1300 further provides a TDM optical sensing system. The design and operation of the optical conductors 1305, 1320, 1325, 1340, 1345, and 1350 and mirrors M are otherwise preferably substantially identical to the optical sensors 125 as described above with reference to the system 100.

The optical conductor 130 conveys light waves between the optical coupler 115 and the WDM optical coupler 1225. The design and operation of the optical conductor 130 is preferably provided as described above with reference to the system 100.

The WDM optical coupler 1225 conveys light waves between the optical conductor 130 and the optical conductors 130a, 130b, 130c, and 130d. In a preferred embodiment, the WDM optical coupler 1225 receives light waves having center wavelengths including $\lambda_{-1}$, $\lambda_{-2}$, $\lambda_{-3}$, and $\lambda_{-4}$ from the optical conductor 130 and conveys light waves having center wavelengths $\lambda_{-1}$, $\lambda_{-2}$, $\lambda_{-3}$, and $\lambda_{-4}$ to the optical conductors 130a, 130b, 130c and 130d, respectively. In this manner, the WDM optical coupler 1225 provides each optical conductor, 130a, 130b, 130c, and 130d with light waves having a different wavelength distribution. The design and operation of the WDM optical coupler 1225 is preferably identical to the WDM optical coupler 1225 described above with reference to the system 1200.

The optical conductors 130a, 130b, 130c and 130d are coupled to the WDM optical coupler 1225 and corresponding compensating interferometers 135a, 135b, 135c and 135d. In a preferred embodiment, the optical conductors 130a, 130b, 130c and 103d receive light waves having center wavelengths $\lambda_{-1}$, $\lambda_{-2}$, $\lambda_{-3}$, and $\lambda_{-3}$ respectively, from the WDM optical coupler 1225. The design and operation of the optical conductors 130a, 130b, 130c, and 130d are preferably substantially identical to the optical conductors 130a, 130b, 130c and 130d as described above with reference to the system 1200.

The compensating interferometers 135a, 135b, 135c, and 135d receive light waves having center wavelengths of $\lambda_{-1}$, $\lambda_{-2}$, $\lambda_{-3}$ and $\lambda_{-4}$ from the corresponding optical conductors 130a, 130b, 130c, and 130d. The design and operation of the compensating interferometers 135a, 135b, 135c, and 135d is preferably substantially identical to the compensating interferometer 135 as described above with reference to the system 100. In a preferred embodiment, the compensating interferometers 135a, 135b, 135c, and 135d generate signals representative of the sensed environmental conditions for the corresponding optical conductors 1305, 1320, 1325, 1340, 1345 and 1350. In this manner, the system 1300 provides wavelength division multiplexing. Furthermore, because the partially reflective mirrors M are also preferably equally spaced by a distance D, the system 1300 also preferably provides time division multiplexing.

The communication interfaces 140a, 140b, 140c, and 140d convey electrical signals from the compensating interferometers 135a, 135b, 135c, and 135d to the system interface 145. The design and operation of the communication interfaces 140a, 140b, 140c, and 140d are preferably substantially identical to the communication interfaces 140a, 140b, 140c and 140d as described above with reference to the system 1200.

The system interface 145 is coupled to the communication interfaces 140a, 140b, 140c, and 140d. The design and operation of the system interface 145 is preferably substantially identical to the system interface 145 as described above with reference to the system 100.

In a preferred embodiment, during operation of the system 1300, the optical sources 105 controllably generate pulses of light having different wavelength distributions. In a preferred embodiment, the optical sources, 105a, 105b, 105c and 105d, controllably generate pulses of light having center wavelengths $\lambda_{-1}$, $\lambda_{-2}$, $\lambda_{-3}$, $\lambda_{-4}$, respectively. The pulses of light controllably generated by the optical sources 105 are then combined by the WDM optical coupler 1205 and transmitted to the WDM optical coupler 1220. The WDM optical coupler 1220 then distributes the pulses of light to the optical conductors 1305, 1310, 1330 and 1350. In a preferred embodiment, the WDM optical coupler 1220 provides the optical conductors 1305, 1310, 1330 and 1350 with pulses of light having center wavelengths $\lambda_{-1}$, $\lambda_{-2}$, $\lambda_{-3}$, and $\lambda_{-4}$, respectively. The pulses of light are then distributed to the optical conductors 1305, 1320, 1325, 1340, 1345 and 1350. In a preferred embodiment, light pulses having a center wavelength of $\lambda_{-1}$ are transmitted to the optical conductor 1305, light pulses having a center wavelength of $\lambda_{-2}$ are transmitted to the optical conductors 1320 and 1325, light pulses having a center wavelength of $\lambda_{-3}$ are transmitted to the optical conductors 1340 and 1345, and light pulses having a center wavelength of $\lambda_4$ are transmitted to the optical conductors 1350.

Within each optical conductor, 1305, 1320, 1325, 1340, 1345 and 1350, a portion of the transmitted pulses of light are reflected back toward to the WDM optical coupler 1220 at each partially reflective mirror M. Because the partially reflective mirrors M are preferably separated by a constant distance D, the reflected pulses of light are time division multiplexed (TDM). Furthermore, because the optical conductors, 1305 and 1320, 1325 and 1340, and 1355 and 1360 are provided with pulses of light having different center wavelengths, the reflected pulses of light within a given time period are also wavelength division multiplexed (WDM). In this manner, the system 1300 provides a TDM and a WDM optical sensing system. The reflected pulses of light are then transmitted to the WDM optical coupler 1225. The WDM optical coupler 1225 preferably distributes the reflected pulses of light to the corresponding compensating interferometer 135 as a function of the center wavelength of the reflected light pulses. In this manner, each compensating interferometer 135 is dedicated to corresponding ones of the optical conductors 1305, 1320, 1325, 1340, 1345 and 1350. The reflected light pulses are then processed by the corresponding compensating interferometer 135 substantially as described above with reference to the system 100 to generate signals representative of the sensed environmental conditions in each of the optical conductors 1305, 1320, 1325, 1340, 1345 and 1350.

Figure 14:
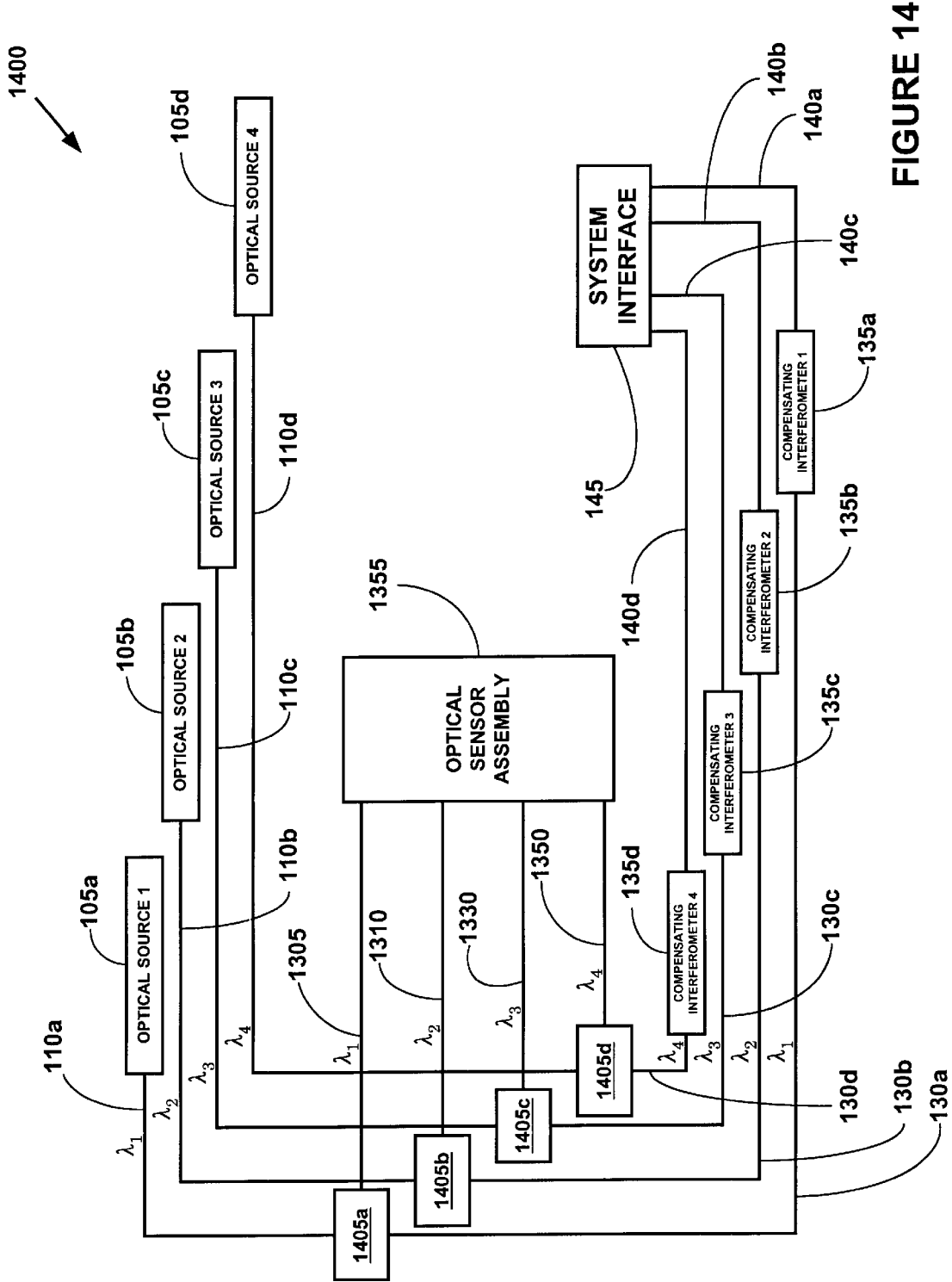
FIG. 14 is a schematic diagram of an alternate embodiment of an optical sensing system.

Referring now to FIG. 14, an alternative embodiment of an optical sensing system 1400 includes the optical sources 105a, 105b, 105c and 105d, the optical conductors 110a, 110b, 110c and 110d, optical couplings 1405a, 1405b, 1405c, and 1405d, the optical conductors 1305, 1310, 1330 and 1350, the optical sensor assembly 1355, the optical conductors 130a, 130b, 130c, and 130d, the compensating interferometers 135a, 135b, 135c, and 135d, the communication interfaces 140a, 140b, 140c, and 140d, and the system interface 145. In a preferred embodiment, the system 1400 provides a TDM and a WDM optical sensing system.

The optical sources 105a, 105b, 105c and 105d preferably controllably generate light sources having center wavelengths of $\lambda_1$, $\lambda_2$, $\lambda_3$, and $\lambda_4$, respectively. In a preferred embodiment, the design and operation of the optical sources 105a, 105b, 105c, and 105d is substantially identical to the optical sources 105a, 105b, 105c and 105d as described above with reference to the system 1300.

The optical conductors 110a, 110b, 110c, and 110d convey light waves between the optical sources 105a, 105b, 105c and 105d and the corresponding optical couplers 1405a, 1405b, 1405c, and 1405d. In a preferred embodiment, the design and operation of the optical conductors 110a, 110b, 110c, and 110d are substantially identical to the optical conductors 110a, 110b, 110c and 110d as described above with reference to the system 1300.

The optical couplers 1405a, 1405b, 1405c, and 1405d convey light waves between the corresponding optical conductors 110a, 110b, 110c, and 110d, the corresponding optical conductors 1305, 1310, 1330 and 1350, and the corresponding optical conductors 130a, 130b, 130c, and 130d. In a preferred embodiment, the optical coupler 1405a conveys light waves having a center frequency of $\lambda_1$ between the optical conductors 110a, 1305, and 130a. In a preferred embodiment, the optical coupler 1405b conveys light waves having a center frequency of $\lambda_2$ between the optical conductors 110b, 1310, and 130b. In a preferred embodiment, the optical coupler 1405c conveys light waves having a center frequency of $\lambda_3$ between the optical conductors 110c, 1330, and 130c. In a preferred embodiment, the optical coupler 1405d conveys light waves having a center frequency of $\lambda_4$ between the optical conductors 110d, 1350, and 130d. The optical couplers 1405a, 1405b, 1405c, and 1405d may be any number of conventional commercially available 1×2 optical couplers. In a preferred embodiment, the optical couplers 1405a, 1405b, 1405c and 1405d are model SMUC2150PS210 optical couplers available from E-TEK Dynamics.

The optical conductor 1305 conveys light waves between the optical coupler 1405a and the optical sensor assembly 1355. The optical conductor 1310 conveys light waves between the optical coupler 1405b and the optical sensor assembly 1355. The optical conductor 1330 conveys light waves between the optical coupler 1405c and the optical sensor assembly 1355. The optical conductor 1350 conveys light waves between the optical coupler 1405d and the optical sensor assembly 1355. The design and operation of the optical conductors 1305, 1310, 1330 and 1350 and the optical sensor assembly 1355 is substantially identical to the optical conductors 1305, 1310, 1330 and 1350 and the optical sensor assembly 1355 as described above with reference to the system 1300.

The optical conductors 130a, 130b, 130c and 130d are coupled to the corresponding optical couplers 1405a, 1405b, 1405c and 1405d and the corresponding compensating interferometers 135a, 135b, 135c and 135d. In a preferred embodiment, the optical conductors 130a, 130b, 130c and 103d receive light waves having center wavelengths $\lambda_1$, $\lambda_2$, $\lambda_3$, and $\lambda_3$ respectively, from the optical coupler 1405a, 1405b, 1405c and 1405d, respectively. The design and operation of the optical conductors 130a, 130b, 130c, and 130d are preferably substantially identical to the optical conductors 130a, 130b, 130c and 130d as described above with reference to the system 1300.

The compensating interferometers 135a, 135b, 135c, and 135d receive light waves having center wavelengths of $\lambda_1$, $\lambda_2$, $\lambda_3$ and $\lambda_4$ from the corresponding optical conductors 130a, 130b, 130c, and 130d. The design and operation of the compensating interferometers 135a, 135b, 135c, and 135d is preferably substantially identical to the compensating interferometers 135a, 135b, 135c and 135d as described above with reference to the system 1300. In a preferred embodiment, the compensating interferometers 135a, 135b, 135c, and 135d generate signals representative of the sensed environmental conditions for the corresponding optical conductors 1305, 1320, 1325, 1340, 1345 and 1350. In this manner, the system 1400 provides wavelength division multiplexing. Furthermore, because the partially reflective mirrors M are also preferably equally spaced by a distance D, the system 1400 also preferably provides time division multiplexing.

The communication interfaces 140a, 140b, 140c, and 140d convey electrical signals from the compensating interferometers 135a, 135b, 135c, and 135d to the system interface 145. The design and operation of the communication interfaces 140a, 140b, 140c, and 140d are preferably substantially identical to the communication interfaces 140a, 140b, 140c and 140d as described above with reference to the system 1300.

The system interface 145 is coupled to the communication interfaces 140a, 140b, 140c, and 140d. The design and operation of the system interface 145 is preferably substantially identical to the system interface 145 as described above with reference to the system 1300.

In a preferred embodiment, during operation of the system 1400, the optical sources 105 controllably generate pulses of light having different wavelength distributions. In a preferred embodiment, the optical sources, 105a, 105b, 105c and 105d, controllably generate pulses of light having center wavelengths $\lambda_1, \lambda_2, \lambda_3, \lambda_4$, respectively. The pulses of light controllably generated by the optical sources 105a, 105b, 105c, and 105d are then transmitted to the optical couplers 1405a, 1405b, 1405c and 1405d, respectively. The pulses of light controllably generated by the optical sources 105a, 105b, 105c, and 105d are then transmitted to the optical conductors 1305, 1310, 1330.and 1350, respectively. The pulses of light controllably generated by the optical sources 105a, 105b, 105c, and 105d are then reflected by the partially reflective mirrors M within the optical conductors 1305, 1320, 1325, 1340, 1345 and 1350 of the optical sensor assembly 1355. Because the partially reflective mirrors M are preferably separated by a constant distance D, the reflected pulses of light are time division multiplexed (TDM). Furthermore, because the optical conductors, 1305 and 1320, 1325 and 1340, and 1355 and 1360 are provided with pulses of light having different center wavelengths, the reflected pulses of light within a given time period are also wavelength division multiplexed (WDM). In this manner, the system 1400 provides a TDM and a WDM optical sensing system. The reflected pulses of light are then transmitted to the corresponding optical couplers 1405a, 1405b, 1405c, and 1405d. The optical couplers 1405a, 1405b, 1405c, and 1405d then transmit the reflected pulses of light to the compensating interferometers 135a, 135b, 135c, and 135d, respectively. In this manner, each compensating interferometer 135 is dedicated to corresponding ones of the optical conductors 1305, 1320, 1325, 1340, 1345 and 1350. The reflected light pulses are then processed by the corresponding compensating interferometers 135 substantially as described above with reference to the. system 1300 to generate signals representative of the sensed environmental conditions in each of the optical conductors 1305, 1320, 1325, 1340, 1345 and 1350.

Figure 15:
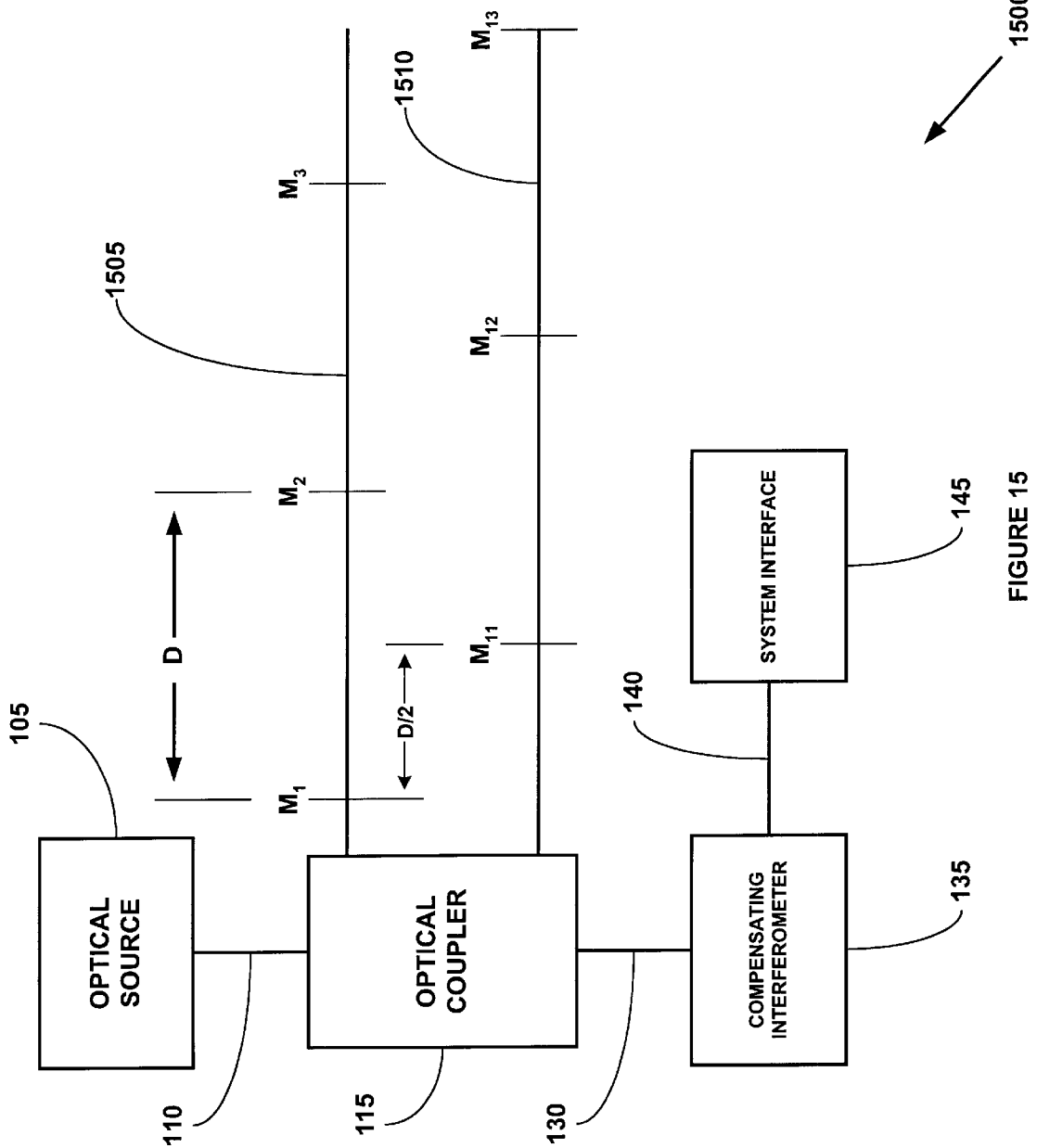
FIG. 15 is a schematic diagram of an alternate embodiment of an optical sensing system.

Referring to FIG. 15, an alternative embodiment of an optical sensing system 1500 will now be described. In a preferred embodiment, the system 1500 includes the optical source 105, the optical conductor 110, the optical coupler 115, a first sensing optical conductor 1505 having partially reflective mirrors M, a second sensing optical conductor 1510 having partially reflective mirrors M, the optical conductor 130, the compensating interferometer 135, the communications interface 140, and the system interface 145.

The optical source 105 preferably controllably generates pulses of light having a predetermined wavelength distribution for transmission to the optical conductor 110. The design and operation of the optical source 105 is preferably identical to the optical source 105 described above with reference to the system 100.

The optical conductor 110 conveys light waves between the optical source 105 and the optical coupler 115. The design and operation of the optical conductor 110 is preferably substantially identical to the optical conductor 110 described above with reference to the system 100.

The optical coupler 115 conveys light waves between the optical conductors 110, 130, 1505 and 1510. The design and operation of the optical coupler 115 is preferably substantially identical to the optical coupler 115 described above with reference to the system 100.

The first sensing optical conductor 1505 conveys light waves to and from the optical coupler 115. The first sensing optical conductor 1505 preferably includes partially reflective mirrors $M_1$ to $M_3$. In a preferred embodiment, the partially reflective mirrors $M_1$ to $M_3$ are equally spaced by a distance D. The first sensing optical conductor 1505 may be any number of conventional commercially available optical conductors. In a preferred embodiment, the first sensing optical conductor 1505 is SMF28 optical fiber available from the Corning Corporation. In a preferred embodiment, the first sensing optical conductor 1505 is a single mode optical fiber. The partially reflective mirrors $M_1$ to $M_3$ may be formed in the first sensing optical conductor 1505 using conventional commercially available methods. The optical hydrophones within the first sensing optical conductor 1505 are provided by pairs of partially reflective mirrors and the corresponding intermediate sections of the first sensing optical conductor 1505. For example, the first optical hydrophone within the first sensing optical conductor 1505 includes the partially reflective mirrors $M_1$ and $M_2$ and the corresponding intermediate section of the first sensing optical conductor 1505.

The second sensing optical conductor 1510 conveys light waves to and from the optical coupler 115. The second sensing optical conductor 1510 preferably includes partially reflective mirrors $M_{11}$ to $M_{13}$. In a preferred embodiment, the partially reflective mirrors $M_{11}$ to $M_{13}$ are equally spaced by a distance D. The second sensing optical conductor 1510 may be any number of conventional commercially available optical conductors. In a preferred embodiment, the second sensing optical conductor 1510 is a single mode optical fiber. In a preferred embodiment, the second sensing optical conductor 1510 is SMF28 optical fiber available from the Corning Corporation. The partially reflective mirrors $M_{11}$ to $M_{13}$ may be formed in the second sensing optical conductor 1510 using conventional commercially available methods. In a preferred embodiment, the partially reflective mirrors $M_1$ to $M_3$ and the partially reflective mirrors $M_{1l}$ to $M_{13}$ are substantially parallel and offset relative to each other by an axial distance D/2. The optical hydrophones within the second sensing optical conductor 1510 are provided by pairs of partially reflective mirrors and the corresponding intermediate sections of the second sensing optical conductor 1510. For example, the first optical hydrophone within the second sensing optical conductor 1510 includes the partially reflective mirrors $M_{11}$ and $M_{12}$ and the corresponding intermediate section of the second sensing optical conductor 1510.

The optical conductor 130 conveys light waves between the optical coupler 115 and the compensating interferometer 135. The design and operation of the optical conductor 130 is preferably substantially identical to the optical conductor 130 described above with reference to the system 100.

The compensating interferometer 135 preferably receives reflected pulses of light from the optical conductor 130 and generates signals representative of the environmental conditions for the first and second sensing optical conductors 1505 and 1510. The design and operation of the compensating interferometer 135 is preferably substantially identical to the compensating interferometer 135 described above with reference to the system 100.

The communication interface 140 conveys signals from the compensating interferometer 135 to the system interface 145. The design and operation of the communication interface 140 is preferably substantially identical to the communication interface 140 described above with reference to the system 100.

The system interface 145 is coupled to the compensating interferometer 135. The design and operation of the system interface 145 is preferably substantially identical to the system interface 145 described above with reference to the system 100.

In a preferred embodiment, during operation of the system 1500, the optical source 105 controllably generates pulses of light having a predetermined wavelength distribution. The pulses of light are then transmitted into the first and second sensing optical conductors, 1505 and 1510, using the optical conductor 110 and the optical coupler 115.

Figure 16:
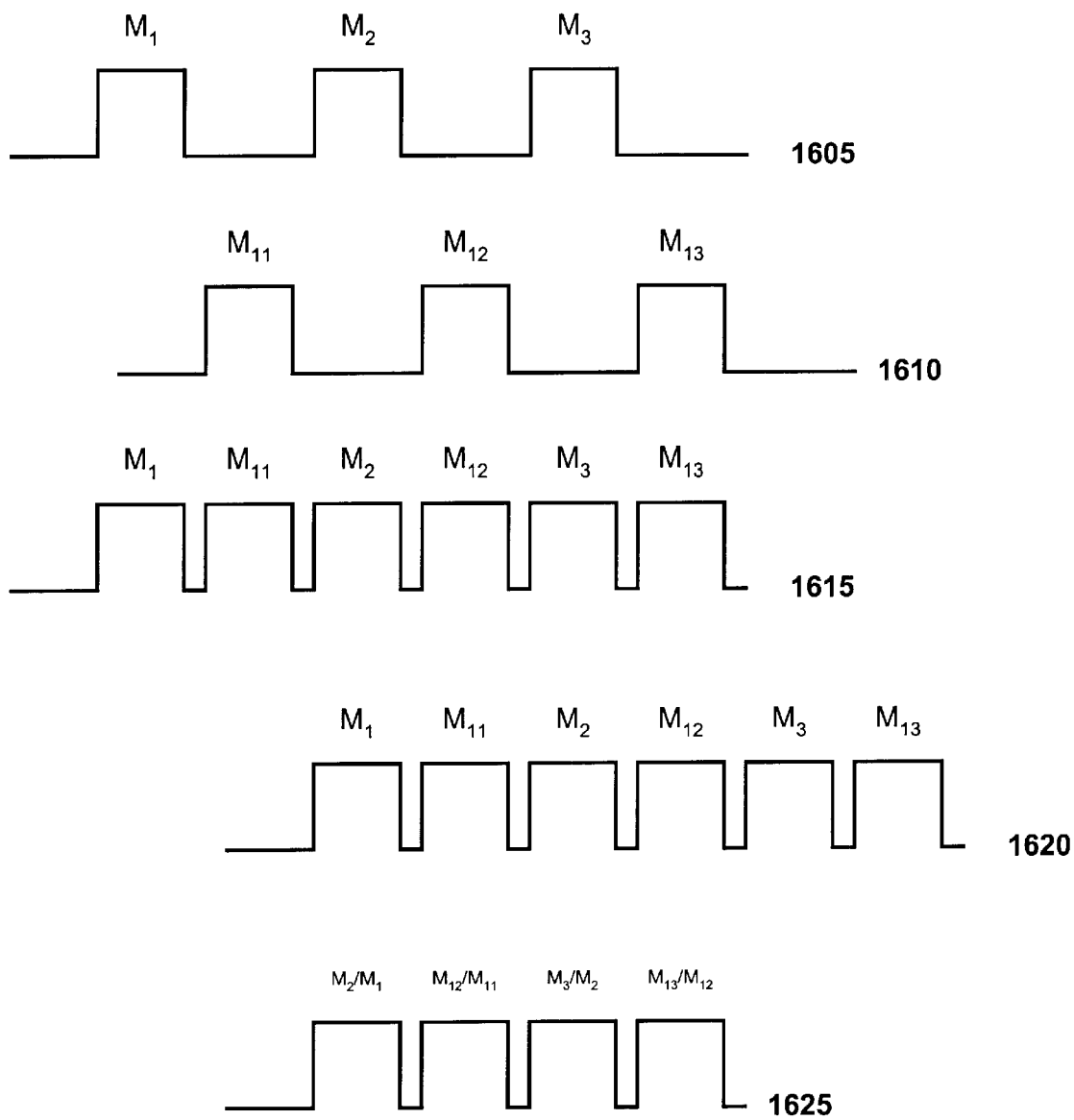
FIG. 16 is a timing diagram illustrating the operation of the optical sensing system of FIG. 15.

As illustrated in FIG. 16, within the first sensing optical conductor 1505, the injected pulses of light are partially reflected at the mirrors, $M_1$ to $M_3$, to generate a first set of reflected pulses of light 1605. Likewise, within the second sensing optical conductor 1510, the injected pulses of light are partially reflected at the mirrors, $M_{11}$ to $M_{13}$, to generate a second set of reflected pulses of light 1610. The first-and second set of reflected pulses of light, 1605 and 1610, are then combined within the optical coupler 115 to generate a combined set of reflected pulses of light 1615. Because of the relative offset between the partially reflective mirrors $M_1$ to $M_3$ and the partially reflective mirrors $M_{11}$ to $M_{13}$, the pulses of light within the combined set of reflected pulses of light 1615 do not overlap. The combined set of reflected pulses of light 1615 are then transmitted to the compensating interferometer 135. Within the compensating interferometer 1615, the combined set of reflected pulses of light 1615 is delayed to provide a delayed combined set of reflected pulses of light 1620. The delayed and undelayed combined sets of reflected pulses of light, 1615 and 1620, are then processed to provide interference patterns 1625 for each of the optical hydrophones.

In this manner, the system 1500 improves the sampling rate of the optical hydrophones by positioning the partially reflective mirrors of the sensing optical conductors in an overlapping parallel relationship. In this manner, the number of optical sensors for a given length of optical fiber can be doubled by locating the mirrors in one group an offset distance D/2 from one another, where D is the distance between adjacent partially reflective mirrors in the optical fibers.

Figure 17:
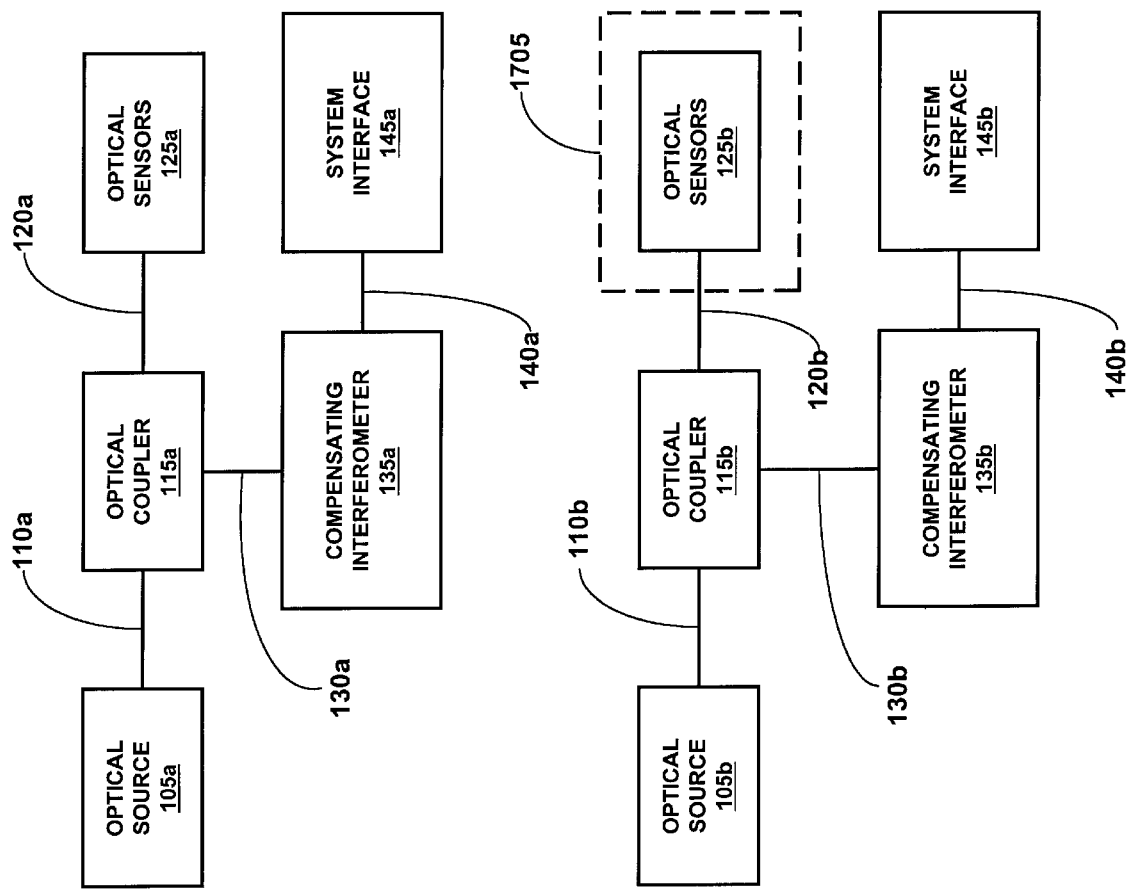
FIG. 17 is a schematic diagram of an alternate embodiment of an optical sensing system.

Referring now to FIG. 17, an alternative embodiment of an optical sensing system 1700 includes optical sources 105a and 150b, optical conductors 110a and 110b, optical couplers 115a and 115b, optical conductors 120a and 120b, optical sensors 125a and 125b, optical conductors 130a and 130b, optical sensors 125a and 125b, optical conductors 130a and 130b, compensating interferometers 135a and 135b, communication interfaces 140a and 140b, and system interfaces 145a and 145b.

The optical sources 105a and 105b preferably. controllably generate light waves having predetermined wavelength distributions. The design and operation of the optical sources 105a and 105b are preferably substantially identical to the optical source 105 described above with reference to the system 100.

The optical conductors 110a and 110b convey light waves between the optical sources 105a and 105b and the optical couplers 115a and 115b. The design and operation of the optical conductors 110a and 110b are preferably substantially identical to the optical conductor 110 described above with reference to the system 100.

The optical couplers 115a and 115b convey light waves between the optical conductors 110a, 110b, 120a, 120b, 130a, and 130b. The design and operation of the optical couplers 115a and 115b are preferably substantially identical to the optical coupler 115 described above with reference to the system 100.

The optical conductors 120a and 120b convey light waves between the optical couplers 115a and 115b and the optical sensors 125a and 125b. The design and operation of the optical conductors 120a and 120b are preferably substantially identical to the optical conductor 120 described above with reference to the system 100.

The optical sensors 125a and 125b sense environmental conditions. The design and operation of the optical sensors 125a and 125b are preferably substantially identical to the optical sensors 125 described above with reference to the system 100. In a preferred embodiment, the optical sensors 125a and 125b are substantially parallel and packaged in the same housing. In a preferred embodiment, the optical sensors 125b are further contained within a non-resilient housing 1705. In this manner, the optical sensors 125b is preferably desensitized to acoustic pressure. In this manner, the optical sensors 125b further provide a reference measurement for the system 1700. The reference optical sensors 125b are further proximate to and substantially parallel to the optical sensors 125a. In this manner, the reference optical sensors 125b are subjected to the same acceleration and temperature effects as the optical sensors 125a. In an alternative embodiment, the optical conductor within the reference optical sensors 125b is made insensitive to acoustic pressure by encasing it within a metallic coating, or by modifying the optical conductor to have a core with low bulk modules and a clad with high bulk modules. In the preferred embodiment, the optical conductor within the reference optical sensors 125b is desensitized by enclosing it within a stainless steel tube manufactured and sold by Laser Armored of Los Angeles, Calif.

The optical conductors 130a and 130b convey light waves between the optical couplers 115a and 115b and the compensating interferometers 135a and 135b. The design and operation of the optical conductors 130a and 130b is preferably substantially identical to the optical conductor 130 described above with reference to the system 100.

The compensating interferometers 135a and 135b receive and process reflected pulses of light from the optical sensors 125a and 125b. The design and operation of compensating interferometers 135a and 135b is preferably substantially identical to the compensating interferometer 135 described above with reference to the system 100.

The communication interfaces 140a and 140b convey signals from the compensating interferometers 135a and 135b to the system interfaces 145a and 145b. The design and operation of the communication interfaces 140a and 140b are preferably substantially identical to the communication interface 140 described above with reference to the system 100.

The system interfaces 145a and 145b are coupled to the compensating interferometers 135a and 135b. The design and operation of the system interfaces 145a and 145b are preferably substantially identical to the system interface 145 described above with reference to the system 100.

In a preferred embodiment, during operation of the system 1700, the optical sources 105a and 105b controllably generate pulses of light for transmission to the optical sensors 125a and 125b. The pulses of light are partially reflected within the optical sensors 125a and 125b back toward the optical couplers 115a and 115b. The reflected pulses of light are then processed within the compensating interferometers 135a and 135b to generate signals representative of the sensed conditions within the optical sensors 125a and 125b. Because the optical sensors 125b provide a reference for the system 1700, the sensed conditions within the optical sensors 125a can be corrected and/or calibrated using conventional algorithms for correcting and/or calibrating sensor signals. Thus the common mode effects in the reference optical sensors 125b and the optical sensors 125a can be canceled. In addition, the undesired effects of temperature, vibration, and acoustics produced in the compensating interferometers 135a and 135b can be canceled.

Figure 18:
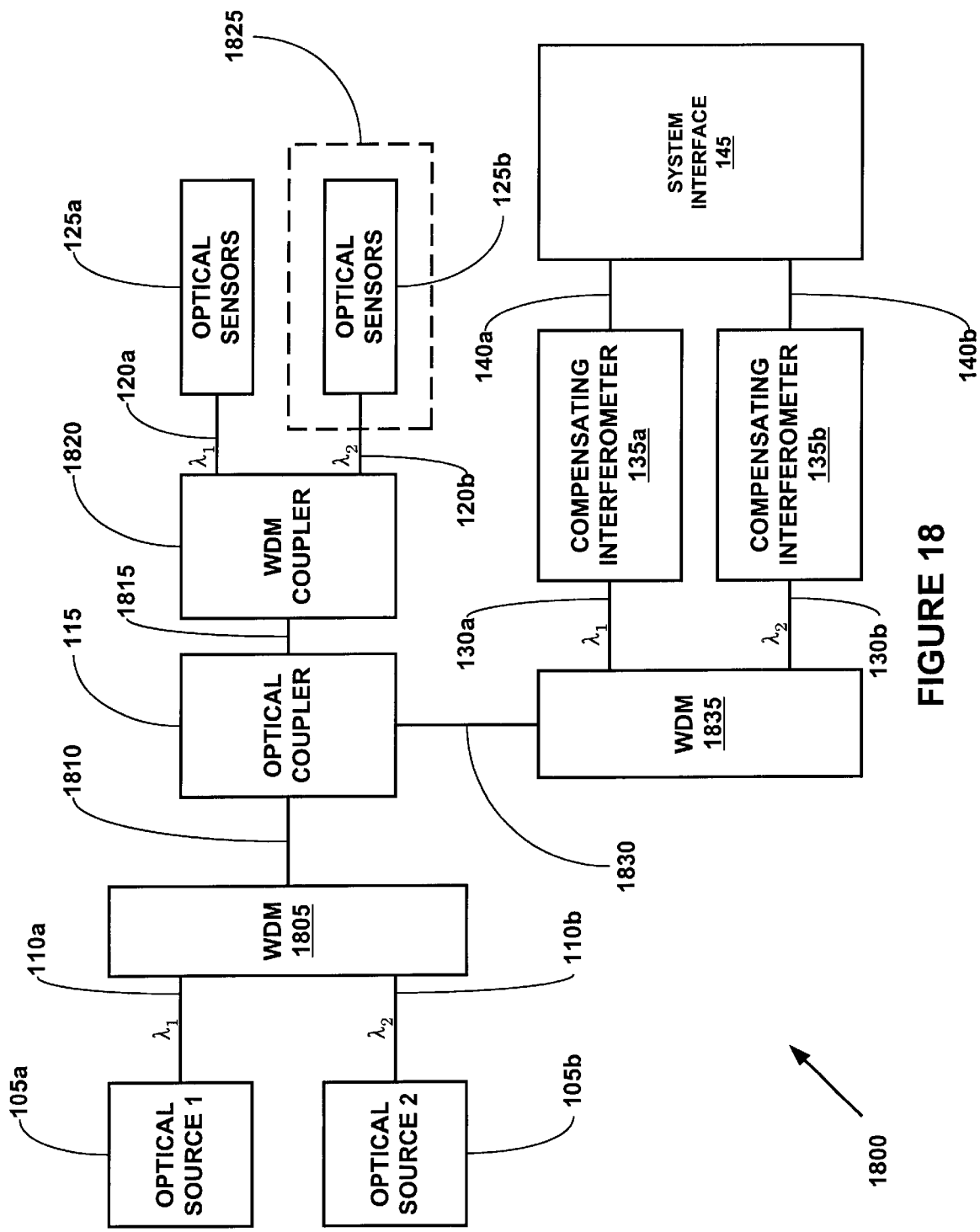
FIG. 18 is a schematic diagram of an alternate embodiment of an optical sensing system.

Referring now to FIG. 18, an alternative embodiment of an optical sensing system 1800 includes optical sources 105a and 105b, optical conductors 110a and 110b, WDM optical coupler 1805, optical conductor 1810, optical coupler 115, optical conductor 1815, WDM optical coupler 1820, optical conductors 120a and 120b, optical sensors 125a and 125b, housing 1825, optical conductor 1830, WDM optical coupler 1835, optical conductors 130a and 130b, compensating interferometers 135a and 135b, communication interfaces 140a and 140b, and system interface 145.

The optical sources 105a and 105b preferably controllably generate light waves having predetermined center wavelengths, $\lambda_1$, and $\lambda_2$, respectively. The design and operation of the optical sources 105a and 105b are preferably substantially identical to the optical source 105 described above with reference to the system 100.

The optical conductors 110a and 110b convey light waves between the optical sources 105a and 105b and the WDM optical coupler 1805. The design and operation of the optical conductors 110a and 110b are preferably substantially identical to the optical conductor 110 described above with reference to the system 100.

The WDM optical coupler 1805 conveys light waves between the optical conductors 110a, 110b, and 1810. The WDM optical coupler 1805 preferably combines light waves having center wavelengths, $\lambda_1$ and $\lambda_2$, received from the optical conductors, 110a and 110b, and transmits them to the optical conductor 1810. The WDM optical coupler 1805 may be any number of conventional commercially available 1×2 WDM optical couplers. In a preferred embodiment, the WDM optical coupler 1805 is a DWF1200015110 WDM coupler available from E-Tek.

The optical conductor 1810 conveys light waves between the WDM optical coupler 1805 and the optical coupler 115. The optical conductor 1810 may be any number of conventional commercially available optical conductors. In a preferred embodiment, the optical conductor 1810 is a single mode optical fiber.

The optical coupler 115 conveys light waves between the optical conductors 1810, 1815 and 1830. The design and operation of the optical coupler 115 is preferably substantially identical to the optical coupler 115 described above with reference to the system 100.

The optical conductor 1815 conveys light waves between the optical coupler 115 and the WDM optical coupler 1820. The optical conductor 1815 may be any number of conventional commercially available optical conductors. In a preferred embodiment, the optical conductor 1815 is a single mode optical fiber.

The WDM optical coupler 1820 conveys light waves between the optical conductors 1815, 120a, and 120b. The WDM optical coupler 1820 preferably separates light waves received from the optical conductor 1815 into light waves having center wavelengths, $\lambda_1$ and $\lambda_2$, for transmission to the optical conductors, 120a and 120b, respectively. The WDM optical coupler 1820 may be any number of conventional commercially available 1×2 WDM optical couplers. In a preferred embodiment, the WDM optical coupler 1820 is a DWF1200015110 WDM coupler available from E-Tek.

The optical conductors 120a and 120b convey light waves between the WDM optical couplers 1820 and the optical sensors 125a and 125b. The design and operation of the optical conductors 120a and 120b are preferably substantially identical to the optical conductor 120 described above with reference to the system 100.

The optical sensors 125a and 125b sense environmental conditions. The design and operation of the optical sensors 125a and 125b are preferably substantially identical to the optical sensors 125 described above with reference to the system 100. In a preferred embodiment, the optical sensors 125a and 125b are substantially parallel and packaged in the same housing. In a preferred embodiment, the optical sensors 125b is further contained within a non-resilient housing 1825. In this manner, the optical sensors 125b is preferably desensitized to acoustic pressure. In this manner, the optical sensors 125b further provide a reference measurement for the system 1800. The reference optical sensors 125b are further proximate to and substantially parallel to the optical sensors 125a. In this manner, the reference optical sensors 125b are subjected to the same acceleration and temperature effects as the optical sensors 125a. In an alternative embodiment, the optical conductor within the reference optical sensors 125b is made insensitive to acoustic pressure by encasing it within a metallic coating, or by modifying the optical conductor to have a core with low bulk modules and a clad with high bulk modules. In the preferred embodiment, the optical conductor within the reference optical sensors 125b is desensitized by enclosing it within a stainless steel tube manufactured and sold by Laser Armored of Los Angeles, Calif.

The optical conductor 1830 conveys light waves between the optical coupler 115 and the WDM optical coupler 1835. The optical conductor 1830 may be any number of conventional commercially available optical conductors. In a preferred embodiment, the optical conductor 1830 is a single mode optical fiber.

The WDM optical coupler 1835 conveys light waves between the optical conductors 1830, 130a, and 130b. The WDM optical coupler 1835 preferably separates light waves received from the optical conductor 1830 into light waves having center wavelengths, $\lambda_1$ and $\lambda_2$, for transmission to the optical conductors, 130a and 130b, respectively. The WDM optical coupler 1835 may be any number of conventional commercially available 1×2 WDM optical couplers. In a preferred embodiment, the WDM optical coupler 1835 is a DWF1200015110 WDM coupler available from E-Tek.

The optical conductors 130a and 130b convey light waves between the WDM optical coupler 1835 and the compensating interferometers 135a and 135b. The design and operation of the optical conductors 130a and 130b are preferably substantially identical to the optical conductor 130 described above with reference to the system 100.

The compensating interferometers 135a and 135b receive and process reflected pulses of light from the optical sensors 125a and 125b. The design and operation of compensating interferometers 135a and 135b is preferably substantially identical to the compensating interferometer 135 described above with reference to the system 100.

The communication interfaces 140a and 140b convey signals from the compensating interferometers 135a and 135b to the system interface 145. The design and operation of the communication interfaces 140a and 140b are preferably substantially identical to the communication interface 140 described above with reference to the system 100.

The system interface 145 is coupled to the compensating interferometers 135a and 135b. The design and operation of the system interface 145 is preferably substantially identical to the system interface 145 described above with reference to the system 100.

In a preferred embodiment, during operation of the system 1800, the optical sources 105a and 105b controllably generate pulses of light having center wavelengths, $\lambda_1$ and $\lambda_2$, for transmission to the optical sensors 125a and 125b, respectively. The pulses of light are partially reflected within the optical sensors 125a and 125b back toward the optical couplers 115a and 115b. The reflected pulses of light are then processed within the compensating interferometers 135a and 135b to generate signals representative of the sensed conditions within the optical sensors 125a and 125b. Because the optical sensors 125b provide a reference for the system 1700, the sensed conditions within the optical sensors 125a can be corrected and/or calibrated using conventional algorithms for correcting and/or calibrating sensor signals. Thus the common mode effects in the reference optical sensors 125b and the optical sensors 125a can be canceled. In addition, the undesired effects of temperature, vibration, and acoustics produced in the compensating interferometers 135a and 135b can be canceled.

Figure 19:
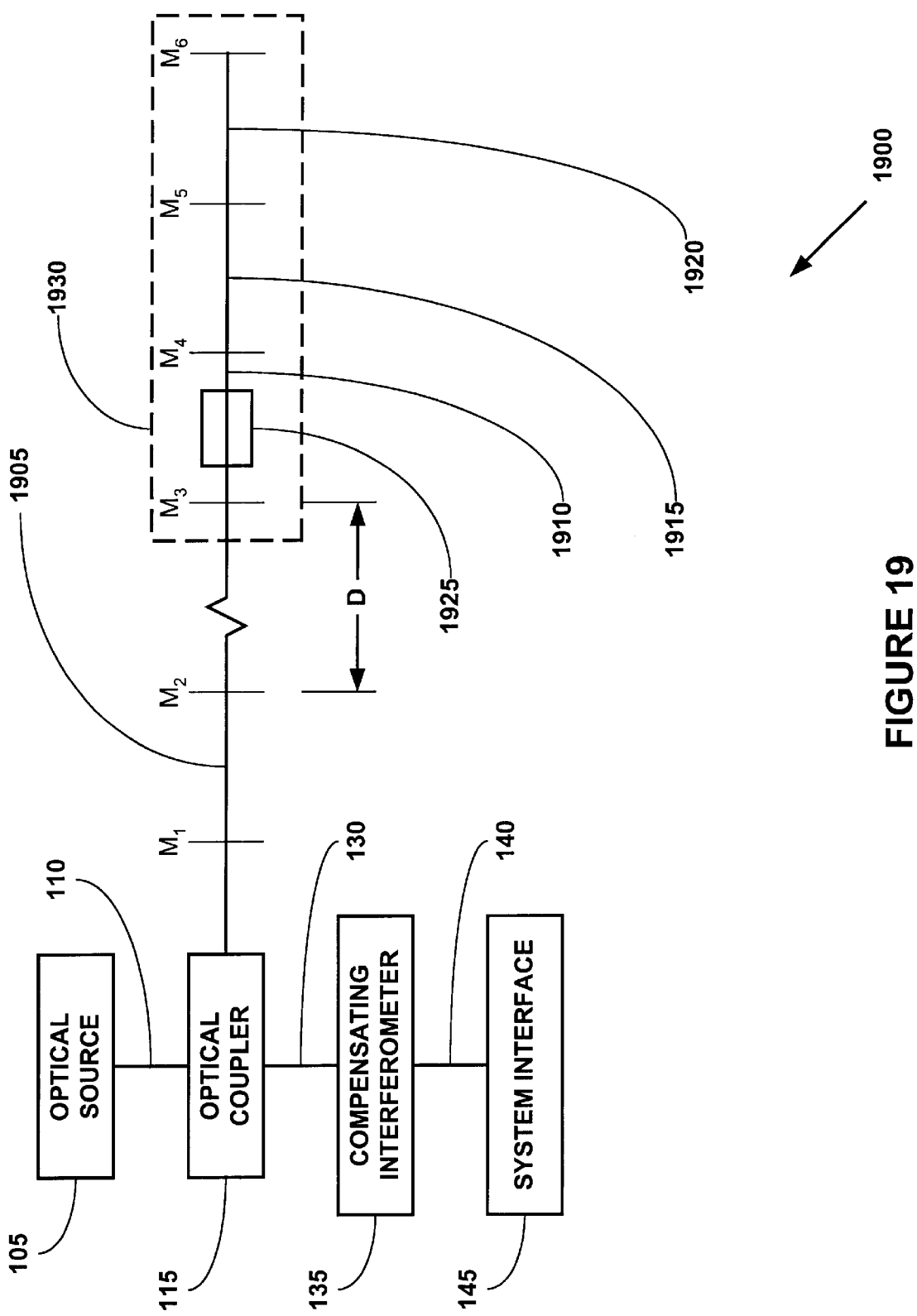
FIG. 19 is a schematic diagram of an alternate embodiment of an optical sensing system.

Referring now to FIG. 19, an alternative embodiment of an optical sensing system 1900 includes the optical source 105, the optical conductor 110, the optical coupler 115, an optical conductor 1905 having partially reflective mirrors M, the optical conductor 130, the compensating interferometer 135, the communication interface 140, and the system interface 145.

The design and operation of the optical source 105, the optical conductor 110, the optical coupler 115, the optical conductor 130, the compensating interferometer 135, the communication interface 140, and the system interface 145 are preferably substantially identical to the optical source 105, the optical conductor 110, the optical coupler 115, the optical conductor 130, the compensating interferometer 135, the communication interface 140, and the system interface 145 described above with reference to the system 100.

The optical conductor 1905 conveys light waves to and from the optical coupler 115. The optical conductor 1905 preferably include partially reflective mirrors M. In a preferred embodiment, the partially reflective mirrors M are equally spaced by a distance D. The optical conductor 1905 may be any number of conventional commercially available optical conductors. In a preferred embodiment, the optical conductor 1905 is a single mode optical fiber, model SMF-28 optical fiber, available from Corning, Inc. The partially reflective mirrors M may be formed in the optical conductor 1905 using conventional methods.

In a preferred embodiment, the optical conductor 1905 further includes a first section 1910, a second section 1915 and a third section 1920. In a preferred embodiment, the first section 1910 includes a stretcher 1925 for controllably adjusting the length of the first section 1910 of the optical conductor 1905. In a preferred embodiment, the section 1915 is pressure sensitive. In a preferred embodiment, the third section 1920 is desensitized to acoustic pressure using conventional methods. In a preferred embodiment, the sections 1910, 1915 and 1920 provide a calibration section 1930 for the system 1900. In this manner, during operation of the system 1900, the reflected pulses of light provided by the partially reflective mirrors $M_2$ to $M_6$ provide reference signals for calibrating the system 1900. The stretcher 1925 may be any number of conventional optical fiber stretcher such as, for example, a PZT stretcher coupled to a conventional oscillator. In a preferred embodiment; the stretcher 1925 is a piezoceramic stretcher available from Optiphase Corporation as part number PZ1-15501-100-0.

During calibration of the system 1900, the optical source 105 controllably generates pulses of light having a predetermined wavelength distribution. The pulses of light are transmitted to the optical conductor 1905 using the optical conductor 110 and the optical coupler 115. The pulses of light are then partially reflected by the partially reflective mirrors M of the calibration section 1930. The reflected pulses of light are then processed by the compensating interferometer 135 to determine the environmental conditions present in the calibration section 130. Because the strain in the optical conductor 1905 caused by the stretcher 1925 is known, the signals generated by the optical hydrophone bounded by the partially reflective mirrors $M_3$ and $M_4$ can be correlated to the amount of strain and then can be used to calibrate the entire system 1900. Furthermore, because the second section 1915 of the calibration section 1930 is sensitive to acoustic pressure, the depth of the optical conductor 1905 within a body of water can be determined. Finally, because the third section 1920 of the calibration section is insensitive to acoustic pressure, the effects of temperature can be measured and then removed from the measurements of the system 1900.

As will be appreciated by persons of ordinary skill in the art having the benefit of the present disclosure, Bragg gratings with a wavelength of ±10% of nominal (e.g. 1535 to 1565 nm) can be used in place of low reflectance mirrors of the systems 100, 700, 800, 900, 1000, 1200, 1300, 1400, 1500, 1700, 1800, and 1900. Furthermore, the use of Bragg gratings also allows the use of multi-wavelength lasers pulsing into the sensing optical fibers at sequential times to permit wave division multiplexing in addition to time division multiplexing. Finally, the use of a mix of Bragg gratings and low reflectivity mirrors simplifies the implementation of the systems 100, 700, 800, 900, 1000, 1200, 1300, 1400, 1500, 1700, 1800, and 1900.

Figure 20:
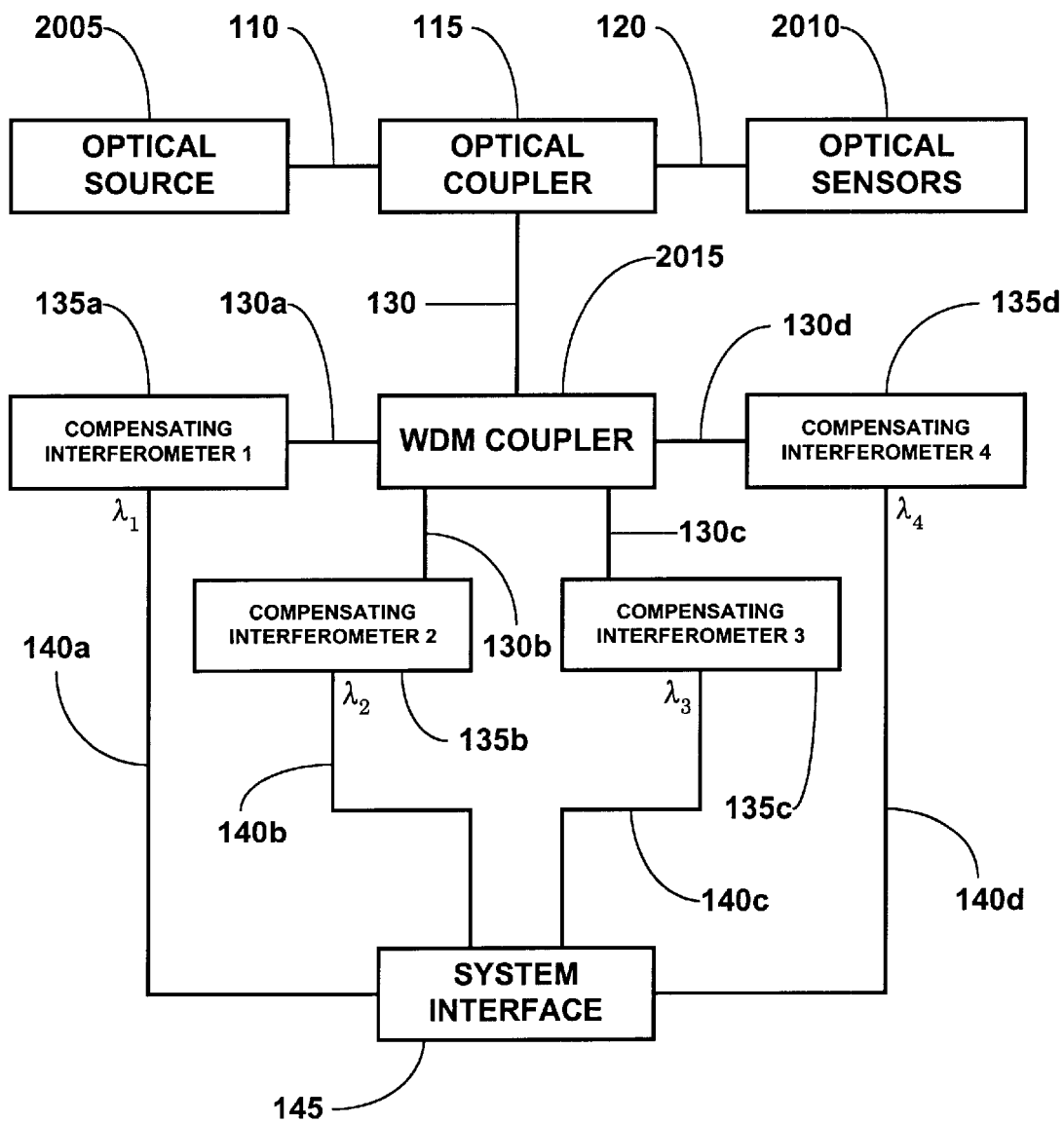
FIG. 20 is a schematic diagram of an alternative embodiment of an alternative embodiment of an optical sensing system.

Referring to FIG. 20, an alternative embodiment of an optical sensing system 2000 includes an optical source 2005, the optical conductor 110, the optical coupler 115, the optical conductor 120, optical sensors 2010, the optical conductor 130, a WDM optical coupler 2015, the optical conductors 130a, 130b, 130c and 130d, the compensating interferometers 135a, 135b, 135c and 135d, the communication interfaces 140a, 140b, 140c and 140d, and the system interface 145.

Figure 21:
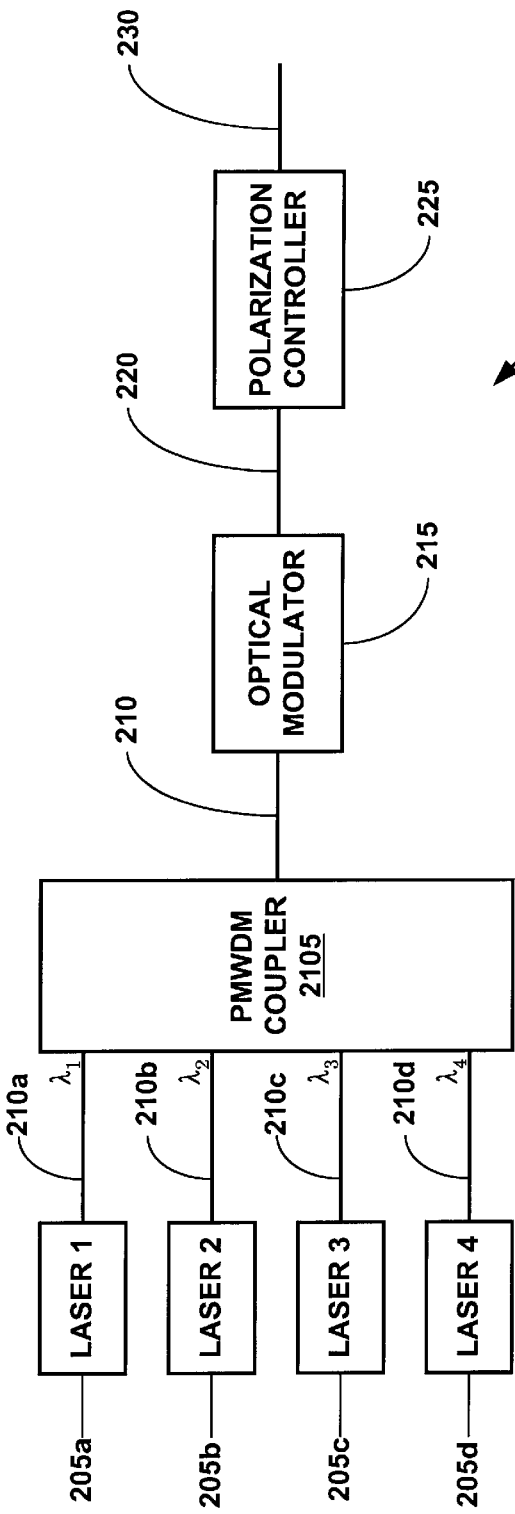
FIG. 21 is a schematic diagram of the optical source of the optical sensing system of FIG. 20.

The optical source 2005 is optically coupled to the optical conductor 110. The optical source 2005 may be any number of conventional commercially available optical sources capable of controllably generating light waves having a predetermined range of wavelengths. In a preferred embodiment, as illustrated in FIG. 21, the optical source 2005. includes the lasers 205a, 205b, 205c and 205d, the optical conductors 210a, 210b, 210c, and 210d, a polarization maintaining wave division multiplexing (PMWDM) optical coupler 2105, the optical conductor 210, the optical modulator 215, the optical conductor 220, the polarization controller 225, and the optical conductor 230.

The lasers 205a, 205b, 205c, and 205d are preferably adapted to controllably generate light waves having center frequencies $\lambda_1$, $\lambda_2$, $\lambda_3$, and $\lambda_4$, respectively. The design and operation of the lasers 205a, 205b, 205c and 205d are otherwise substantially identical to the laser 205 described above with reference to the optical source 105.

The optical conductors 210a, 210b, 210c and 210d are optically coupled to corresponding lasers 205a, 205b, 205c and 205d, and the PMWDM optical coupler 2105. The optical conductors 210a, 210b, 210c, and 210d are otherwise substantially identical to the optical conductor 210 described above with reference to the optical source 105.

The PMWDM optical coupler 2105 is coupled to the optical conductors 210a, 210b, 210c and 210d, and the optical conductor 210. The PMWDM optical coupler 2105 receives and combines light waves received from the optical conductors 210a, 210b, 210c and 210d and transmits them to the optical conductor 210. In a preferred embodiment, the PMWDM optical coupler 2105 further maintains the polarization of the light waves received and transmitted. The PMWDM optical coupler 2105 may be any conventional commercially available PMWDM optical coupler. In a preferred embodiment, the PMWDM optical coupler is a polarization maintaining WDM available from Chorum Technologies in order to optimally provide PM of multiple wavelengths.

The optical conductor 210 is coupled to the PMWDM 2015 and the optical modulator 215. The optical conductor 210 is preferably adapted to provide a polarization maintaining (PM) optical conductor. The design and operation of the optical conductor 210 is otherwise substantially identical to the optical conductor 210 described above with reference to the optical source 105.

The optical modulator 215 is coupled to the optical conductor 210 and the optical conductor 220. The design and operation of the optical modulator 215 is otherwise substantially identical to the optical modulator 215 described above with reference to the optical source 105.

The optical conductor 220 is coupled to the optical modulator 215 and the optical polarization controller 225. The design and operation of the optical conductor 220 is otherwise substantially identical to the optical conductor 220 described above with reference to the optical source 105.

The polarization controller 225 is coupled to the optical conductor 220 and the optical conductor 230. The design and operation of the polarization controller 225 is otherwise substantially identical to the polarization controller 220 described above with reference to the optical source 105.

The optical conductor 230 is coupled to the polarization controller 225 and the optical conductor 110. The design and operation of the optical conductor 230 is otherwise substantially identical to the optical conductor 230 described above with reference to the optical source 105.

The optical conductor 110 is coupled to the optical source 2005 and the optical coupler 115. The design and operation of the optical conductor 110 is otherwise substantially identical to the optical conductor 110 described above with reference to the system 100.

The optical coupler 115 is coupled to the optical conductor 110, the optical conductor 120 and the optical conductor 130. The design and operation of the optical coupler 115 is otherwise substantially identical to the optical coupler 115 described above with reference to the system 100.

The optical conductor 120 is coupled to the optical coupler 115 and the optical sensors 2010. The design and operation of the optical conductor 120 is otherwise substantially identical to the optical conductor 110 described above with reference to the system 100.

Figure 22:
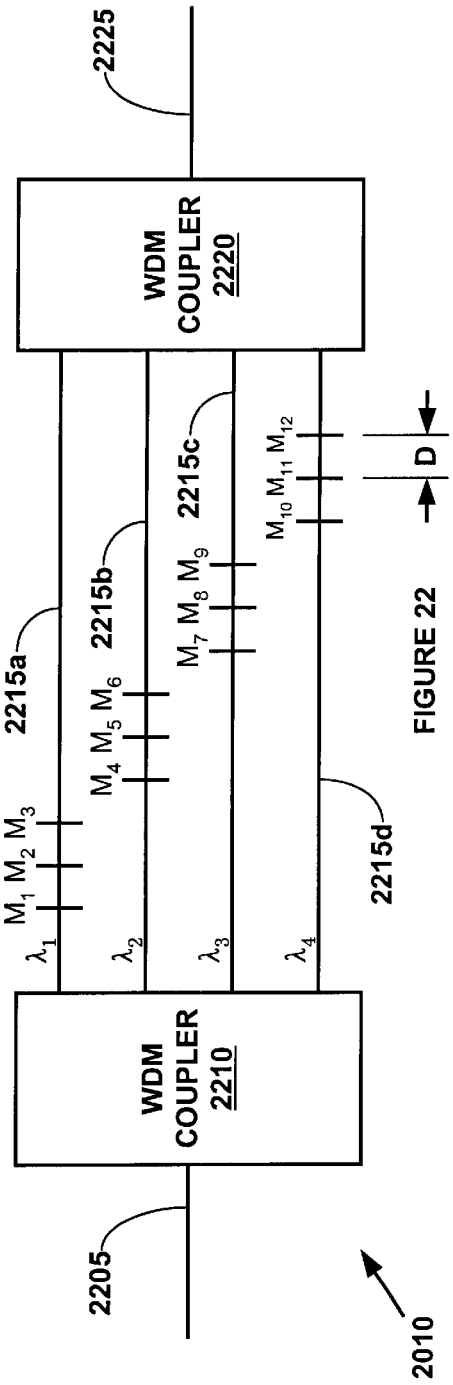
FIG. 22 is a schematic diagram of the optical sensors of the optical sensing system of FIG. 20.

The optical sensors 2010 are coupled to the optical conductor 120. In a preferred embodiment, as illustrated in FIG. 22, the optical sensors 2010 include an optical conductor 2205, a WDM optical coupler 2210, optical conductors 2215a, 2215b, 2215c and 2215d having partially reflective mirrors $M_1$ to $M_{12}$, a WDM optical coupler 2220, and an optical conductor 2225.

The optical conductor 2205 is coupled to the WDM coupler 2210 and the optical conductor 120. The optical conductor 2205 conveys light waves to and from the WDM coupler 2210. The optical conductor 2205 may be any number of conventional commercially available optical conductor. In a preferred embodiment, the optical conductor 2205 is a single mode optical fiber, model number SMF-28, available from Corning Inc. in order to optimally provide transmission of lightwaves.

The WDM optical coupler 2210 is coupled to the optical conductor 2205 and the optical conductors 2215a, 2215b, 2215c, and 2215d. The WDM optical coupler 2210 preferably conveys lightwaves having center wavelengths $\lambda_1$ to $\lambda_4$ to and from the optical conductor 2205 and conveys lightwaves having center wavelengths $\lambda_1$, $\lambda_2$, $\lambda_3$, and $\lambda_4$ to and from optical conductors 2215a, 2215b, 2215c, and 2215d, respectively. The WDM. optical coupler 2210 may be any number of conventional commercially available WDM optical couplers. In a preferred embodiment, the WDM optical coupler 2210 is a LDW Series available from Kaifa in order to optimally provide wavelength splitting and combining.

The optical conductor 2215a is coupled to the WDM optical coupler 2210 and the WDM optical coupler 2220. The optical conductor 2215a preferably includes partially reflective mirrors $M_1$ to $M_3$. The optical conductor 2215a may be any number of conventional commercially available optical conductors. In a preferred embodiment, the optical conductor 2215a is a single mode optical fiber, model number SMF-28, available from Corning Inc. in order to optimally provide propagation of lightwaves. The partially reflective mirrors $M_1$ to $M_3$ be formed in the optical conductor 2215a using any number of conventional commercially available methods of forming partially reflective mirrors in optical fibers. In. a preferred embodiment, the partially reflective mirrors $M_1$ to $M_3$ are formed in the optical conductor 2215a using $TiO_2$ in order to optimally provide partially reflective surfaces.

The optical conductor 2215b is coupled to the WDM optical coupler 2210 and the WDM optical coupler 2220. The optical conductor 2215a preferably includes partially reflective mirrors $M_4$ to $M_6$. The optical conductor 2215b may be any number of conventional commercially available optical conductors. In a preferred embodiment, the optical conductor 2215b is a single mode optical fiber, model number SMF-28, available from Corning Inc. in order to optimally provide propagation of lightwaves. The partially reflective mirrors $M_4$ to $M_6$ be formed in the optical conductor 2215b using any number of conventional commercially available methods of forming partially reflective mirrors in optical fibers. In a preferred embodiment, the partially reflective mirrors $M_4$ to $M_6$ are formed in the optical conductor 2215b using $TiO_2$ in order to optimally provide partially reflective surfaces.

The optical conductor 2215c is coupled to the WDM. optical coupler 2210 and the WDM optical coupler 2220. The optical conductor 2215c preferably includes partially reflective mirrors $M_7$ to $M_9$. The optical conductor 2215c may be any number of conventional commercially available optical conductors. In a preferred embodiment, the optical conductor 2215c is a single mode optical fiber, model number SMF-28, available from Corning Inc. in order to optimally provide propagation of lightwaves. The partially reflective mirrors $M_7$ to $M_9$ be formed in the optical conductor 2215c using any number of conventional commercially available methods of forming partially reflective mirrors in optical fibers. In a preferred embodiment, the partially reflective mirrors $M_7$ to $M_9$ are formed in the optical conductor 2215c using $TiO_2$ in order to optimally provide partially reflective surfaces.

The optical conductor 2215d is coupled to the WDM optical coupler 2210 and the WDM optical coupler 2220. The optical conductor 2215d preferably includes partially reflective mirrors $M_{10}$ to $M_{12}$. The optical conductor 2215d may be any number of conventional commercially available optical conductors. In a preferred embodiment, the optical conductor 2215d is a single mode optical fiber, model number SMF-28, available from Corning Inc. in order to optimally provide partially reflective surfaces. The partially reflective mirrors $M_{10}$ to $M_{12}$ be formed in the optical conductor 2215d using any number of conventional commercially available methods of forming partially reflective mirrors in optical fibers. In a preferred embodiment, the partially reflective mirrors $M_{10}$ to $M_{12}$ are formed in the optical conductor 2215d using $TiO_2$ in order to optimally provide partially reflective surfaces.

In a preferred embodiment, the partially reflective mirrors $M_1$ to $M_{12}$ are separated by an axial distance D. In a preferred embodiment, adjacent pairs of partially reflective mirrors and the corresponding intermediate section of the optical conductor provide an optical hydrophone. In a preferred embodiment, variations in the axial spacing between the adjacent pairs of the mirrors in the optical hydrophones are detected by the system 2000. In a preferred embodiment, the partially reflective mirrors $M_1$ to $M_{12}$ do not overlap. In this manner, the pulses of light reflected by the partially. reflective mirrors $M_1$ to $M_{12}$ are time division multiplexed. Furthermore, since the center wavelengths of the incident pulses of light are also different for each of the optical conductors, 2215a, 2215b, 2215c and 2215d, the pulses of light reflected by the partially reflective mirrors $M_1$ to $M_{12}$ are also wave division multiplexed.

The WDM optical coupler 2220 is coupled to the optical conductors 2215a, 2215b, 2215c, and 2215d and the optical conductor 2225. The WDM optical coupler 2220 preferably conveys lightwaves having center wavelengths $\lambda_1$, $\lambda_2$, $\lambda_3$, and $\lambda_4$ to and from the optical conductors 2415a, 2415b, 2415c, and 2415d, respectively, and conveys lightwaves having center wavelengths $\lambda_1$ to $\lambda_4$ to and from the optical conductor 2225. The WDM optical coupler 2220 may be any number of conventional commercially available WDM optical couplers. In a preferred embodiment, the WDM optical coupler 2220 is a LDW Series WDM optical coupler, available from Kaifa, in order to optimally provide wavelength splitting and combining.

The optical conductor 2225 is coupled to the WDM coupler 2220. The optical conductor 2225 conveys light waves to and from the WDM coupler 2220. The optical conductor 2225 may be any number of conventional commercially available optical conductors. In a preferred embodiment, the optical conductor 2225 is a single mode optical fiber, model number SMF-28, available from Corning Inc., in order to optimally provide propagation of lightwaves.

In a preferred embodiment, the optical sensors 2010 are capable of operation by injecting pulses of light into the optical conductor 2205 and/or the optical conductor 2225. In this manner, the optical sensors 2010 are preferably reversible and capable of bidirectional operation.

The optical conductor 130 is coupled to the optical coupler 115 and the WDM optical coupler 2015. The design and operation of the optical coupler 130 is otherwise substantially identical to the optical conductor 130 described above with reference to the system 100.

The WDM optical coupler 2015 is coupled to the optical conductor 130 and the optical conductors 130a, 130b, 130c, and 130d. The WDM optical coupler 2015 preferably receives lightwaves having center wavelengths $\lambda_1$ to $\lambda_4$ from the optical conductor 130 and transmits lightwaves having center wavelengths $\lambda_1$, $\lambda_2$, $\lambda_3$, and $\lambda_4$ to the optical conductors 130a, 130b, 130c, and 130d, respectively. The WDM optical coupler 2015 may be any number of conventional commercially available WDM optical coupler couplers. In a preferred embodiment, the WDM optical coupler 2015 is a LDW Series WDM optical coupler available from Kaifa in order to optimally provide wavelength splitting and combining.

The optical conductors 130a, 130b, 130c and 130d are coupled to the WDM optical coupler 2105 and the corresponding compensating interferometers 135a, 135b, 135c, and 135d. The optical conductors 130a, 130b, 130c, and 130d preferably convey lightwaves having center wavelengths of $\lambda_1$, $\lambda_2$, $\lambda_3$, and $\lambda_4$ to the compensating interferometers 135a, 135b, 135c, and 135d, respectively. The design and operation of the optical conductors 130a, 130b, 130c, and 130d are otherwise substantially identical to the optical conductor 130 described above with reference to the system 100.

The compensating interferometers 135a, 135b, 135c, and 135d are coupled to corresponding optical conductors 130a, 130b, 130c and 130d, and the system interface 145. The compensating interferometers 135a, 135b, 135c, and 135d are preferably adapted to receive reflected pulses of light having center wavelengths $\lambda_1$, $\lambda_2$, $\lambda_3$, and $\lambda_4$ from the optical conductors 130a, 130b, 130c, and 130d, and generating output signals representative of the environmental conditions within the optical sensors 2010. In this manner, the system 2000 is wave-division-multiplexed. Furthermore, because the partially reflective mirrors are also preferably non-overlapping, the system 2000 is also time-division-multiplexed.

The communication interfaces 140a, 140b, 140c, and 140d are coupled to the corresponding compensating interferometers 135a, 135b, 135c, and 135d, and the system interface 145. The communication interfaces 140a, 140b, 140c, and 140d convey electrical signals from the corresponding compensating interferometers 135a, 135b, 135c, and 135d to the system interface 145. The design and operation of the communication interfaces 140a, 140b, 140c, and 140d are otherwise substantially identical to the communication interface 140 described above with reference to the system 100.

The system interface 145 is coupled to the communication interfaces 140a, 140b, 140c, and 140d. The design and operation of the system interface 145 is otherwise substantially identical to the system interface 145 described above with reference to the system 100.

During operation of the system 2000, the optical source 2005 preferably controllably generates pulses of light having center wavelengths $\lambda_1$, $\lambda_2$, $\lambda_3$, and $\lambda_4$. The pulses of light are then preferably transmitted to the optical sensors 2010. The pulses of light are preferably partially reflected by the partially reflective mirrors positioned within the optical conductors 2215. The reflected pulses of light are then processed within the compensating interferometers 135 to generate signals representative of the environmental conditions sensed by the optical sensors 2010. In a preferred embodiment, the compensating interferometers 135 process the reflected pulses of light to generate signals representative of the environmental conditions sensed by the optical sensors 2010 substantially as described above with reference to FIGS. 6a, 6b and 6c. In a preferred embodiment, the system 2000 provides a wave-division-multiplexed and a time-division-multiplexed optical sensing system.

Figure 23:
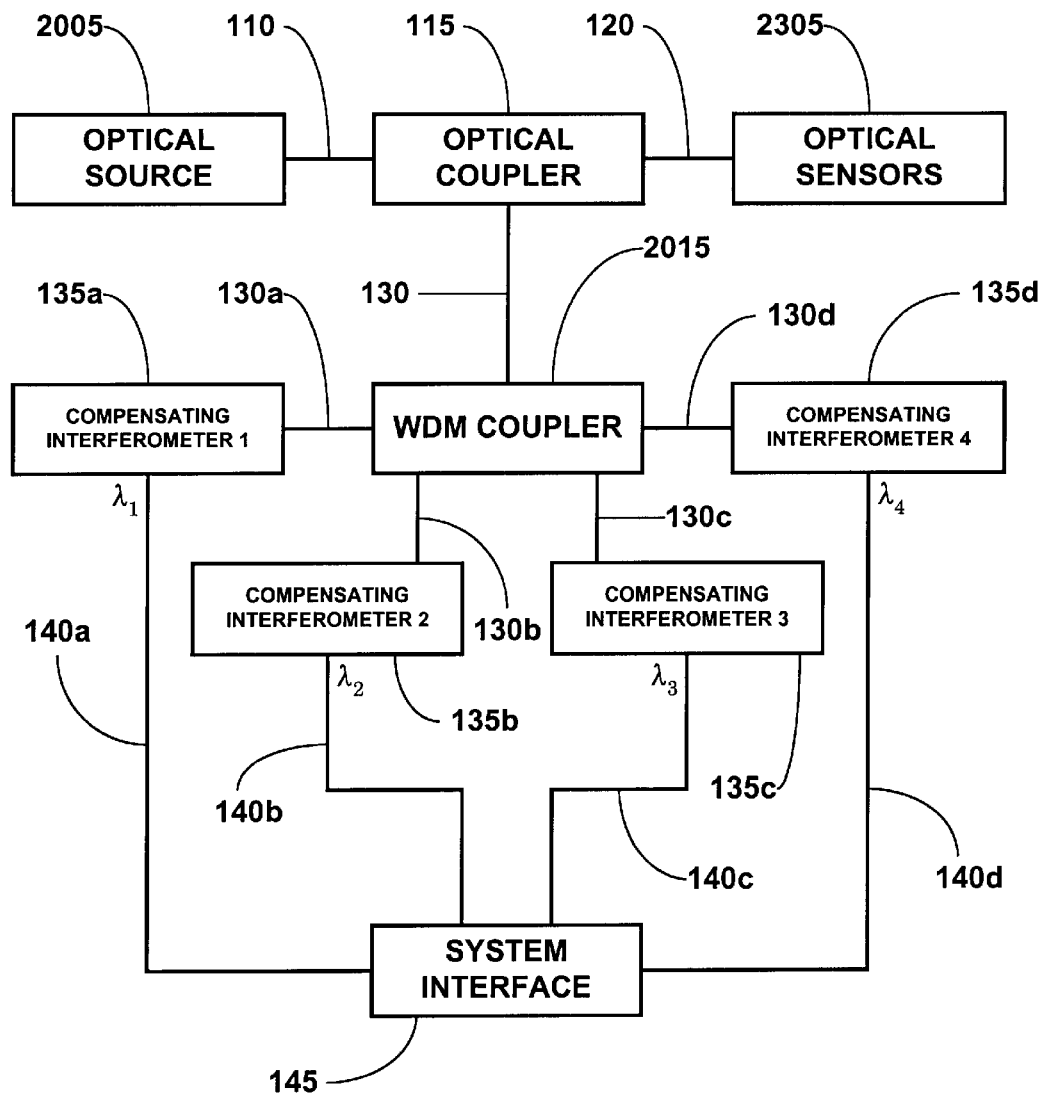
FIG. 23 is a schematic diagram of an alternative embodiment of an optical sensing system.

Referring to FIG. 23, an alternative embodiment of an optical sensing system 2300 includes the optical source 2005, the optical conductor 110, the optical coupler 115, the optical conductor 120, optical sensors 2305, the optical conductor 130, the WDM coupler 2015, the optical conductors 130a, 130b, 130c, and 130d, the compensating interferometers 135a, 135b, 135c and 135d, the communication interfaces 140a, 140b, 140c, and 140d, and the system interfaces 145.

The optical source 2005 is optically coupled to the optical conductor 110. The design and operation of the optical source 2005 is preferably substantially identical to the optical source 2005 described above with reference to the system 2000.

The optical conductor 110 is coupled to the optical source 2005 and the optical coupler 115. The design and operation of the optical conductor 110 is otherwise substantially identical to the optical conductor 110 described above with reference to the system 100.

The optical coupler 115 is coupled to the optical conductor 110, the optical conductor 120 and the optical conductor 130. The design and operation of the optical coupler 115 is otherwise substantially identical to the optical coupler 115 described above with reference to the system 100.

The optical conductor 120 is coupled to the optical coupler 115 and the optical sensors 2305. The design and operation of the optical conductor 120 is otherwise substantially identical to the optical conductor 110 described above with reference to the system 100.

Figure 24:
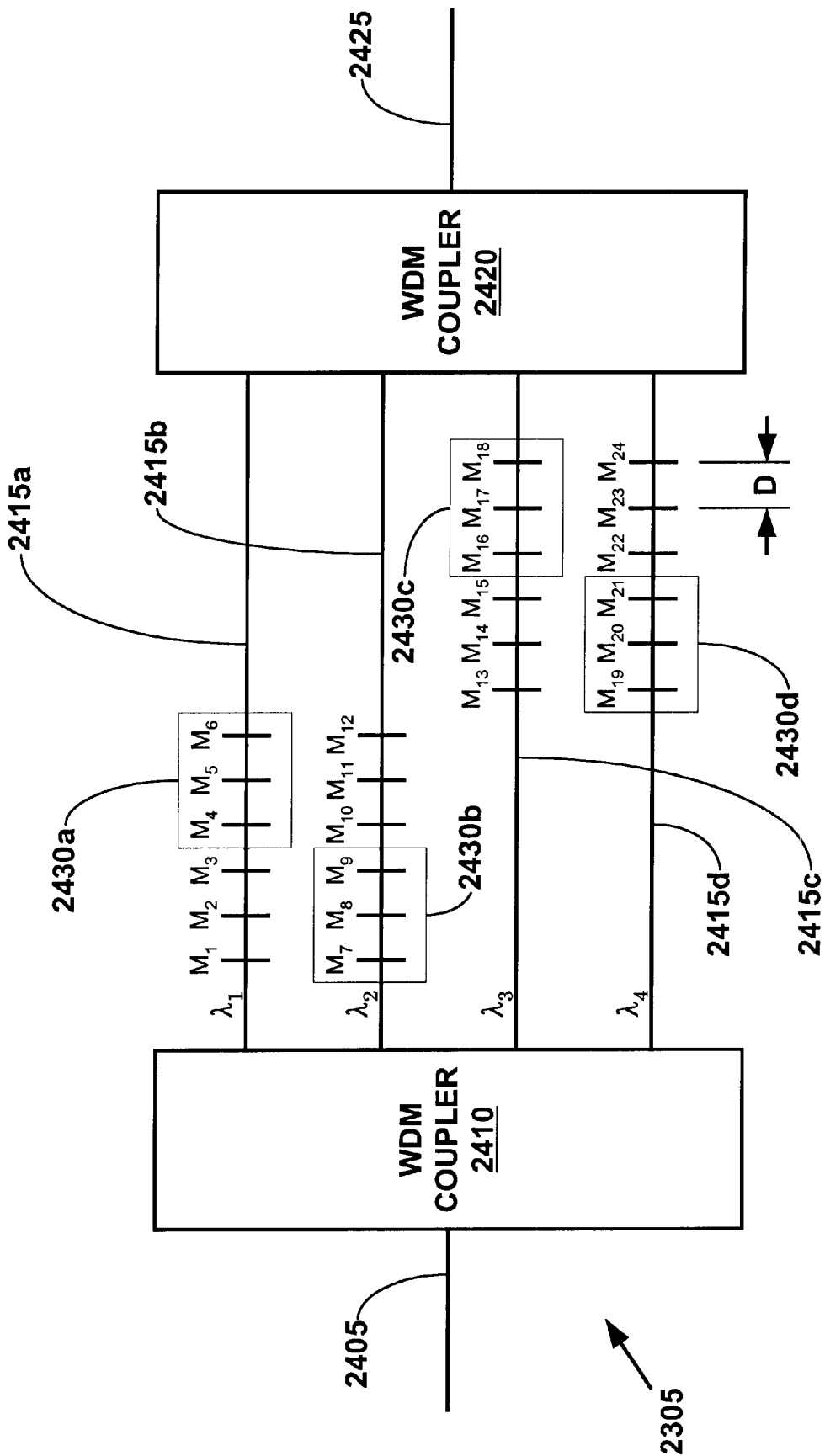
FIG. 24 is a schematic diagram of the optical sensors of the optical sensing system of FIG. 23.

The optical sensors 2305 are coupled to the optical conductor 120. In a preferred embodiment, as illustrated in FIG. 24, the optical sensors 2305 include an optical conductor 2405, a WDM optical coupler 2410, optical conductors 2415a, 2415b, 2415c and 2415d having partially reflective mirrors $M_1$ to $M_{24}$, a WDM optical coupler 2420, and an optical conductor 2425.

The optical conductor 2405 is coupled to the: optical conductor 120 and the WDM coupler 2410. The optical conductor 2405 conveys light waves to and from the WDM coupler 2410. The optical conductor 2405 may be any number of conventional commercially available optical conductors. In a preferred embodiment, the optical conductor 2405 is a single mode optical fiber, model number SMF-28, available from Corning Inc. in order to optimally provide propagation of lightwaves.

The WDM optical coupler 2410 is coupled to the optical conductor 2405 and the optical conductors 2415a, 2415b, 2415c, and 2415d. The WDM optical coupler 2410 preferably conveys lightwaves having center wavelengths $\lambda_1$ to $\lambda_4$ to and from the optical conductor 2405 and conveys lightwaves having center wavelengths $\lambda_1$, $\lambda_2$, $\lambda_3$, and $\lambda_4$ to and from optical conductors 2415a, 2415b, 2415c, and 2415d, respectively. The WDM optical coupler 2410 may be any number of conventional commercially available WDM optical couplers. In a preferred embodiment, the WDM optical coupler 2410 is a LDW Series, available from Kaifa, in order to optimally provide wavelength splitting and combining.

The optical conductor 2415a is coupled to the WDM optical coupler 2410 and the WDM optical coupler 2420. The optical conductor 2415a preferably includes partially reflective mirrors $M_1$ to $M_6$. In a preferred embodiment, the partially reflective mirrors $M_4$ to $M_6$ are encased within an acoustically insulative housing 2430a. In this manner, the partially reflective mirrors $M_4$ to $M_6$ preferably provide reference signals for calibration and quality control. The optical conductor 2415a may be any number of conventional commercially available optical conductors. In a preferred embodiment, the optical conductor 2415a is a single mode optical fiber, model number SMF-28, available from Corning Inc. in order to optimally provide partially reflective surfaces. The partially reflective mirrors $M_1$ to $M_6$ be formed in the optical conductor 2415a using any number of conventional commercially available methods of forming partially reflective mirrors in optical fibers. In a preferred embodiment, the partially reflective mirrors $M_1$ to $M_6$ are formed in the optical conductor 2415a using TiO2 in order to optimally provide partially reflective surfaces.

The optical conductor 2415b is coupled to the WDM optical coupler 2410 and the WDM optical coupler 2420. The optical conductor 2415b preferably includes partially reflective mirrors $M_7$ to $M_{12}$. In a preferred embodiment, the partially reflective mirrors $M_7$ to $M_9$ are encased within an acoustically insulative housing 2430b. In this manner, the partially reflective mirrors $M_7$ to $M_9$ preferably provide reference signals for calibration and quality control. The optical conductor 2415b may be any number of conventional commercially available optical conductors. In a preferred embodiment, the optical conductor 2415b is a single mode optical fiber, model number SMF-28, available from Corning Inc. in order to optimally provide propagation of lightwaves. The partially reflective mirrors $M_7$ to $M_{12}$ be formed in the optical conductor 2415b using any number of conventional commercially available methods of forming partially reflective mirrors in optical fibers. In a preferred embodiment, the partially reflective mirrors $M_7$ to $M_{12}$ are formed in the optical conductor 2415b using $TiO_2$ in order to optimally provide partially reflective surfaces.

The optical conductor 241c is coupled to the WDM optical coupler 2410 and the WDM optical coupler 2420. The optical conductor 2415c preferably includes partially reflective mirrors $M_{13}$ to $M_{18}$. In a preferred embodiment, the partially reflective mirrors $M_{16}$ to $M_{18}$ are encased within an acoustically insulative housing 2430c. In this manner, the partially reflective mirrors $M_{16}$ to $M_{18}$ preferably provide reference signals for calibration and quality control. The optical conductor 2415c may be any number of conventional commercially available optical conductors. In a preferred embodiment, the optical conductor 2415c is a single mode optical fiber, model number SMF-28, available from Corning Inc. in order to optimally provide propagation of lightwaves. The partially reflective mirrors $M_{13}$ to $M_{18}$ be formed in the optical conductor 2415c using any number of conventional commercially available methods of forming partially reflective mirrors in optical fibers. In a preferred embodiment, the partially reflective mirrors $M_{13}$ to $M_{18}$ are formed in the optical conductor 2415c using $TiO_2$ in order to optimally provide partially reflective surfaces.

The optical conductor 2415d is coupled to the WDM optical coupler 2410 and the WDM optical coupler 2420. The optical conductor 2415d preferably includes partially reflective mirrors $M_{19}$ to $M_{24}$. In a preferred embodiment, the partially reflective mirrors $M_{19}$ to $M_{21}$ are encased within an acoustically insulative housing 2430d. In this manner, the partially reflective mirrors $M_{19}$ to $M_{21}$ preferably provide reference signals for calibration and quality control. The optical conductor 2415d may be any number of conventional commercially available optical conductors. In a preferred embodiment, the optical conductor. 2415d is a single mode optical fiber, model number SMF-28, available from Corning Inc. in order to optimally provide propagation of lightwaves. The partially reflective mirrors $M_{19}$ to $M_{24}$ be formed in the optical conductor 2415d using any number of conventional commercially available methods of forming partially reflective mirrors in optical fibers. In a preferred embodiment, the partially reflective mirrors $M_{19}$ to $M_{24}$ are formed in the optical conductor 2415d using $TiO_2$ in order to optimally provide partially reflective surfaces.

In a preferred embodiment, the partially reflective mirrors $M_1$ to $M_6$, $M_7$ to $M_{12}$, $M_{13}$ to $M_{18}$, and $M_{19}$ to $M_{24}$ are separated by an axial distance D. In a preferred embodiment, adjacent pairs of partially reflective mirrors and the corresponding intermediate section of the optical conductor provide an optical hydrophone. In a preferred embodiment, variations in the axial spacing between the adjacent pairs of the mirrors in the optical hydrophones are detected by the system 2300. In a preferred embodiment, the partially reflective mirrors $M_1$ to $M_3$, $M_{10}$ to $M_{12}$, $M_{13}$ to $M_{15}$, and $M_{22}$ to $M_{24}$ do not overlap. In a preferred embodiment, the partially reflective mirrors $M_4$ to $M_6$, $M_7$ to $M_9$, $M_{16}$ to $M_{18}$, and $M_{19}$ to $M_{21}$, preferably used for calibration and quality control, do not overlap. In this manner, the pulses of light reflected by the partially reflective mirrors $M_1$ to $M_{24}$ are time division multiplexed.

Furthermore, since the center wavelengths of the incident pulses of light are also different for each of the optical conductors, 2415a, 2415b, 2415c and 2415d, the pulses of light reflected by the partially reflective mirrors $M_1$ to $M_{24}$ are also wave division multiplexed.

The WDM optical coupler 2420 is coupled to the optical conductors 2415a, 2415b, 2415c, and 2415d and the optical conductor 2425. The WDM optical coupler 2420 preferably conveys lightwaves having center wavelengths $\lambda_1$, $\lambda_2$, $\lambda_3$, and $\lambda_4$ to and from the optical conductors 2415a, 2415b, 2415c, and 2415d, respectively, and conveys lightwaves having center wavelengths $\lambda_1$ to $_4$ to and from the optical conductor 2425. The WDM optical coupler 2420 may be any number of conventional commercially available WDM optical couplers. In a preferred embodiment, the WDM optical coupler 2420 is a LDW Series WDM optical coupler, available from Kaifa, in order to optimally provide wavelength splitting and combining.

The optical conductor 2425 is coupled to the WDM coupler 2420. The optical conductor 2425 conveys light waves to and from the WDM coupler 2420. The optical conductor 2425 may be any number of conventional commercially available optical conductors. In a preferred embodiment, the optical conductor 2425 is a single mode optical fiber, model number SMF-28, available from Corning Inc. in order to optimally provide propagation of lightwaves.

In a preferred embodiment, the optical sensors 2305 are capable of operation by injecting pulses of light into the optical conductor 2405 and/or the optical conductor 2425. In this manner, the optical sensors 2305 are preferably reversible and capable of bidirectional operation.

The optical conductor 130 is coupled to the optical coupler 115 and the WDM optical coupler 2015. The design and operation of the optical coupler 130 is otherwise substantially identical to the optical conductor 130 described above with reference to the system 100.

The WDM optical coupler 2015 is coupled to the optical conductor 130 and the optical conductors 130a, 130b, 130c, and 130d. The WDM optical coupler 2015 preferably receives lightwaves having center wavelengths $\lambda_1$ to $\lambda_4$ from the optical conductor 130 and transmits lightwaves having center wavelengths $\lambda_1$, $\lambda_2$, $\lambda_3$, and $\lambda_4$ to the optical conductors 130a, 130b, 130c, and 130d, respectively. The WDM optical coupler 2015 may be any number of conventional commercially available WDM optical coupler couplers. In a preferred embodiment, the WDM optical coupler 2015 is a LDW Series WDM optical coupler available from Kaifa in order to optimally provide wavelength splitting and combining.

The optical conductors 130a, 130b, 130c and 130d are coupled to the WDM optical coupler 2105 and the corresponding compensating interferometers 135a, 135b, 135c, and 135d. The optical conductors 130a, 130b, 130c, and 130d preferably convey lightwaves having center wavelengths of $\lambda_1$, $\lambda_2$, $\lambda_3$, and $\lambda_4$ to the compensating interferometers 135a, 135b, 135c, and 135d, respectively. The design and operation of the optical conductors 130a, 130b, 130c, and $^{130}d$ are otherwise substantially identical to the optical conductor 130 described above with reference to the system 100.

The compensating interferometers 135a, 135b, 135c, and 135d are coupled to corresponding optical conductors 130a, 130b, 130c and 130d, and the system interface 145. The compensating interferometers 135a, 135b, 135c, and 135d are preferably adapted to receive reflected pulses of light having center wavelengths $\lambda_1$, $\lambda_2$, $\lambda_3$, and $\lambda_4$ from the optical conductors 130a, 130b, 130c, and 130d, and generating output signals representative of the environmental conditions within the optical sensors 2305. In this manner, the system 2300 is wave-division-multiplexed. Furthermore, because the partially reflective mirrors are also preferably non-overlapping, the system 2300 is also time-division-multiplexed.

The communication interfaces 140a, 140b, 140c, and 140d are coupled to the corresponding compensating interferometers 135a, 135b, 135c, and 135d, and the system interface 145. The communication interfaces 140a, 140b, 140c, and 140d convey electrical signals from the corresponding compensating interferometers 135a, 135b, 135c, and 135d to the system interface 145. The design and operation of the communication interfaces 140a, 140b, 140c, and 140d are otherwise substantially identical to the communication interface 140 described above with reference to the system 100.

The system interface 145 is coupled to the communication interfaces 140a, 140b, 140c, and 140d. The design and operation of the system interface 145 is otherwise substantially identical to the system interface 145 described above with reference to the system 100.

During operation of the system 2300, the optical source 2005 preferably controllably generates pulses of light having center wavelengths $\lambda_1$, $\lambda_2$, $\lambda_3$, and $\lambda_4$. The pulses of light are then preferably transmitted to the optical sensors 2305. The pulses of light are preferably partially reflected by the partially reflective mirrors within the optical conductors 2415. In a preferred embodiment, the reflected pulses of light include reflected pulses of light that correspond to environmental conditions and reflected pulses of light that correspond to a reference environment that is insulated from conditions. In this manner, a reference signal is preferably provided for each of the optical hydrophones that is preferably used to correct the sensed signals. The reflected pulses of light are then processed within the compensating interferometers 135 to generate signals representative of the environmental conditions sensed by the optical sensors 2305. In a preferred embodiment, the compensating interferometers 135 process the reflected pulses of light to generate signals representative of the environmental conditions sensed by the optical sensors 2305 substantially as described above with reference to FIGS. 6a, 6b and 6c. In a preferred embodiment, the system 2300 provides a wave-division-multiplexed and a time-division-multiplexed optical sensing system.

Figure 25:
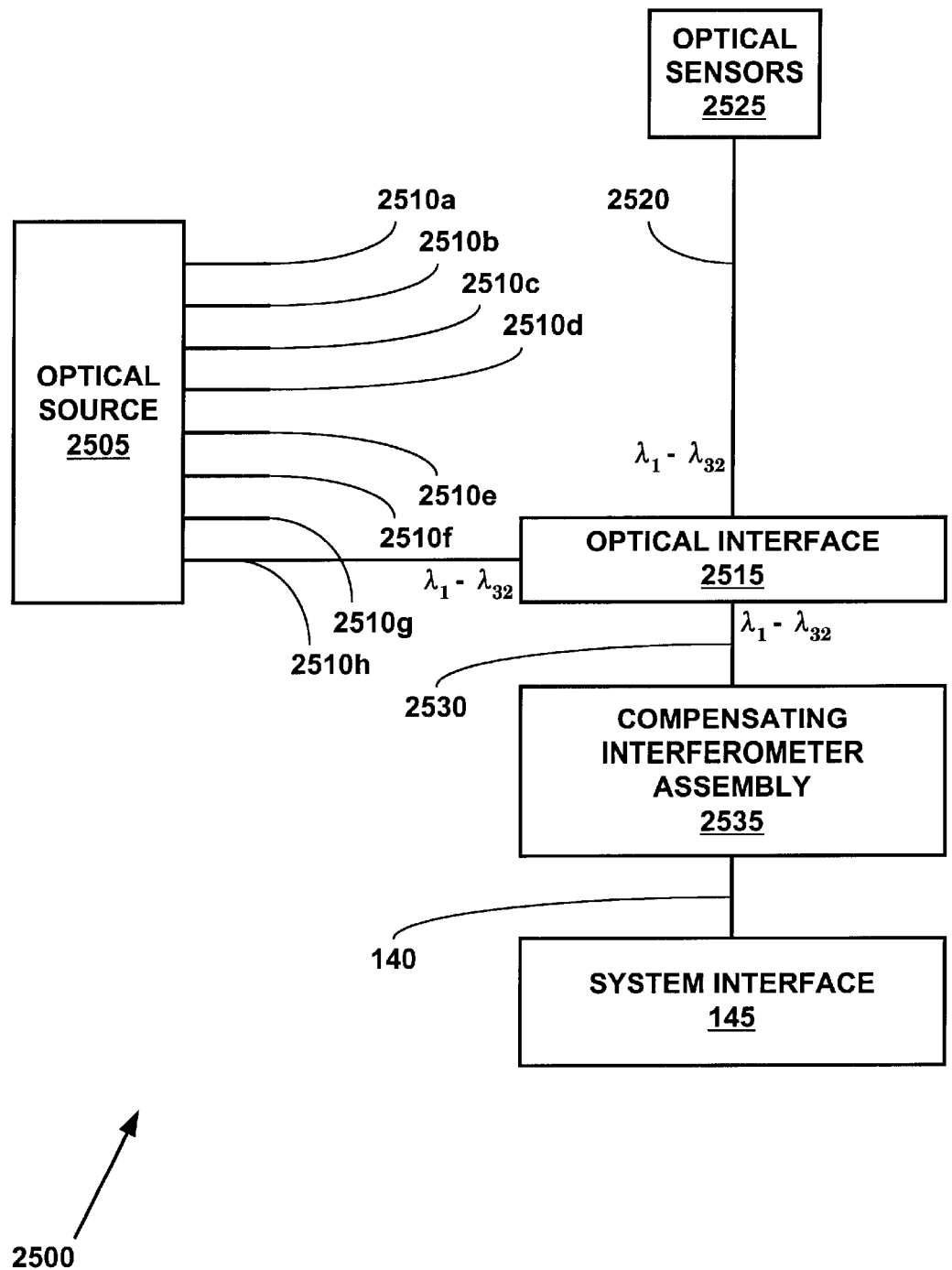
FIG. 25 is a schematic diagram of an alternative embodiment of an optical sensing system.

Referring to FIG. 25, an alternative embodiment of an optical sensing system 2500 preferably includes an optical source 2505, optical conductors 2510a, 2510b, 2510c, 2510d, 2510e, 2510f, 2510g, and 2510h, an optical interface 2515, an optical conductor 2520, optical sensors 2525, an optical conductor 2530, a compensating interferometer assembly 2535, the communication interface 140, and the system interface 145.

The optical source 2505 is preferably coupled to one or more of the optical conductors 2510a, 2510b, 2510c, 2510d, 2510e, 2510f, 2510g, and 2510h. The optical source 2505 is preferably adapted to controllably generate pulses of light having a predetermined range of center wavelengths for injection into one or more of the optical conductors 2510a, 2510b, 2510c, 2510d, 2510e, 2510f, 2510g, and 2510h.

Figure 26A:
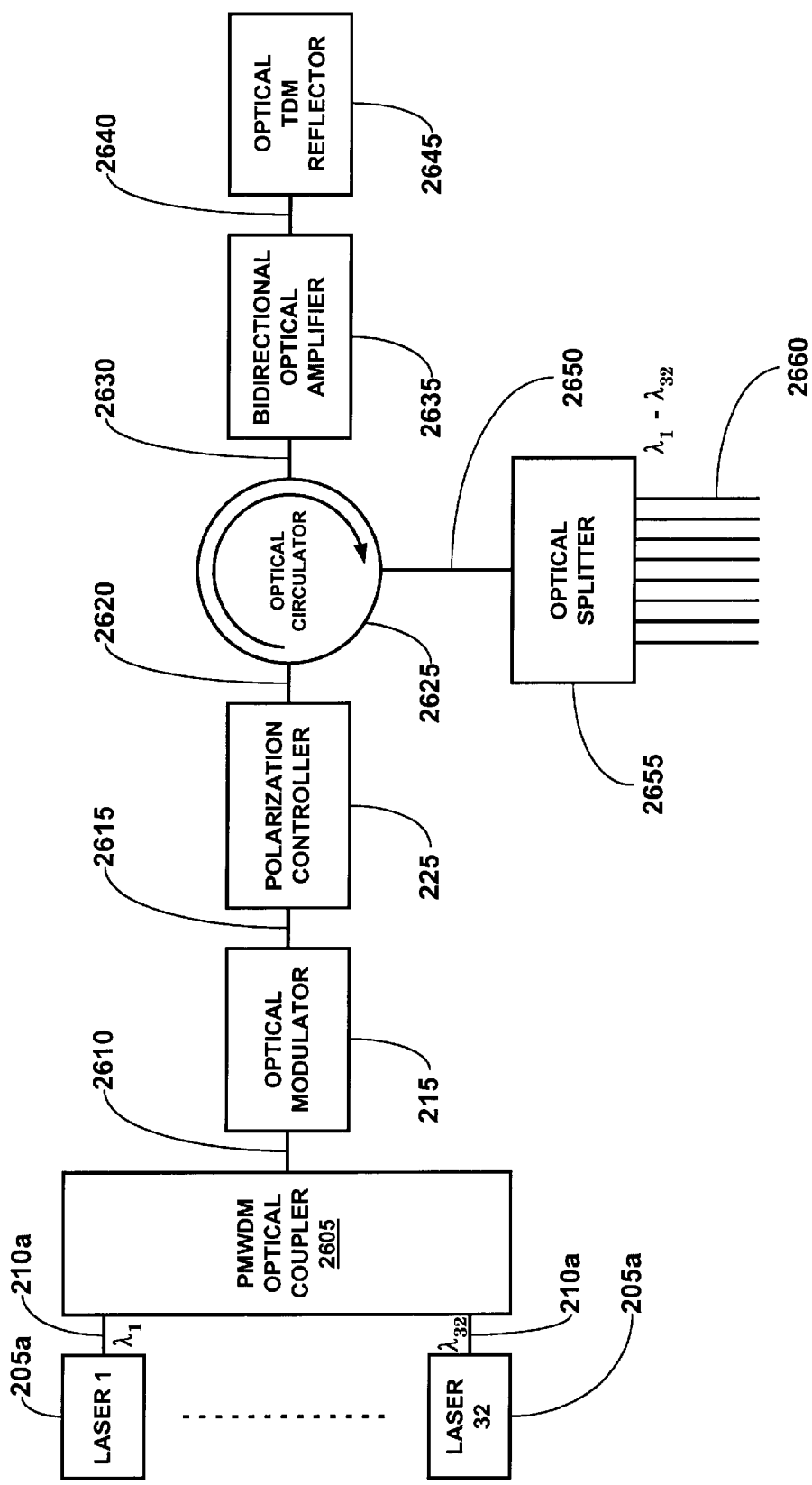
FIG. 26a is a schematic diagram of an embodiment of the optical source of the optical sensing system of FIG. 25.

In a preferred embodiment, as illustrated in FIG. 26a, the optical source 2505 includes a plurality of the lasers 205, a plurality of the optical conductors 210, a polarization maintaining wave division multiplexing (PMWDM) optical coupler 2605, an optical conductor 2610, the optical modulator 215, an optical conductor 2615, the polarization controller 225, an optical conductor 2620, an optical circulator 2625, an optical conductor 2630, a bidirectional optical amplifier 2635, an optical conductor 2640, an optical time division multiplexing (TDM) optical reflector 2645, an optical conductor 2650, an optical splitter 2655, and one or more optical conductors 2660.

The lasers 205 are coupled to the corresponding optical conductors 210. The lasers 205 are preferably adapted to controllably generate pulses of light having corresponding predetermined center wavelengths. In a preferred embodiment, the lasers 205 include 32 lasers that each generate pulses of light having a different center wavelength. In this manner, the lasers 205 preferably controllably provide pulses of light having center wavelengths $\lambda_1$ to $\lambda_{32}$. The lasers 205 are otherwise substantially identical to the laser 205 described above with reference to the optical source 105.

The optical conductors 210 are coupled to the corresponding lasers 205 and the PMWDM optical coupler 2605. The design and operation of the optical conductors 210 are otherwise substantially identical to the optical conductor 210 described above with reference to the optical source 105.

The PMWDM 2605 is coupled to the optical conductors 210 and the optical conductor 2610. The PMWDM 2065 is preferably adapted to receive lightwaves from the optical conductors 210 having corresponding center wavelengths and conveying lightwaves having a range of center wavelengths to the optical conductor 2610. The PMWDM 2605 may be any number of conventional commercially available PMWDM. In a preferred embodiment, the PMWDM 2605 is an LDW Series -4 channel broad band PMWDM available from Kaifa in order to optimally provide wavelength splitting and combining.

The optical conductor 2610 is coupled to the PMWDM optical coupler 2605 and the optical modulator 215. The optical conductor 2610 is preferably adapted to convey light waves between the PMWDM optical coupler 2605 and the optical modulator 215. The optical conductor 2610 may be any number of conventional commercially available optical conductors. In a preferred embodiment, the optical conductor 2610 is a Panda polarization maintaining (PM) optical fiber available from Fujikura in order to optimally provide polarization maintained lightwave propagation.

The optical modulator 215 is coupled to the optical conductor 2610 and the optical conductor 2615. The design and operation of the optical modulator 215 is otherwise substantially identical to the optical modulator 215 described above with reference to the optical source 105.

The optical conductor 2615 is coupled to the optical modulator 215 and the polarization controller 225. The optical conductor 2615 is preferably adapted to convey light waves between the optical modulator 215 and the polarization controller 225. The optical conductor 2615 may be any number of conventional commercially available optical conductors. In a preferred embodiment, the optical conductor 2615 is a Panda PM optical fiber available from Fujikara in order to optimally provide polarization maintained lightwave propagation.

The polarization controller 225 is coupled to the optical conductor 2615 and the optical conductor 2620. The design and operation of the polarization controller 225 is otherwise substantially identical to the optical modulator 215 described above with reference to the optical source 105.

The optical conductor 2620 is coupled to the polarization controller 225 and the optical circulator 2625. The optical conductor 2620 is preferably adapted to convey light waves between the polarization controller 225 and the optical circulator 2625. The optical conductor 2620 may be any number of conventional commercially available optical conductors. In a preferred embodiment, the optical conductor 2620 is a single mode optical fiber, model number SMF-28, available from Corning Inc. in order to optimally provide lightwave propagation.

The optical circulator 2625 is coupled to the optical conductor 2620, the optical conductor 2630, and the optical conductor 2650. The optical circulator 2625 is preferably adapted to convey light waves from the optical conductor 2620 to the optical conductor 2630, and to convey light waves from the optical conductor 2630 to the optical conductor 2650. The optical circulator 2625 may be any number of conventional commercially available optical circulators. In a preferred embodiment, the optical circulator 2625 is a 3-port optical circulator available from Kaifa Technologies in order to optimally provide isolation and directivity.

The optical conductor 2630 is coupled to the optical circulator 2625 and the bidirectional optical amplifier 2635. The optical conductor 2630 is preferably adapted to convey light waves between the optical circulator 2625 and the bidirectional optical amplifier 2635. The optical conductor 2630 may be any number of conventional commercially available optical conductors. In a preferred embodiment, the optical conductor 2630 is a single mode optical fiber, model number SMF-28, available from Corning Inc. in order to optimally provide lightwave propagation.

Figure 27A:
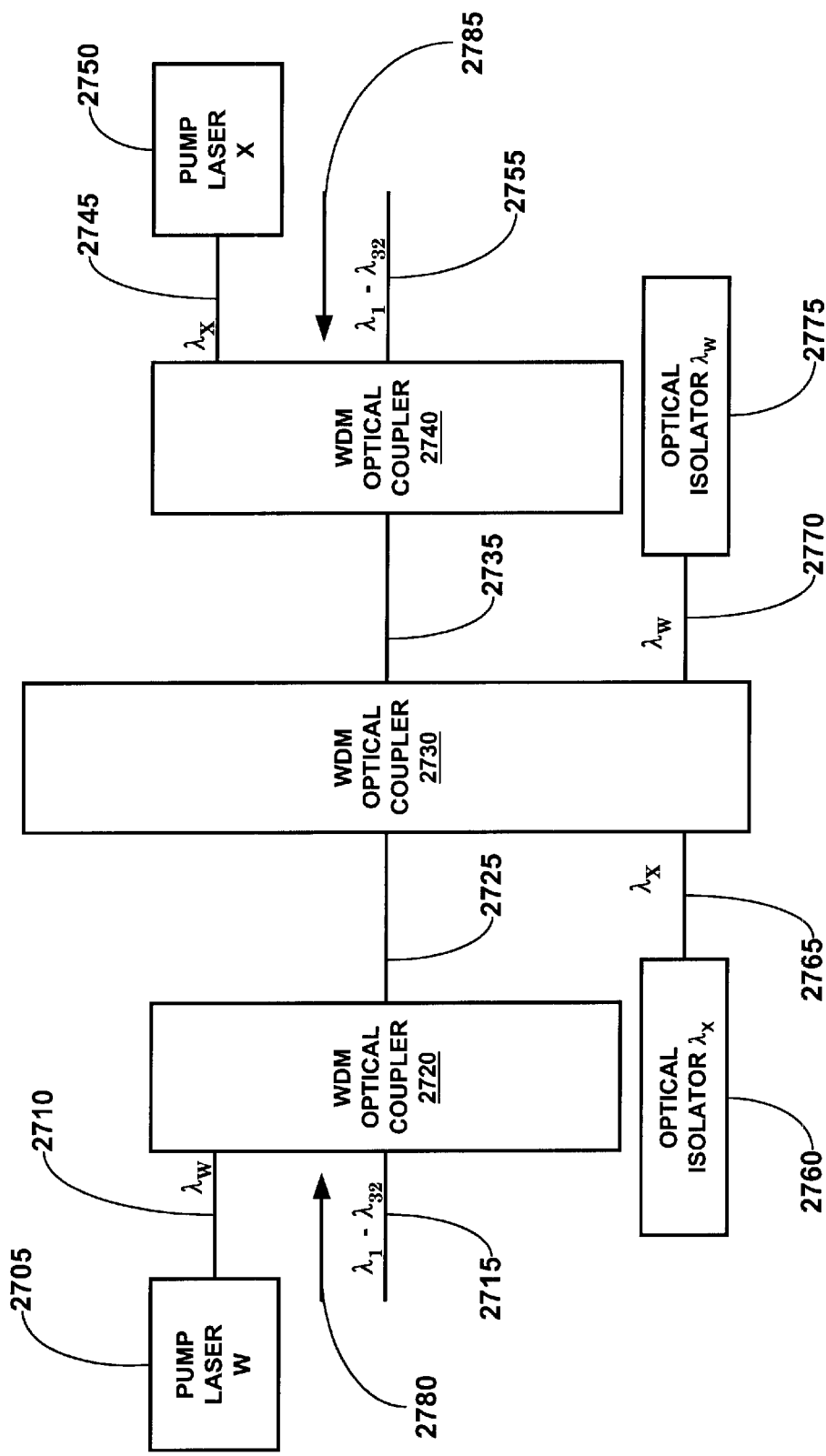

The bidirectional optical amplifier 2635 is coupled to the optical conductor 2630 and the optical conductor 2640. The bidirectional optical amplifier 2635 is preferably adapted to amplify the energy level of optical signals traveling in two directions. In a preferred embodiment, as illustrated in FIG. 27a, the bidirectional optical amplifier 2635 preferably includes a pump laser W 2705, an optical conductor 2710, an optical conductor 2715, a wave-division-multiplexing (WDM) optical coupler 2720, an optical conductor 2725, a WDM optical coupler 2730, an optical conductor 2735, a WDM optical coupler 2740, an optical conductor 2745, a pump laser X 2750, an optical conductor 2755, an optical isolator X 2760, an optical conductor 2765, an optical conductor 2770, and an optical isolator W 2775.

The pump laser W 2705 is coupled to the optical conductor 2710. The pump laser W 2705 is preferably adapted to controllably generate lightwaves having a center wavelength $\lambda_W$. In a preferred embodiment, the center wavelength $\lambda_W$ is within the range of center wavelengths generated by the, lasers 205. In a preferred embodiment, the center wavelength $\lambda_W$ is about 1480 nm. The pump laser W 2705 may be any number of conventional commercially available pump lasers. In a preferred embodiment, the pump laser W 2705 is a FLD148G3NL-E available from Fujitsu in order to optimally provide optical pump power to erbium doped optical fibers.

The optical conductor 2710 is coupled to the pump laser W 2705 and the WDM optical coupler 2720. The optical conductor 2710 is preferably adapted to convey lightwaves from the pump laser W 2705 to the WDM optical coupler 2720. The optical conductor 2710 may be any number of conventional commercially available optical conductors. In a preferred embodiment, the optical conductor 2710 is a single mode optical fiber, model number SMF-28, available from Corning Inc., in order to optimally provide lightwave transmission.

The optical conductor 2715 is coupled to the optical conductor 2630 and the WDM optical coupler 2720. The optical conductor 2715 is preferably adapted to convey lightwaves to and from the WDM optical coupler 2720. The optical conductor 2715 may be any number of conventional commercially available optical conductors. In a preferred embodiment, the optical conductor 2715 is a single mode optical fiber, model number SMF-28, available from Corning Inc., in order to optimally provide lightwave transmission.

The WDM optical coupler 2720 is coupled to the optical conductor 2710, the optical conductor 2715, and the optical conductor 2725. The WDM optical coupler 2720 is preferably adapted to receive lightwaves having a center frequency $\lambda W$ from the optical conductor 2710, transmit and receive lightwaves having center frequencies ranging from $\lambda_1$ to $\lambda_{32}$ to and from the optical conductor 2715, and transmit and receive lightwaves having center frequencies ranging from $\lambda_1$ to $\lambda_{32}$ to and from the optical conductor 2725. The WDM optical coupler 2720 may be any number of conventional commercially available WDM optical couplers. In a preferred embodiment, the WDM optical coupler 2720 is a FWDMC0, available from E-Tek Dynamics, in order to optimally provide low loss insertion of pump power.

The optical conductor 2725 is coupled to the WDM optical coupler 2720 and the WDM optical coupler 2730. The optical conductor 2725 is preferably adapted to convey lightwaves between the WDM optical coupler 2720 and the WDM optical coupler 2730. In a preferred embodiment, the optical conductor 2725 is adapted to amplify the energy level of lightwaves traveling within the optical conductor 2725 When the optical conductor 2725 is excited by lightwaves from a pump laser. In a preferred embodiment, the optical conductor 2725 is adapted to amplify the energy level of lightwaves traveling within the optical conductor 2725 when the optical conductor is excited by lightwaves having a center wavelength $\lambda_W$ from the pump laser W 2705. In a preferred embodiment, the optical conductor 2725 is an erbium doped optical fiber available from 3M Speciality Optical Fibers in order to optimally provide an optical gain medium.

The WDM optical coupler 2730 is coupled to the optical conductor 2725, the optical conductor 2735, the optical conductor 2765, and the optical conductor 2770. The WDM optical coupler 2720 is preferably adapted to transmit and receive lightwaves having a center frequency from $\lambda_1$ to $\lambda_{32}$ to and from the optical conductors 2725, 2735, 2765, and 2770. The WDM optical coupler 2730 may be any number of conventional commercially available WDM optical couplers. In a preferred embodiment, the WDM optical coupler 2730 is a 16-channel WDM Polar Wave Optical Slicer, available from Chorum Technologies, in order to optimally provide distribution of signals as a function of wavelength.

The optical conductor 2735 is coupled to the WDM optical coupler 2730 and the WDM optical coupler 2740. The optical conductor 2735 is preferably adapted to convey lightwaves between the WDM optical coupler 2730 and the WDM optical coupler 2740. In a preferred embodiment, the optical conductor 2735 is adapted to amplify the energy level of lightwaves traveling within the optical conductor 2735 when the optical conductor 2735 is excited by lightwaves from a pump laser. In a preferred embodiment, the optical conductor 2725 is adapted to amplify the energy level of lightwaves traveling within the optical conductor 2735 when the optical conductor 2735 is excited by lightwaves having a center wavelength $\lambda_X$ from the pump laser X 2750. In a preferred embodiment, the optical conductor 2735 is an erbium doped optical fiber available from 3M Speciality Optical Fibers in order to optimally provide an optical gain medium.

The WDM optical coupler 2740 is coupled to the optical conductor 2735, the optical conductor 2745, and the optical conductor 2755. The WDM optical coupler 2740 is preferably adapted to transmit and receive lightwaves having center frequencies ranging from $\lambda_1$ to $\lambda_{32}$ to and from the optical conductor 2735, receive lightwaves having a center frequency $\lambda_X$ from the optical conductor 2745, and transmit and receive lightwaves having center frequencies ranging from $\lambda_1$ to $\lambda_{32}$ to and from the optical conductor 2755. The WDM optical coupler 2740 may be any number of conventional commercially available WDM optical couplers. In a preferred embodiment, the WDM optical coupler 2740 is a FWDMA0, available from E-Tek Dynamics, in order to optimally provide low loss insertion of pump power.

The optical conductor 2745 is coupled to the pump laser Y 2750 and the WDM optical coupler 2740. The optical conductor 2745 is preferably adapted to convey lightwaves from the pump laser X 2750 to the WDM optical coupler 2740. The optical conductor 2745 may be any number of conventional commercially available optical conductors. In a preferred embodiment, the optical conductor 2745 is a single mode optical fiber, model number SMF-28, available from Corning Inc. in order to optimally provide lightwave transmission.

The pump laser X 2750 is coupled to the optical conductor 2745. The pump laser X 2750 is preferably adapted to controllably generate lightwaves having a center wavelength $\lambda_X$. In a preferred embodiment, the center wavelength $\lambda_X$ is within the range of center wavelengths generated by the lasers 205. In a preferred embodiment, the center wavelength $\lambda_X$ is about 1480 nm. In a preferred embodiment, the center wavelength $\lambda_X$ is different from the center wavelength $\lambda_W$. The pump laser X 2750 may be any number of conventional commercially available pump lasers. In a preferred embodiment, the pump laser X 2750 is a FLD148G3NL-E, available from Fujitsu, in order to optimally provide pump power to erbium doped optical fibers.

The optical conductor 2755 is coupled to the WDM optical coupler 2740 and the optical conductor 2640. The optical conductor 2755 is preferably adapted to convey lightwaves to and from the WDM optical coupler 2740. The optical conductor 2755 may be any number of conventional commercially available optical conductors. In a preferred embodiment, the optical conductor 2755 is a single mode optical fiber, model number SMF-28, available from Corning Inc., in order to optimally provide lightwave transmission.

During operation of the bidirectional optical amplifier 2635, the pump laser W 2705 preferably injects lightwaves having a center wavelength $\lambda_W$ into the optical conductor 2725 and the pump laser X 2750 preferably injects lightwaves having a center wavelength $\lambda_X$ into the optical conductor 2735. In this manner, the energy level of lightwaves within the optical conductors 2725 and 2735 are amplified. The injected lightwaves having the center wavelengths $\lambda_W$ and $\lambda_X$ are then preferably absorbed and removed from the system 2500 by the optical isolators 2760 and 2775.

During operation of the bidirectional optical amplifier 2635, lightwaves conveyed by the optical conductor 2715 in the direction 2780 are preferably sequentially amplified within the optical conductors 2725 and 2735. The amplified lightwaves are then conveyed to the optical TDM reflector 2645 by the optical conductor 2755. The lightwaves reflected by the optical TDM reflector 2645 and traveling in the direction 2785 are then sequentially amplified within the optical conductors 2735 and 2725. In this manner, lightwaves traveling within the bidirectional optical amplifier 2635 are amplified in both directions of travel.

Figure 27B:
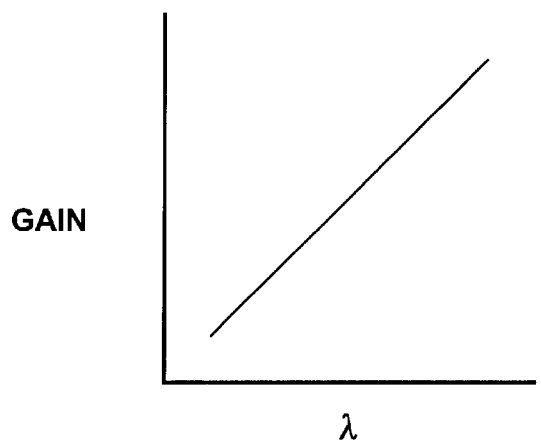
FIG. 27b is a graphical illustration of the amplification of the bidirectional amplifier of FIG. 27 in the forward direction.
Figure 27C:
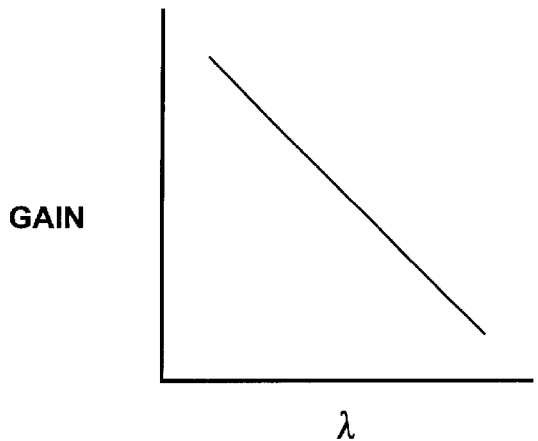
FIG. 27c is a graphical illustration of the amplification of the bidirectional amplifier of FIG. 27 in the reverse direction.
Figure 27D:
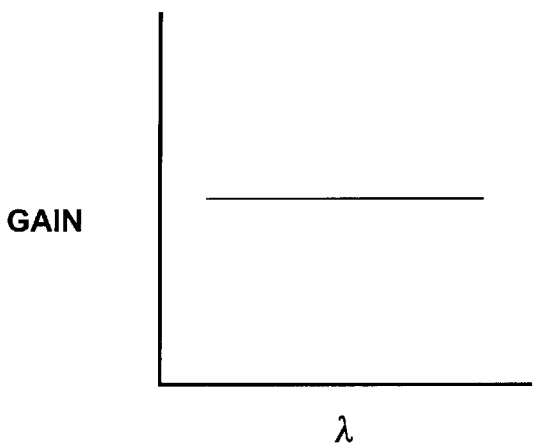
FIG. 27d is a graphical illustration of the overall amplification of the bidirectional amplifier of FIG. 27.

In a preferred embodiment, as illustrated in FIG. 27b, lightwaves traveling in the direction 2780 within the bidirectional optical amplifier 2635 having higher center wavelengths are amplified more than lightwaves having lower center wavelengths. In this manner, lightwaves traveling in the direction 2780 within the bidirectional optical amplifier 2635 having higher center wavelengths are preemphasized. In a preferred embodiment, as illustrated in FIG. 27c, lightwaves traveling in the direction 2785 within the bidirectional optical amplifier 2635 having higher center wavelengths are amplified less than lightwaves having lower center wavelengths. In this manner, lightwaves traveling in the direction 2785 within the bidirectional optical amplifier 2635 having higher center wavelengths are de-emphasized. In a preferred embodiment, as illustrated in FIG. 27d, overall, all lightwaves are substantially equally amplified upon completing their two-way travel within the bidirectional optical amplifier 2635.

The optical conductor 2640 is coupled to the bidirectional optical amplifier 2635 and the optical TDM reflector. The optical conductor 2640 is preferably adapted to convey light waves between the bidirectional optical amplifier 2635 and the optical TDM reflector 2645. The optical conductor 2640 may be any number of conventional commercially available optical conductors. In a preferred embodiment, the optical conductor 2640 is a single mode optical fiber, part number SMF-28, available from Corning Inc., in order to optimally provide lightwave propagation.

Figure 28:
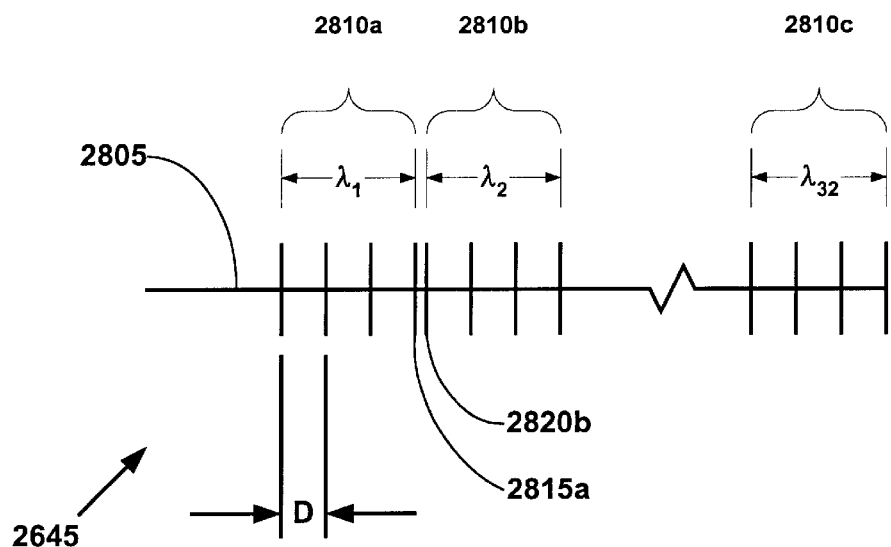

The optical TDM reflector 2645 is coupled to the optical conductor 2640. The optical TDM reflector 2645 is preferably adapted to reflect incident lightwaves at different locations as a function of their center wavelengths so as to provide a time division multiplexing of the reflected lightwaves. In a preferred embodiment, as illustrated in FIG. 28, the optical TDM reflector 2645 includes an optical conductor 2805 having a plurality of groups 2810 of bragg gratings.

The optical conductor 2805 is coupled to the optical conductor 2640. The optical conductor 2805 may be any number of conventional commercially available optical conductors 2805. In a preferred embodiment, the optical conductor 2805 is a single mode optical fiber, part number SMF-28, available from Corning Inc., in order to optimally provide lightwave transmission.

The groups of bragg gratings 2810 are coupled to and formed within the optical conductor 2805. The groups of bragg gratings 2810 may be formed within the optical conductor 2805 using any number of conventional commercially available methods. In a preferred embodiment, the groups of bragg gratings 2810 are formed within the optical conductor 2805 by the process of phase masking, available from Innovative Fibers, in order to optimally provide wavelength selective partial reflectivity.

In a preferred embodiment, each group 2810 of bragg gratings includes a plurality of spaced apart bragg gratings having identical center wavelengths. In a preferred embodiment, each of the bragg gratings within a group 2810 of bragg gratings reflects about 0.95 to 1.05% of the incident lightwaves having substantially the same center wavelength as the bragg grating. In a preferred embodiment, the bragg gratings within each of the groups 2810 of bragg gratings are spaced apart by an axial distance equal to D. In a preferred embodiment, the last bragg grating 2815a within a group 2810a of bragg gratings is preferably substantially coincident with the first bragg grating 2820b within the next group 2810b of bragg gratings. In a preferred embodiment, the optical TDM reflector 2645 includes 48 groups 2810 of bragg gratings each having corresponding center wavelengths ranging from $\lambda_1$ to $\lambda_{48}$.

Figure 28A:
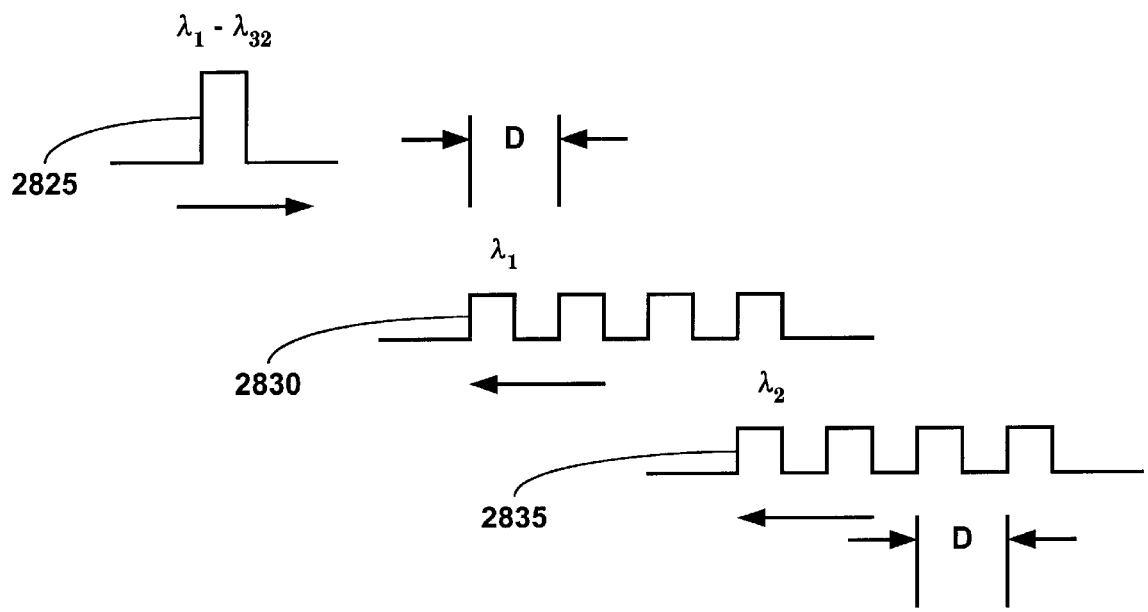
FIG. 28a is a timing diagram illustrating the operation of the optical TDM reflector of FIG. 28.

As illustrated in FIG. 28a, during operation of the optical TDM reflector 2645, in a preferred embodiment, an incident pulse of light 2825 including center wavelengths $\lambda_1$ to $\lambda_{32}$ conveyed by the optical conductor 2805 is partially reflected within each of the groups 2810 of bragg gratings as a function of the center wavelength of the particular group 2810 of bragg gratings. For example, incident lightwaves having a center wavelength of $\lambda_1$ are partially reflected at each of the bragg gratings within the group 2810a of bragg gratings. In this manner, a first group of reflected pulses 2830 of light having a center wavelength of $\lambda_1$ and spaced apart by a distance D are transmitted back towards the bidirectional optical amplifier 2635. Incident lightwaves having a center wavelength of $\lambda_2$ are then partially reflected at each of the bragg gratings within the group 2810b of bragg gratings. In this manner, a second group of reflected pulses 2835 of light having a center wavelength of $\lambda_2$ and spaced apart by a distance D are transmitted back towards the bidirectional optical amplifier 2635. More generally, the optical TDM reflector 2645 preferably receives a single pulse of light having a plurality of center wavelengths and generates a plurality of groups of reflected pulses of light, with pulses within each group spaced apart by a distance D, having corresponding center wavelengths that are transmitted back towards the bidirectional optical amplifier 2635. In this manner, the optical TDM reflector 2645 preferably time division multiplexes the reflected pulses of light.

The optical conductor 2650 is coupled to the optical circulator 2625 and the optical splitter 2655. The optical conductor 2650 is preferably adapted to convey light waves between the optical circulator 2625 and the optical splitter 2655. The optical conductor 2650 may be any number of conventional commercially available optical conductors. In a preferred embodiment, the optical conductor 2650 is a single mode optical fiber, part number SMF-28, available from Corning Inc., in order to optimally provide lightwave transmission.

The optical splitter 2655 is coupled to the optical conductor 2650 and the optical conductors 2660. The optical splitter 2655 is preferably adapted to split pulses of light conveyed from the optical conductor 2650 into a plurality of pulses of light having substantially the same composition of center wavelengths. In this manner, pulses of light having the same wavelength characteristics are provided to a plurality of downstream optical devices. The optical splitter 2655 may be any number of conventional commercially available optical splitters. In a preferred embodiment, the optical splitter 2655 is a 1×N cascaded optical coupler, available from Kaifa Technologies, in order to optimally provide distribution of optical power.

The optical conductors 2660 are coupled to the optical splitter 2655 and corresponding optical conductors 2510. The optical conductors 2660 are preferably adapted to convey light waves between corresponding outputs of the optical splitter 2655 and corresponding optical conductors 2510. The optical conductors 2660 may be any number of conventional commercially available optical conductors. In a preferred embodiment, the optical conductor 2660 are single mode optical fibers, part number SMF-28, available from Corning Inc. in order to optimally provide lightwave propagation.

Figure 26B:
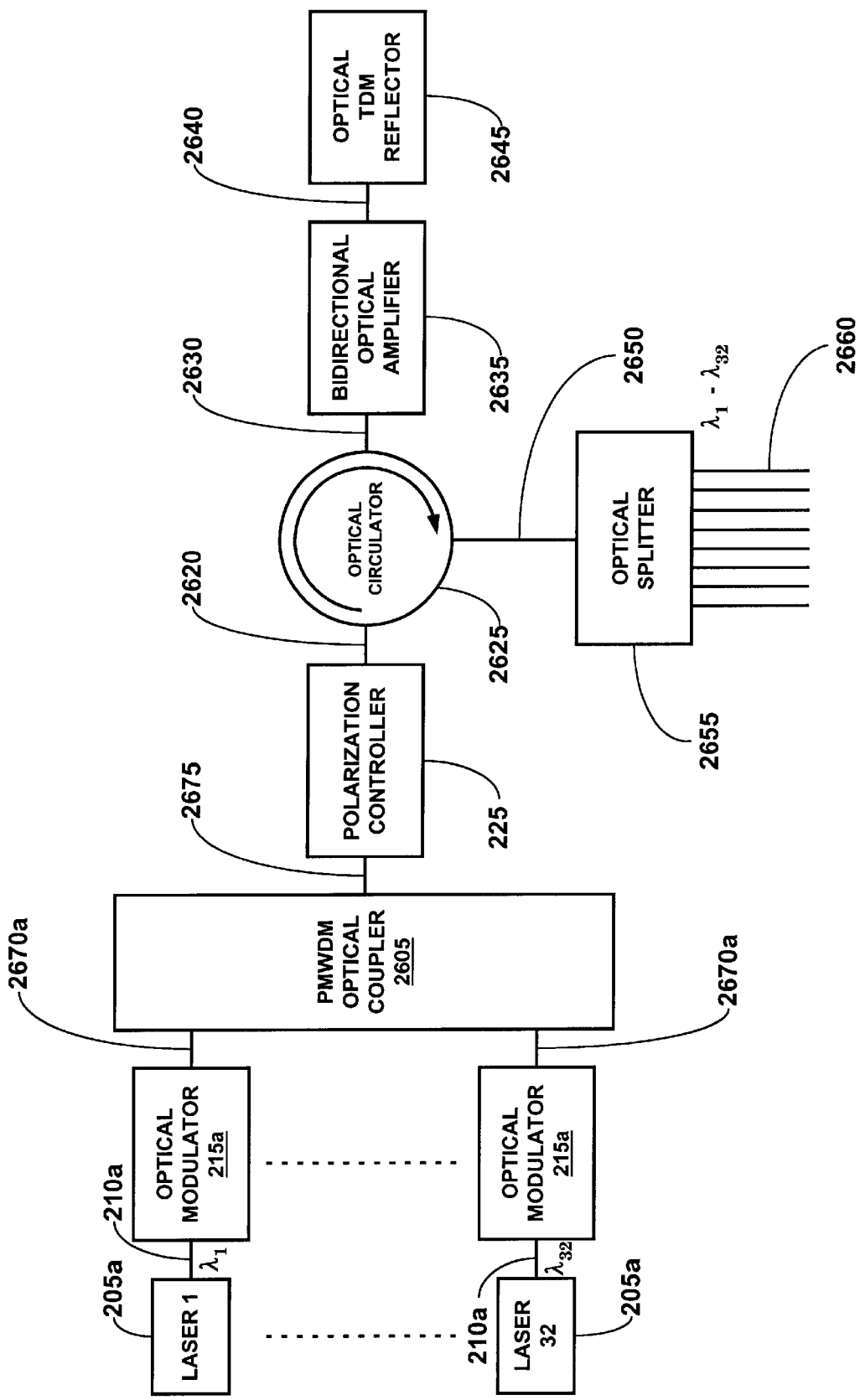
FIG. 26b is a schematic diagram of an alternative embodiment of the optical source of the optical sensing system of FIG. 25.

Referring to FIG. 26b, in an alternative embodiment of the optical source 2505, a plurality of optical modulators 215 are coupled to and positioned upstream of the PMWDM optical coupler 2605 and coupled to the outputs of corresponding lasers 205. In this manner, the operation of the optical source 2505 optimally provides a high extinction ratio pulsed output.

The optical conductors 2510 are coupled to corresponding optical conductors 2660 of the optical source 2505 and one or more corresponding optical interfaces 2515. The optical conductors 2510 are preferably adapted to convey light waves between corresponding optical conductors 2660 of the optical source 2505 and corresponding optical interfaces 2515. The optical conductors 2510 may be any number of conventional commercially available optical conductors. In a preferred embodiment, the optical conductors 2510 are single mode optical fibers, part number SMF-28, available from Corning Inc. in order to optimally provide lightwave propagation.

Figure 29:
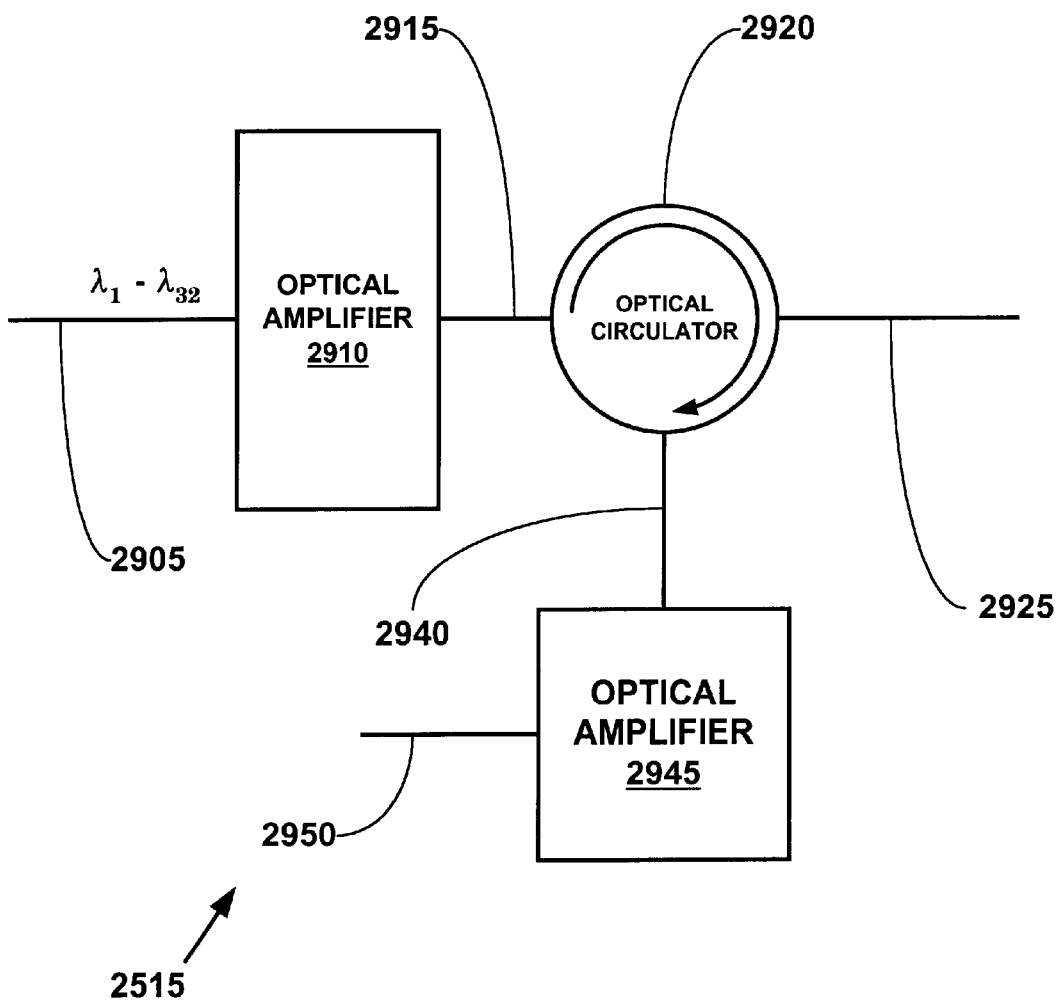
FIG. 29 is a schematic diagram of the optical interface of the optical sensing system of FIG. 25.

The optical interface 2515 is coupled to the corresponding optical conductor 2510. The optical interface 2515 is preferably adapted to: convey lightwaves from the corresponding optical conductor 2510, convey lightwaves to and from the optical conductors 2520a, 2520b, and 2520c, and convey lightwaves to the optical conductor 2530. In a preferred embodiment, as illustrated in FIG. 29, the optical interface 2515 includes an optical conductor 2905, an optical amplifier 2910, an optical conductor 2915, an optical circulator 2920, an optical conductor 2925, an optical conductor 2940, an optical amplifier 2945, and an optical conductor 2950.

The optical conductor 2005 is coupled to the corresponding optical conductor 2510 and the optical amplifier 2910. The optical conductor 2905 is preferably adapted to convey lightwaves between the corresponding optical conductor 2510 and the optical amplifier 2910. The optical conductor 2905 may be any number of conventional commercially available optical conductors. In a preferred embodiment, the optical conductor 2905 is a single mode optical fiber, part number SMF-28, available from Corning Inc. in order to optimally provide lightwave propagation.

Figure 30:
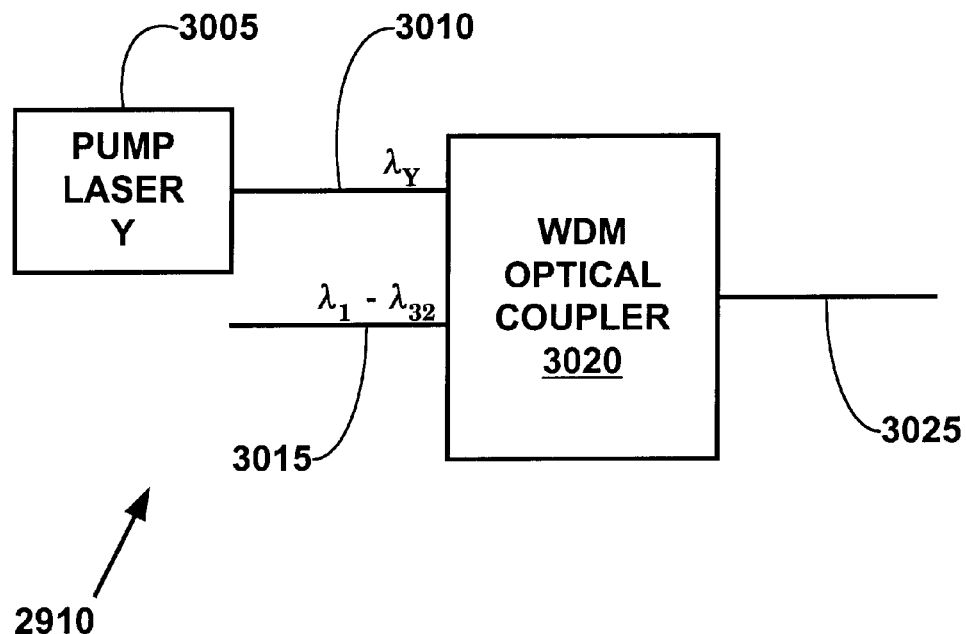
FIG. 30 is a schematic diagram of one of the optical amplifiers of the optical interface of FIG. 29.

The optical amplifier 2910 is coupled to the optical conductor 2905 and the optical conductor 2915. The optical amplifier 2910 is preferably adapted to amplify the energy level of lightwaves passing through the optical amplifier 2910. In a preferred embodiment, as illustrated in FIG. 30, the optical amplifier 2910 includes a pump laser Y 3005, an optical conductor 3010, and optical conductor 3015, a WDM optical coupler 3020, and an optical conductor 3025.

The pump laser Y 3005 is coupled to the optical conductor 3010. The pump laser Y 3005 is preferably adapted to controllably generate lightwaves having a center wavelength $\lambda_Y$. In a preferred embodiment, the center wavelength $\lambda_Y$ is outside the range of center wavelengths $\lambda_1$ to $\lambda_{32}$. In this manner, the injection of the lightwaves having the center wavelength $\lambda_Y$ does not affect the operation of the system 2500. The pump laser Y 3005 may be any number of conventional commercially available pump lasers. In a preferred embodiment, the pump laser Y 3005 is a model FLD148G3NL-E laser available from Fujitsu and generates lightwaves having a center wavelength of about 1480 nm.

The optical conductor 3010 is coupled to the pump laser Y 3005 and the WDM optical coupler 3020. The optical conductor 3010 is preferably adapted to convey lightwaves between the pump laser Y 3005 and the WDM optical coupler 3020. The optical conductor 3010 may be any number of conventional commercially available optical conductors. In a preferred embodiment, the optical conductor 3010 is a single mode optical fiber, part number SMF-28, available from Corning Inc. in order to optimally provide lightwave propagation.

The optical conductor 3015 is coupled to the optical conductor 2905 and the WDM optical coupler 3020. The optical conductor 3015 is preferably adapted to convey lightwaves between the optical conductor 2905 and the WDM optical coupler 3020. The optical conductor 3015 may be any number of conventional commercially available optical conductors. In a preferred embodiment, the optical conductor 3015 is a single mode optical fiber, part number SMF-28, available from Corning Inc. in order to optimally provide lightwave propagation.

The WDM optical coupler 3020 is coupled to the optical conductors 3010, 3015, and 3025. The WDM optical coupler 3020 is preferably adapted to receive and combine lightwaves received from the optical conductors 3010 and 3015 and transmit the combined lightwaves to the optical conductor 3025. The WDM optical coupler 3020 may be any number of conventional WDM optical couplers. In a preferred embodiment, the WDM optical coupler 3020 is a FWDMA0 WDM optical coupler available from E-Tek Dynamics in order to optimally provide low loss insertion of pump power.

The optical conductor 3025 is coupled to the WDM optical coupler 3020 and the optical conductor 2915. The optical conductor 3025 is preferably adapted to convey lightwaves between the WDM optical coupler 3020 and the optical conductor 2915. In a preferred embodiment, the optical conductor 3025 is adapted to amplify the energy level of lightwaves traveling within the optical conductor 3025 when the optical conductor 3025 is excited by lightwaves from a pump laser. In a preferred embodiment, the optical conductor 3025 is adapted to amplify the energy level of lightwaves traveling within the optical conductor 3025 when the optical conductor is excited by lightwaves having a center wavelength $\lambda_Z$ from the pump laser Z 3005. In a preferred embodiment, the optical conductor 3025 is an erbium doped optical fiber available from 3M Speciality Optical Fibers in order to optimally provide an optical gain medium.

During operation of the optical amplifier 2910, lightwaves conveyed by the optical conductor 3015 are preferably amplified within the optical conductor 3025. The amplified lightwaves are then conveyed to the optical circulator 2920 by the optical conductor 2915.

The optical conductor 2915 is coupled to the optical conductor 3025 and the optical circulator 2920. The optical conductor 2915 is preferably adapted to convey lightwaves between the optical conductor 3025 and the optical circulator 2920. The optical conductor 2915 may be any number of conventional commercially available optical conductors. In a preferred embodiment, the optical conductor 2915 is a single mode optical fiber, part number SMF-28, available from Corning Inc. in order to optimally provide lightwave propagation.

The optical circulator 2920 is coupled to the optical conductors 2915, 2925 and 2940. The optical circulator 2920 is preferably adapted to convey lightwaves from the optical conductor 2915, convey lightwaves to and from the optical conductor 2925, and convey lightwaves to the optical conductor 2940. The optical circulator 2920 may be any number of conventional commercially available optical circulators. In a preferred embodiment, the optical circulator 2920 is a 3-port optical circulator available from Kaifa Technologies in order to optimally provide optical isolation and directivity.

The optical conductor 2925 is coupled to the optical circulator 2920 and the optical conductor 2520. The optical conductor 2925 is preferably adapted to convey lightwaves between the optical circulator 2920 and the optical conductor 2520. The optical conductor 2925 may be any number of conventional commercially available optical conductors. In a preferred embodiment, the optical conductor 2925 is a single mode optical fiber, part number SMF-28, available from Corning Inc. in order to optimally provide lightwave propagation.

The optical conductor 2940 is coupled to the optical circulator 2920 and the optical amplifier 2945. The optical conductor 2940 is preferably adapted to convey lightwaves between the optical circulator 2920 and the optical amplifier 2945. The optical conductor 2940 may be any number of conventional commercially available optical conductors. In a preferred embodiment, the optical conductor 2940 is a single mode optical fiber, part number SMF-28, available from Corning Inc. in order to optimally provide lightwave propagation.

Figure 31:
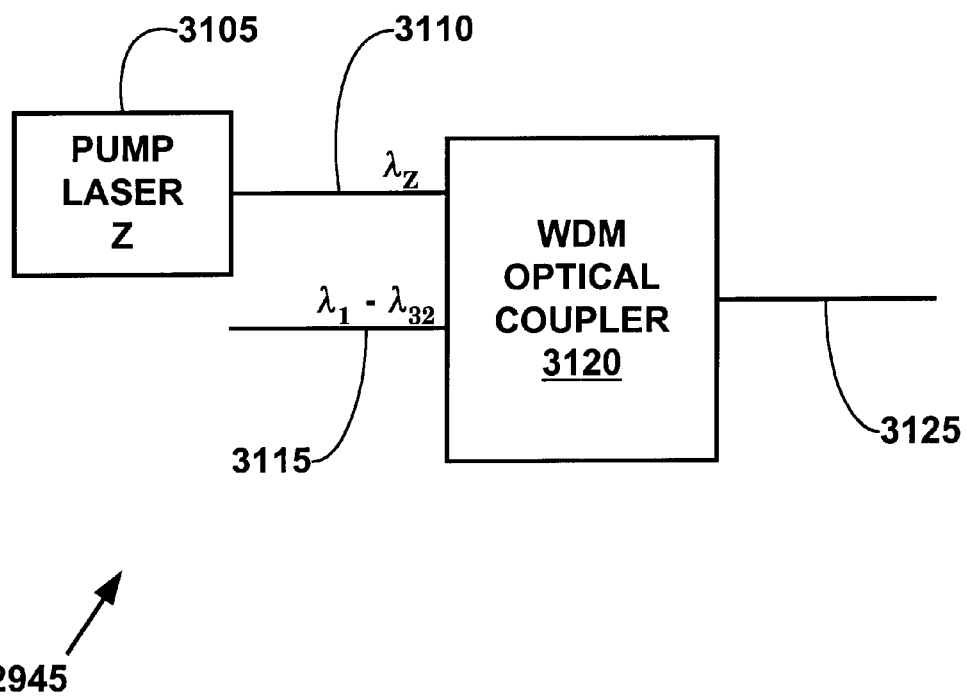
FIG. 31 is a schematic diagram of another one of the optical amplifiers of the optical interface of FIG. 29.

The optical amplifier 2945 is coupled to the optical conductor 2940 and the optical conductor 2950. The optical amplifier 2945 is preferably adapted to amplify the energy level of lightwaves passing through the optical amplifier 2945. In a preferred embodiment, as illustrated in FIG. 31, the optical amplifier 2945 includes a pump laser Z 3105, an optical conductor 3110, an optical conductor 3115, a WDM optical coupler 3120, and an optical conductor 3125.

The pump laser Z 3105 is coupled to the optical conductor 3110. The pump laser Z 3105 is preferably adapted to controllably generate lightwaves having a center wavelength $\lambda_Z$. In a preferred embodiment, the center wavelength $\lambda_Z$ is outside the range of center wavelengths $\lambda_1$ to $\lambda_{32}$. In this manner, the injection of the lightwaves having the center wavelength $\lambda_Z$ does not affect the operation of the system 2500. The pump laser Z 3105 may be any number of conventional commercially available pump lasers. In a preferred embodiment, the pump laser Z 3105 is a model FLD148G3NL-E laser available from Fujistu and generates lightwaves having a center wavelength of about 1480 nm.

The optical conductor 3110 is coupled to the pump laser Z 3105 and the WDM optical coupler 3120. The optical conductor 3110 is preferably adapted to convey lightwaves between the pump laser Z 3105 and the WDM optical coupler 3120. The optical conductor 3110 may be any number of conventional commercially available optical conductors. In a preferred embodiment, the optical conductor 3110 is a single mode optical fiber, part number SMF-28, available from Corning Inc. in order to optimally provide lightwave propagation.

The optical conductor 3115 is coupled to the optical conductor 2940 and the WDM optical coupler 3120. The optical conductor 3115 is preferably adapted to convey lightwaves between the optical conductor 2940 and the WDM optical coupler 3126. The optical conductor 3115 may be any number of conventional commercially available optical conductors. In a preferred embodiment, the optical conductor 3115 is a single mode optical fiber, part number SMF-28, available from Corning Inc. in order to optimally provide lightwave propagation.

The WDM optical coupler 3120 is coupled to the optical conductors 3110, 3115, and 3125. The WDM optical coupler 3120 is preferably adapted to receive and combine lightwaves received from the optical conductors 3110 and 3115 and transmit the combined lightwaves to the optical conductor 3125. The WDM optical coupler 3120 may be any number of conventional WDM optical couplers. In a preferred embodiment, the WDM optical coupler 3120 is a FWDMA0 WDM optical coupler available from E-Tek Dynamics in order to optimally provide low loss insertion of pump power.

The optical conductor 3125 is coupled to the WDM optical coupler 3120 and the optical conductor 2950. The optical conductor 3125 is preferably adapted to convey lightwaves between the WDM optical coupler 3120 and the optical conductor 2950. In a preferred embodiment, the optical conductor 3125 is adapted to amplify the energy level of lightwaves traveling within the optical conductor 3125 when the optical conductor 3125 is excited by lightwaves from a pump laser. In a preferred embodiment, the optical conductor 3125 is adapted to amplify the energy level of lightwaves traveling within the optical conductor 3125 when the optical conductor is excited by lightwaves having a center wavelength z from the pump laser Z 3105. In a preferred embodiment, the optical conductor 3125 is an erbium doped optical fiber available from 3M Speciality Optical Fibers in order to optimally provide an optical gain medium.

During operation of the optical amplifier 2945, lightwaves conveyed by the optical conduct or 3115 are preferably amplified within the optical conductor 3125. The amplified lightwaves are then conveyed to the optical conductor 2530 by the optical conductor 2950.

The optical conductor 2950 is coupled to the optical amplifier 2945 and the optical conductor 2530. The optical conductor 2915 is preferably adapted to convey lightwaves between the optical amplifier 2945 and the optical conductor 2530. The optical conductor 2950 may be any number of conventional commercially available optical conductors. In a preferred embodiment, the optical conductor 2950 is a single mode optical fiber, part number SMF-28, available from Corning Inc. in order to optimally provide lightwave propagation.

The optical conductor 2520 is coupled to the optical conductor 2925 and the optical sensors 2525. The optical conductor 2520 is preferably adapted to convey lightwaves between the optical conductor 2925 and the optical sensors 2525. The optical conductors 2520 may be any number of conventional commercially available optical conductors. In a preferred embodiment, the optical conductors 2520 are single mode optical fibers, part number SMF-28, available from Corning Inc. in order to optimally provide lightwave propagation.

Figure 32A:
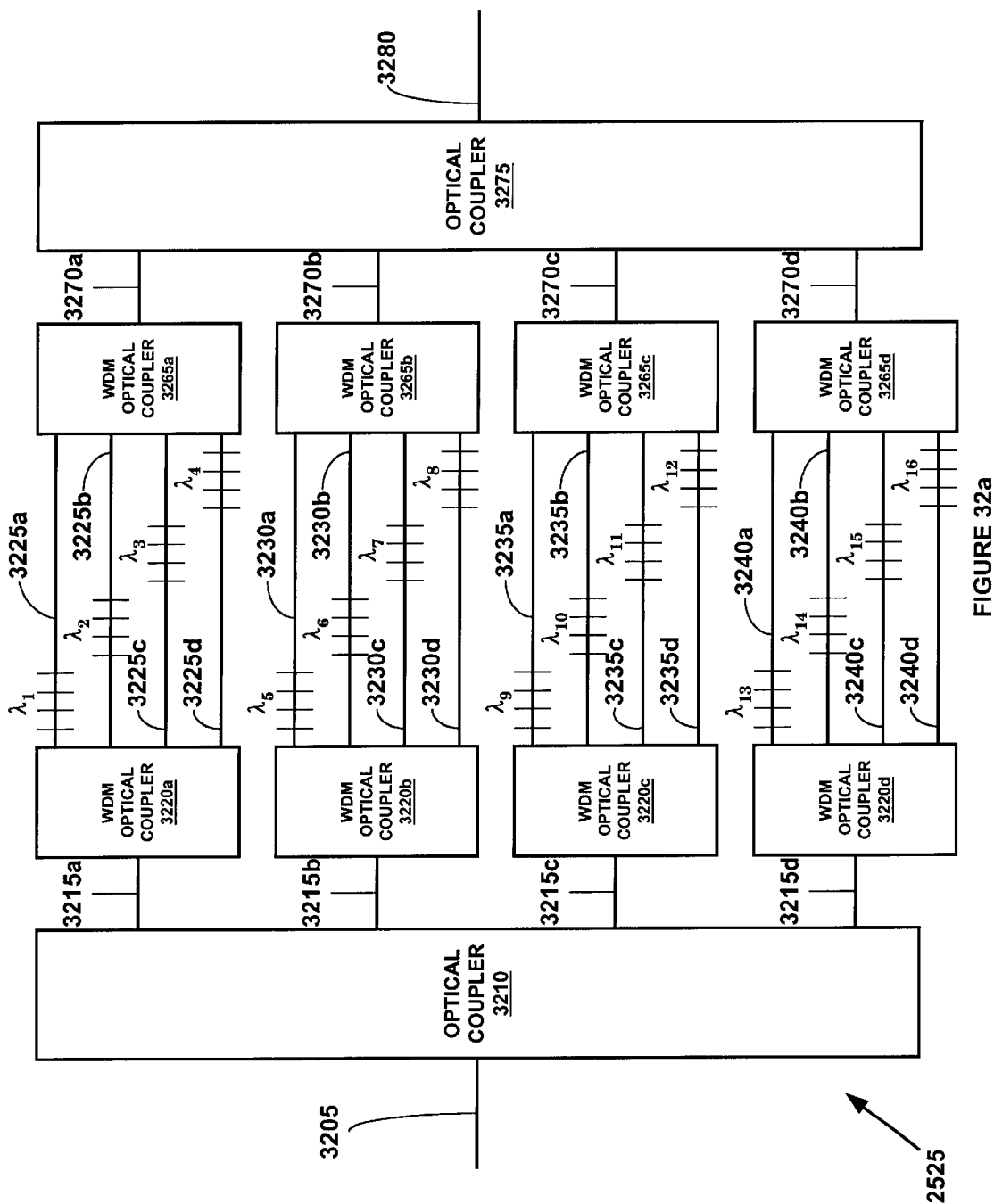
FIG. 32a is a schematic diagram of one of the optical sensors of the optical sensing system of FIG. 25.
Figure 32B:
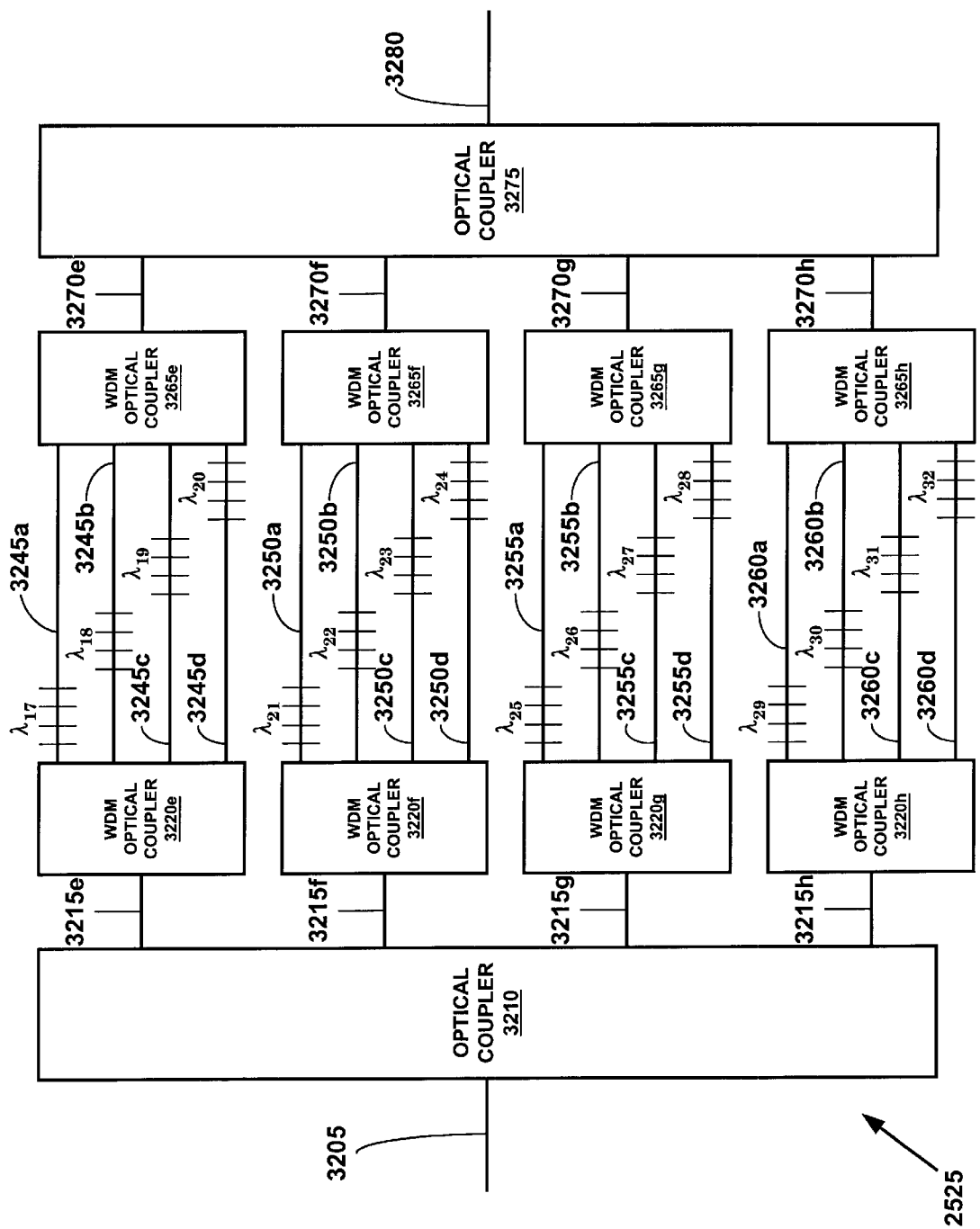
FIG. 32b is a schematic diagram of another one of the optical sensors of the optical sensing system of FIG. 25.

The optical sensors 2525 are coupled to the optical conductor 2520. The optical sensors 2525 are preferably adapted to receive pulses of light from the optical conductor 2520 and generate reflected pulses of light representative of the operating conditions sensed by the optical sensors 2525. In a preferred embodiment, as illustrated in FIGS. 32a and 32b, the optical sensors 2525 include an optical conductor 3205, an optical coupler 3210, optical conductors 3215a, 3215b, 3215c, 3215d, 3215e, 3215f, 3215g, and 3215h, WDM optical couplers 3220a, 3220b, 3220c, 3220d, 3220e, 3220f, 3220g, and 3220h, optical conductors 3225a, 3225b, 3225c, and 3225d, optical conductors 3230a, 3230b, 3230c, and 3230d, optical conductors 3235a, 3235b, 3235c, and 3235d, optical conductors 3240a, 3240b, 3240c, and 3240d, optical conductors 3245a, 3245b, 3245c, and 3245d, optical conductors 3250a, 3250b, 3250c, and 3250d, optical conductors 3255a, 3255b, 3255c, and 3255d, optical conductors 3260a, 3260b, 3260c, and 3260d, WDM optical couplers 3265a, 3265b, 3265c, 3265d, 3265e, 3265f, 3265g, and 3265h, optical conductors 3270a, 3270b, 3270c, 3270d, 3270e, 3270f, 3270g, and 3270h, optical coupler 3275, and optical conductor 3280.

The optical conductor 3205 is coupled to the optical conductor 2520 and the optical coupler 3210. The optical conductor 3205 is preferably adapted to convey lightwaves between the optical conductor 2520a and the optical coupler 3210. The optical conductor 3205 may be any number of conventional commercially available optical conductors. In a preferred embodiment, the optical conductor 3205 is a single mode optical fiber, part number SMF-28, available from Corning Inc. in order to optimally provide lightwave propagation.

The optical coupler 3210 is coupled to the optical conductor 3205 and the optical conductors 3215a, 3215b, 3215c, 3215d, 3215e, 3215f, 3215g, and 3215h. The optical coupler is preferably adapted to convey lightwaves between the optical conductor 3205 and the optical conductors 3215a, 3215b, 3215c, 3215d, 3215e, 3215f, 3215g, and 3215h. The optical coupler 3210 may be any number of conventional commercially available optical couplers. In a preferred embodiment, the optical coupler 3210 is a 32-channel Polar Wave Optical Slicer 100-1600G, available from Chorum Technologies in order to optimally provide distribution of optical signals as a function of wavelength.

The optical conductors 3215a, 3215b, 3215c, 3215d, 3215e, 3215f, 3215g, and 3215h are coupled to the optical coupler 3210 and the WDM optical couplers 3220a, 3220b, 3220c, 3220d, 3220e, 3220f, 3220g, and 3220h, respectively. The optical conductors 3215a, 3215b, 3215c, 3215d, 3215e, 3215f, 3215g, and 3215h are preferably adapted to convey lightwaves between the optical coupler 3210 and the WDM optical couplers 3220a, 3220b, 3220c, 3220d, 3220e, 3220f, 3220g, and 3220h, respectively. The optical conductors 3215a, 3215b, 3215c, 3215d, 3215e, 3215f, 3215g, and 3215h may be any number of conventional commercially available optical conductors. In a preferred embodiment, the optical conductors 3215a, 3215b, 3215c, 3215d, 3215e, 3215f, 3215g, and 3215h are single mode optical fibers, part number SMF-28, available from Corning Inc. in order to optimally provide lightwave propagation.

The WDM optical coupler 3220a is coupled to the optical conductor 3215a and the optical conductors 3225a, 3225b, 3225c and 3225d. The WDM optical coupler 3220a is preferably adapted to convey lightwaves between the optical conductor 3215a and the optical conductors 3225a, 3225b, 3225c and 3225d. In a preferred embodiment, the WDM optical coupler 3220a conveys lightwaves to and from the optical conductors 3225a, 3225b, 3225c and 3225d having center wavelengths $\lambda_1$, $\lambda_2$, $\lambda_3$, and $\lambda_4$, respectively. The WDM optical coupler 3220a may be any number of conventional commercially available WDM optical couplers. In a preferred embodiment, the WDM optical coupler 3220a is a 4-channel Polar Wave Optical Slicer 100-200G, available from Chorum Technologies, in order to optimally provide distribution of signals as a function of wavelength.

The WDM optical coupler 3220b is coupled to the optical conductor 3215b and the optical conductors 3230a, 3230b, 3230c and 3230d. The WDM optical coupler 3220b is preferably adapted to convey lightwaves between the optical conductor 3215b and the optical conductors 3230a, 3230b, 3230c and 3230d. In a preferred embodiment, the WDM optical coupler 3220b conveys lightwaves to and from the optical conductors 3230a, 3230b, 3230c and 3230d having center wavelengths $\lambda_5$, $\lambda_6$, $\lambda_7$, and $\lambda_8$, respectively. The WDM optical coupler 3220b may be any number of conventional commercially available WDM optical couplers. In a preferred embodiment, the WDM optical coupler 3220b is a 4-channel Polar Wave Optical Slicer 100-200G, available from Chorum Technologies, in order to optimally provide distribution of signals as a function of wavelength.

The WDM optical coupler 3220c is coupled to the optical conductor 3215c and the optical conductors 3235a, 3235b, 3235c and 3235d. The WDM optical coupler 3220c is preferably adapted to convey lightwaves between the optical conductor 3215c and the optical conductors 3235a, 3235b, 3235c and 3235d. In a preferred embodiment, the WDM optical coupler 3220c conveys lightwaves to and from the optical conductors 3235a, 3235b, 3235c and 3235d having center wavelengths $\lambda_9$, $\lambda_{10}$, $\lambda_{11}$, and $\lambda_{12}$, respectively. The WDM optical coupler 3220c may be any number of conventional commercially available WDM optical couplers. In a preferred embodiment, the WDM optical coupler 3220c is a 4-channel Polar Wave Optical Slicer 100-200G, available from Chorum Technologies, in order to optimally provide distribution of signals as a function of wavelength.

The WDM optical coupler 3220d is coupled to the optical conductor 3215d and the optical conductors 3240a, 3240b, 3240c and 3240d. The WDM optical coupler 3220d is preferably adapted to convey lightwaves between the optical conductor 3215d and the optical conductors 3240a, 3240b, 3240c and 3240d. In a preferred embodiment, the WDM optical coupler 3220d conveys lightwaves to and from the optical conductors 3240a, 3240b, 3240c and 3240d having center wavelengths $\lambda_{13}$, $\lambda_{14}$, $\lambda_{15}$, and $\lambda_{16}$, respectively. The WDM optical coupler 3220d may be any number of conventional commercially available WDM optical couplers. In a preferred embodiment, the WDM optical coupler 3220d is a 4-channel Polar Wave Optical Slicer 100-200G, available from Chorum Technologies, in order to optimally provide distribution of signals as a function of wavelength.

The WDM optical coupler 3220e is coupled to the optical conductor 3215e and the optical conductors 3245a, 3245b, 3245c and 3245d. The WDM optical coupler 3220e is preferably adapted to convey lightwaves between the optical conductor 3215e and the optical conductors 3245a, 3245b, 3245c and 3245d. In a preferred embodiment, the WDM optical coupler 3220e conveys lightwaves to and from the optical conductors 3245a, 3245b, 3245c and 3245d having center wavelengths $\lambda_{17}$, $\lambda_{18}$, $\lambda_{19}$, and $\lambda_{20}$, respectively. The WDM optical coupler 3220e may be any number of conventional commercially available WDM optical couplers. In a preferred embodiment, the WDM optical coupler 3220e is a 4-channel Polar Wave Optical Slicer 100-200G, available from Chorum Technologies, in order to optimally provide distribution of signals as a function of wavelength.

The WDM optical coupler 3220f is coupled to the optical conductor 3215f and the optical conductors 3250a, 3250b, 3250c and 3250d. The WDM optical coupler 3220f is preferably adapted to convey lightwaves between the optical conductor 3215f and the optical conductors 3250a, 3250b, 3250c and 3250d. In a preferred embodiment, the WDM optical coupler 3220f conveys lightwaves to and from the optical conductors 3250a, 3250b, 3250c and 3250d having center wavelengths $\lambda_{21}$, $\lambda_{22}$, $\lambda_{22}$, and $\lambda_{24}$, respectively. The WDM optical coupler 3220f may be any number of conventional commercially available WDM optical couplers. In a preferred embodiment, the WDM optical coupler 3220f is a 4-channel Polar Wave Optical Slicer 100-200G, available from Chorum Technologies, in order to optimally provide distribution of signals as a function of wavelength.

The WDM optical coupler 3220g is coupled to the optical conductor 3215g and the optical conductors 3255a, 3255b, 3255c and 3255d. The WDM optical coupler 3220g is preferably adapted to convey lightwaves between the optical conductor 3215g and the optical conductors 3255a, 3255b, 3255c and 3255d. In a preferred embodiment, the WDM optical coupler 3220g conveys lightwaves to and from the optical conductors 3255a, 3255b, 3255c and 3255d having center wavelengths $\lambda_{25}$, $\lambda_{26}$, $\lambda_{27}$, and $\lambda_{28}$, respectively. The WDM optical coupler 3220g may be any number of conventional commercially available WDM optical couplers. In a preferred embodiment, the WDM optical coupler 3220g is a 4-channel Polar Wave Optical Slicer 100-200G, available from Chorum Technologies, in order to optimally provide distribution of signals as a function of wavelength.

The WDM optical coupler 3220h is coupled to the optical conductor 3215h and the optical conductors 3260a, 3260b, 3260c and 3260d. The WDM optical coupler 3220h is preferably adapted to convey lightwaves between the optical conductor 3215h and the optical conductors 3260a, 3260b, 3260c and 3260d. In a preferred embodiment, the WDM optical coupler 3220h conveys lightwaves to and from the optical conductors 3260a, 3260b, 3260c and 3260d having center wavelengths $\lambda_{29}$, $\lambda_{30}$, $\lambda_{31}$, and $\lambda_{32}$, respectively. The WDM optical coupler 3220h may be any number of conventional commercially available WDM optical couplers. In a preferred embodiment, the WDM optical coupler 3220h is a 4-channel Polar Wave Optical Slicer 100-200G, available from Chorum Technologies, in order to optimally provide distribution of signals as a function of wavelength.

The optical conductor 3225a is coupled to the WDM optical coupler 3220a and the WDM optical coupler 3265a. The optical conductor 3225a is preferably adapted to convey lightwaves to and from the WDM optical coupler 3220a and the WDM optical coupler 3265a. The optical conductor 3225a may be any number of conventional commercially available optical conductors. In a preferred embodiment, the optical conductor 3225a is a single mode optical fiber, part number SMF-28, available from Corning Inc. in order to optimally provide lightwave transmission.

In a preferred embodiment, the optical conductor 3225a includes one or more bragg gratings each having a center wavelength of $\lambda_1$. In a preferred embodiment, the bragg gratings within the optical conductor 3225a are separated by an axial distance D. The bragg gratings may be formed within the optical conductor 3225a using any number of conventional commercially available methods for forming bragg gratings. In a preferred embodiment, the bragg gratings are formed within the optical conductor 3225a by the process of phase masking in order to optimally provide wavelength selective partial reflection.

In a preferred embodiment, each of the bragg gratings in the optical conductor 3225a reflect a portion of incident lightwaves having a center wavelength of $\lambda_1$. In a preferred embodiment, each of the bragg gratings in the optical conductor 3225a reflect about 0.85 to 1.05% of incident lightwaves having a center wavelength of $\lambda_1$. In a preferred embodiment, during operation of the system 2500, variations in the axial spacing between adjacent bragg gratings are detected and correlated to environmental conditions. In a preferred embodiment, optical hydrophones are thereby provided within the optical conductor 3225a that are each defined by adjacent bragg gratings and the corresponding intermediate section of the optical conductor 3225a.

The optical conductor 3225b is coupled to the WDM optical coupler 3220a and the WDM optical coupler 3265a. The optical conductor 3225b is preferably adapted to convey lightwaves to and from the WDM optical coupler 3220a and the WDM optical coupler 3265a. The optical conductor 3225b may be any number of conventional commercially available optical conductors. In a preferred embodiment, the optical conductor 3225b is a single mode optical fiber, part number SMF-28, available from Corning Inc. in order to optimally provide lightwave transmission.

In a preferred embodiment, the optical conductor 3225b includes one or more bragg gratings each having a center wavelength of $\lambda_2$. In a preferred embodiment, the bragg gratings within the optical conductor 3225b are separated by an axial distance D. The bragg gratings may be formed within the optical conductor 3225b using any number of conventional commercially available methods for forming bragg gratings. In a preferred embodiment, the bragg gratings are formed within the optical conductor 3225b by the process of phase masking in order to optimally provide wavelength selective partial reflection.

In a preferred embodiment, each of the bragg gratings in the optical conductor 3225b reflect a portion of incident lightwaves having a center wavelength of $\lambda_2$. In a preferred embodiment, each of the bragg gratings in the optical conductor 3225b reflect about 0.85 to 1.05% of incident lightwaves having a center wavelength of $\lambda_2$. In a preferred embodiment, during operation of the system 2500, variations in the axial spacing between adjacent bragg gratings are detected and correlated to environmental conditions. In a preferred embodiment, optical hydrophones are thereby provided within the optical conductor 3225b that are each defined by adjacent bragg gratings and the corresponding intermediate section of the optical conductor 3225b.

The optical conductor 3225c is coupled to the WDM optical coupler 3220a and the WDM optical coupler 3265a. The optical conductor 3225c is preferably adapted to convey lightwaves to and from the WDM optical coupler 3220a and the WDM optical coupler 3265a. The optical conductor 3225c may be any number of conventional commercially available optical conductors. In a preferred embodiment, the optical conductor 3225c is a single mode optical fiber, part number SMF-28, available from Corning Inc. in order to optimally provide lightwave transmission.

In a preferred embodiment, the optical conductor 3225c includes one or more bragg gratings each having a center wavelength of $\lambda_3$. In a preferred embodiment, the bragg gratings within the optical conductor 3225c are separated by an axial distance D. The bragg gratings may be formed within the optical conductor 3225c using any number of conventional commercially available methods for forming bragg gratings. In a preferred embodiment, the bragg gratings are formed within the optical conductor 3225c by the process of phase masking in order to optimally provide wavelength selective partial reflection.

In a preferred embodiment, each of the bragg gratings in the optical conductor 3225c reflect a portion of incident lightwaves having a center wavelength of $\lambda_3$. In a preferred embodiment, each of the bragg gratings in the optical conductor 3225c reflect about 0.85 to 1.05% of incident lightwaves having a center wavelength of $\lambda_3$. In a preferred embodiment, during operation of the system 2500, variations in the axial spacing between adjacent bragg gratings are detected and correlated to environmental conditions. In a preferred embodiment, optical hydrophones are thereby provided within the optical conductor 3225c that are each defined by adjacent bragg gratings and the corresponding intermediate section of the optical conductor 3225c.

The optical conductor 3225d is coupled to the WDM optical coupler 3220a and the WDM optical coupler 3265a.

The optical conductor 3225d is preferably adapted to convey lightwaves to and from the WDM optical coupler 3220a and the WDM optical coupler 3265a. The optical conductor 3225d may be any number of conventional commercially available optical conductors. In a preferred embodiment, the optical conductor 3225d is a single mode optical fiber, part number SMF-28, available from Corning Inc. in order to optimally provide lightwave transmission.

In a preferred embodiment, the optical conductor 3225d includes one or more bragg gratings each having a center wavelength of $\lambda_4$. In a preferred embodiment, the bragg gratings within the optical conductor 3225d are separated by an axial distance D. The bragg gratings may be formed within the optical conductor 3225d using any number of conventional commercially available methods for forming bragg gratings. In a preferred embodiment, the bragg gratings are formed within the optical conductor 3225d by the process of phase masking in order to optimally provide wavelength selective partial reflection.

In a preferred embodiment, each of the bragg gratings in the optical conductor 3225d reflect a portion of incident lightwaves having a center wavelength of $\lambda_4$. In a preferred embodiment, each of the bragg gratings in the optical conductor 3225d reflect about 0.85 to 1.05% of incident lightwaves having a center wavelength of $\lambda_4$. In a preferred embodiment, during operation of the system 2500, variations in the axial spacing between adjacent bragg gratings are detected and correlated to environmental conditions. In a preferred embodiment, optical hydrophones are thereby provided within the optical conductor 3225d that are each defined by adjacent bragg gratings and the corresponding intermediate section of the optical conductor 3225d.

In a preferred embodiment, the bragg gratings provided in the optical conductors 3225a, 3225b, 3225c, and 3225d have different central wavelengths and do not overlap in the axial direction. In this manner, the optical sensors provided by the optical conductors 3225a, 3225b, 3225c, and 3225d and corresponding bragg gratings are both wave division multiplexed and time division multiplexed.

The optical conductor 3230a is coupled to the WDM optical coupler 3220b and the WDM optical coupler 3265b. The optical conductor 3230a is preferably adapted to convey lightwaves to and from the WDM optical coupler 3220b and the WDM optical coupler 3265b. The optical conductor 3230a may be any number of conventional commercially available optical conductors. In a preferred embodiment, the optical conductor 3230a is a single mode optical fiber, part number SMF-28, available from Corning Inc. in order to optimally provide lightwave transmission.

In a preferred embodiment, the optical conductor 3230a includes one or more bragg gratings each having a center wavelength of $\lambda_5$. In a preferred embodiment, the bragg gratings within the optical conductor 3230a are separated by an axial distance D. The bragg gratings may be formed within the optical conductor 3230a using any number of conventional commercially available methods for forming bragg gratings. In a preferred embodiment, the bragg gratings are formed within the optical conductor 3230a by the process of phase masking in order to optimally provide wavelength selective partial reflection.

In a preferred embodiment, each of the bragg gratings in the optical conductor 3230a reflect a portion of incident lightwaves having a center wavelength of $\lambda_5$. In a preferred embodiment, each of the bragg gratings in the optical conductor 3230a reflect about 0.85 to 1.05% of incident lightwaves having a center wavelength of $\lambda_5$. In a preferred embodiment, during operation of the system 2500, variations in the axial spacing between adjacent bragg gratings are detected and correlated to environmental conditions. In a preferred embodiment, optical hydrophones are thereby provided within the optical conductor 3230a that are each defined by adjacent bragg gratings and the corresponding intermediate section of the optical conductor 3230a.

The optical conductor 3230b is coupled to the WDM optical coupler 3220b and the WDM optical coupler 3265b. The optical conductor 3230b is preferably adapted to convey lightwaves to and from the WDM optical coupler 3220b and the WDM optical coupler 3265b. The optical conductor 3230b may be any number of conventional commercially available optical conductors. In a preferred embodiment, the optical conductor 3230b is a single mode optical fiber part number SMF-28, available from Corning Inc. in order to optimally provide lightwave transmission.

In a preferred embodiment, the optical conductor 3230b includes one or more bragg gratings each having a center wavelength of $\lambda_6$. In a preferred embodiment, the bragg gratings within the optical conductor 3230b are separated by an axial distance D. The bragg gratings may be formed within the optical conductor 3230b using any number of conventional commercially available methods for forming bragg gratings. In a preferred embodiment, the bragg gratings are formed within the optical conductor 3230b by the process of phase masking in order to optimally provide wavelength selective partial reflection.

In a preferred embodiment, each of the bragg gratings in the optical conductor 3230b reflect a portion of incident lightwaves having a center wavelength of $\lambda_6$. In a preferred embodiment, each of the bragg gratings in the optical conductor 3230b reflect about 0.85 to 1.05% of incident lightwaves having a center wavelength of $\lambda_5$. In a preferred embodiment, during operation of the system 2500, variations in the axial spacing between adjacent bragg gratings are detected and correlated to environmental conditions. In a preferred embodiment, optical hydrophones are thereby provided within the optical conductor 3230b that are each defined by adjacent bragg gratings and the corresponding intermediate section of the optical conductor 3230b.

The optical conductor 3230c is coupled to the WDM optical coupler 3220b and the WDM optical coupler 3265b. The optical conductor 3230c is preferably adapted to convey lightwaves to and from the WDM optical coupler 3220b and the WDM optical coupler 3265b. The optical conductor 3230c may be any number of conventional commercially available optical conductors. In a preferred embodiment, the optical conductor 3230c is a single mode optical fiber, part number SMF-28, available from Corning Inc. in order to optimally provide lightwave transmission.

In a preferred embodiment, the optical conductor 3230c includes one or more bragg gratings each having a center wavelength of $\lambda_7$. In a preferred embodiment, the bragg gratings within the optical conductor 3230c are separated by an axial distance D. The bragg gratings may be formed within the optical conductor 3230c using any number of conventional commercially available methods for forming bragg gratings. In a preferred embodiment, the bragg gratings are formed within the optical conductor 3230c by the process of phase masking in order to optimally provide wavelength selective partial reflection.

In a preferred embodiment, each of the bragg gratings in the optical conductor 3230c reflect a portion of incident lightwaves having a center wavelength of $\lambda_7$. In a preferred embodiment, each of the bragg gratings in the optical conductor 3230c reflect about 0.85 to 1.05% of incident lightwaves having a center wavelength of $\lambda_7$. In a preferred embodiment, during operation of the system 2500, variations in the axial spacing between adjacent bragg gratings are detected and correlated to environmental conditions. In a preferred embodiment, optical hydrophones are thereby provided within the optical conductor 3230c that are each defined by adjacent bragg gratings and the corresponding intermediate section of the optical conductor 3230c.

The optical conductor 3230d is coupled to the WDM optical coupler 3220b and the WDM optical coupler 3265b. The optical conductor 3230d is preferably adapted to convey lightwaves to and from the WDM optical coupler 3220b and the WDM optical coupler 3265b. The optical conductor 3230d may be any number of conventional commercially available optical conductors. In a preferred embodiment, the optical conductor 3230d is a single mode optical fiber, part number SMF-28, available from Corning Inc. in order to optimally provide lightwave transmission.

In a preferred embodiment, the optical conductor 3230d includes one or more bragg gratings each having a center wavelength of $\lambda_8$. In a preferred embodiment, the bragg gratings within the optical conductor 3230d are separated by an axial distance D. The bragg gratings may be formed within the optical conductor 3230d using any number of conventional commercially available methods for forming bragg gratings. In a preferred embodiment, the bragg gratings are formed within the optical conductor 3230d by the process of phase masking in order to optimally provide wavelength selective partial reflection.

In a preferred embodiment, each of the bragg gratings in the optical conductor 3230d reflect a portion of incident lightwaves having a center wavelength of $\lambda_8$. In a preferred embodiment, each of the bragg gratings in the optical conductor 3230d reflect about 0.85 to 1.05% of incident lightwaves having a center wavelength of $\lambda_8$. In a preferred embodiment, during operation of the system 2500, variations in the axial spacing between adjacent bragg gratings are detected and correlated to environmental conditions. In a preferred embodiment, optical hydrophones are thereby provided within the optical conductor 3230d that are each defined by adjacent bragg gratings and the corresponding intermediate section of the optical conductor 3230d.

In a preferred embodiment, the bragg gratings provided in the optical conductors 3230a, 3230b, 3230c, and 3230d have different central wavelengths and do not overlap in the axial direction. In this manner, the optical sensors provided by the optical conductors 3230a, 3230b, 3230c, and 3230d and corresponding bragg gratings are both wave division multiplexed and time division multiplexed.

The optical conductor 3235a is coupled to the WDM optical coupler 3220c and the WDM optical coupler 3265c. The optical conductor 3235a is preferably adapted to convey lightwaves to and from the WDM optical coupler 3220c and the WDM optical coupler 3265c. The optical conductor 3235a may be any number of conventional commercially available optical conductors. In a preferred embodiment, the optical conductor 3235a is a single mode optical fiber, part number SMF-28, available from Corning Inc. in order to optimally provide lightwave transmission.

In a preferred embodiment, the optical conductor 3235a includes one or more bragg gratings each having a center wavelength of $\lambda_9$. In a preferred embodiment, the bragg gratings within the optical conductor 3235a are separated by an axial distance D. The bragg gratings may be formed within the optical conductor 3235a using any number of conventional commercially available methods for forming bragg gratings. In a preferred embodiment, the bragg gratings are formed within the optical conductor 3235a by the process of phase masking in order to optimally provide wavelength selective partial reflection.

In a preferred embodiment, each of the bragg gratings in the optical conductor 3235a reflect a portion of incident lightwaves having a center wavelength of $\lambda_9$. In a preferred embodiment, each of the bragg gratings in the optical conductor 3235a reflect about 0.85 to 1.05% of incident lightwaves having a center wavelength of $\lambda_9$. In a preferred embodiment, during operation of the system 2500, variations in the axial spacing between adjacent bragg gratings are detected and correlated to environmental conditions. In a preferred embodiment, optical hydrophones are thereby provided within the optical conductor 3235a that are each defined by adjacent bragg gratings and the corresponding intermediate section of the optical conductor 3235a.

The optical conductor 3235b is coupled to the WDM optical coupler 3220c and the WDM optical coupler 3265c. The optical conductor 3235b is preferably adapted to convey lightwaves to and from the WDM optical coupler 3220c and the WDM optical coupler 3265c. The optical conductor 3235b may be any number of conventional commercially available optical conductors. In a preferred embodiment, the optical conductor 3235b is a single mode optical fiber, part number SMF-28, available from Corning Inc. in order to optimally provide lightwave transmission.

In a preferred embodiment, the optical conductor 3235b includes one or more bragg gratings each having a center wavelength of $\lambda_{10}$. In a preferred embodiment, the bragg gratings within the optical conductor 3235b are separated by an axial distance D. The bragg gratings may be formed within the optical conductor 3235b using any number of conventional commercially available methods for forming bragg gratings. In a preferred embodiment, the bragg gratings are formed within the optical conductor 3235b by the process of phase masking in order to optimally provide wavelength selective partial reflectivity.

In a preferred embodiment, each of the bragg gratings in the optical conductor 3235b reflect a portion of incident lightwaves having a center wavelength of $\lambda_{10}$. In a preferred embodiment, each of the bragg gratings in the optical conductor 3235b reflect about 0.85 to 1.05% of incident lightwaves having a center wavelength of $\lambda_{10}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3235b that are each defined by adjacent bragg gratings and the corresponding intermediate section of the optical conductor 3235b.

The optical conductor 3235c is coupled to the WDM optical coupler 3220c and the WDM optical coupler 3265c. The optical conductor 3235c is preferably adapted to convey lightwaves to and from the WDM optical coupler 3220c and the WDM optical coupler 3265c. The optical conductor 3235c may be any number of conventional commercially available optical conductors. In a preferred embodiment, the optical conductor 3235c is a single mode optical fiber, part number SMF-28, available from Corning Inc. in order to optimally provide lightwave transmission.

In a preferred embodiment, the optical conductor 3235c includes one or more bragg gratings each having a center wavelength of $\lambda_{11}$. In a preferred embodiment, the bragg gratings within the optical conductor 3235c are separated by an axial distance D. The bragg gratings may be formed within the optical conductor 3235c using any number of conventional commercially available methods for forming bragg gratings. In a preferred embodiment, the bragg gratings are formed within the optical conductor 3235c by the process of phase masking in order to optimally provide wavelength selective partial reflection.

In a preferred embodiment, each of the bragg gratings in the optical conductor 3235c reflect a portion of incident lightwaves having a center wavelength of $\lambda_{11}$. In a preferred embodiment, each of the bragg gratings in the optical conductor 3235c reflect about 0.85 to 1.05% of incident lightwaves having a center wavelength of $\lambda_{11}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3235c that are each defined by adjacent bragg gratings and the corresponding intermediate section of the optical conductor 3235c.

The optical conductor 3235d is coupled to the WDM optical coupler 3220c and the WDM optical coupler 3265c. The optical conductor 3235d is preferably adapted to convey lightwaves to and from the WDM optical coupler 3220c and the WDM optical coupler 3265c. The optical conductor 3235d may be any number of conventional commercially available optical conductors. In a preferred embodiment, the optical conductor 3235d is a single mode optical fiber, part number SMF-28, available from Corning Inc. in order to optimally provide lightwave transmission.

In a preferred embodiment, the optical conductor 3235d includes one or more bragg gratings each having a center wavelength of $\lambda_{12}$. In a preferred embodiment, the bragg gratings within the optical conductor 3235d are separated by an axial distance D. The bragg gratings may be formed within the optical conductor 3235d using any number of conventional commercially available methods for forming bragg gratings. In a preferred embodiment, the bragg gratings are formed within the optical conductor 3235d by the process of phase masking in order to optimally provide wavelength selective partial reflection.

In a preferred embodiment, each of the bragg gratings in the optical conductor 3235d reflect a portion of incident lightwaves having a center wavelength of $\lambda_{12}$. In a preferred embodiment, each of the bragg gratings in the optical conductor 3235d reflect about 0.85 to 1.05% of incident lightwaves having a center wavelength of $\lambda_{12}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3235d that are each defined by adjacent bragg gratings and the corresponding intermediate section of the optical conductor 3235d.

In a preferred embodiment, the bragg gratings provided in the optical conductors 3235a, 3235b, 3235c, and 3235d have different central wavelengths and do not overlap in the axial direction. In this manner, the optical sensors provided by the optical conductors 3235a, 3235b, 3235c, and 3235d and corresponding bragg gratings are both wave division multiplexed and time division multiplexed.

The optical conductor 3240a is coupled to the WDM optical coupler 3220d and the WDM optical coupler 3265d. The optical conductor 3240a is preferably adapted to convey lightwaves to and from the WDM optical coupler 3220d and the WDM optical coupler 3265d. The optical conductor 3240a may be any number of conventional commercially available optical conductors. In a preferred embodiment, the optical conductor 3240a is a single mode optical fiber, part number SMF-28, available from Corning Inc. in order to optimally provide lightwave transmission.

In a preferred embodiment, the optical conductor 3240a includes one or more bragg gratings each having a center wavelength of $\lambda_{13}$. In a preferred embodiment, the bragg gratings within the optical conductor 3240a are separated by an axial distance D. The bragg gratings may be formed within the optical conductor 3240a using any number of conventional commercially available methods for forming bragg gratings. In a preferred embodiment, the bragg gratings are formed within the optical conductor 3240a by the process of phase masking in order to optimally provide wavelength selective partial reflection.

In a preferred embodiment, each of the bragg gratings in the optical conductor 3240a reflect a portion of incident lightwaves having a center wavelength of $\lambda_{13}$. In a preferred embodiment, each of the bragg gratings in the optical conductor 3240a reflect about 0.85 to 1.05% of incident lightwaves having a center wavelength of $\lambda_{13}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3240a that are each defined by adjacent bragg gratings and the corresponding intermediate section of the optical conductor 3240a.

The optical conductor 3240b is coupled to the WDM optical coupler 3220d and the WDM optical coupler 3265d. The optical conductor 3240b is preferably adapted to convey lightwaves to and from the WDM optical coupler 3220d and the WDM optical coupler 3265d. The optical conductor 3240b may be any number of conventional commercially available optical conductors. In a preferred embodiment, the optical conductor 3240b is a single mode optical fiber, part number SMF-28, available from Corning Inc. in order to optimally provide lightwave transmission.

In a preferred embodiment, the optical conductor 3240b includes one or more bragg gratings each having a center wavelength of $\lambda_{14}$. In a preferred embodiment, the bragg gratings within the optical conductor 3240b are separated by an axial distance D. The bragg gratings may be formed within the optical conductor 3240b using any number of conventional commercially available methods for forming bragg gratings. In a preferred embodiment, the bragg gratings are formed within the optical conductor 3240b by the process of phase masking in order to optimally provide wavelength selective partial reflection.

In a preferred embodiment, each of the bragg gratings in the optical conductor 3240b reflect a portion of incident lightwaves having a center wavelength of $\lambda_{14}$. In a preferred embodiment, each of the bragg gratings in the optical conductor 3240b reflect about 0.85 to 1.05% of incident lightwaves having a center wavelength of $\lambda_{14}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3240b that are each defined by adjacent bragg gratings and the corresponding intermediate section of the optical conductor 3240b.

The optical conductor 3240c is coupled to the WDM optical coupler 3220d and the WDM optical coupler 3265d. The optical conductor 3240c is preferably adapted to convey lightwaves to and from the WDM optical coupler 3220d and the WDM optical coupler 3265d. The optical conductor 3240c may be any number of conventional commercially available optical conductors. In a preferred embodiment, the optical conductor 3240c is a single mode optical fiber, part number SMF-28, available from Corning Inc. in order to optimally provide lightwave transmission.

In a preferred embodiment, the optical conductor 3240c includes one or more bragg gratings each having a center wavelength of $\lambda_{15}$. In a preferred embodiment, the bragg gratings within the optical conductor 3240c are separated by an axial distance D. The bragg gratings may be formed within the optical conductor 3240c using any number of conventional commercially available methods for forming bragg gratings. In a preferred embodiment, the bragg gratings are formed within the optical conductor 3240c by the process of phase masking in order to optimally provide wavelength selective partial reflection.

In a preferred embodiment, each of the bragg gratings in the optical conductor 3240c reflect a portion of incident lightwaves having a center wavelength of $\lambda_{15}$. In a preferred embodiment, each of the bragg gratings in the optical conductor 3240c reflect about 0.85 to 1.05% of incident lightwaves having a center wavelength of $\lambda_{15}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3240c that are each defined by adjacent bragg gratings and the corresponding intermediate section of the optical conductor 3240c.

The optical conductor 3240d is coupled to the WDM optical coupler 3220d and the WDM optical coupler 3265d. The optical conductor 3240d is preferably adapted to convey lightwaves to and from the WDM optical coupler 3220d and the WDM optical coupler 3265d. The optical conductor 3240d may be any number of conventional commercially available optical conductors. In a preferred embodiment, the optical conductor 3240d is a single mode optical fiber, part number SMF-28, available from Corning Inc. in order to optimally provide lightwave transmission.

In a preferred embodiment, the optical conductor 3240d includes one or more bragg gratings each having a center wavelength of $\lambda_{16}$. In a preferred embodiment, the bragg gratings within the optical conductor 3240d are separated by an axial distance D. The bragg gratings may be formed within the optical conductor 3240d using any number of conventional commercially available methods for forming bragg gratings. In a preferred embodiment, the bragg gratings are formed within the optical conductor 3240d by the process of phase masking in order to optimally provide wavelength selective partial reflection.

In a preferred embodiment, each of the bragg gratings in the optical conductor 3240d reflect a portion of incident lightwaves having a center wavelength of $\lambda_{16}$. In a preferred embodiment, each of the bragg gratings in the optical conductor 3240d reflect about 0.85 to 1.05% of incident lightwaves having a center wavelength of $\lambda_{16}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3240d that are each defined by adjacent bragg gratings and, the corresponding intermediate section of the optical conductor 3240d.

In a preferred embodiment, the bragg gratings provided in the optical conductors 3240a, 3240b, 3240c, and 3240d have different central wavelengths and do not overlap in the axial direction. In this manner, the optical sensors provided by the optical conductors 3240a, 3240b, 3240c, and 3240d and corresponding bragg gratings are both wave division multiplexed and time division multiplexed.

The optical conductor 3245a is coupled to the WDM optical coupler 3220e and the WDM optical coupler 3265e. The optical conductor 3225a is preferably adapted to convey lightwaves to and from the WDM optical coupler 3220e and the WDM optical. coupler 3265e. The optical conductor 3245a may be any number of conventional commercially available optical conductors. In a preferred embodiment, the optical conductor 3245a is a single mode optical fiber, part number SMF-28, available from Corning Inc. in order to optimally provide lightwave transmission.

In a preferred embodiment, the optical conductor 3245a includes one or more bragg gratings each having a center wavelength of $\lambda_{17}$. In a preferred embodiment, the bragg gratings within the optical conductor 3245a are separated by an axial distance D. The bragg gratings may be formed within the optical conductor 3245a using any number of conventional commercially available methods for forming bragg gratings. In a preferred embodiment, the bragg gratings are formed within the optical conductor 3245a by the process of phase masking in order to optimally provide wavelength selective partial reflection.

In a preferred embodiment, each of the bragg gratings in the optical conductor 3245a reflect a portion of incident lightwaves having a center wavelength of $\lambda_{17}$. In a preferred embodiment, each of the bragg gratings in the optical conductor 3245a reflect about 0.85 to 1.05% of incident lightwaves having a center wavelength of $\lambda_{17}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3245a that are each defined by adjacent bragg gratings and the corresponding intermediate section of the optical conductor 3245a.

The optical conductor 3245b is coupled to the WDM optical coupler 3220e and the WDM optical coupler 3265e. The optical conductor 3245b is preferably adapted to convey lightwaves to and from the WDM optical coupler 3220e and the WDM optical coupler 3265e. The optical conductor 3245b may be any number of conventional commercially available optical conductors. In a preferred embodiment, the optical conductor 3245b is a single mode optical fiber, part number SMF-28, available from Corning Inc. in order to optimally provide lightwave transmission.

In a preferred embodiment, the optical conductor 3245b includes one or more bragg gratings each having a center wavelength of $\lambda_{18}$. In a preferred embodiment, the bragg gratings within the optical conductor 3245b are separated by an axial distance D. The bragg gratings may be formed within the optical conductor 3245b using any number of conventional commercially available methods for forming bragg gratings. In a preferred embodiment, the bragg gratings are formed within the optical conductor 3245b by the process of phase masking in order to optimally provide wavelength selective partial reflection.

In a preferred embodiment, each of the bragg gratings in the optical conductor 3245b reflect a portion of incident lightwaves having a center wavelength of $\lambda_{18}$. In a preferred embodiment, each of the bragg gratings in the optical conductor 3245b reflect about 0.85 to 1.05% of incident lightwaves having a center wavelength of $\lambda_{18}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3245b that are each defined by adjacent bragg gratings and the corresponding intermediate section of the optical conductor 3245b.

The optical conductor 3245c is coupled to the WDM optical coupler 3220e and the WDM optical coupler 3265e.

The optical conductor 3245c is preferably adapted to convey lightwaves to and from the WDM optical coupler 3220e and the WDM optical, coupler 3265e. The optical conductor 3245c may be any number of conventional commercially available optical conductors. In a preferred embodiment, the optical conductor 3245c is a single mode optical fiber, part number SMF-28, available from Corning Inc. in order to optimally provide lightwave transmission.

In a preferred embodiment, the optical conductor 3245c includes one or more bragg gratings each having a center wavelength of $\lambda_{19}$. In a preferred embodiment, the bragg gratings within the optical conductor 3245c are separated by an axial distance D. The bragg gratings may be formed within the optical conductor 3245c using any number of conventional commercially available methods for forming bragg gratings. In a preferred embodiment, the bragg gratings are formed within the optical conductor 3245c by the process of phase masking in order to optimally provide wavelength selective partial reflection.

In a preferred embodiment, each of the bragg gratings in the optical conductor 3245c reflect a portion of incident lightwaves having a center wavelength of $\lambda_{19}$. In a preferred embodiment, each of the bragg gratings in the optical conductor 3245c reflect about 0.85 to 1.05% of incident lightwaves having a center wavelength of $\lambda_{19}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3245c that are each defined by adjacent bragg gratings and the corresponding intermediate section of the optical conductor 3245c.

The optical conductor 3245d is coupled to the WDM optical coupler 3220e and the WDM optical coupler 3265e. The optical conductor 3245d is preferably adapted to convey lightwaves to and from the WDM optical coupler 3220e and the WDM optical coupler 3265e. The optical conductor 3245d may be any number of conventional commercially available optical conductors. In a preferred embodiment, the optical conductor 3245d is a single mode optical fiber, part number SMF-28, available from Corning Inc. in order to optimally provide lightwave transmission.

In a preferred embodiment, the optical conductor 3245d includes one or more bragg gratings each having a center wavelength of $\lambda_{20}$. In a preferred embodiment, the bragg gratings within the optical conductor 3245d are separated by an axial distance D. The bragg gratings may be formed within the optical conductor 3245d using any number of conventional commercially available methods for forming bragg gratings. In a preferred embodiment, the bragg gratings are formed within the optical conductor 3245d by the process of phase masking in order to optimally provide wavelength selective partial reflection.

In a preferred embodiment, each of the bragg gratings in the optical conductor 3245d reflect a portion of incident lightwaves having a center wavelength of $\lambda_{20}$. In a preferred embodiment, each of the bragg gratings in the optical conductor 3245d reflect about 0.85 to 1.05% of incident lightwaves having a center wavelength of $\lambda_{20}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3245d that are each defined by adjacent bragg gratings and the corresponding intermediate section of the optical conductor 3245d.

In a preferred embodiment, the bragg gratings provided in the optical conductors 3245a, 3245b, 3245c, and 3245d have different central wavelengths and do not overlap in the axial direction. In this manner, the optical sensors provided by the optical conductors 3245a, 3245b, 3245c, and 3245d and corresponding bragg gratings are both wave division multiplexed and time division multiplexed.

The optical conductor 3250a is coupled to the WDM optical coupler 3220f and the WDM optical coupler 3265f. The optical conductor 3250a is preferably adapted to convey lightwaves to and from the WDM optical coupler 3220f and the WDM optical coupler 3265f. The optical conductor 3250a may be any number of conventional commercially available optical conductors. In a preferred embodiment, the optical conductor 3250a is a single mode optical fiber, part number SMF-28, available from Corning Inc. in order to optimally provide lightwave transmission.

In a preferred embodiment, the optical conductor 3250a includes one or more bragg gratings each having a center wavelength of $\lambda_{21}$. In a preferred embodiment, the bragg gratings within the optical conductor 3250a are separated by an axial distance D. The bragg gratings may be formed within the optical conductor 3250a using any number of conventional commercially available methods for forming bragg gratings. In a preferred embodiment, the bragg gratings are formed within the optical conductor 3250a by the process of phase masking in order to optimally provide wavelength selective partial reflection.

In a preferred embodiment, each of the bragg gratings in the optical conductor 3250a reflect a portion of incident lightwaves having a center wavelength of $\lambda_{21}$. In a preferred embodiment, each of the bragg gratings in the optical conductor 3250a reflect about 0.85 to 1.05% of incident lightwaves having a center wavelength of $\lambda_{21}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3250a that are each defined by adjacent bragg gratings and the corresponding intermediate section of the optical conductor 3250a.

The optical conductor 3250b is coupled to the WDM optical coupler 3220f and the WDM optical coupler 3265f. The optical conductor 3250b is preferably adapted to convey lightwaves to and from the WDM optical coupler 3220f and the WDM optical coupler 3265f. The optical conductor 3250b may be any number of conventional commercially available optical conductors. In a preferred embodiment, the optical conductor 3250b is a single mode optical fiber, part number SMF-28, available from Corning Inc. in order to optimally provide lightwave transmission.

In a preferred embodiment, the optical conductor 3250b includes one or more bragg gratings each having a center wavelength of $\lambda_{22}$. In a preferred embodiment, the bragg gratings within the optical conductor 3250b are separated by an axial distance D. The bragg gratings may be formed within the optical conductor 3250b using any number of conventional commercially available methods for forming bragg gratings. In a preferred embodiment, the bragg gratings are formed within the optical conductor 3250b by the process of phase masking in order to optimally provide wavelength selective partial reflection.

In a preferred embodiment, each of the bragg gratings in the optical conductor 3250b reflect a portion of incident lightwaves having a center wavelength of $\lambda_{22}$. In a preferred embodiment, each of the bragg gratings in the optical conductor 3250b reflect about 0.85 to 1.05% of incident lightwaves having a center wavelength of $\lambda_{22}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3250*b* that are each defined by adjacent bragg gratings and the corresponding intermediate section of the optical conductor 3250*b*.

The optical conductor 3250*c* is coupled to the WDM optical coupler 3220*f* and the WDM optical coupler 3265*f*. The optical conductor 3250*c* is preferably adapted to convey lightwaves to and from the WDM optical coupler 3220*f* and the WDM optical coupler 3265*f*. The optical conductor 3250*c* may be any number of conventional commercially available optical conductors. In a preferred embodiment, the optical conductor 3250*c* is a single mode optical fiber, part number SMF-28, available from Corning Inc. in order to optimally provide lightwave transmission.

In a preferred embodiment, the optical conductor 3250*c* includes one or more bragg gratings each having a center wavelength of $\lambda_{23}$. In a preferred embodiment, the bragg gratings within the optical conductor 3250*c* are separated by an axial distance D. The bragg gratings may be formed within the optical conductor 3250*c* using any number of conventional commercially available methods for forming bragg gratings. In a preferred embodiment, the bragg gratings are formed within the optical conductor 3250*c* by the process of phase masking in order to optimally provide wavelength selective partial reflection.

In a preferred embodiment, each of the bragg gratings in the optical conductor 3250*c* reflect a portion of incident lightwaves having a center wavelength of $\lambda_{23}$. In a preferred embodiment, each of the bragg gratings in the optical conductor 3250*c* reflect about 0.85 to 1.05% of incident lightwaves having a center wavelength of $\lambda_{23}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3250*c* that are each defined by adjacent bragg gratings and the corresponding intermediate section of the optical conductor 3250*c*.

The optical conductor 3250*d* is coupled to the WDM optical coupler 3220*f* and the WDM optical coupler 3265*f*. The optical conductor 3250*d* is preferably adapted to convey lightwaves to and from the WDM optical coupler 3220*f* and the WDM optical coupler 3265*f*. The optical conductor 3250*d* may be any number of conventional commercially available optical conductors. In a preferred embodiment, the optical conductor 3250*d* is a single mode optical fiber, part number SMF-28, available from Corning Inc. in order to optimally provide lightwave transmission.

In a preferred embodiment, the optical conductor 3250*d* includes one or more bragg gratings each having a center wavelength of $\lambda_{24}$. In a preferred embodiment, the bragg gratings within the optical conductor 3250*d* are separated by an axial distance D. The bragg gratings may be formed within the optical conductor 3250*d* using any number of conventional commercially available methods for forming bragg gratings. In a preferred embodiment, the bragg gratings are formed within the optical conductor 3250*d* by the process of phase masking in order to optimally provide wavelength selective partial reflection.

In a preferred embodiment, each of the bragg gratings in the optical conductor 3250*d* reflect a portion of incident lightwaves having a center wavelength of $\lambda_{24}$. In a preferred embodiment, each of the bragg gratings in the optical conductor 3250*d* reflect about 0.85 to 1.05% of incident lightwaves having a center wavelength of $\lambda_{24}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3250*d* that are each defined by adjacent bragg gratings and the corresponding intermediate section of the optical conductor 3250*d*.

In a preferred embodiment, the bragg gratings provided in the optical conductors 3250*a*, 3250*b*, 3250*c*, and 3250*d* have different central wavelengths and do not overlap in the axial direction. In this manner, the optical sensors provided by the optical conductors 3250*a*, 3250*b*, 3250*c*, and 3250*d* and corresponding bragg gratings are both wave division multiplexed and time division multiplexed.

The optical conductor 3255*a* is coupled to the WDM optical coupler 3220*g* and the WDM optical coupler 3265*g*. The optical conductor 3255*a* is preferably adapted to convey lightwaves to and from the WDM optical coupler 3220*g* and the WDM optical coupler 3265*g*. The optical conductor 3255*a* may be any number of conventional commercially available optical conductors. In a preferred embodiment, the optical conductor 3255*a* is a single mode optical fiber, part number SMF-28, available from Corning Inc. in order to optimally provide lightwave transmission.

In a preferred embodiment, the optical conductor 3255*a* includes one or more bragg gratings each having a center wavelength of $\lambda_{25}$. In a preferred embodiment, the bragg gratings within the optical conductor 3255*a* are separated by an axial distance D. The bragg gratings may be formed within the optical conductor 3255*a* using any number of conventional commercially available methods for forming bragg gratings. In a preferred embodiment, the bragg gratings are formed within the optical conductor 3255*a* by the process of phase masking in order to optimally provide wavelength selective partial reflection.

In a preferred embodiment, each of the bragg gratings in the optical conductor 3255*a* reflect a portion of incident lightwaves having a center wavelength of $\lambda_{25}$. In a preferred embodiment, each of the bragg gratings in the optical conductor 3255*a* reflect about 0.85 to 1.05% of incident lightwaves having a center wavelength of $\lambda_{25}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3255*a* that are each defined by adjacent bragg gratings and the corresponding intermediate section of the optical conductor 3255*a*.

The optical conductor 3255*b* is coupled to the WDM optical coupler 3220*g* and the WDM optical coupler 3265*g*. The optical conductor 3255*b* is preferably adapted to convey lightwaves to and from the WDM optical coupler 3220*g* and the WDM optical coupler 3265*g*. The optical conductor 3255*b* may be any number of conventional commercially available optical conductors. In a preferred embodiment, the optical. conductor 3255*b* is a single mode optical fiber, part number SMF-28, available from Corning Inc. in order to optimally provide lightwave transmission.

In a preferred embodiment, the optical conductor 3255*b* includes one or more bragg gratings each having a center wavelength of $\lambda_{26}$. In a preferred embodiment, the bragg gratings within the optical conductor 3255*b* are separated by an axial distance D. The bragg gratings may be formed within the optical conductor 3255*b* using any number of conventional commercially available methods for forming bragg gratings. In a preferred embodiment, the bragg gratings are formed within the optical conductor 3255*b* by the process of phase masking in order to optimally provide wavelength selective partial reflectivity.

In a preferred embodiment, each of the bragg gratings in the optical conductor 3255b reflect a portion of incident lightwaves having a center wavelength of $\lambda_{26}$. In a preferred embodiment, each of the bragg gratings in the optical conductor 3255b reflect about 0.85 to 1.05% of incident lightwaves having a center wavelength of $\lambda_{26}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3255b that are each defined by adjacent bragg gratings and the corresponding intermediate section of the optical conductor 3255b.

The optical conductor 3255c is coupled to the WDM optical coupler 3220g and the WDM optical coupler 3265g. The optical conductor 3255c is preferably adapted to convey lightwaves to and from the WDM optical coupler 3220g and the WDM optical coupler 3265g. The optical conductor 3255c may be any number of conventional commercially available optical conductors. In a preferred embodiment, the optical conductor 3255c is a single mode optical fiber, part number SMF-28, available from Corning Inc. in order to optimally provide lightwave transmission.

In a preferred embodiment, the optical conductor 3255c includes one or more bragg gratings each having a center wavelength of $\lambda_{27}$. In a preferred embodiment, the bragg gratings within the optical conductor 3255c are separated by an axial distance D. The bragg gratings may be formed within the optical conductor 3255c using any number of conventional commercially available methods for forming bragg gratings. In a preferred embodiment, the bragg gratings are formed within the optical conductor 3255c by the process of phase masking in order to optimally provide wavelength selective partial reflection.

In a preferred embodiment, each of the bragg gratings in the optical conductor 3255c reflect a portion of incident lightwaves having a center wavelength of $\lambda_{27}$. In a preferred embodiment, each of the bragg gratings in the optical conductor 3255c reflect about 0.85 to 1.05% of incident lightwaves having a center wavelength of $\lambda_{27}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3255c that are each defined by adjacent bragg gratings and the corresponding intermediate section of the optical conductor 3255c.

The optical conductor 3255d is coupled to the WDM optical coupler 3220g and the WDM optical coupler 3265g. The optical conductor 3255d is preferably adapted to convey lightwaves to and from the WDM optical coupler 3220g and the WDM optical coupler 3265g. The optical conductor 3255d may be any number of conventional commercially available optical conductors. In a preferred embodiment, the optical conductor 3255d is a single mode optical fiber, part number SMF-28, available from Corning Inc. in order to optimally provide lightwave transmission.

In a preferred embodiment, the optical conductor 3255d includes one or more bragg gratings each having a center wavelength of $\lambda_{28}$. In a preferred embodiment, the bragg gratings within the optical conductor 3255d are separated by an axial distance D. The bragg gratings may be formed within the optical conductor 3255d using any number of conventional commercially available methods for forming bragg gratings. In a preferred embodiment, the bragg gratings are formed within the optical conductor 3255d by the process of phase masking in order to optimally provide wavelength selective partial reflection.

In a preferred embodiment, each of the bragg gratings in the optical conductor 3255d reflect a portion of incident lightwaves having a center wavelength of $\lambda_{28}$. In a preferred embodiment, each of the bragg gratings in the optical conductor 3255d reflect about 0.85 to 1.05% of incident lightwaves having a center wavelength of $\lambda_{28}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3255d that are each defined by adjacent bragg gratings and the corresponding intermediate section of the optical conductor 3255d.

In a preferred embodiment, the bragg gratings provided in the optical conductors 3255a, 3255b, 3255c, and 3255d have different central wavelengths and do not overlap in the axial direction. In this manner, the optical sensors provided by the optical conductors 3255a, 3255b, 3255c, and 3255d and corresponding bragg gratings are both wave division multiplexed and time division multiplexed.

The optical conductor 3260a is coupled to the WDM optical coupler 3220h and the WDM optical coupler 3265h. The optical conductor 3260a is preferably adapted to convey lightwaves to and from the WDM optical coupler 3220h and the WDM optical coupler 3265h. The optical conductor 3260a may be any number of conventional commercially available optical conductors. In a preferred embodiment, the optical conductor 3260a is a single mode optical fiber, part number SMF-28, available from Corning Inc. in order to optimally provide lightwave transmission.

In a preferred embodiment, the optical conductor 3260a includes one or more bragg gratings each having a center wavelength of $\lambda_{29}$. In a preferred embodiment, the bragg gratings within the optical conductor 3260a are separated by an axial distance D. The bragg gratings may be formed within the optical conductor 3260a using any number of conventional commercially available methods for forming bragg gratings. In a preferred embodiment, the bragg gratings are formed within the optical conductor 3260a by the process of phase masking in order to optimally provide wavelength selective partial reflection.

In a preferred embodiment, each of the bragg gratings in the optical conductor 3260a reflect a portion of incident lightwaves having a center wavelength of $\lambda_{29}$. In a preferred embodiment, each of the bragg gratings in the optical conductor 3260a reflect about 0.85 to 1.05% of incident lightwaves having a center wavelength of $\lambda_{29}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3260a that are each defined by adjacent bragg gratings and the corresponding intermediate section of the optical conductor 3260a.

The optical conductor 3260b is coupled to the WDM optical coupler 3220h and the WDM optical coupler 3265h. The optical conductor 3260b is preferably adapted to convey lightwaves to and from the WDM optical coupler 3220h and the WDM optical coupler 3265h. The optical conductor 3260b may be any number of conventional commercially available optical conductors. In a preferred embodiment, the optical conductor 3260b is a single mode optical fiber, part number SMF-28, available from Corning Inc. in order to optimally provide lightwave transmission.

In a preferred embodiment, the optical conductor 3260b includes one or more bragg gratings each having a center wavelength of $\lambda_{30}$. In a preferred embodiment, the bragg gratings within the optical conductor 3260b are separated by an axial distance D. The bragg gratings may be formed within the optical conductor 3260b using any number of conventional commercially available methods for forming bragg gratings. In a preferred embodiment, the bragg gratings are formed within the optical conductor 3260b by the process of phase masking in order to optimally provide wavelength selective partial reflection.

In a preferred embodiment, each of the bragg gratings in the optical conductor 3260b reflect a portion of incident lightwaves having a center wavelength of $\lambda_{30}$. In a preferred embodiment, each of the bragg gratings in the optical conductor 3260b reflect about 0.85 to 1.05% of incident lightwaves having a center wavelength of $\lambda_{30}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3260b that are each defined by adjacent bragg gratings and the corresponding intermediate section of the optical conductor 3260b.

The optical conductor 3260c is coupled to the WDM optical coupler 3220h and the WDM optical coupler 3265h. The optical conductor 3260c is preferably adapted to convey lightwaves to and from the WDM optical coupler 3220h and the WDM optical coupler 3265h. The optical conductor 3260c may be any number of conventional commercially available optical conductors. In a preferred embodiment, the optical conductor 3260c is a single mode optical fiber, part number SMF-28, available from Corning Inc. in order to optimally provide lightwave transmission.

In a preferred embodiment, the optical conductor 3260c includes one or more bragg gratings each having a center wavelength of $\lambda_{31}$. In a preferred embodiment, the bragg gratings within the optical conductor 3260c are separated by an axial distance D. The bragg gratings may be formed within the optical conductor 3260c using any number of conventional commercially available methods for forming bragg gratings. In a preferred embodiment, the bragg gratings are formed within the optical conductor 3260c by the process of phase masking in order to optimally provide wavelength selective partial reflection.

In a preferred embodiment, each of the bragg gratings in the optical conductor 3260c reflect a portion of incident lightwaves having a center wavelength of $\lambda_{31}$. In a preferred embodiment, each of the bragg gratings in the optical conductor 3260c reflect about 0.85 to 1.05% of incident lightwaves having a center wavelength of $\lambda_{31}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3260c that are each defined by adjacent bragg gratings and the corresponding intermediate section of the optical conductor 3260c.

The optical conductor 3260d is coupled to the WDM optical coupler 3220h and the WDM optical coupler 3265h. The optical conductor 3260d is preferably adapted to convey lightwaves to and from the WDM optical coupler 3220h and the WDM optical coupler 3265h. The optical conductor 3260d may be any number of conventional commercially available optical conductors. In a preferred embodiment, the optical conductor 3260d is a single mode optical fiber, part number SMF-28, available from Corning Inc. in order to optimally provide lightwave transmission.

In a preferred embodiment, the optical conductor 3260d includes one or more bragg gratings each having a center wavelength of $\lambda_{16}$. In a preferred embodiment, the bragg gratings within the optical conductor 3260d are separated by an axial distance D. The bragg gratings may be formed within the optical conductor 3260d using any number of conventional commercially available methods for forming bragg gratings. In a preferred embodiment, the bragg gratings are formed within the optical conductor 3260d by the process of phase masking in order to optimally provide wavelength selective partial reflection.

In a preferred embodiment, each of the bragg gratings in the optical conductor 3260d reflect a portion of incident lightwaves having a center wavelength of $\lambda_{32}$. In a preferred embodiment, each of the bragg gratings in the optical conductor 3260d reflect about 0.85 to 1.05% of incident lightwaves having a center wavelength of $\lambda_{32}$. In a preferred embodiment, during operation of the system 2500, variations in the axial spacing between adjacent bragg gratings are detected and correlated to environmental conditions. In a preferred embodiment, optical hydrophones are thereby provided within the optical conductor 3260d that are each defined by adjacent bragg gratings and the corresponding intermediate section of the optical conductor 3260d.

In a preferred embodiment, the bragg gratings provided in the optical conductors 3260a, 3260b, 3260c, and 3260d have different central wavelengths and do not overlap in the axial direction. In this manner, the optical sensors provided by the optical conductors 3260a, 3260b, 3260c, and 3260d and corresponding bragg gratings are both wave division multiplexed and time division multiplexed.

The WDM optical coupler 3265a is coupled to the optical conductors 3225a, 3225b, 3225c, and 3225d and the optical conductor 3270a. The WDM optical coupler 3265a is preferably adapted to convey lightwaves to and from the optical conductors 3225a, 3225b, 3225c, and 3225d and the optical conductor 3270a. In a preferred embodiment, the WDM optical coupler 3265a conveys lightwaves to and from the optical conductors 3225a, 3225b, 3225c and 3225d having center wavelengths $\lambda_1$, $\lambda_2$, $\lambda_3$, and $\lambda_4$, respectively. The WDM optical coupler 3265a may be any number of conventional commercially available WDM optical couplers. In a preferred embodiment, the WDM optical coupler 3245a is a 4-channel Polar Wave Optical Slicer 100-200G, available from Chorum Technologies, in order to optimally provide distribution of signals as a function of wavelength.

The WDM optical coupler 3265b is coupled to the optical conductors 3230a, 3230b, 3230c, and 3230d and the optical conductor 3270b. The WDM optical coupler 3265b is preferably adapted to convey lightwaves to and from the optical conductors 3230a, 3230b, 3230c, and 3230d and the optical conductor 3270b. In a preferred embodiment, the WDM optical coupler 3265b conveys lightwaves to and from the optical conductors 3230a, 3230b, 3230c and 3230d having center wavelengths $\lambda_5$, $\lambda_6$, $\lambda_7$, and $\lambda_8$, respectively. The WDM optical coupler 3265b may be any number of conventional commercially available WDM optical couplers. In a preferred embodiment, the WDM optical coupler 3265b is a 4-channel Polar Wave Optical Slicer 100-200G, available from Chorum Technologies, in order to optimally provide distribution of signals as a function of wavelength.

The WDM optical coupler 3265c is coupled to the optical conductors 3235a, 3235b, 3235c, and 3235d and the optical conductor 3270c. The WDM optical coupler 3265c is preferably adapted to convey lightwaves to and from the optical conductors 3235a, 3235b, 3235c, and 3235d and the optical conductor 3270c. In a preferred embodiment, the WDM optical coupler 3265*c* conveys lightwaves to and from the optical conductors 3235*a*, 3235*b*, 3235*c* and 3235*d* having center wavelengths $\lambda_9$, $\lambda_{10}$, $\lambda_{11}$, and $\lambda_{12}$, respectively. The WDM optical coupler 3265*c* may be any number of conventional commercially available WDM optical couplers. In a preferred embodiment, the WDM optical coupler 3265*c* is a 4-channel Polar Wave Optical Slicer 100-200G, available from Chorum Technologies, in order to optimally provide distribution of signals as a function of wavelength.

The WDM optical coupler 3265*d* is coupled to the optical conductors 3240*a*, 3240*b*, 3240*c*, and 3240*d* and the optical conductor 3270*d*. The WDM optical coupler 3265*d* is preferably adapted to convey lightwaves to and from the optical conductors 3240*a*, 3240*b*, 3240*c*, and 3240*d* and the optical conductor 3270*d*. In a preferred embodiment, the WDM optical coupler 3265*d* conveys lightwaves to and from the optical conductors 3240*a*, 3240*b*, 3240*c* and 3240*d* having center wavelengths $\lambda_{13}$, $\lambda_{14}$, $\lambda_{15}$, and $\lambda_{16}$, respectively. The WDM optical coupler 3265*d* may be any number of conventional commercially available WDM optical couplers. In a preferred embodiment, the WDM optical coupler 3265*d* is a 4-channel Polar Wave Optical Slicer 100-200G, available from Chorum Technologies, in order to optimally provide distribution of signals as a function of wavelength.

The WDM optical coupler 3265*e* is coupled to the optical conductors 3245*a*, 3245*b*, 3245*c*, and 3245*d* and the optical conductor 3270*e*. The WDM optical coupler 3265*e* is preferably adapted to convey lightwaves to and from the optical conductors 3245*a*, 3245*b*, 3245*c*, and 3245*d* and the optical conductor 3270*e*. In a preferred embodiment, the WDM optical coupler 3265*e* conveys lightwaves to and from the optical conductors 3245*a*, 3245*b*, 3245*c* and 3245*d* having center wavelengths $\lambda_{17}$, $\lambda_{18}$, $\lambda_{19}$, and $\lambda_{20}$, respectively. The WDM optical coupler 3265*e* may be any number of conventional commercially available WDM optical couplers. In a preferred embodiment, the WDM optical coupler 3245*e* is a 4-channel Polar Wave Optical Slicer 100-200G, available from Chorum Technologies, in order to optimally provide distribution of signals as a function of wavelength.

The WDM optical coupler 3265*f* is coupled to the optical conductors 3250*a*, 3250*b*, 3250*c*, and 3250*d* and the optical conductor 3270*f*. The WDM optical coupler 3265*f* is preferably adapted to convey lightwaves to and from the optical conductors 3250*a*, 3250*b*, 3250*c*, and 3250*d* and the optical conductor 3270*f*. In a preferred embodiment, the WDM optical coupler 3265*f* conveys lightwaves to and from the optical conductors 3250*a*, 3250*b*, 3250*c* and 3250*d* having center wavelengths $\lambda_{21}$, $\lambda_{22}$, $\lambda_{23}$, and $\lambda_{24}$, respectively. The WDM optical coupler 3265*f* may be any number of conventional commercially available WDM optical couplers. In a preferred embodiment, the WDM optical coupler 3265*f* is a 4-channel Polar Wave Optical Slicer 100-200G, available from Chorum Technologies, in order to optimally provide distribution of signals as a function of wavelength.

The WDM optical coupler 3265*g* is coupled to the optical conductors 3255*a*, 3255*b*, 3255*c*, and 3255*d* and the optical conductor 3270*g*. The WDM optical coupler 3265*g* is preferably adapted to convey lightwaves to and from the optical conductors 3255*a*, 3255*b*, 3255*c*, and 3255*d* and the optical conductor 3270*g*. In a preferred embodiment, the WDM optical coupler 3265*g* conveys lightwaves to and from the optical conductors 3255*a*, 3255*b*, 3255*c* and 3255*d* having center wavelengths $\lambda_{25}$, $\lambda_{26}$, $\lambda_{27}$, and $\lambda_{28}$, respectively. The WDM optical coupler 3265*g* may be any number of conventional commercially available WDM optical couplers. In a preferred embodiment, the WDM optical coupler 3265*g* is a 4-channel Polar Wave Optical Slicer 100-200G, available from Chorum Technologies, in order to optimally provide distribution of signals as a function of wavelength.

The WDM optical coupler 3265*h* is coupled to the optical conductors 3260*a*, 3260*b*, 3260*c*, and 3260*d* and the optical conductor 3270*h*. The WDM optical coupler 3265*h* is preferably adapted to convey lightwaves to and from the optical conductors 3260*a*, 3260*b*, 3260*c*, and 3260*d* and the optical conductor 3270*h*. In a preferred embodiment, the WDM optical coupler 3265*h* conveys lightwaves to and from the optical conductors 3260*a*, 3260*b*, 3260*c* and 3260*d* having center wavelengths $\lambda_{29}$, $\lambda_{30}$, $\lambda_{31}$, and $\lambda_{32}$, respectively. The WDM optical coupler 3265*h* may be any number of conventional commercially available WDM optical couplers. In a preferred embodiment, the WDM optical coupler 3265*h* is a 4-channel Polar Wave Optical Slicer 100-200G, available from Chorum Technologies, in order to optimally provide distribution of signals as a function of wavelength.

The optical conductors 3270*a*, 3270*b*, 3270*c*, 3270*d*, 3270*e*, 3270*f*, 3270*g*, and 3270*h* are coupled to the WDM optical couplers 3265*a*, 3265*b*, 3265*c*, 3265*d*, 3265*e*, 3265*f*, 3265*g*, and 3265*h*, respectively, and the optical coupler 3275. The optical conductors 3270*a*, 3270*b*, 3270*c*, 3270*d*, 3270*e*, 3270*f*, 3270*g*, and 3270*h* are preferably adapted to convey lightwaves between the WDM optical couplers 3265*a*, 3265*b*, 3265*c*, 3265*d*, 3265*e*, 3265*f*, 3265*g*, and 3265*h*, respectively, and the optical coupler 3275. The optical conductors 3270*a*, 3270*b*, 3270*c*, 3270*d*, 3270*e*, 3270*f*, 3270*g*, and 3270*h* may be any number of conventional commercially available optical conductors. In a preferred embodiment, the optical conductors 3270*a*, 3270*b*, 3270*c*, 3270*d*, 3270*e*, 3270*f*, 3270*g*, and 3270*h* are single mode optical fibers, part number SMF-28, available from Corning Inc., in order to optimally provide lightwave transmission.

The optical coupler 3275 is coupled to the optical conductors 3270*a*, 3270*b*, 3270*c*, 3270*d*, 3270*e*, 3270*f*, 3270*g*, and 3270*h* and the optical conductor 3280. The optical coupler 3275 is preferably adapted to convey lightwaves between the optical conductors 3270*a*, 3270*b*, 3270*c*, 3270*d*, 3270*e*, 3270*f*, 3270*g*, and 3270*h* and the optical conductor 3280. The optical coupler 3275 may be any number of conventional commercially available optical couplers.

The optical conductor 3280 is coupled to the optical coupler 3275 and is preferably adapted to be coupled to another optical conductor. The optical conductor 3280 is preferably adapted to convey lightwaves between the optical coupler 3275 and another optical conductor. The optical conductor 3280 may be any number of conventional commercially available optical conductors. In a preferred embodiment, the optical conductor 3280 is a single mode optical fiber, part number SMF-28, available from Corning Inc., in order to optimally provide lightwave transmission.

In a preferred embodiment, the sensors 2525 are adapted to be reversible and/or receive and reflect incident lightwaves transmitted into the sensors 2525 using the optical conductor 3205 and/or the optical conductor 3280.

The optical conductor 2530 is coupled to the optical interface 2515 and the compensating interferometer assembly 2535. The optical conductor 2530 is preferably adapted to convey lightwaves between the optical interface 2515 and the compensating interferometer assembly 2535. The optical conductor 2530 may be any number of conventional commercially available optical conductors. In a preferred embodiment, the optical conductor 2530 is a single mode optical fiber, part number SMF-28, available from Corning Inc. in order to optimally provide lightwave transmission.

The compensating interferometer assembly 2535 is coupled to the optical conductor 2530 and the communication interface 140. The compensating interferometer assembly 2535 is preferably adapted to receive reflected pulses of light from the sensors 2525 and generate signals representative of the environmental conditions sensed by the sensors 2525.

Figure 33:
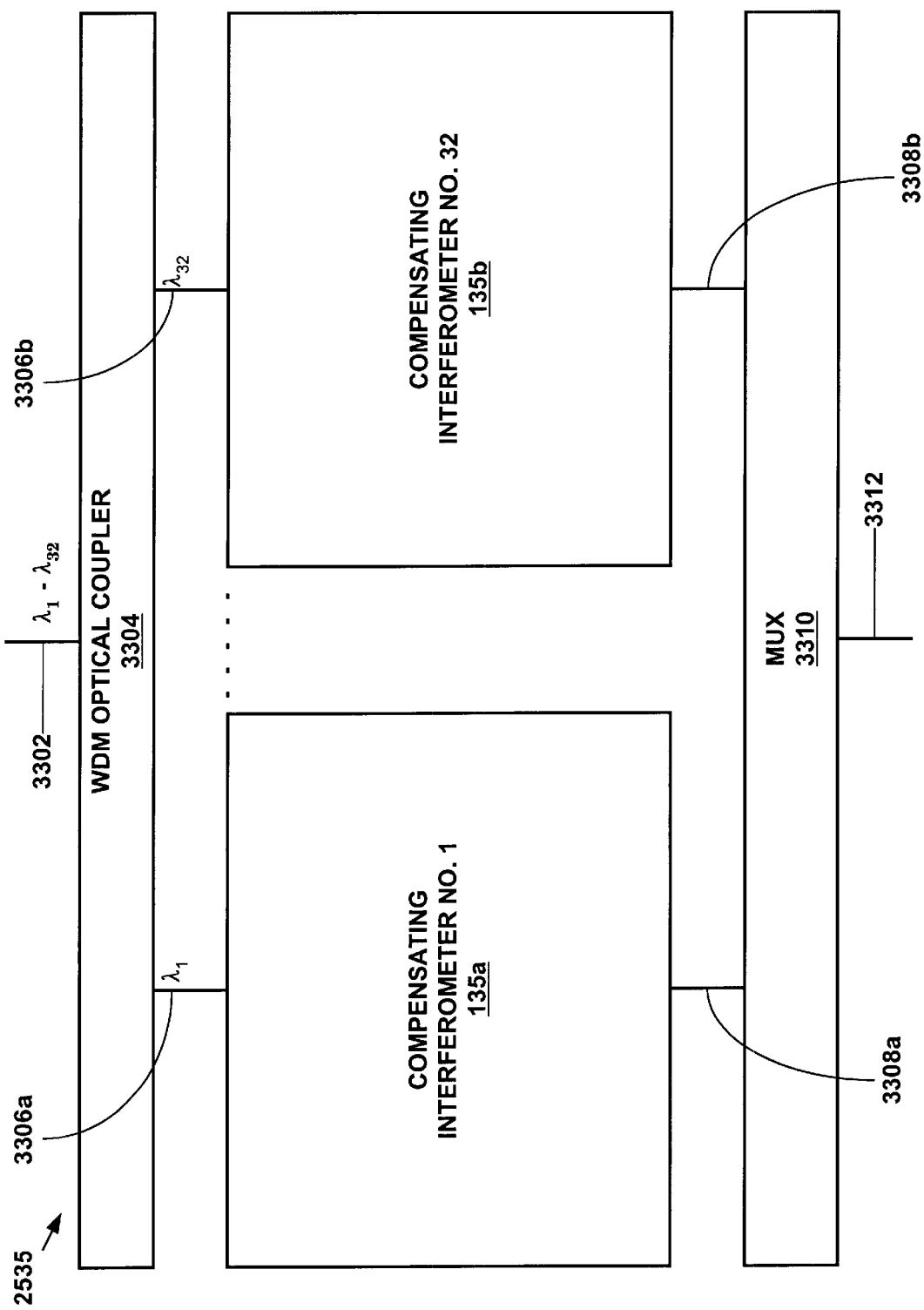
FIG. 33 is a schematic diagram of the compensating interferometer assembly of the optical sensing system of FIG. 25.

In a preferred embodiment, as illustrated in FIG. 33, the compensating interferometer assembly 2535 includes an optical conductor 3302, a WDM optical coupler 3304, one or more optical conductors 3306, one or more corresponding compensating interferometers 135, one or more corresponding communication interfaces 3308, a multiplexer 3310, and a communication interface 3312.

The optical conductor 3302 is coupled to the optical conductor 2530 and the WDM optical coupler 3304. The optical conductor 3302 is preferably adapted to convey lightwaves between the optical conductor 2530 and the WDM optical coupler 3304. The optical conductor 3302 may be any number of conventional commercially available optical conductors. In a preferred embodiment, the optical conductor 3302 is a single mode optical fiber, part number SMF-28, available from Corning, Inc.

The WDM optical coupler 3304 is coupled to the optical conductor 3302 and one or more optical conductors 3306. The WDM optical coupler 3304 is preferably coupled to the optical conductor 3302 and 32 optical conductors 3306. In a preferred embodiment, the WDM optical coupler 3304 receives lightwaves from the optical conductor 3302 having center wavelengths that range from $\lambda_1$ to $\lambda_{32}$ and transmits lightwaves to the each of the optical conductors 3306 having different corresponding center wavelengths. In this manner, each of the optical conductors 3306 receive lightwaves from the WDM optical coupler 3304 having different center wavelengths. The WDM optical coupler 3304 may be any number of conventional commercially available WDM optical couplers. In a preferred embodiment, the WDM optical coupler 3304 is a 1×32 channel DWDM optical router available from Chorum Technologies in order to optimally provide distribution of optical signals as a function of wavelength.

Each optical conductor 3306 is coupled to the WDM optical coupler 3304 and the corresponding compensating interferometer 135. Each optical conductor 3306 is preferably adapted to convey light waves between the WDM optical coupler 3304 and the corresponding compensating interferometer 135. The optical conductors 3306 may be any number of conventional commercially available optical conductors. In a preferred embodiment, the optical conductors 3306 are single mode optical fibers, part number SMF-28, available from Corning, Inc., in order to optimally provide lightwave transmission. In a preferred embodiment, the compensating interferometer assembly 2535 includes 32 optical conductors 3306 each adapted to convey reflected pulses of light having a different center wavelength.

Each compensating interferometer 135 is coupled to corresponding optical conductors 3306 and communication interfaces 3308. Each compensating interferometer 135 is preferably adapted to process reflected pulses of light having corresponding center wavelengths received from the optical sensors 2525 and generate electrical signals representative of the environmental conditions sensed by the optical sensors 2525. In a preferred embodiment, the compensating interferometers 135 are substantially identical in design and function to the compensating interferometer 135 described above with reference to the system 100.

Each communication interface 3308 is coupled to the corresponding compensating interferometer 135 and the multiplexer 3310.

The multiplexer 3310 is coupled to the communication interfaces 3308 and the communication interface 3312.

The communication interface 3312 is coupled to the multiplexer 3310 and the communication interface 140. In a preferred embodiment, the communication interface 3312 is adapted to convey electrical signals from the multiplexer 3310 to the communication interface 140. The communication interface 3312 may be any number of conventional commercially available communication interfaces.

The communication interface 140 is coupled to the communication interface 3312 and the system interface 145. In a preferred embodiment, the communication interface 140 is adapted to convey electrical signals from the communication interface 3312 to the system interface 145. The communication interface 140 may be any number of conventional commercially available communication interfaces.

The system interface 145 is coupled to the communication interface 140.

In a preferred embodiment, during operation of the system 2500, the optical source 2505 controllably generates groups of pulses of light having different center wavelengths. In a preferred embodiment, the pulses of light within each group are separated by a time period D. In this manner, the optical source 2505 preferably provides pulses of light that are time division multiplexed and wave division multiplexed. In a preferred embodiment, the optical source 2505 controllably generates time division and wave division multiplexed pulses of light for transmission to a plurality of optical interfaces 2515.

The time division and wave division multiplexed pulses of light are then preferably conveyed to the optical sensors 2525a, 2525b and 2525c. Within each of the optical sensors 2525, the pulses of light are partially reflected by each of the corresponding bragg gratings. The reflected pulses of light are then conveyed back to the optical interface 2515. In a preferred embodiment, the optical sensors 2525a, 2525b and 2525c are reversible and/or can receive pulses of light from both of the optical conductors at either end.

The reflected pulses of light are then preferably processed within the compensating interferometer assembly 2535, using the corresponding compensating interferometers 135, to generate the corresponding electrical signals representative of the optical signals A, B and C.

Figure 34:
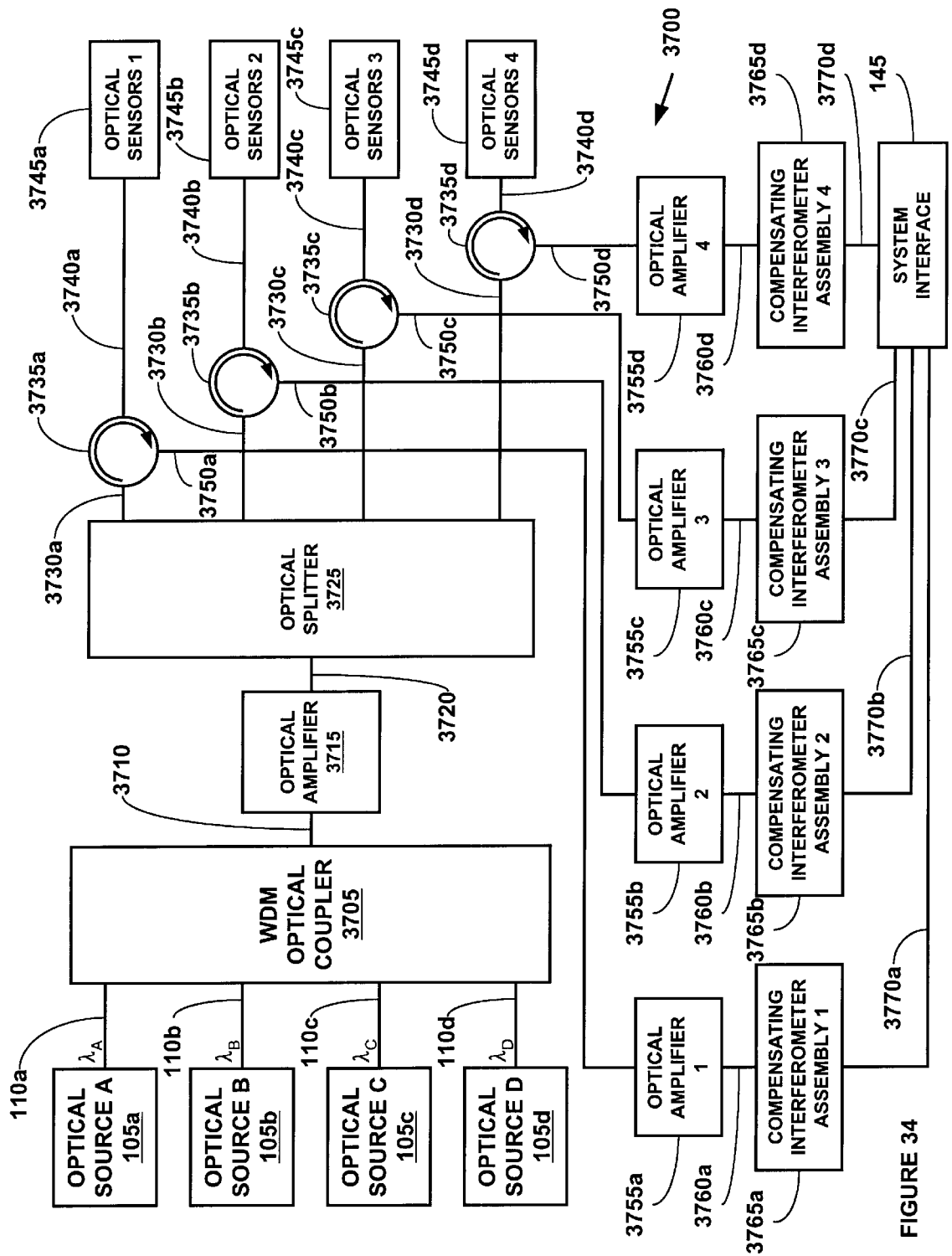
FIG. 34 is a schematic diagram of an alternate embodiment of an optical sensing system.

Referring to FIG. 34, an alternative embodiment of an optical sensing system 3700 includes optical sources 105a, 105b, 105c, and 105d, optical conductors 110a, 110b, 110c, and 110d, WDM optical coupler 3705, optical conductor 3710, optical amplifier 3715, optical conductor 3720, optical splitter 3725, optical conductors 3730a, 3730b, 3730c, and 3730d, optical circulators 3735a, 3735b, 3735c, and 3735d, and optical conductors 3740a, 3740b, 3740c and 3740d, optical sensors 3745a, 3745b, 3745c, and 3745d, optical conductors 3750a, 3750b, 3750c, and 3750d, optical amplifiers 3755a, 3755b, 3755c, and 3755d, optical conductors 3760a, 3760b, 3760c and 3760d, compensating interferometer assemblies 3765a, 3765b, 3765c, and 3765d, communication interfaces 3770a, 3770b, 3770c and 3770d, and system interface 145.

The optical sources 105a, 105b, 105c, and 105d are coupled to the corresponding optical conductors 110a, 110b, 110c, and 110d. The optical sources 105a, 105b, 105c, and 105d are preferably adapted to controllably generate pulses of light having center wavelengths $\lambda_A$, $\lambda_B$, $\lambda_C$ and $\lambda_D$, respectively. The design and operation of the optical sources 105a, 105b, 105c, and 105d are otherwise preferably substantially identical to the optical sources 105 described above with reference to the system 100.

The optical conductors 110a, 110b, 110c, and 110d are coupled to the optical sources 105a, 105b, 105c and 105d, respectively, and the WDM optical coupler 3705. The optical conductors 110a, 110b, 110c and 110d are preferably adapted to convey lightwaves between the optical sources 105a, 105b, 105c and 105d, respectively, and the WDM optical coupler 3705. The optical conductors 110a, 110b, 110c and 110d are otherwise preferably substantially identical to the optical conductor 110 described above with reference to the system 100.

The WDM optical coupler 3705 is coupled to the optical conductors 110a, 110b, 110c, and 110d and the optical conductor 3710. The WDM optical coupler 3705 is preferably adapted to receive and combine lightwaves received from the optical conductors 110a, 110b, 110c and 110d and transmit the combined lightwaves to the optical conductor 3710. The WDM optical coupler 3705 may be any number of conventional commercially available WDM optical couplers. In a preferred embodiment, the WDM optical coupler 3705 is a LDW Series 4 channel broad band WDM optical coupler available from Kaifa Technology.

The optical conductor 3710 is coupled to the WDM optical coupler 3705 and the optical amplifier 3715. The optical conductor 3710 is preferably adapted to convey lightwaves between the WDM optical coupler 3705 and the optical amplifier 3715. The optical conductor 3710 may be any number of conventional commercially available optical conductors. In a preferred embodiment, the optical conductor 3710 is a single mode optical fiber, part number SMF-28, available from Corning, Inc., in order to optimally provide lightwave transmission.

Figure 35:
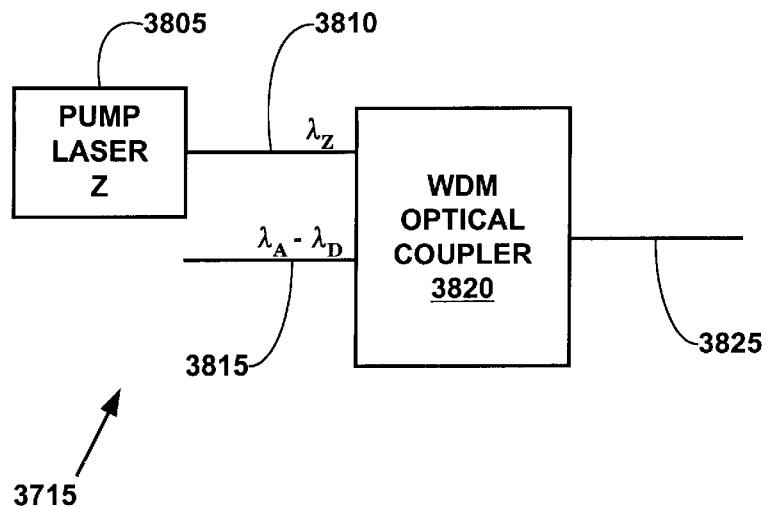
FIG. 35 is a schematic diagram of one of the optical amplifiers of the optical sensing system of claim 34.

The optical amplifier 3715 is coupled to the optical conductor 3710 and the optical conductor 3720. The optical amplifier 3715 is preferably adapted to amplify the energy level of lightwaves passing through the optical amplifier 3715. The optical amplifier 3715 may be any number of conventional commercially available optical amplifiers. In a preferred embodiment, as illustrated in FIG. 35, the optical amplifier 3715 includes a pump laser Z 3805, an optical conductor 3810, an optical conductor 3815, a WDM optical coupler 3820, and an optical conductor 3825.

The pump laser Z 3805 is coupled to the optical conductor 3810. The pump laser Z 3805 is preferably adapted to generate lightwaves having a center wavelength $\lambda_Z$. In a preferred embodiment, the center wavelength $\lambda_Z$ is not within the range of center wavelengths $\lambda_A$ to $\lambda_D$. In a preferred embodiment, the center wavelength $\lambda_Z$ is equal to about 980 nm. The pump laser Z 3805 may be any number of conventional commercially available pump lasers. In a preferred embodiment, the pump laser Z 3805 is a SLDO-2500-XXX pump laser, available from SDL, Inc., in order to optimally provide pump power to the optical conductor 3825.

The optical conductor 3815 is coupled to the optical conductor 3710 and the WDM optical coupler 3820. The optical conductor 3815 is preferably adapted to convey lightwaves between the optical conductor 3710 and the WDM optical coupler 3820. The optical conductor 3815 may be any number of conventional commercially available optical conductors. In a preferred embodiment, the optical conductor 3815 is a single mode optical fiber, part number SMF-28, available from Corning, Inc. in order to optimally provide lightwave transmission.

The WDM optical coupler 3820 is coupled to the optical conductors 3810, 3815 and 3825. The WDM optical coupler 3820 is preferably adapted to receive and combine lightwaves received from the optical conductors 3810 and 3815 and transmit the combined lightwaves to the optical conductor 3825. The WDM optical coupler 3820 may be any number of conventional commercially available WDM optical couplers. In a preferred embodiment, the WDM optical coupler 3820 is a 1550 nm/980 nm FWDMC0 WDM optical coupler, available from E-Tek Dynamics, Inc., in order to optimally provide low loss insertion of pump power.

The optical conductor 3825 is coupled to the WDM optical coupler 3820 and the optical conductor 3720. The optical conductor 3825 is preferably adapted to convey lightwaves between the WDM optical coupler 3820 and the optical conductor 3720. In a preferred embodiment, the optical conductor 3825 is adapted to amplify the energy level of lightwaves traveling within the optical conductor 3825 when the optical conductor 3825 is excited by lightwaves from a pump laser. In a preferred embodiment, the optical conductor 3825 is adapted to amplify the energy level of lightwaves traveling within the optical conductor 3825 when the optical conductor is excited by lightwaves having a center wavelength $\lambda_Z$ from the pump laser Z 3805. In a preferred embodiment, the optical conductor 3825 is an erbium doped optical fiber available from 3M Speciality Fibers in order to optimally provide an optical gain medium.

The optical conductor 3720 is coupled to the optical conductor 3825 and the optical splitter 3725. The optical conductor 3720 is preferably adapted to convey lightwaves between the optical conductor 3825 and the optical splitter 3725. The optical conductor 3720 may be any number of conventional commercially available optical conductors. In a preferred embodiment, the optical conductor 3720 is a single mode optical fiber, part number SMF-28, available from Corning, Inc., in order to optimally provide lightwave transmission.

The optical splitter 3725 is coupled to the optical conductor 3720 and the optical conductors 3730a, 3730b, 3730c and 3730d. The optical splitter 3725 is preferably adapted to receive lightwaves from the optical conductor 3720 and equally split the energy of the light waves and then distribute them to the optical conductors 3730a, 3730b, 3730c and 3730d. The optical splitter 3725 may be any number of conventional commercially available optical splitters. In a preferred embodiment, the optical splitter 3725 is a 1×4 cascaded optical coupler, available from Kaifa Technologies, in order to optimally provide distribution of optical power.

The optical conductors 3730a, 3730b, 3730c, and 3730d are coupled to the optical splitter 3725 and the optical circulators 3735a, 3735b, 3735c, and 3735d, respectively. The optical conductors 3730a, 3730b, 3730c, and 3730d are preferably adapted to convey lightwaves between the optical splitter 3725 and the optical circulators 3735a, 3735b, 3735c, and 3735d, respectively. The optical conductors 3730a, 3730b, 3730c, and 3730d may be any number of conventional commercially available optical conductors. In a preferred embodiment, the optical conductors 3730a, 3730b, 3730c, and 3730d are single mode optical fibers, part number SMF-28, available from Corning, Inc., in order to optimally provide lightwave transmission.

The optical circulator 3735a is coupled to the optical conductors 3730a, 3740a, and 3750a. The optical circulator 3735a is preferably adapted to receive lightwaves from the optical conductor 3730a, transmit and receive lightwaves to and from the optical conductor 3740a, and transmit lightwaves to the optical conductor 3750a. The optical circulator 3735a may be any number of conventional commercially available optical circulator. In a preferred embodiment, the optical circulator 3735a is an 3-port optical circulator, available from Kiafa Technologies, in order to optimally provide optical isolation and directivity.

The optical circulator 3735b is coupled to the optical conductors 3730b, 3740b, and 3750b. The optical circulator 3735b is preferably adapted to receive lightwaves from the optical conductor 3730b, transmit and receive lightwaves to and from the optical conductor 3740b, and transmit lightwaves to the optical conductor 3750b. The optical circulator 3735b may be any number of conventional commercially available optical circulator. In a preferred embodiment, the optical circulator 3735b is a 3-port optical circulator, available from Kiafa Technologies, Inc., in order to optimally provide optical isolation and directivity.

The optical circulator 3735c is coupled to the optical conductors 3730c, 3740c, and 3750c. The optical circulator 3735c is preferably adapted to receive lightwaves from the optical conductor 3730c, transmit and receive lightwaves to and from the optical conductor 3740c, and transmit lightwaves to the optical conductor 3750c. The optical circulator 3735c may be any number of conventional commercially available optical circulator. In a preferred embodiment, the optical circulator 3735c is a 3-port optical circulator, available from Kiafa Technologies, Inc., in order to optimally provide optical isolation and directivity.

The optical circulator 3735d is coupled to the optical conductors 3730d, 3740d, and 3750d. The optical circulator 3735d is preferably adapted to receive lightwaves from the optical conductor 3730d, transmit and receive lightwaves to and from the optical conductor 3740d, and transmit lightwaves to the optical conductor 3750d. The optical circulator 3735d may be any number of conventional commercially available optical circulators. In a preferred embodiment, the optical circulator 3735d is a 3-port optical circulator, available from Kiafa Technologies, in order to optimally provide optical isolation and directivity.

The optical conductors 3740a, 3740b, 3740c and 3740d are coupled to the optical circulators 3735a, 3735b, 3735c, and 3735d, respectively, and the optical sensors 3745a, 3745b, 3745c, and 3745d, respectively. The optical conductors 3740a, 3740b, 3740c, and 3740d are preferably adapted to convey light waves between the optical circulators 3735a, 3735b, 3735c, and 3735d, respectively, and the optical sensors 3745a, 3745b, 3745c, and 3745d, respectively. The optical conductors 3740a, 3740b, 3740c and 3740d may be any number of conventional commercially available optical conductors. In a preferred embodiment, the optical conductors 3740a, 3740b, 3740c and 3740d are single mode optical fibers, part number SMF-28, available from Corning, Inc., in order to optimally provide lightwave transmission.

Figure 36:
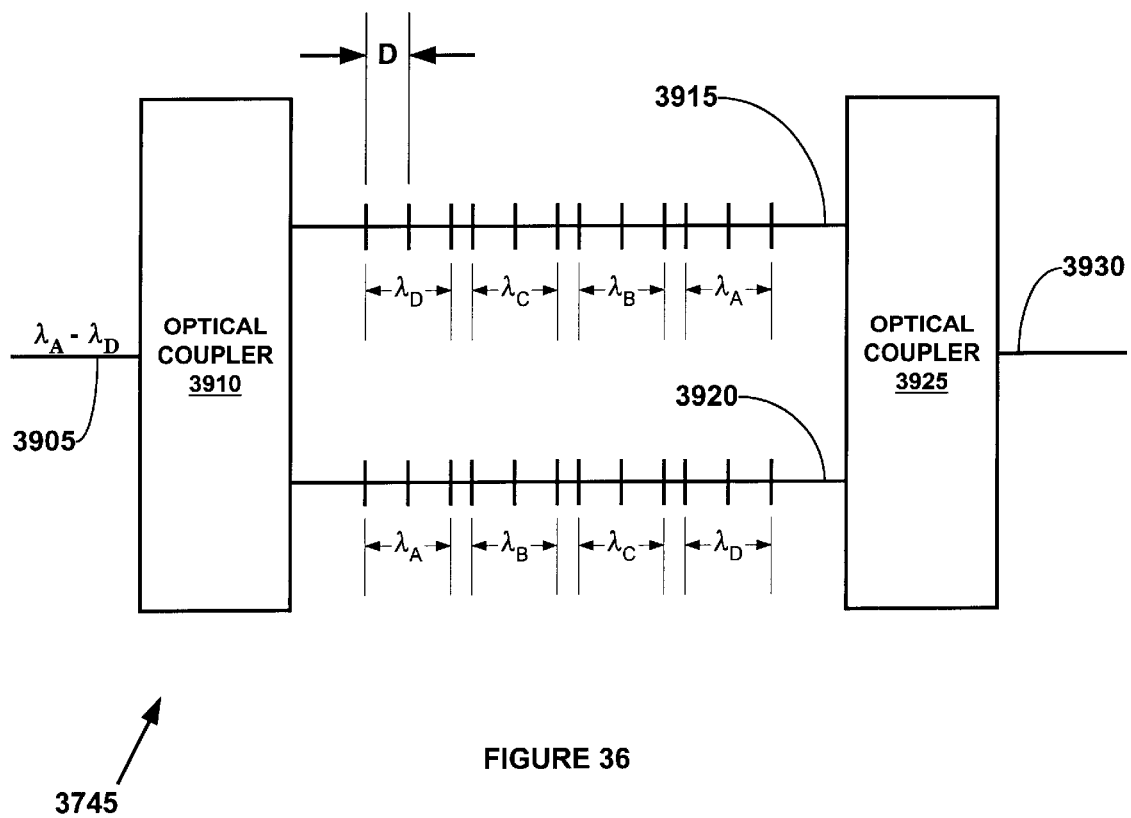
FIG. 36 is a schematic diagram of one of the optical sensors of the optical sensing system of claim 34.

The optical sensors 3745a, 3745b, 3745c, and 3745d are coupled to the optical conductors 3740a, 3740b, 3740c and 3740d, respectively. The optical sensors 3745a, 3745b, 3745c and 3745d are preferably adapted to reflect pulses of light injected into the sensors 3745a, 3745b, and 3745c. In a preferred embodiment, as illustrated in FIG. 36, each of the optical sensors 3745 include an optical conductor 3905, an optical coupler 3910, a first optical conductor 3915, a second optical conductor 3920, an optical coupler 3925, and an optical conductor 3930.

The optical conductor 3905 is coupled to the corresponding optical conductor 3740 and the optical coupler 3910. The optical conductor 3905 is preferably adapted to convey lightwaves between the corresponding optical conductor 3740 and the optical coupler 3910. The optical conductor 3905 may be any number of conventional commercially available optical conductors. In a preferred embodiment, the optical conductor 3905 is a single mode optical fiber, part number SMF-28, available from Corning, Inc., in order to optimally provide lightwave transmission.

The optical coupler 3910 is coupled to the optical conductor 3905 and the first and second optical conductors, 3915 and 3920. The optical coupler 3910 is preferably adapted to convey lightwaves between the optical conductor 3905 and the first and second optical conductors, 3915 and 3920. The optical coupler 3910 may be any number of conventional commercially available optical conductors. In a preferred embodiment, the optical coupler 3910 is a single mode optical fiber, part number SMF-28, available from Corning, Inc., in order to optimally provide lightwave transmission.

The first optical conductor 3915 is coupled to the optical coupler 3910 and the optical coupler 3925. The first optical conductor 3915 is preferably adapted to convey lightwaves to and from the optical couplers, 3910 and 3925. The first optical conductor 3915 may be any number of conventional commercially available optical conductors. In a preferred embodiment, the first optical conductor 3915 is a single mode optical fiber, part number SMF-28, available from Corning, Inc., in order to optimally provide lightwave transmission.

The first optical conductor 3915 preferably further includes a plurality of groups of bragg gratings. In a preferred embodiment, the first optical coupler 3915 includes a first group of bragg gratings having a center wavelength $\lambda_D$, a second group of bragg gratings having a center wavelength $\lambda_C$, a third group of bragg gratings having a center wavelength $\lambda_B$, and a fourth group of bragg gratings having a center wavelength $\lambda_A$. In a preferred embodiment, the bragg gratings within each group are separated by an axial distance equal to D. In a preferred embodiment, the first and last bragg gratings of adjacent groups of bragg gratings are substantially coincident in order to optimally provide continuity between adjacent sensors groups. The bragg gratings may be formed in the first optical conductor 3915 using any number of conventional commercially available processes for forming bragg gratings in an optical conductor. In a preferred embodiment, the bragg gratings are formed in the first optical conductor 3915 using the phase masking technique process, available from Innovative Fibers, in order to optimally provide wavelength selective partial reflection.

The second optical conductor 3920 is coupled to the optical coupler 3910 and the optical coupler 3925. The second optical conductor 3920 is preferably adapted to convey lightwaves to and from the optical couplers, 3910 and 3925. The second optical conductor 3920 may be any number of conventional commercially available optical conductors. In a preferred embodiment, the second optical conductor 3920 is a single mode optical fiber, part number SMF-28, available from Corning, Inc., in order to optimally provide lightwave transmission.

The second optical conductor 3920 preferably further includes a plurality of groups of bragg gratings. In a preferred embodiment, the second optical coupler 3920 includes a first group of bragg gratings having a center wavelength $\lambda_A$, a second group of bragg gratings having a center wavelength $\lambda_B$, a third group of bragg gratings having a center wavelength $\lambda_C$, and a fourth group of bragg gratings having a center wavelength $\lambda_D$. In a preferred embodiment, the bragg gratings within each group are separated by an axial distance equal to D. In a preferred embodiment, the first and last bragg gratings of adjacent groups of bragg gratings are substantially coincident in order to optimally provide continuity between adjacent sensor groups. The bragg gratings may be formed in the second optical conductor 3920 using any number of conventional commercially available processes for forming bragg gratings in an optical conductor. In a preferred embodiment, the bragg gratings are formed in the second optical conductor 3920 using the phase masking technique process, available from Innovative Fibers, in order to optimally provide wavelength selective partial reflection.

In a preferred embodiment, the first and second optical conductors, 3915 and 3920, are substantially parallel and equal in length in order to optimally provide correlation between the sensor and a reference. In a preferred embodiment, the groups of bragg gratings in the first and second optical conductors, 3915 and 3920, are substantially parallel and positioned in opposing relation to one another in order to optimally provide correlation between the sensor and a reference. In a preferred embodiment, adjacent pairs of bragg gratings, within a given group of bragg gratings, along with the intermediate section of the optical conductor provide an optical hydrophone. In a preferred embodiment, variations in the axial spacing between the opposing pairs of bragg gratings within a given optical hydrophone are sensed and processed by the system 3700 to generate signals representative of the environmental conditions sensed by the optical hydrophone. In a preferred embodiment, the optical sensors 3745 are reversible and/or sense environmental conditions when pulses of light are injected into both of the optical conductors 3905 and 3930.

The optical coupler 3925 is coupled to the optical conductor 3905 and the first and second optical conductors, 3915 and 3920. The optical coupler 3925 is preferably adapted to convey lightwaves between the optical conductor 3930 and the first and second optical conductors, 3915 and 3920. The optical coupler 3925 may be any number of conventional commercially available optical conductors. In a preferred embodiment, the optical coupler 3925 is a 1×2 optical coupler, part number SMUC2150PS210, available from E-Tek Dynamics, in order to optimally provide balanced division of the optical signals.

The optical conductor 3930 is coupled to the optical coupler 3925 and is preferably adapted to be coupled to another optical conductor. The optical conductor 3930 is preferably adapted to convey lightwaves between another optical conductor and the optical coupler 3925. The optical conductor 3930 may be any number of conventional commercially available optical conductors. In a preferred embodiment, the optical conductor 3930 is a single mode optical fiber, part number SMF-28, available from Corning, Inc., in order to optimally provide lightwave transmission.

In a preferred embodiment, during operation of the sensors 3745, pulses of light having center wavelengths $\lambda_A$, $\lambda_B$, $\lambda_C$ and $\lambda_D$ are injected into the first and second optical conductors, 3915 and 3920. The injected pulses of light are then partially reflected by the corresponding bragg gratings. The reflected pulses of light are then conveyed out of the sensors 3745 by the optical conductors 3905. Variations in the axial spacing between adjacent bragg gratings within the first and second optical conductors, 3915 and 3920, caused by changes in environmental conditions are then preferably detected by the corresponding compensating interferometer assemblies 3765. Because the groups of bragg gratings within the first and second optical conductors, 3915 and 3920, are axially spaced and ordered differently, the sensors 3745 provide time division and wave division multiplexed sensors.

The optical conductors 3750a, 3750b, 3750c, and 3750d are coupled to the optical circulators 3735a, 3735b, 3735c, and 3735d, respectively, and the optical amplifiers 3755a, 3755b, 3755c, and 3755d, respectively. The optical conductors 3750a, 3750b, 3750c, and 3750d are preferably adapted to convey lightwaves between the optical circulators 3735a, 3735b, 3735c, and 3735d, respectively, and the optical amplifiers 3755a, 3755b, 3755c, and 3755d, respectively. The optical conductors 3750a, 3750b, 3750c and 3750d may be any number of conventional commercially available optical conductors. In a preferred embodiment, the optical conductors 3750a, 3750b, 3750c and 3750d are single mode optical fibers, part number SMF-28, available from Corning, Inc., in order to optimally provide lightwave transmission.

Figure 37:
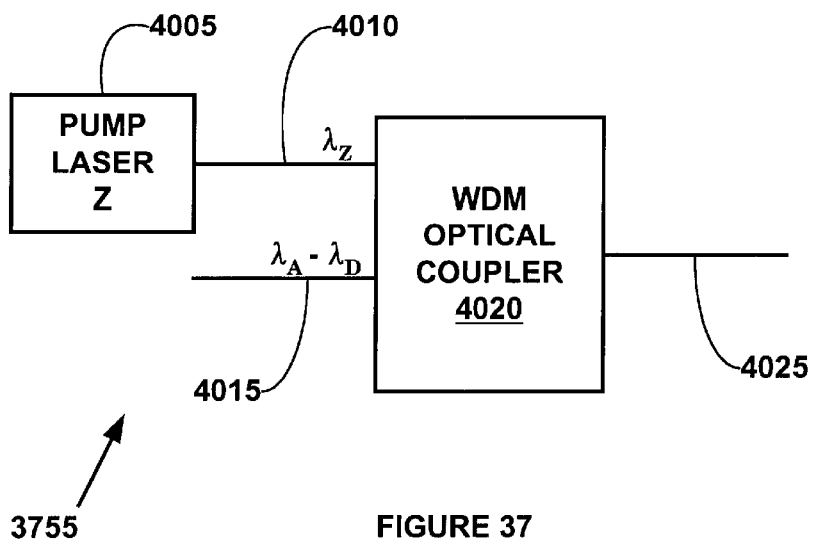
FIG. 37 is a schematic diagram of another one of the optical amplifiers of the optical sensing system of claim 34.

The optical amplifiers 3755a, 3755b, 3755c, and 3755d are coupled to the optical conductors 3750a, 3750b, 3750c and 3750d, respectively, and the optical conductors 3760a, 3760b, 3760c, and 3760d, respectively. The optical amplifiers 3755a, 3755b, 3755c and 3755d are preferably adapted to amplify the energy level of lightwaves passing through the optical amplifiers 3755a, 3755b, 3755c and 3755d. The optical amplifiers 3755a, 3755b, 3755c and 3755d may be any number of conventional commercially available optical amplifiers. In a preferred embodiment, as illustrated in FIG. 37, each optical amplifier 3755 includes a pump laser Z 4005, an optical conductor 4010, an optical conductor 4015, a WDM optical coupler 4020, and an optical conductor 4025.

The pump laser Z 4005 is coupled to the optical conductor 4010. The pump laser Z 4005 is preferably adapted to generate lightwaves having a center wavelength $\lambda_Z$. In a preferred embodiment, the center wavelength $\lambda_Z$ is not within the range of center wavelengths $\lambda_A$ to $\lambda_D$. In a preferred embodiment, the center wavelength $\lambda_Z$ is equal to about 980 nm. The pump laser Z 4005 may be any number of conventional commercially available pump lasers. In a preferred embodiment, the pump laser Z 4005 is a SLDO-2500-XXX pump laser, available from SDL, Inc., in order to optimally provide pump power to the optical conductor 4025.

The optical conductor 4015 is coupled to the corresponding optical conductor 3750 and the WDM optical coupler 4020. The optical conductor 4015 is preferably adapted to convey lightwaves between the corresponding optical conductor 3750 and the WDM optical coupler 4020. The optical conductor 4015 may be any number of conventional commercially available optical conductors. In a preferred embodiment, the optical conductor 4015 is a single mode optical fiber, part number SMF-28, available from Corning, Inc., in order to optimally provide lightwave transmission.

The WDM optical coupler 4020 is coupled to the optical conductors 4010, 4015 and 4025. The WDM optical coupler 4020 is preferably adapted to receive and combine lightwaves received from the optical conductors 4010 and 4015 and transmit the combined lightwaves to the optical conductor 4025.

The WDM optical coupler 4020 may be any number of conventional commercially available WDM optical couplers. In a preferred embodiment, the WDM optical coupler 4020 is a 1550 nm/980 nm FWDMC0 WDM optical coupler, available from E-Tek Dynamics, Inc., in order to optimally provide low loss insertion of pump power.

The optical conductor 4025 is coupled to the WDM optical coupler 4020 and the corresponding optical conductor 3760. The optical conductor 4025 is preferably adapted to convey lightwaves between the WDM optical coupler 4020 and the corresponding optical conductor 3760. In a preferred embodiment, the optical conductor 4025 is adapted to amplify the energy level of lightwaves traveling within the optical conductor 4025 when the optical conductor 4025 is excited by lightwaves from a pump laser. In a preferred embodiment, the optical conductor 4025 is adapted to amplify the energy level of lightwaves traveling within the optical conductor 4025 when the optical conductor is excited by lightwaves having a center wavelength $\lambda_Z$ from the pump laser Z 4005. In a preferred embodiment, the optical conductor 4025 is an erbium doped optical fiber, available from 3M Speciality Optical Fibers, in order to optimally provide an optical gain medium.

The optical conductors 3760a, 3760b, 3760c and 3760d are coupled to the optical amplifiers 3755a, 3755b, 3755c, and 3755d, respectively, and the compensating interferometer assemblies 3765a, 3765b, 3765c, and 3765d, respectively. The optical conductors 3760a, 3760b, 3760c, and 3760d are preferably adapted to convey lightwaves between the optical amplifiers 3755a, 3755b, 3755c, and 3755d, respectively, and the compensating interferometer assemblies 3765a, 3765b, 3765c, and 3765d, respectively. The optical conductors 3760a, 3760b, 3760c and 3760d may be any number of conventional commercially available optical conductors. In a preferred embodiment, the optical conductors 3760a, 3760b, 3760c and 3760d are single mode optical fibers, part number SMF-28, available from Corning, Inc., in order to optimally provide lightwave transmission.

The compensating interferometer assemblies 3765a, 3765b, 3765c, and 3765d are coupled to the optical conductors 3760a, 3760b, 3760c, and 3760d, respectively, and the communication interfaces 3770a, 3770b, 3770c and 3770d. The compensating interferometers assemblies 3765a, 3765b, 3765c and 3765d are preferably adapted to receive reflected pulses of light from the optical sensors 3745a, 3745b, 3745c, and 3745d, respectively, and generate electrical signals representative of the sensed environmental conditions.

Figure 38:
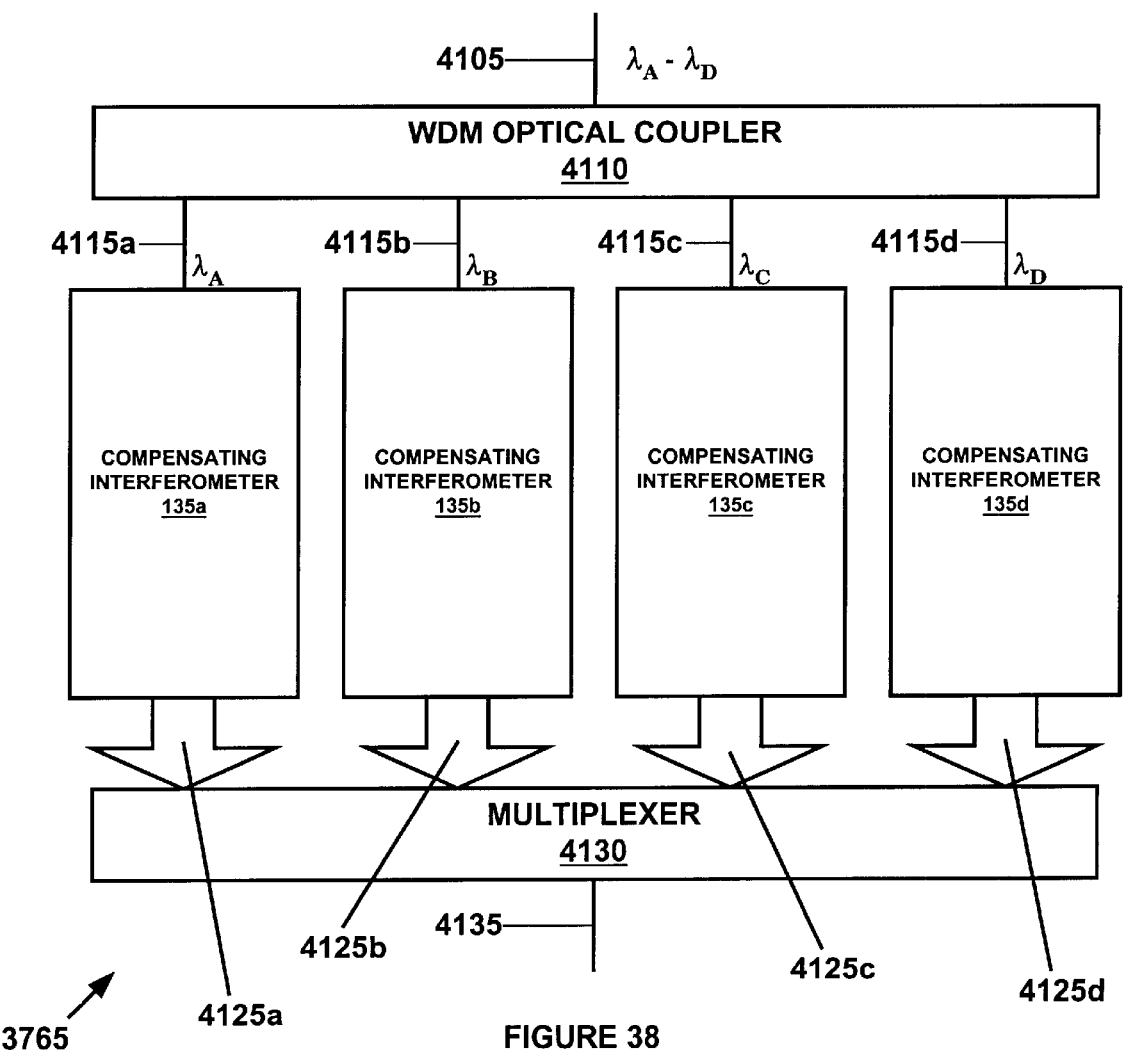
FIG. 38 is a schematic diagram of one of the compensating interferometer assemblies of the optical sensing system of FIG. 34.
Figure 39:
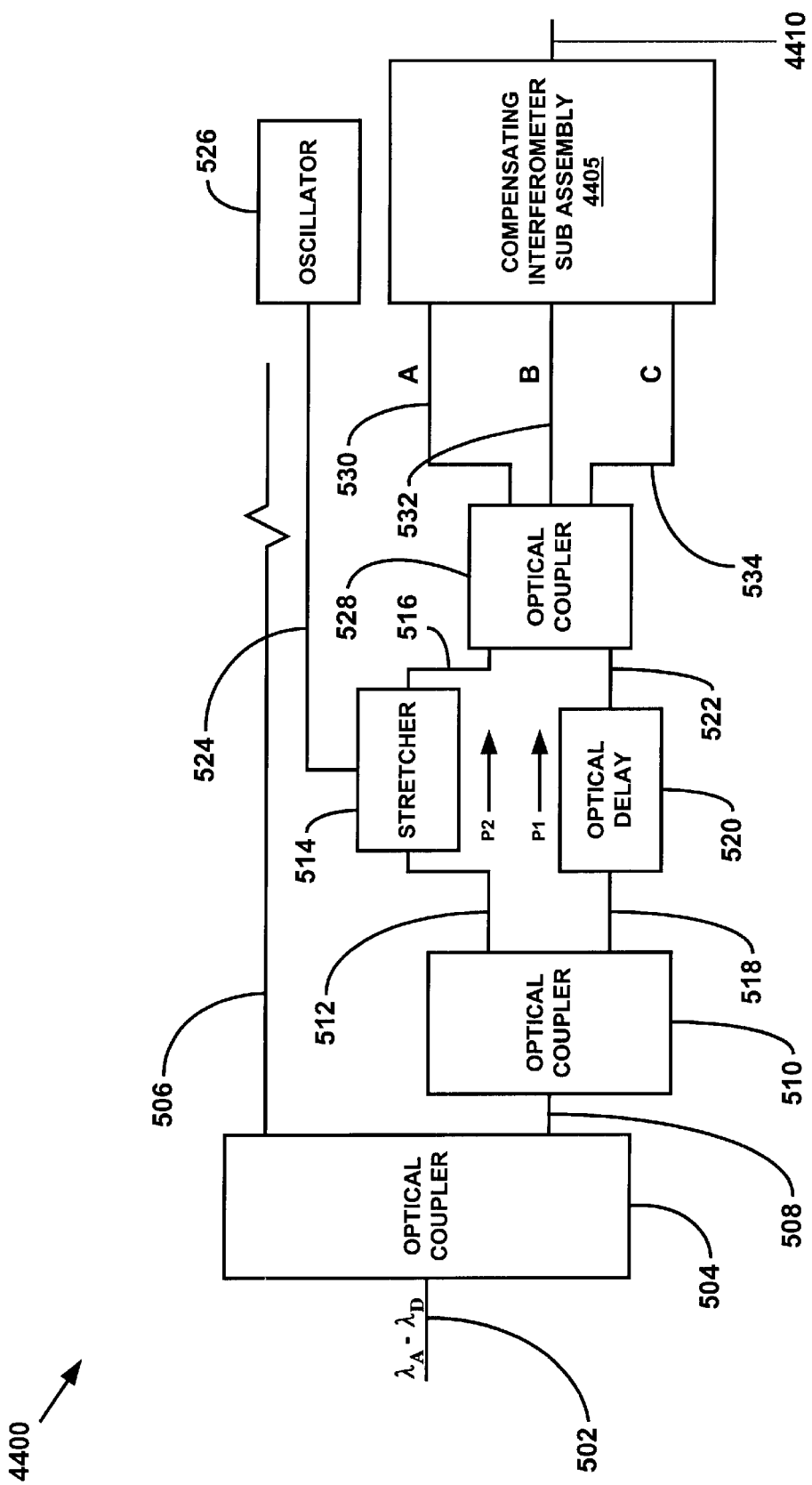
FIG. 39 is a schematic diagram of an alternative embodiment of one of the compensating interferometer assemblies for use in the optical sensing system of FIG. 34.

In a preferred embodiment, as illustrated in FIG. 38, each of the compensating interferometer assemblies 3765a, 3765b, 3765c and 3765d include an optical conductor 4105, a WDM optical coupler 4110, optical conductors 4115a, 4115b, 4115c, and 4115d, compensating interferometers 135a, 135b, 135c, and 135d, communication interfaces 4125a, 4125b, 4125c and 4125d, a multiplexer 4130, and a communication interface 4135.

The optical conductor 4105 is coupled to the corresponding optical conductor 3760 and the WDM optical coupler 4110. The optical conductor 4105 is preferably adapted to convey lightwaves between the corresponding optical conductor 3760 and the WDM optical coupler 4110. The optical conductor 4105 may be any number of conventional commercially available optical conductors. In a preferred embodiment, the optical conductor 4105 is a single mode optical fiber, part number SMF-28, available from Corning, Inc., in order to optimally provide lightwave transmission.

The WDM optical coupler 4110 is coupled to the optical conductor 4105 and the optical conductors 4115a, 4115b, 4115c, and 4115d. The WDM optical coupler 4110 is preferably adapted to convey lightwaves having center wavelengths $\lambda_A$, $\lambda_B$, $\lambda_C$, and $\lambda_D$ from the optical conductor 4105 to the optical conductors 4115a, 4115b, 4115c, and 4115d, respectively. The WDM optical coupler 4110 may be any number of conventional commercially available WDM optical couplers. In a preferred embodiment, the WDM optical coupler 4110 is a LDW Series 4 channel broad band WDM optical coupler, available from Kiafa Technologies, in order to optimally provide wavelength splitting and combining.

The optical conductors 4115a, 4115b, 4115c, and 4115d are coupled to the WDM optical coupler 4110 and the corresponding compensating interferometers 135a, 135b, 135c, and 135d, respectively. The optical conductors 4115a, 4115b, 4115c, and 4115d are preferably adapted to convey lightwaves between the WDM optical coupler 4110 and the corresponding compensating interferometers 135a, 135b, 135c, and 135d, respectively. The optical conductors 4115a, 4115b, 4115c, and 4115d may be any number of conventional commercially available optical conductors. In a preferred embodiment, the optical conductors 4115a, 4115b, 4115c, and 4115d are single mode optical fibers, part number SMF-28, available from Corning, Inc., in order to optimally provide lightwave transmission.

The compensating interferometers 135a, 135b, 135c and 135d are coupled to the optical conductors 4115a, 4115b, 4115c, and 4115d, respectively, and the communication interfaces 4125a, 4125b, 4125c and 4125d, respectively. The compensating interferometer sub assemblies 135a, 135b, 135c and 135d are preferably adapted to: (1) receive reflected pulses of light having center wavelengths $\lambda_A$, $\lambda_B$, $\lambda_C$, and $\lambda_D$, respectively, from the optical conductors 4115a, 4115b, 4115c, and 4115d, respectively; (2) generate electrical signals for error correction and analog-to-digital conversion timing; (3) generate delayed and undelayed versions of the reflected pulses of light; (4) generate optical interference patterns using the delayed and undelayed versions of the reflected pulses of light; and (5) generate electrical signals representative of the optical interference patterns. In a preferred embodiment, the compensating interferometers 135a, 135b, 135c, and 135d are substantially identical in design and operation to the compensating interferometer 135 of system 100.

The communication interfaces 4125a, 4125b, 4125c and 4125d are coupled to the corresponding compensating interferometers 135a, 135b, 135c, and 135d and the multiplexer 4130. The communication interfaces 4125a, 4125b, 4125c and 4125d may be any number of conventional commercially available communication interfaces.

The multiplexer 4130 is coupled to the communication interfaces 4125a, 4125b, 4125c, and 4125d and the communication interface 4135.

The communication interface 4135 is coupled to the processor multiplexer 4130 and the corresponding communication interface 3770. The communication interface 4135 is preferably adapted to convey electrical signals representative of the environmental conditions sensed by the optical sensors 3745 from the multiplexer 4130 to the corresponding communication interface 3770. The communication interface 4135 may be any number of conventional commercially available communication interfaces.

The communication interfaces 3770a, 3770b, 3770c and 3770d are coupled to the communication interfaces 4135 of the compensating interferometer assemblies 3765a, 3765b, 3765c, and 3765d, respectively, and the system interface 145. The communication interfaces 3770a, 3770b, 3770c and 3770d are preferably adapted to convey electrical signals representative of the environmental conditions sensed by the optical sensors 3745 from the communication interfaces 4135 of the compensating interferometer assemblies 3765a, 3765b, 3765c, and 3765d, respectively, to the system interface 145. The communication interfaces 3770a, 3770b, 3770c and 3770d may be any number of conventional commercially available communication interfaces.

The system interface 145 is coupled to the communication interfaces 3770a, 3770b, 3770c, and 3770d.

In a preferred embodiment, during operation of the system 3700, the optical sources 105 controllably generate pulses of light having center wavelengths $\lambda_A$, $\lambda_B$, $\lambda_C$, and $\lambda_D$. The pulses of light are then preferably combined within the WDM optical coupler 3705 and amplified by the optical amplifier 3715. The energy of the pulses of light are then preferably split equally among the optical conductors 3730. The pulses of light are then preferably injected into the optical sensors 3745. Within the optical sensors, the pulses of light are then preferably partially reflected by the bragg gratings. The reflected pulses of light are then preferably reflected back to the optical circulators 3735 for transmission to the optical conductors 3750. The reflected pulses of light are then preferably amplified within the amplifiers 3755. The reflected pulses of light are then preferably transmitted to the compensating interferometer assemblies 3765.

Within the compensating interferometer assemblies 3765, the reflected pulses of light are divided into reflected pulses of light having center wavelengths $\lambda_A$, $\lambda_B$, $\lambda_C$, and $\lambda_D$ by the WDM optical couplers 4110 and transmitted to the corresponding compensating interferometers 135. Within the compensating interferometers 135, a delayed and an undelayed set of reflected pulses of light are generated within the optical paths P1 and P2. The delayed and undelayed sets of reflected pulses of light are then preferably processed using the method 6000 to generate electrical signals representative of the environmental conditions sensed by the optical sensors 3745.

In an alternative embodiment of the system 3700, one or more of the compensating interferometer assemblies 3765 are replaced with a compensating interferometer assembly 4400, as illustrated in FIGS. 39, 40, 41 and 42, that includes the optical conductor 502, the optical coupler 504, the optical conductor 506, the optical conductor 508, the optical coupler 510, the optical conductor 512, the stretcher 514, the optical conductor 516, the optical conductor 518, the optical delay 520, the optical conductor 522, the communication interface 524, the oscillator 526, the optical coupler 528, the optical conductor 530, the optical conductor 532, the optical conductor 534, a compensating interferometer sub assembly 4405, and a communication interface 4410. The design and operation of the optical conductor 502, the optical coupler 504, the optical conductor 506, the optical conductor 508, the optical coupler 510, the optical conductor 512, the stretcher 514, the optical conductor 516, the optical conductor 518, the optical delay 520, the optical conductor 522, the communication interface 524, the oscillator 526, the optical coupler 528, the optical conductor 530, the optical conductor 532, and the optical conductor 534 are preferably substantially identical to the corresponding elements of the compensating interferometer 135 of the system 100.

Figure 40:
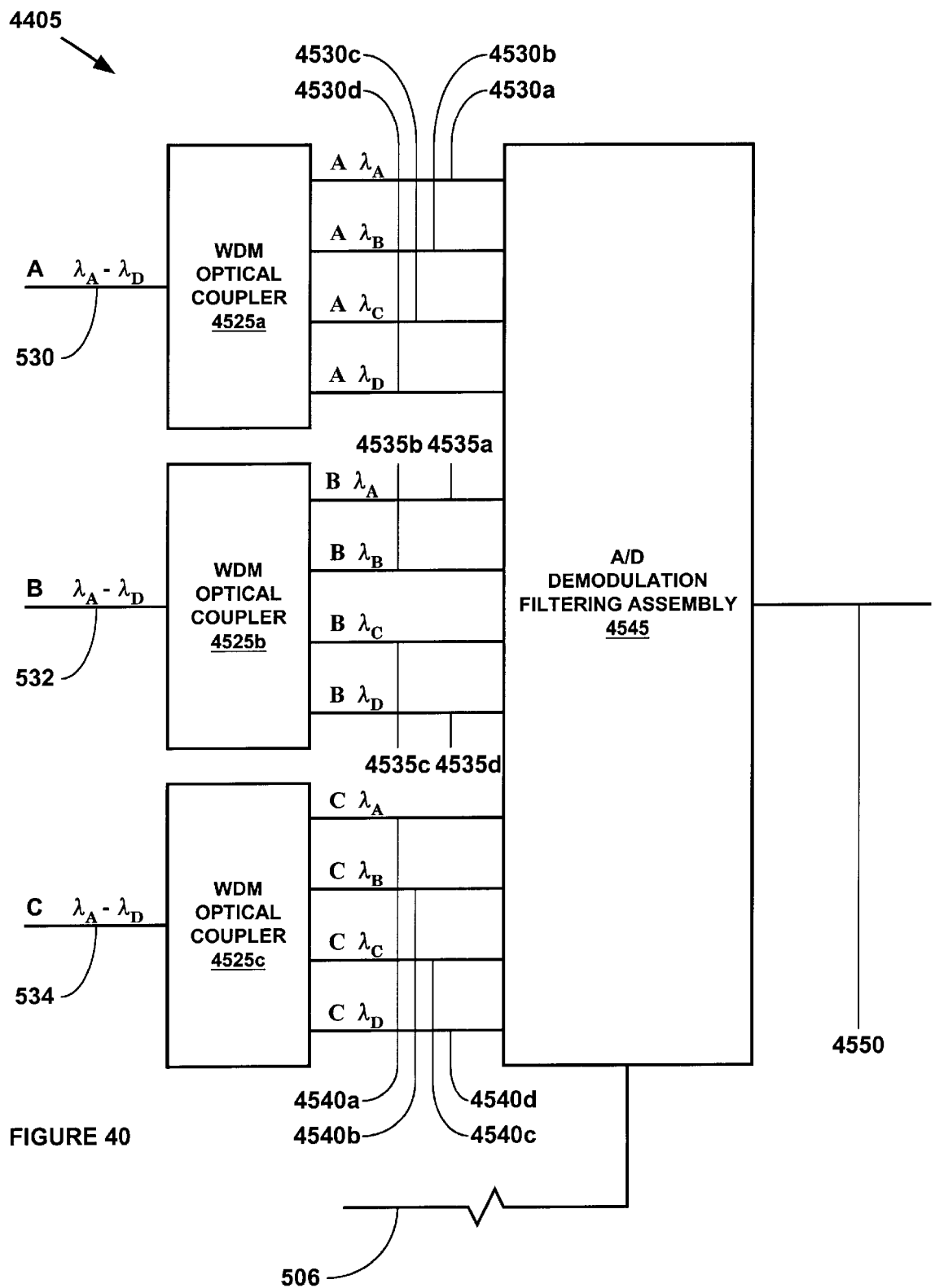
FIG. 40 is a schematic diagram of an embodiment of the compensating interferometer sub-assembly of the compensating interferometer assembly of FIG. 39.

As illustrated in FIG. 40, in a preferred embodiment, the compensating interferometer sub-assembly 4405 includes WDM optical couplers 4525a, 4545b, and 4545c, optical conductors 4530a, 4530b, 4530c, 4530d, 4535a, 4535b, 4535c, 4535d, 4540a, 4540b, 4540c, and 4540d, an A/D demodulation and filtering assembly 4545, and a communication interface 4550.

The WDM optical coupler 4525a is coupled to the optical conductor 530 and the optical conductors 4530a, 4530b, 4530c and 4530d. The WDM optical coupler 4525a is preferably adapted to receive the optical signals A for the range of center wavelengths $\lambda_A$ to $\lambda_D$, and divide the optical signals A into the optical signals A for the center wavelengths $\lambda_A$, $\lambda_B$, $\lambda_C$, and $\lambda_D$ for transmission to the A/D demodulation and filtering assembly 4545. The WDM optical coupler 4525a may be any number of conventional commercially available WDM optical couplers. In a preferred embodiment, the WDM optical coupler 4525a is a LDW Series 4 channel broad band WDM optical coupler, available from Kiafa Technologies, in order to optimally provide wavelength splitting and combining.

The WDM optical coupler 4525b is coupled to the optical conductor 532 and the optical conductors 4535a, 4535b, 4535c and 4535d. The WDM optical coupler 4525b is preferably adapted to receive the optical signals B for the range of center wavelengths $\lambda_A$ to $\lambda_D$, and divide the optical signals B into the optical signals B for the center wavelengths $\lambda_A$, $\lambda_B$, $\lambda_C$, and $\lambda_D$ for transmission to the optical conductors 4535a, 4535b, 4535c and 4535d, respectively. The WDM optical coupler 4525b may be any number of conventional commercially available WDM optical couplers. In a preferred embodiment, the WDM optical coupler 4525b is a LDW Series 4 channel broad band WDM optical coupler, available from Kiafa Technologies, in order to optimally provide wavelength splitting and combining.

The WDM optical coupler 4525c is coupled to the optical conductor 534 and the optical conductors 4540a, 4540b, 4540c and 4540d. The WDM optical coupler 4525c is preferably adapted to receive the optical signals C for the range of center wavelengths $\lambda_A$ to $\lambda_D$, and divide the optical signals C into the optical signals C for the center wavelengths $\lambda_A$, $\lambda_B$, $\lambda_C$, and $\lambda_D$ for transmission to the optical conductors 4540a, 4540b, 4540c and 4540d, respectively. The WDM optical coupler 4525c may be any number of conventional commercially available WDM optical couplers. In a preferred embodiment, the WDM optical coupler 4525c is a LDW Series/4 channel broad band WDM optical coupler, available from Kiafa Technologies, in order to optimally provide wavelength splitting and combining.

The optical conductors 4530a, 4530b, 4530c, and 4530d are coupled to the WDM optical coupler 4525a, and the A/D demodulation and filtering assembly 4545. The optical conductors 4530a, 4530b, 4530c, and 4530d are preferably adapted to convey lightwaves between the WDM optical coupler 4525a and the A/D demodulation and filtering assembly 4545. The optical conductors 4530a, 4530b, 4530c, and 4530d may be any number of conventional commercially available optical conductors. In a preferred embodiment, the optical conductors 4530a, 4530b, 4530c, and 4530d are single mode optical fibers, part number SMF-28, available from Corning, Inc., in order to optimally provide lightwave transmission.

The optical conductors 4535a, 4535b, 4535c, and 4535d are coupled to the WDM optical coupler 4525b and the A/D demodulation and filtering assembly 4545. The optical conductors 4535a, 4535b, 4535c, and 4535d are preferably adapted to convey lightwaves between the WDM optical coupler 4525b and the A/D demodulation and filtering assembly 4545. The optical conductors 4535a, 4535b, 4535c, and 4535d may be any number of conventional commercially available optical conductors. In a preferred embodiment, the optical conductors 4535a, 4535b, 4535c, and 4535d are single mode optical fibers, part number SMF-28, available from Corning, Inc., in order to optimally provide lightwave transmission.

The optical conductors 4540a, 4540b, 4540c, and 4540d are coupled to the WDM optical coupler 4525c and the A/D demodulation and filtering assembly 4545. The optical conductors 4540a, 4540b, 4540c, and 4540d are preferably adapted to convey lightwaves between the WDM optical coupler 4525c and the A/D demodulation and filtering assembly 4545. The optical conductors 4540a, 4540b, 4540c, and 4540d may be any number of conventional commercially available optical conductors. In a preferred embodiment, the optical conductors 4540a, 4540b, 4540c, and 4540d are single mode optical fibers, part number SMF-28, available from Corning, Inc., in order to optimally provide lightwave transmission.

The A/D demodulation and filtering assembly 4545 is coupled to the optical conductors 4530, 4535, and 4540 and the communication interface 4550.

Figure 41:
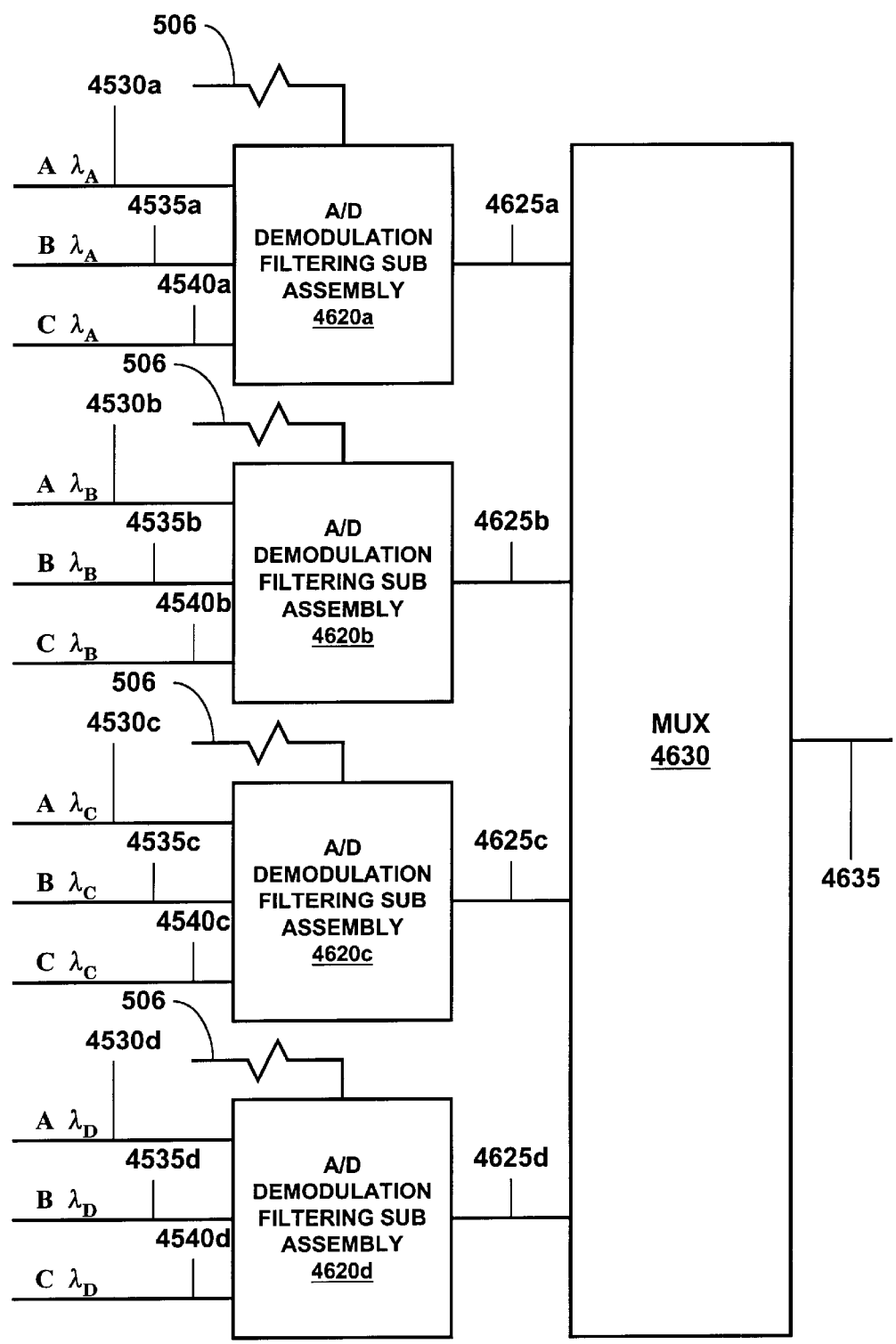
FIG. 41 is a schematic diagram of an embodiment of the A/D demodulation and filtering assembly of the compensating interferometer sub-assembly of FIG. 40.

In a preferred embodiment, as illustrated in FIG. 41, the A/D demodulation and filtering assembly 4545 includes A/D demodulation and filtering sub assemblies 4620a, 4620b, 4620c, and 4620d, communication interfaces 4625a, 4625b, 4625c, and 4625d, a multiplexer 4630, and a communication interface 4635.

The A/D demodulation and filtering sub assemblies 4620a, 4620b, 4620c, and 4620d are coupled to corresponding optical conductors 4530, 4535, and 4545. In this manner, each A/D demodulation and filtering sub assembly 4620 processes optical signals A, B and C for a corresponding center wavelength.

Figure 42:
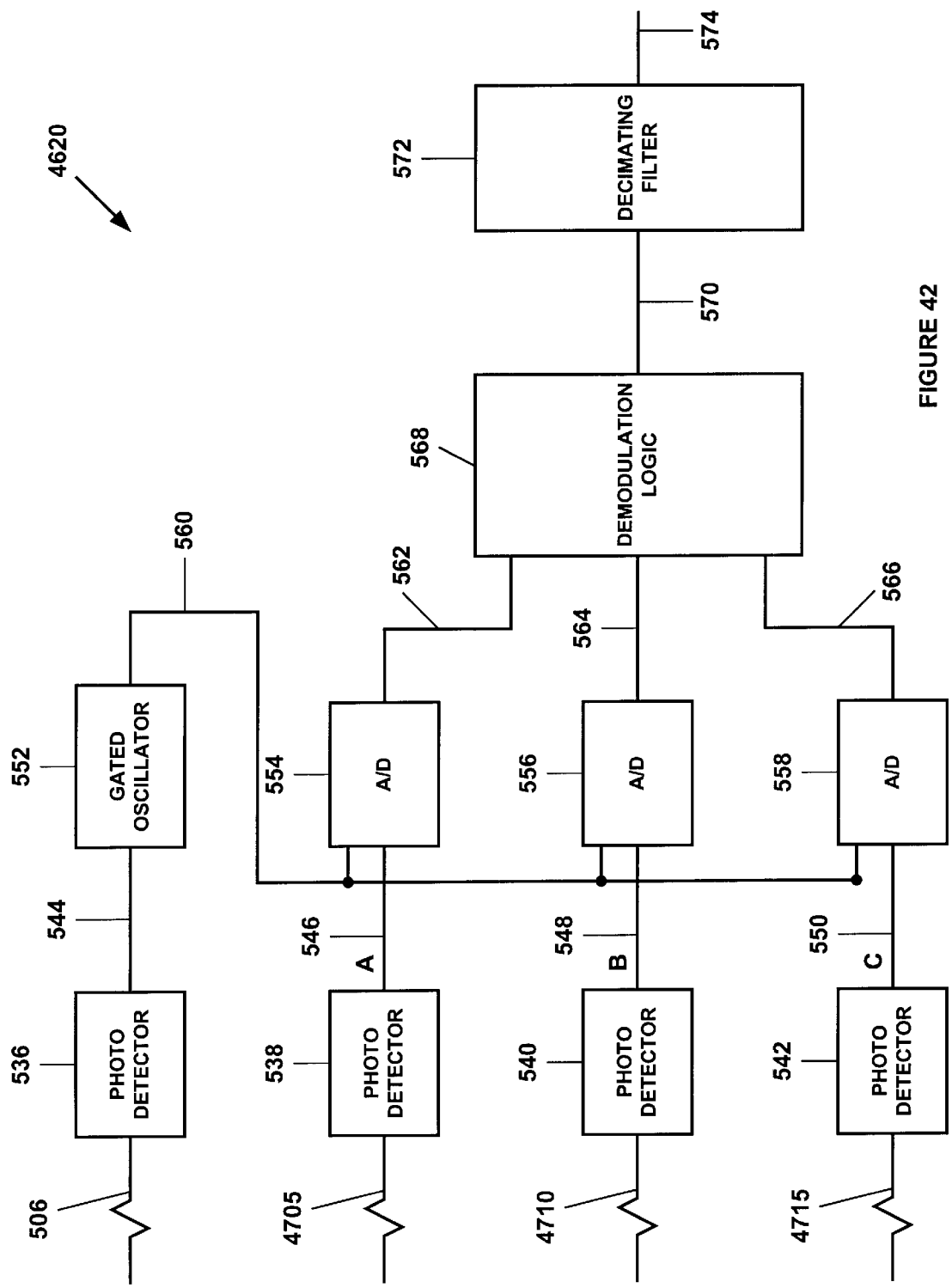
FIG. 42 is a schematic diagram of an embodiment of the A/D demodulation and filtering sub-assembly of the A/D demodulation and filtering assembly of FIG. 41.

In a preferred embodiment, as illustrated in FIG. 42, each A/D demodulation and filtering sub assembly 4620 includes optical conductors 4705, 4710 and 4715, the photodetectors 536, 538, 540, and 542, the communication interfaces 544, 546, 548, and 550, the gated oscillator 552, the A/D converters 554, 556, and 558, the communication interface 560, the communication interfaces 562, 564, and 566, the demodulation logic 568, the communication interface 570, the decimating filter 572, and the communication interface 574. In a preferred embodiment, the design and operation of the photodetectors 536, 538, 540, and 542, the communication interfaces 544, 546, 548, and 550, the gated oscillator 552, the A/D converters 554, 556, and 558, the communication interface 560, the communication interfaces 562, 564, and 566, the demodulation logic 568, the communication interface 570, the decimating filter 572, and the communication interface 574 are substantially identical to the corresponding elements of the compensating interferometer 135 of the system 100.

The optical conductors 4705, 4710, and 4715 are coupled to corresponding optical conductors 4530, 4535, and 4540 and the photodetectors 538, 540 and 542, respectively. The optical conductors 4705, 4710 and 4715 may be any number of conventional commercially available optical fibers. In a preferred embodiment, the optical conductors 4705, 4710, and 4715 are single mode optical fibers.

The communication interfaces 4625a, 4625b, 4625c, and 4625d are coupled to the corresponding communication interfaces 574 of the A/D demodulation and filtering sub assemblies 4620.

The multiplexer 4630 is coupled to the communication interfaces 4625a, 4635b, 4635c, and 4635d and the communication interface 4635.

The communication interface 4635 is coupled to the multiplexer 4630 and the communication interface 4550.

The communication interface 4550 is coupled to the communication interface 4635 and the communication interface 4410.

The communication interface 4410 is coupled to the communication interface 4550 and the corresponding communication interface 3770.

In a preferred embodiment, during operation of the alternative embodiment of the system 3700 including one or more of the compensating interferometer assemblies 4400, the optical sources 105 controllably generate pulses of light having center wavelengths $\lambda_A$, $\lambda_B$, $\lambda_C$, and $\lambda_D$. The pulses of light are then preferably combined within the WDM optical coupler 3705 and amplified by the optical amplifier 3715. The energy of the pulses of light are then preferably split equally among the optical conductors 3730. The pulses of light are then preferably injected into the optical sensors 3745. Within the optical sensors, the pulses of light are then preferably partially reflected by the bragg gratings. The reflected pulses of light are then preferably reflected back to the optical circulators 3735 for transmission to the optical conductors 3750. The reflected pulses of light are then preferably amplified within the amplifiers 3755. The reflected pulses of light are then preferably transmitted to at least one of the compensating interferometer assemblies 4400.

Within the compensating interferometer assemblies 4400, the energy of the reflected pulses of light having center wavelengths ranging from $\lambda_A$ to $\lambda_D$ are preferably split up by the ratio optical coupler 504. The majority of the energy of the reflected pulses of light having center wavelengths ranging from $\lambda_A$ to $\lambda_D$ are converted into a delayed and an undelayed set of reflected pulses of light within the optical paths P1 and P2. The remaining energy of the reflected pulses of light having center wavelengths ranging from $\lambda_A$ to $\lambda_D$ are used to provide an optical signal for synchronizing the analog-to-digital conversion of analog signals. The delayed and undelayed sets of reflected pulses of light are then preferably combined within the optical coupler 528 to generate optical interference patterns representative of the axial spacing of the pairs of bragg gratings within each of the optical hydrophones of the corresponding optical sensors 3745.

Within the compensating interferometer sub assembly 4405, the optical signals A, B, and C are divided up into their corresponding center wavelengths by the WDM optical couplers 4525a, 4525b, and 4525c. The optical signals A, B and C are then processed by the A/D demodulation and filtering sub assemblies 4620 to generate signals representative of the environmental conditions sensed by the optical hydrophones of the corresponding optical sensor 3745. In a preferred embodiment, the electrical signals A, B and C are processed by the assemblies 4620 using the conversion program 6000 to generate signals representative of the environmental conditions sensed by the optical hydrophones of the corresponding optical sensor 3745.

Figure 43A:
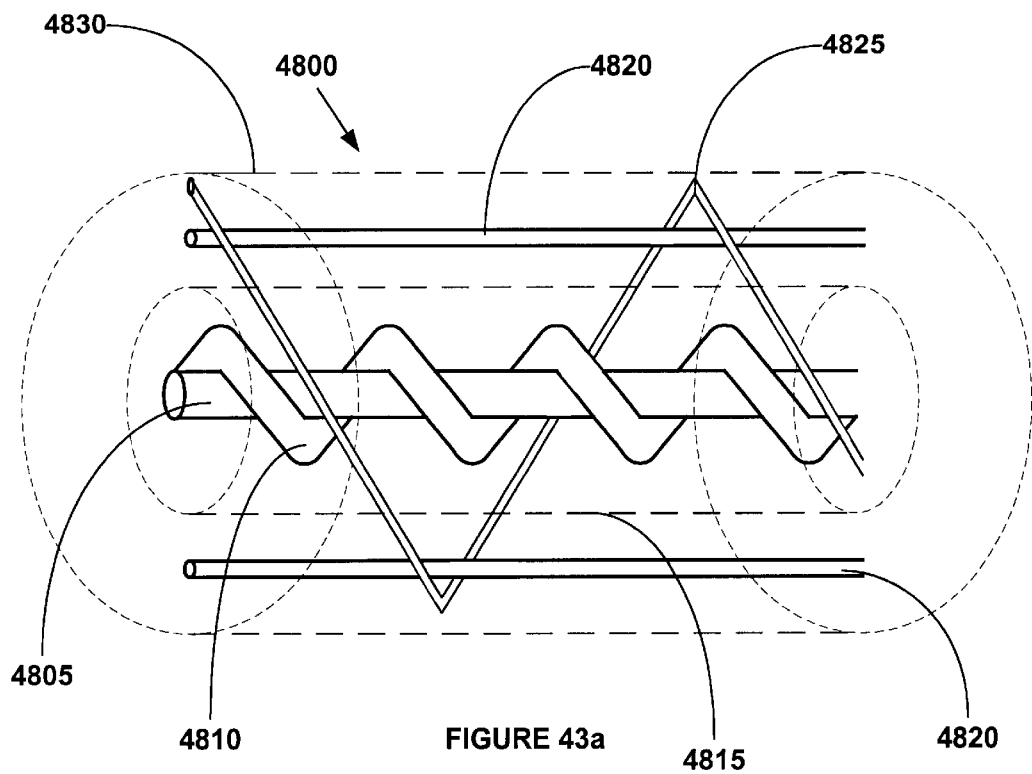
FIG. 43a is an illustration of a preferred embodiment of an optical sensor assembly.

Referring now to FIG. 43a, a preferred embodiment of an optical sensor 4800 includes one or more inner elastic members 4805, an optical fiber assembly 4810 including a plurality of optical fibers, each having partially reflective internal elements, an inner tube 4815, one or more outer strength members 4820, one or more outer communication interfaces 4825, and an outer tuber 4830.

The inner elastic members 4805 are coupled to the optical fiber assembly 4810. The inner elastic members 4805 are preferably adapted to support and position the optical fiber assembly 4810 within the optical sensor 4800. The inner elastic members 4805 may be any number of conventional commercially available elastic members such as, for example, synthetic rubber, or santoprene.

The optical fiber assembly 4810 is coupled to the inner elastic members 4805. The optical fiber assembly 4810 is preferably adapted to convey lightwaves.

Figure 43B:
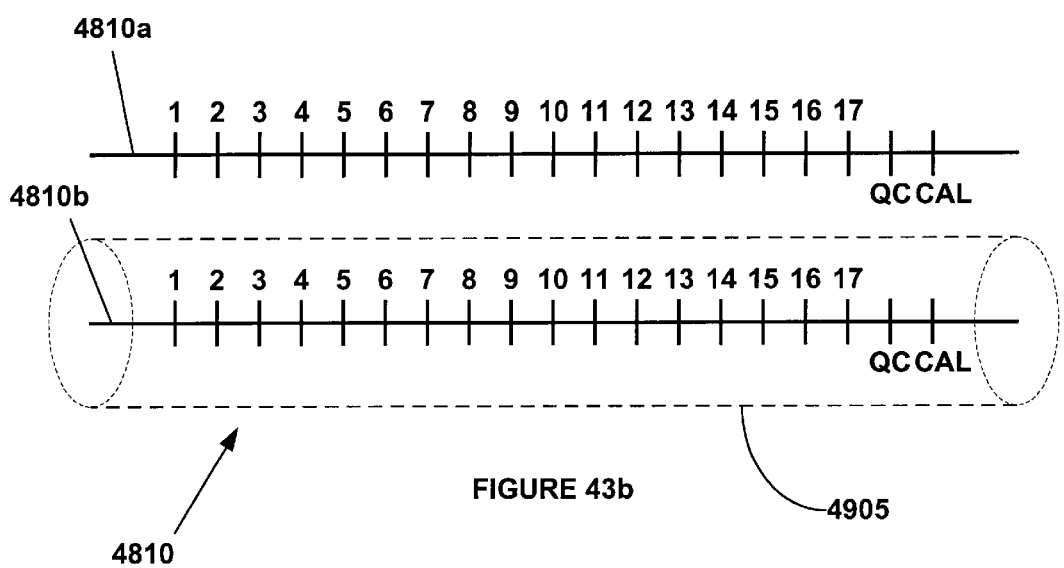

In a preferred embodiment, as illustrated in FIG. 43b, the optical fiber assembly 4810 includes a plurality of optical fibers 4810a and 4810b. In a preferred embodiment, the optical fiber 4810a is acoustically sensitive and the optical fiber 4810b is acoustically insensitive. In a preferred embodiment, the optical fiber 4810b is acoustically insulated by a conventional acoustic insulating member 4905. In a preferred embodiment, each of the optical fibers 4810a and 4810b include partially reflective elements. The partially reflective elements may be partially reflective internal mirrors and/or bragg gratings. In a preferred embodiment, the partially reflective elements include 17 partially reflective elements used for measuring environmental conditions and one or more partially reflective elements used for quality control (QC) and calibration (CAL). In a preferred embodiment, optical hydrophones are defined by adjacent pairs of partially reflective elements and the intermediate section of optical fibers 4810*a* and 4810*b*.

The inner tube 4815 is coupled to and houses the inner elastic member 4805 and the optical fiber 4810. The inner tube 4815 may be any number of conventional commercially available tubes suitable for underwater use. In a preferred embodiment, an open cell foam is wrapped around the inner elastic members 4805 and the optical fiber assembly 4810 within the inner tuber 4815. In a preferred embodiment, the interior of the inner tuber 4815 is filled with, and open to receive, seawater at both ends.

The outer strength members 4820 are coupled to the inner tube 4815, the outer communication interfaces 4825, and the outer tube 4830. The outer strength members 4820 are preferably adapted to provide structural support for the inner tube 4815, the outer communication interfaces 4825, and the outer tuber 4830. The outer strength members 4820 may be any number of conventional commercially available strength members.

The outer communication interfaces 4825 are coupled to the inner tube 4815, the outer support members 4820, and the outer tube 4830. The outer communication interfaces 4825 are preferably adapted to convey optical and/or electrical signals. The outer communication interfaces 4825 may be any number of conventional optical and/or electrical communication interfaces.

The outer tube 4830 is coupled to and houses the elastic members 4805, the optical fiber assembly 4810, the inner tube 4815, the outer strength members 4820, and the communication interfaces 4825. The outer tube is preferably adapted to house and protect the elastic members 4805, the optical fiber 4810, the inner tube 4815, the outer strength members 4820, and the communication interfaces 4825. The outer tube 4830 may be any number of conventional commercially available tubes.

In a preferred embodiment, the teachings of the optical sensor 4800 are incorporated into the optical sensors of the optical sensing systems 100, 700, 800, 900, 1000, 1200, 1300, 1400, 1500, 1700, 1800, 1900, 2000, 2300, 2500, and 3700.

As will be recognized by persons of ordinary skill in the art having the benefit of the present disclosure, multiple variations and modifications can be made in the embodiments of the invention. Although certain illustrative embodiments of the invention have been shown and described, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method of optically sensing environmental conditions, comprising:

generating pulses of light;

reflecting the pulses of light at partially reflective locations;

delaying the reflected pulses of light;

interfering the reflected pulses of light with the delayed reflected pulses of light to generate an interference pattern;

splitting the interference pattern into a first part, a second part and a third part;

processing the first, second and third parts to generate a phase shift representative of the spacing between adjacent partially reflective locations, wherein processing the first, second and third parts to generate a phase shift representative of the spacing between adjacent partially reflective locations, includes:

converting the first, second and third parts to rectangular coordinates; and converting the rectangular coordinates to polar coordinates.

2. The method of claim 1, further including unwrapping the phase of the polar coordinates.

3. The method of claim 1, wherein generating pulses of light includes:

controllably blocking a constant light source.

4. The method of claim 3, wherein controllably blocking includes:

matching the polarization of an optical conductor.

* * * * *